United States Patent
Morioka et al.

(10) Patent No.: US 10,025,037 B2
(45) Date of Patent: Jul. 17, 2018

(54) METHOD OF SPLICING OPTICAL FIBER AND OPTICAL FIBER SPLICING DEVICE

(71) Applicants: FUJIKURA LTD., Koto-ku, Tokyo (JP); NIPPON TELEGRAPH AND TELEPHONE CORPORATION, Chiyoda-ku, Tokyo (JP)

(72) Inventors: Hiroyuki Morioka, Sakura (JP); Takashi Yamaguchi, Sakura (JP); Kazuhiro Takizawa, Sakura (JP); Kazutoshi Takamizawa, Tsukuba (JP); Tetsuhiro Numata, Tsukuba (JP); Atsushi Hamaoka, Tsukuba (JP); Atsushi Daido, Tsukuba (JP); Tadashi Sasaki, Tsukuba (JP); Masahiro Ida, Tsukuba (JP); Hayato Minami, Tsukuba (JP); Chihiro Suzuki, Tsukuba (JP)

(73) Assignees: FUJIKURA LTD., Tokyo (JP); NIPPON TELEGRAPH AND TELEPHONE CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/342,257

(22) Filed: Nov. 3, 2016

(65) Prior Publication Data

US 2017/0108652 A1   Apr. 20, 2017

Related U.S. Application Data

(63) Continuation of application No. 14/166,470, filed on Jan. 28, 2014, now Pat. No. 9,541,706, which is a
(Continued)

(30) Foreign Application Priority Data

Aug. 9, 2011 (JP) ................. 2011-174047
Aug. 9, 2011 (JP) ................. 2011-174048
(Continued)

(51) Int. Cl.
  *G02B 6/38*   (2006.01)
(52) U.S. Cl.
  CPC ........ *G02B 6/3802* (2013.01); *G02B 6/3803* (2013.01)
(58) Field of Classification Search
  None
  See application file for complete search history.

(56) References Cited

U.S. PATENT DOCUMENTS 5,963,699 A    10/1999  Tanaka
2009/0180742 A1   7/2009  Van Noten et al.
(Continued)

FOREIGN PATENT DOCUMENTS

CN    102057307 A   5/2011
EP     2299305 A1   3/2011
(Continued)

OTHER PUBLICATIONS

Communication dated May 16, 2016 from the United States Patent and Trademark Office in corresponding U.S. Appl. No. 14/166,470.
(Continued)

*Primary Examiner* — Mike Stahl
(74) *Attorney, Agent, or Firm* — Sughrue Mion, PLLC

(57) ABSTRACT

A method of splicing an optical fiber of the invention splices a first optical fiber cable and an optical fiber in a splicing box, the first optical fiber cable is a drop cable or an indoor cable, the optical fiber is drawn from a second optical fiber cable, the method splices a terminal of the first optical fiber
(Continued)

cable and the optical fiber. The method includes: sliding a unit base holding an extended-optical-fiber-attached splice along a rail in a direction in which the unit base approaches a grasper; thereby inserting an inserted optical fiber grasped by the grasper between halved elements of a mechanical splice; and splicing the inserted optical fiber and an extended optical fiber by butt-jointing an end of the inserted optical fiber to the extended optical fiber.

5 Claims, 94 Drawing Sheets

Related U.S. Application Data continuation of application No. PCT/JP2012/070379, filed on Aug. 9, 2012.

(30) Foreign Application Priority Data

| Aug. 9, 2011 | (JP) | 2011-174049 |
|---|---|---|
| Aug. 29, 2011 | (JP) | 2011-186090 |
| Aug. 29, 2011 | (JP) | 2011-186091 |
| Nov. 28, 2011 | (JP) | 2011-259209 |

(56) References Cited

U.S. PATENT DOCUMENTS

| 2010/0316339 A1 | 12/2010 | Dobbins |
| 2011/0079930 A1 | 4/2011 | Saito |

FOREIGN PATENT DOCUMENTS

| JP | 1-126601 A | 5/1989 |
| JP | 8-110439 A | 4/1996 |
| JP | 2002-71999 A | 3/2002 |
| JP | 2005-128139 A | 5/2005 |
| JP | 2005-157286 A | 6/2005 |
| JP | 2006-53318 A | 2/2006 |
| JP | 2006-227575 A | 8/2006 |
| JP | 2007-510941 A | 4/2007 |
| JP | 2007-121603 A | 5/2007 |
| JP | 2007-121886 A | 5/2007 |
| JP | 2008-3218 A | 1/2008 |
| JP | 2008-299348 A | 12/2008 |
| JP | 2009-506362 A | 2/2009 |
| JP | 2009-139839 A | 6/2009 |
| JP | 2010-91901 A | 4/2010 |
| JP | 2010-145951 A | 7/2010 |
| TW | M369465 U1 | 11/2009 |
| TW | 201027864 A1 | 7/2010 |
| WO | 2005/052661 A1 | 6/2005 |
| WO | 2007/024912 A1 | 3/2007 |

OTHER PUBLICATIONS

Communication dated Sep. 26, 2016, from the State Intellectual Property Office of People's Republic of China in counterpart Application No. 201280037589.1.
Communication dated Feb. 9, 2015 from the European Patent Office in Counterpart Application No. 12821382.4.
Communication dated Jan. 21, 2016 from the State Intellectual Property Office of the P.R.C. in Counterpart Application No. 201280037589.1.
International Search Report for PCT/JP2012/070379 dated Sep. 11, 2012.
Machine Translation of JP 01-126601 submitted Jan. 28, 2014.
Machine Translation of JP 2005-128139 submitted Jan. 28, 2014.
Machine Translation of JP 2005-157286 submitted Jan. 28, 2014.
Machine Translation of JP 2006-053318 submitted Jan. 28, 2014.
Machine Translation of JP 2007-121603 submitted Jan. 28, 2014.
Machine Translation of JP 2007-121886 submitted Jan. 28, 2014.
Machine Translation of JP 2008-299348 submitted Jan. 28, 2014.
Machine Translation of JP 2009-139839 submitted Jan. 28, 2014.
Machine Translation of JP 2009-506362 submitted Jan. 28, 2014.
Machine Translation of JP 2010-091901 submitted Jan. 28, 2014.
Office Action for Japanese Application 2011-174049 dated Jun. 25, 2013.
Office Action for Japanese Application 2011-259209 dated Feb. 5, 2013.
Office Action issued by Taiwanese Patent Office in Taiwanese Application No. 101128888 dated Jun. 23, 2014.
English translation of written opinion for PCT/JP2012/070379, dated Sep. 11, 2012.
Communication dated Nov. 20, 2017, from the European Patent Office in counterpart European Application No. 12821382.4.
Communication dated Jun. 4, 2018 from the Intellectual Property Office of India in counterpart application No. 818/CHENP/2014.

METHOD OF SPLICING OPTICAL FIBER AND OPTICAL FIBER SPLICING DEVICE

CROSS REFERENCE TO RELATED APPLICATIONS

This is a Continuation of U.S. patent application Ser. No. 14/166,470 filed Jan. 28, 2014, which is a continuation application based on a PCT Patent Application No. PCT/JP2012/070379, filed Aug. 9, 2012, whose priority is claimed on Japanese Patent Application No. 2011-174047 filed on Aug. 9, 2011, Japanese Patent Application No. 2011-174048 filed on Aug. 9, 2011, Japanese Patent Application No. 2011-174049 filed on Aug. 9, 2011, Japanese Patent Application No. 2011-186090 filed on Aug. 29, 2011, Japanese Patent Application No. 2011-186091 filed on Aug. 29, 2011, and Japanese Patent Application No. 2011-259209 filed on Nov. 28, 2011, the contents of which are hereby incorporated by reference.

BACKGROUND OF THE INVENTION

The present invention relates to, a mechanical splice unit, a mechanical splicing tool, and an optical fiber splicing method which butt-joints optical fibers to each other using mechanical splicing.

DESCRIPTION OF THE RELATED ART

A mechanical splice is generally configured to include a base having an optical fiber guide groove, a lid covering the base, and a plate spring clamping the base and the lid in a state where the base is matched to the lid. When the optical fibers are optically spliced to each other, in a state where the lid is slightly opened by use of a wedged member, an optical fiber, which is inserted into the optical fiber guide groove (which may be simply referred to as a guide groove hereinbelow) through one end side of the mechanical splice, is butt-jointed to an optical fiber which is inserted into the guide groove through the other end side, on the guide groove.

When optical fiber splicing is carried out by use of the mechanical splice, generally, a mechanical splicing tool is used.

Conventionally, as shown in FIGS. 108A and 108B schematically showing a splicing tool 81, a structure is used in which, a mechanical splice fixing portion 83 fixing a mechanical splice 2 is provided at the center portion thereof, and optical fiber holder guiding portions 86 and 87 that allow the optical fiber holders 84 and 85 to slide, respectively, are provided at both sides thereof. When optical fiber splicing of the optical fibers 88 and 89 is carried out, the grasped optical fibers 88 and 89 are butt-jointed in the guide groove of the mechanical splice 2 as a result of allowing the optical fiber holder 84 grasping one optical fiber 88 and the optical fiber holder 85 grasping the other optical fiber 89 to slide toward the mechanical splice 2 from both sides thereof in a direction shown by the arrow.

Similar to the splicing tool of FIG. 21, a splicing tool described in Japanese Unexamined Patent Application, First Publication No. 2002-71999 has a constitution that allows the optical fiber holders at both sides of the mechanical splice to slide toward the mechanical splice.

An optical fiber splicing tool performing butt-jointing inside thereof by inserting an optical fiber grasped by an optical fiber holder into a mechanical splice (optical fiber splicing unit) is disclosed in Japanese Unexamined Patent Application, First Publication No. 2008-003218.

In Japanese Unexamined Patent Application, First Publication No. 2006-227575, a tool used for an optical connector is disclosed which is provided with an interposing member and an interposing member driving unit; the interposing member interposes and opens between halved elements of a clamp portion of the optical connector; the interposing member driving unit carries out deformation so as to increase the size thereof in the vertical direction by the lateral pressure applied from right and left sides so that a first movable end portion located at a portion in the vertical direction is engaged with the interposing member and the interposing member driving unit removes the interposing member from between the elements of the optical connector disposed at the other side in the vertical direction.

In Japanese Unexamined Patent Application, First Publication No. 2010-145951, an optical fiber splicing unit is disclosed which splices end portions of optical fibers exposed at the optical fiber cables grasped by the cable grasping member in a state where the end portions are butt-jointed to each other along a predetermined direction; the optical fiber splicing unit is provided with a pair of holding portion members grasping the end portion of the optical fiber opened from the hole, a spring member applying pressure so as to hold a pair of the holding portion members by an elastic force, a guide guiding the cable grasping member mounted thereon, a restraining cover restraining the cable grasping member mounted on the guide, a plurality of insertion units maintaining a pair of the holding portion members so as to be separated from each other, and a locking means that allows the guide to be locked in a housing when the cable grasping member is stored in the housing.

In Japanese Unexamined Patent Application, First Publication No. H8-110439, a pin insertion member that inserts a guide pin into a pin hole of an optical connector is disclosed; the pin insertion member is provided with a holding portion that causes one end side to protrude from an edge face and grasps the other end side of at least two guide pins in a width direction thereof at a predetermined distance, and is characterized in that said at least two guide pins are collectively inserted into respective pin holes of the optical connector.

However, when an optical line is introduced into, for example, a user's new house, a drop cable is dropped and drawn to the user's house from an optical closure of light communication lines suspended in air. In this case, an optical fiber is suitably extracted from an optical fiber trunk line in the optical closure, the optical fiber is cut, and an optical connector is attached to the station side of the optical fiber of the cutting point thereof and is optically spliced to a drop-cable side of the optical connector. Later, in the case where the optical line is in non-use due to cancellation of contract of the subscriber line, in order to utilize the non-use optical line, it is necessary to re-splice the station side of the optical fiber of the cutting point to the optical fiber at the opposite side thereof.

At this time, it is necessary to optically splice the station side of the optical connector, which is spliced to the optical connector of the drop cable, to the optical fiber, which is on the opposite side of the station into which the optical line is introduced, at the cutting point.

In this case, an optical-connector-attached relay optical fiber having one end side to which an optical connector is attached is used, the optical connector (relay optical connector) of the optical-connector-attached optical fiber is jointed to the station side of the optical connector through the connector, and the optical fiber (relay optical fiber) of the optical-connector-attached optical fiber may be spliced to the optical fiber that is located opposite to the station side of the optical fiber of the cutting point using mechanical splicing.

In such a case, regarding the optical fiber that is located opposite to the station side of the optical fiber of the cutting point, since the length of the optical fiber extending in the optical closure as an extra length is short such that it is approximately 8 cm, there is a problem in that the operability of optical fiber splicing using mechanical splicing is extremely deteriorated or difficult.

In the case of performing optical fiber splicing using mechanical splicing by use of the aforementioned conventional splicing tool 81 in a state where an extra length of the optical fiber is low as described above, the operability is extremely deteriorated.

Particularly, in the structure sliding the optical fiber holder side, the length of the splicing tool 81 in the longitudinal direction thereof is a large size such as 140 mm or the like in consideration of the sliding distance thereof; therefore, it is difficult to perform butt-jointing of the optical fiber having a short extra length such that the extra length is approximately 80 mm in the above-described optical closure by use of the splicing tool 81 using mechanical splicing.

Since the an extra length of the grasped optical fiber is also short, the operability of moving the optical fiber holder grasping the optical fiber having the short extra length is deteriorated.

Consequently, it is desired to realize the splicing of the optical fiber having the short extra length using mechanical splicing.

However, when an optical fiber is drawn from a terminal and the optical fiber cable is handled for an operation of holding the optical fiber cable, to which a mechanical splice is attached, in an optical joint box or the like, since it is necessary to pay attention with respect to possible damage to the optical fiber, and the operation is not easy.

SUMMARY OF THE INVENTION

The invention was conceived in view of the above-described circumstances and it is an object thereof to provide a mechanical splice unit, a mechanical splicing tool, and an optical fiber splicing method, where it is possible to realize an optical fiber splicing by use of a mechanical splice even if an extra length of one of optical fibers to be spliced is considerably short.

Additionally, the invention was conceived in view of the above-described circumstances and it is an object thereof to provide a mechanical splice unit, a mechanical splicing tool, and an optical fiber splicing method, which reliably prevent the optical fiber drawn from a terminal from being damaged and can provide the optical fiber cable with excellent operatability.

Furthermore, the invention was conceived in view of the above-described circumstances and it is an object thereof to provide a mechanical splice unit, a mechanical splicing tool, and an optical fiber splicing method, where the optical fiber drawn from the terminal of the optical fiber cable is prevented from being damaged, and it is possible to provide the optical fiber cable with excellent operatability.

Moreover, the invention was conceived in view of the above-described circumstances and it is an object thereof to provide a mechanical splice unit, a mechanical splicing tool, and an optical fiber splicing method, where the optical fiber grasped by a mechanical splice is prevented from being damaged, and it is possible to provide the mechanical splice with excellent operatability.

A mechanical splice unit of a first aspect of the invention includes: a mechanical splice having an optical fiber guide groove that is formed at matching surfaces of both a base and a lid in a two-part-divided structure, the mechanical splice being capable of grasping a first optical fiber at one end side of the lid; and an optical fiber splice auxiliary tool used for splice of the first optical fiber that is grasped by the mechanical splice, wherein the optical fiber splice auxiliary tool includes a mechanical splice grasping portion that holds the mechanical splice and a guided portion that is slidable along a guide portion formed at a splicing tool to which a second optical fiber to be spliced to the first optical fiber is fixed.

In the mechanical splice unit of the first aspect of the invention, it is preferable that the first optical fiber be grasped at one end side of the lid and the other end of the lid be in an opened state.

It is preferable that the mechanical splice unit of the first aspect of the invention further include a wedge that is attached to the mechanical splice and causes the other end of the lid of the mechanical splice to be in an opened state.

In the mechanical splice unit of the first aspect of the invention, it is preferable that the first optical fiber be an extended optical fiber that is drawn from a terminal of an optical fiber cable, and the mechanical splice unit further include an outer coating grasping portion that grasps an outer coating of the terminal of the optical fiber cable.

In the mechanical splice unit of the first aspect of the invention, it is preferable that the mechanical splice grasping portion and the outer coating grasping portion be formed separately from each other and a flexion be formed at the extended optical fiber provided therebetween.

It is preferable that the mechanical splice unit of the first aspect of the invention further include a protuberance that is provided at outer surfaces of both sides of side wall portions, the side wall portions forming the mechanical splice grasping portion, and the protuberance be engaged with an engagement recess that is formed at an optical fiber splice auxiliary tool engagement end provided at the splicing tool, and the optical fiber splice auxiliary tool be thereby fixed to the splicing tool side.

It is preferable that the mechanical splice unit of the first aspect of the invention further include a substrate portion in which the mechanical splice grasping portion and the outer coating grasping portion are provided on one face side thereof, and the mechanical splice grasping portion and the outer coating grasping portion be formed integrally with the substrate portion.

In the mechanical splice unit of the first aspect of the invention, it is preferable that the first optical fiber be an extended optical fiber that is drawn from a terminal of an optical fiber cable, the mechanical splice unit further include: a cable grasping member that grasps the optical fiber cable; a grasping member holding portion that movably holds the cable grasping member along a longitudinal direction of the mechanical splice; a first splicing tool including a first wedge that allows one end side of the lid of the mechanical splice to be in an opened state; and a second splicing tool including a second wedge that allows the other end of the lid of the mechanical splice to be in an opened state.

In the mechanical splice unit of the first aspect of the invention, it is preferable that the first splicing tool include a spacer that stops movement of the cable grasping member of the mechanical splice along the longitudinal direction thereof by a predetermined distance with respect to the mechanical splice; a front-end portion of the extended optical fiber be sandwiched between the base and the lid so as to be grasped and fixed therebetween by removing the first wedge from between the base and the lid of the mechanical splice; and the mechanical splice unit be capable of forming flexural deformation at the extended optical fiber between the cable grasping member and one end side of the mechanical splice in the longitudinal direction thereof as a result of causing the cable grasping member to further come close to one end side of the mechanical splice in the longitudinal direction thereof.

In the mechanical splice unit of the first aspect of the invention, it is preferable that the spacer be pressed into a spacer accommodating portion, the spacer accommodating portion be formed between a positioning protuberance provided at the grasping member holding portion and a positioning recess portion provided at the mechanical splice grasping portion; and the positioning protuberance include an elastic member that presses the spacer onto one end side of the mechanical splice in the longitudinal direction thereof.

In the mechanical splice unit of the first aspect of the invention, it is preferable that the grasping member holding portion include a lever member that is rotatable in the range of a regulated position to a standby position by rotating on an axis line in a direction perpendicular to the longitudinal direction of the mechanical splice, the regulated position maintaining a back-end portion of the cable grasping member and regulating backward movement thereof, the standby position not regulating the backward movement of the cable grasping member.

In the mechanical splice unit of the first aspect of the invention, it is preferable that the lever member include a locking protuberance that holds the lever member at the standby position by being locked on the first splicing tool, a lock which is due to the locking protuberance be released and the lever member be rotatable toward the regulated position by removing the first wedge from between the base and the lid of the mechanical splice.

In the mechanical splice unit of the first aspect of the invention, it is preferable that the second splicing tool include: a ring-shaped wedge driving portion that is used to remove the second wedge from between the base and the lid; and holding wall portions that contains and holds the mechanical splice grasping portion and the optical fiber splice auxiliary tool, and that the second splicing tool remove the second wedge from between the base and the lid by applying a lateral pressure to the wedge driving portion and the second splicing tool being capable of separating the optical fiber splice auxiliary tool from the mechanical splice grasping portion by opening between the holding wall portions.

In the mechanical splice unit of the first aspect of the invention, it is preferable that the grasping member holding portion have a substantially square insert hole in cross section into which a fitting portion protruding toward a front side of the cable grasping member is inserted, and the cable grasping member be capable of fitting onto the grasping member holding portion in a plurality of directions different from each other by 90°, which are from the center corresponding to an axis direction of the extended optical fiber.

A mechanical splicing tool of a second aspect of the invention includes: a mechanical splice guide portion that allows a mechanical splice to linearly slide, the mechanical splice having an optical fiber guide groove formed at matching surfaces of both a base and a lid in a two-part-divided structure, the mechanical splice being capable of grasping a first optical fiber at one end side of the lid; and an optical fiber location fixing portion that fixes a location of a second optical fiber provided at a position facing a slide direction of the mechanical splice.

In the mechanical splicing tool of the second aspect of the invention, it is preferable that the first optical fiber be grasped at one end side of the lid and the other end of the lid be in an opened state in the mechanical splice.

It is preferable that the mechanical splicing tool of the second aspect of the invention further include an anti-separation portion that is provided at a portion of the mechanical splice guide portion and prevents the mechanical splice from separated from the mechanical splice guide portion.

In the mechanical splicing tool of the second aspect of the invention, it is preferable that the mechanical splice guide portion include a structure which slidably guides an optical fiber splice auxiliary tool holding a mechanical splice.

In the mechanical splicing tool of the second aspect of the invention, it is preferable that the optical fiber location fixing portion be configured by a holder fixing portion that fixes an optical fiber holder holding a second optical fiber.

In the mechanical splicing tool of the second aspect of the invention, it is preferable that the optical fiber holder be slidable on the holder fixing portion in the holder fixing portion, and the length in the tool longitudinal direction of the holder fixing portion is substantially the same as the length in the tool longitudinal direction of the optical fiber holder.

In the mechanical splicing tool of the second aspect of the invention, it is preferable that the mechanical splice guide portion be provided with a front-end position mark M that indicates a front-end position of an optical fiber extended from the optical fiber holder in a state where the optical fiber holder is located at the holder fixing portion.

It is preferable that the mechanical splicing tool of the second aspect of the invention further include a projected portion that is provided at a boundary portion of the mechanical splice guide portion and the holder fixing portion, the projected portion serving as a positioning portion that positions the optical fiber holder at a predetermined position.

It is preferable that the mechanical splicing tool of the second aspect of the invention further include a projected portion that is provided at a boundary portion of the mechanical splice guide portion and the optical fiber location fixing portion, the projected portion serving as a positioning portion that positions the mechanical splice at a predetermined position.

In the mechanical splicing tool of the second aspect of the invention, it is preferable that a front edge face of the optical fiber holder in a state of being fixed to the holder fixing portion at a predetermined position be a forward movement limit determination portion that determines a limit of forward movement of the optical fiber splice auxiliary tool.

It is preferable that the mechanical splicing tool of the second aspect of the invention further include an optical fiber splice auxiliary tool engagement end that is provided near a boundary of the holder fixing portion of the mechanical splice guide portion and has an engagement recess that is engaged with a protuberance provided at both side faces of the optical fiber splice auxiliary tool.

In the mechanical splicing tool of the second aspect of the invention, it is preferable that the optical fiber splice auxiliary tool engagement end be consecutively connected to a U-shaped curved portion that is connected to both side portions of a wide portion at a front-end side of a tool.

It is preferable that the mechanical splicing tool of the second aspect of the invention further include an optical fiber holder engagement end that is provided near a boundary of the mechanical splice guide portion of the holder fixing portion and has an engagement recess that is engaged with a protuberance provided at both side faces of the optical fiber holder.

In the mechanical splicing tool of the second aspect of the invention, it is preferable that the optical fiber holder engagement end be consecutively connected to a U-shaped curved portion that is connected to both side portions of a wide portion at a front-end side of a tool.

An optical fiber splicing method of a third aspect of the invention includes: causing a mechanical splice to move forward toward a second optical fiber where a position of the second optical fiber is fixed, the mechanical splice having an optical fiber guide groove that is formed at matching surfaces of both a base and a lid in a two-part-divided structure, the mechanical splice grasping a first optical fiber at one end side of the lid where the other end of the lid is in an opened state; inserting the second optical fiber into the optical fiber guide groove of a mechanical splice; and butt-jointing the first optical fiber to the second optical fiber.

In the optical fiber splicing method of the third aspect of the invention, it is preferable that the second optical fiber be held by an optical fiber holder.

It is preferable that the optical fiber splicing method of the third aspect of the invention further include: holding the mechanical splice using an optical fiber splice auxiliary tool that holds the mechanical splice and is slidable on a mechanical splice guide portion; and causing the optical fiber splice auxiliary tool that holds the mechanical splice to move forward toward the second optical fiber.

It is preferable that the optical fiber splicing method of the third aspect of the invention further include: using an anti-separation portion that is provided at a mechanical splicing tool that has the mechanical splice guide portion, prevents the optical fiber splice auxiliary tool from rising from the mechanical splice guide portion.

In the optical fiber splicing method of the third aspect of the invention, it is preferable that an attachment be used as a spacer that determines a coating removal start position or an optical fiber cutting position in steps of removing a coating of an optical fiber and cutting an optical fiber by a predetermined length, the steps be prior to butt-jointing the first optical fiber to the second optical fiber, the attachment integrally have a table portion on which the optical fiber holder holding the second optical fiber is mounted and a front portion which is formed at a front side of the table portion and have a predetermined length, and the attachment be integrated with the optical fiber holder so as to be attachable thereto and detachable therefrom in a state of being positioned thereto.

In the optical fiber splicing method of the third aspect of the invention, it is preferable that the first optical fiber be an extended optical fiber drawn from a terminal of an optical fiber cable, and the optical fiber splice auxiliary tool hold a substrate portion on which a mechanical splice grasping portion that holds the mechanical splice and an outer coating grasping portion that grasps an outer coating of the terminal of the optical fiber cable are provided on one face side thereof.

In the optical fiber splicing method of the third aspect of the invention, it is preferable that the first optical fiber be an extended optical fiber drawn from a terminal of an optical fiber cable, the optical fiber splicing method include a step of holding a cable grasping member that grasps the optical fiber cable at a grasping member holding portion, the step of holding the cable grasping member be prior to a step of grasping the first optical fiber at one end side of the lid and causing the other end of the lid to be in an opened state, and the optical fiber splice auxiliary tool hold a substrate portion on which a mechanical splice grasping portion that holds the mechanical splice and the grasping member holding portion that holds the cable grasping member are provided on one face side thereof.

Effects of the Invention

According to the mechanical splice unit of the first aspect of the invention, the mechanical splice grasping the first optical fiber is held by the mechanical splice grasping portion provided to the optical fiber splice auxiliary tool, butt-jointing of the mechanical splice to the second optical fiber that is fixed to the splicing tool can be carried out as a result of allowing the mechanical splice to only slide along the guide portion of the splicing tool to which the guide portion guiding the optical fiber splice auxiliary tool is provided.

Furthermore, as a result of sliding of the optical fiber splice without direct sliding of the mechanical splice, the mechanical splice can smoothly move forward in a linear manner with a high level of precision, and a splicing method of butt-jointing the optical fibers to each other is smoothly carried out as a result of allowing the mechanical splice side to move.

As described above, since it is not necessary to move the second optical fiber, the butt-jointing by use of the mechanical splice can be uneventfully carried out even where the an extra length of the second optical fiber is short, a problem of deterioration in or difficulty in operability which is due to a short extra length of the second optical fiber is solved.

Moreover, a movement operation of the optical fiber having a short extra length is poor in operability; however, since the position of the second optical fiber is fixed during butt-jointing, in this point, the problem of deterioration in operability is solved.

According to the optical fiber splice auxiliary tool to which the case accommodating the first optical fiber is attached, the first optical fiber protruding from the mechanical splice does not hinder a work operation, and the operability in the operation of the optical fiber splicing improves.

According to the mechanical splice unit having the optical fiber splice auxiliary tool to which a mechanical splice is attached, when the optical fiber splicing is carried out at a workplace, since the butt-jointing of the mechanical splice to the second optical fiber can be carried out as a result of allowing the unmodified mechanical splice unit to only slide along the guide portion of the splicing tool, and operability in a workplace improves.

According to the mechanical splice unit having the optical fiber splice auxiliary tool to which a mechanical splice is attached and to which the case is attached, when the optical fiber splicing is carried out at a workplace, the first optical fiber protruding from the mechanical splice does not hinder a work operation, since the butt-jointing of the mechanical splice to the second optical fiber can be carried out as a result of allowing the unmodified mechanical splice unit to only slide along the guide portion of the splicing tool, the optical fiber splicing operation at the workplace becomes extremely simple, operability at the workplace significantly improves in cooperation with improvement of operability of splicing the optical fiber having a short extra length improves.

Furthermore, the mechanical splice unit can be used as a single part, handling of the mechanical splice unit is easy without being complicated in not only a step of splicing operation but also various situations such as parts management, carrying of the part to a workplace, or the like, and the efficiency thereof improves under various situations.

Since a wedge is preliminarily attached to the mechanical splice, operability in a workplace improves.

Moreover, since a structure is used in which a wedge is attached to a wedge unit including engagement claws that detachably engage with both wall portions of the optical fiber splice auxiliary tool, operation of the wedge becomes easy.

In the case where the first optical fiber is an optical-connector-attached optical fiber, this first optical fiber may be applied to the optical splicing between, an optical connector attached to the station side of the optical fiber, that is, a cut optical fiber which has been cut in the optical closure when an optical line is introduced into the user's house, and the optical fiber having a short extra length on a side opposite to the station side of the cutting point; in this case, effects of the invention, that an extra length of one of optical fibers becomes short, are extremely and effectively obtained.

According to the mechanical splicing tool or the optical fiber splicing method of the invention, since the first optical fiber is butt jointed to the second optical fiber as a result of causing the mechanical splice grasping the first optical fiber at one end side of the lid to move forward to the positionally-fixed second optical fiber, that is, since it is not necessary to move the second optical fiber, the butt-jointing by use of the mechanical splice can be uneventfully carried out even where the an extra length of the second optical fiber is short, a problem of deterioration in or difficulty in operability which is due to a short extra length of the second optical fiber is solved.

Additionally, the operability of operation is deteriorated which moves the optical fiber holder grasping the optical fiber having a short extra length; however, since the position of the optical fiber holder is fixed during butt-jointing, in this point, the problem of deterioration in operability is solved.

As a result of employing not only a constitution that allows the mechanical splice to directly slide on the mechanical splicing tool but also a constitution of performing the sliding via the optical fiber splice auxiliary tool holding the mechanical splice as described above, it is possible to allow the mechanical splice to smoothly move.

According to the mechanical splicing tool or the optical fiber splicing method of the invention, since the first optical fiber can be butt jointed to the second optical fiber as a result of causing the mechanical splice grasping the first optical fiber at one end side of the lid to move forward to the positionally-fixed second optical fiber while the anti-rising portion preventing the mechanical splice from being separated, that is, since it is not necessary to move the second optical fiber, the butt-jointing by use of the mechanical splice can be uneventfully carried out even where the an extra length of the second optical fiber is short, a problem of deterioration in or difficulty in operability which is due to a short extra length of the second optical fiber is solved.

Additionally, the operability of operation is deteriorated which moves the optical fiber holder grasping the optical fiber having a short extra length; however, since the position of the optical fiber holder is fixed during butt-jointing, in this point, the problem of deterioration in operability is solved.

Since it is not necessary to move the second optical fiber during butt-jointing, even where a structure allowing the optical fiber holder to slide as described above is used, the length of the optical fiber holder in a tool-longitudinal direction can be substantially the same as the length of the holder fixing portion in the tool-longitudinal direction, and it is possible to shorten the overall length of the mechanical splicing tool.

Accordingly, it is possible to adequately shorten the length of the second optical fiber that is to be subjected to butt-jointing.

As a result of employing not only a constitution that allows the mechanical splice to directly slide on the mechanical splicing tool but also a constitution of performing the sliding via the optical fiber splice auxiliary tool holding the mechanical splice as described above, it is possible to allow the mechanical splice to smoothly move.

As described above, the length of the second optical fiber protruding from the optical fiber holder is easily determined based on the front-end position mark.

Moreover, positioning of the optical fiber holder is easy.

Additionally, forward-movement limit position of the mechanical splice can be accurately set.

Furthermore, the forward-movement limit position of the mechanical splice and the position of the optical fiber holder, which should correspond to each other, are simply determined with precision.

Moreover, as a result of causing the protuberance provided to the optical fiber splice auxiliary tool to engage with the engagement recess of the optical fiber splice auxiliary tool engagement end close to the splicing tool, it is possible to suitably fix the optical fiber splice auxiliary tool holding the first optical fiber to the splicing tool during a butt-jointing operation.

In addition, the engagement recess of the optical fiber splice auxiliary tool engagement end that is consecutively connected to the U-shaped curved portion can hold the protuberances provided at both side faces of the optical fiber splice auxiliary tool due to elastic action of the U-shaped curved portion, and it is possible to hold the optical fiber splice auxiliary tool with a suitable holding pressure.

Furthermore, the protuberance provided at the optical fiber holder is engaged with the engagement recess of the optical fiber holder engagement end, which is close to the splicing tool, and it is thereby possible to suitably fix the optical fiber holder grasping the second optical fiber to the splicing tool during a butt-jointing operation.

In addition, the engagement recess of the optical fiber holder engagement end that is consecutively connected to the U-shaped curved portion can hold the protuberances provided at both side faces of the optical fiber holder due to elastic action of the U-shaped curved portion, and it is possible to hold the optical fiber holder with a suitable holding pressure.

According to the invention, since the splice holder portion and the outer coating grasping portion are provided at a common base body, the relative position between the terminal of the optical fiber cable and the splice is always constant.

Consequently, during an operation of accommodating optical fibers to the optical fiber splicing box or the like, excessive force is not applied to the optical fiber between the terminal and the splice, and it is possible to prevent damage thereto.

Therefore, excellent operatability is realized.

Moreover, the optical fiber splicing unit of the invention has a simple structure and can be reduced in size, and therefore, is accommodated in an optical joint box (optical termination box or the like) and can be used without modification.

According to the invention, the optical fiber drawn from the terminal of the optical fiber cable can be prevented from being damaged, and it is possible to provide the optical fiber cable with excellent operatability.

According to the invention, the optical fiber grasped by a mechanical splice is prevented from being damaged, and it is possible to provide the mechanical splice with excellent operatability.

Furthermore, it is possible to simply carry out: stacking of a plurality of optical fiber splicing units in layers; or thereafter, separating them.

BRIEF DESCRIPTION OF THE DRAWINGS

FIG. 11 is a perspective view showing only the splicing tool, a slider, and an optical fiber holder shown in FIG. 1 or the like.

DETAILED DESCRIPTION OF THE INVENTION

Hereinafter, an optical fiber splice auxiliary tool, an mechanical splice unit, and an optical fiber splicing method, which carries out the invention, will be described with reference to drawings.

First Embodiment

Figure 1:
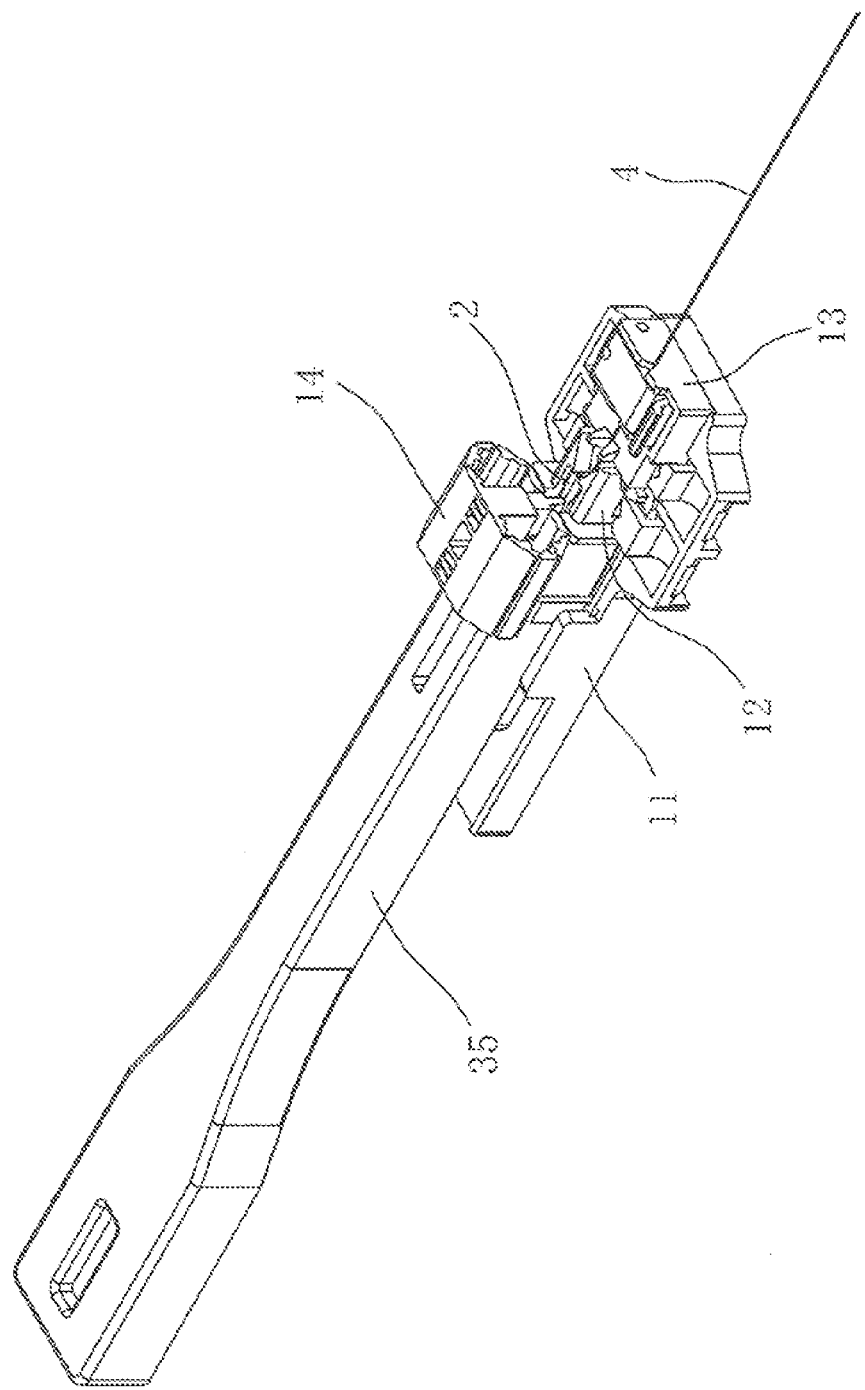
FIG. 1 is a perspective view showing a state where butt-jointing of optical fibers is carried out by mechanical splice using a mechanical splice unit, a mechanical splicing tool, and an optical fiber splicing method of a first embodiment of the invention.
Figure 2:
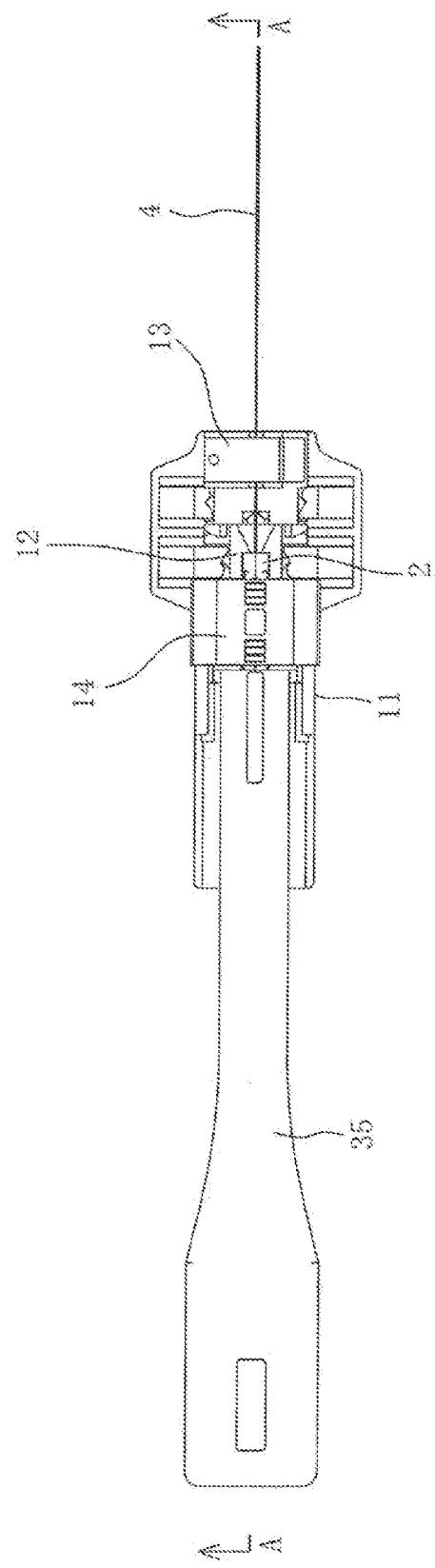
FIG. 2 is a plan view showing FIG. 1.
Figure 3:
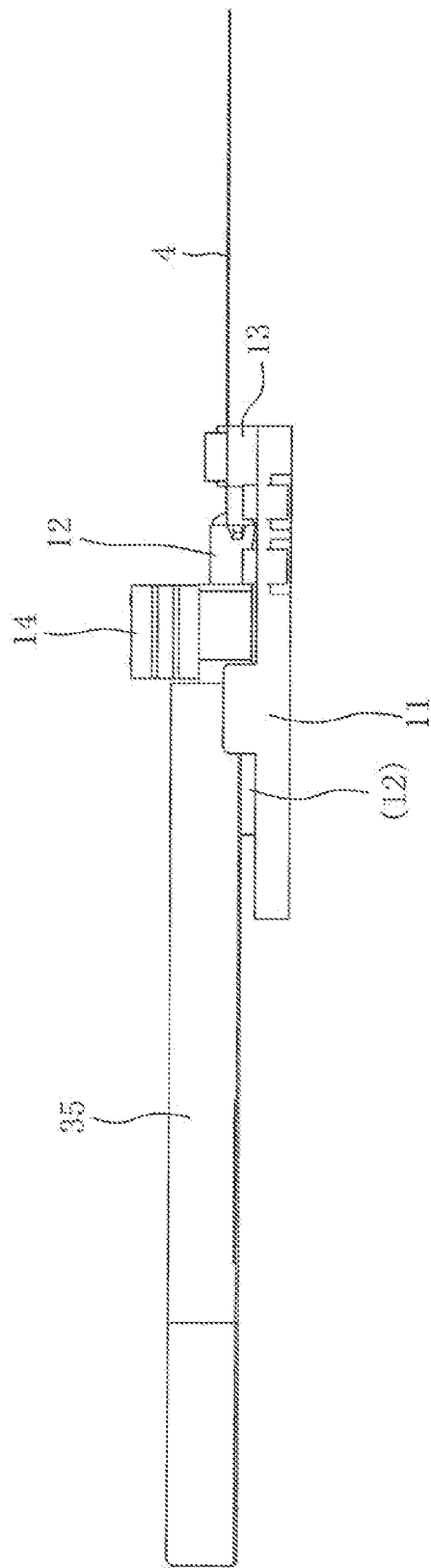
FIG. 3 is a front view showing FIG. 1.

FIGS. 1 to 3 shows a state where butt-jointing of optical fibers is carried out by a mechanical splice 2 using a mechanical splicing tool 11 and an optical fiber splice auxiliary tool 12 of a first embodiment of the invention (However, operation is not completed), FIG. 1 is a perspective view, FIG. 2 is a plan view, and FIG. 3 is a front view.

Figure 4:
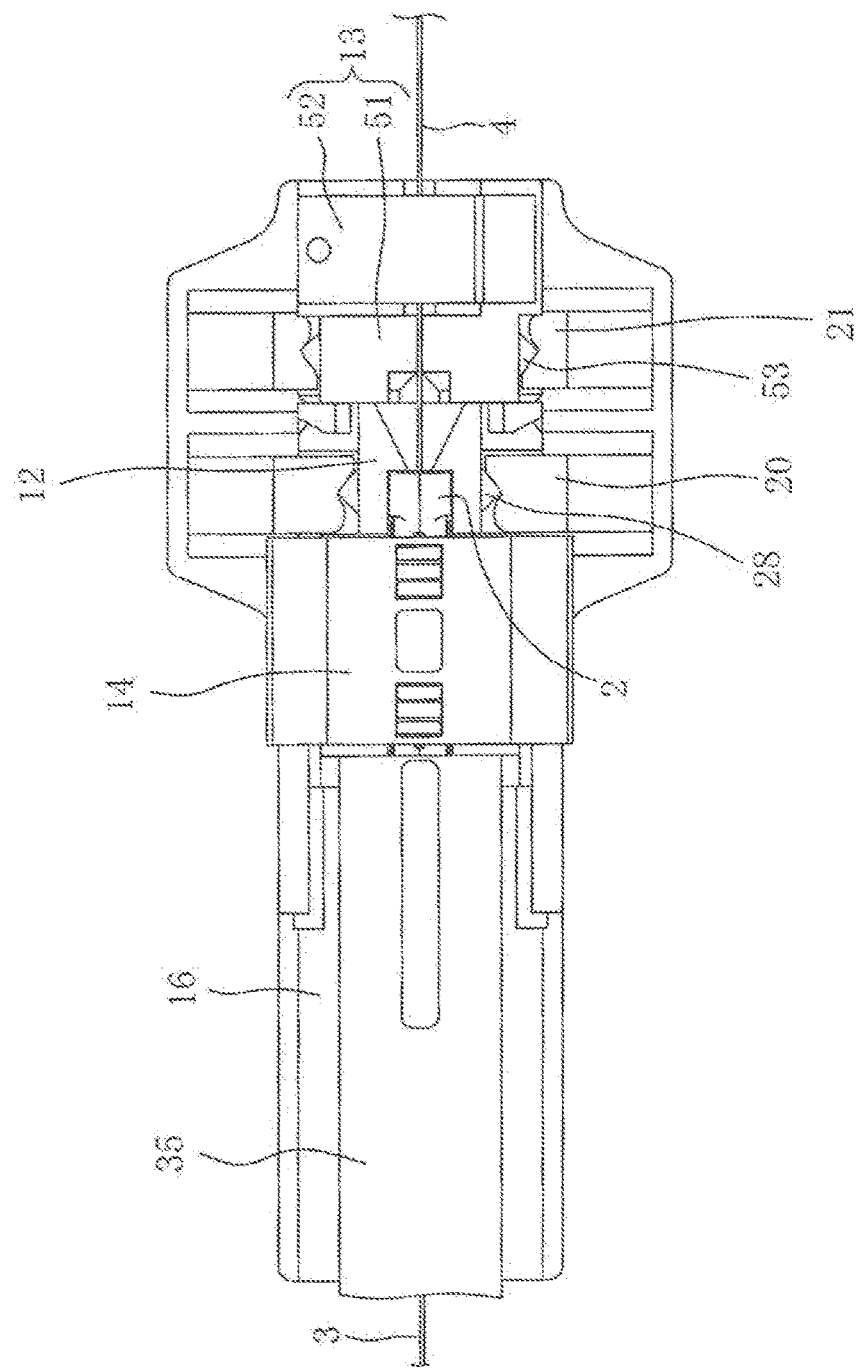
FIG. 4 is an enlarged view showing the vicinity of the splicing tool shown in FIG. 2.
Figure 5:
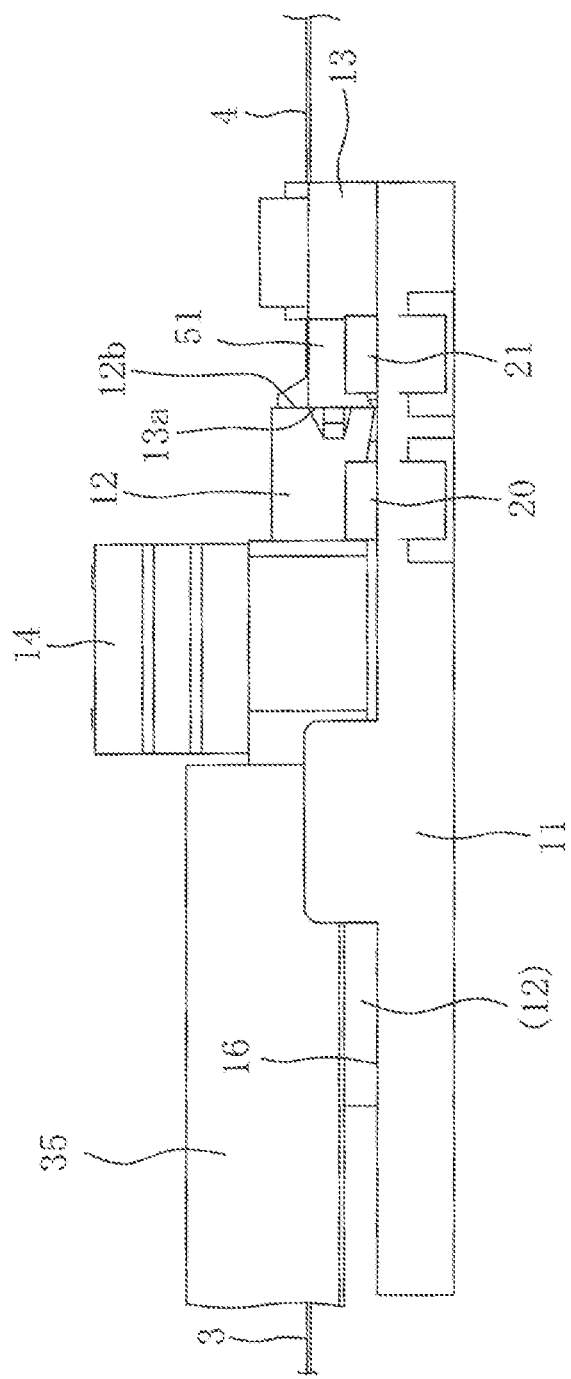
FIG. 5 is a front view showing FIG. 4.
Figure 6:
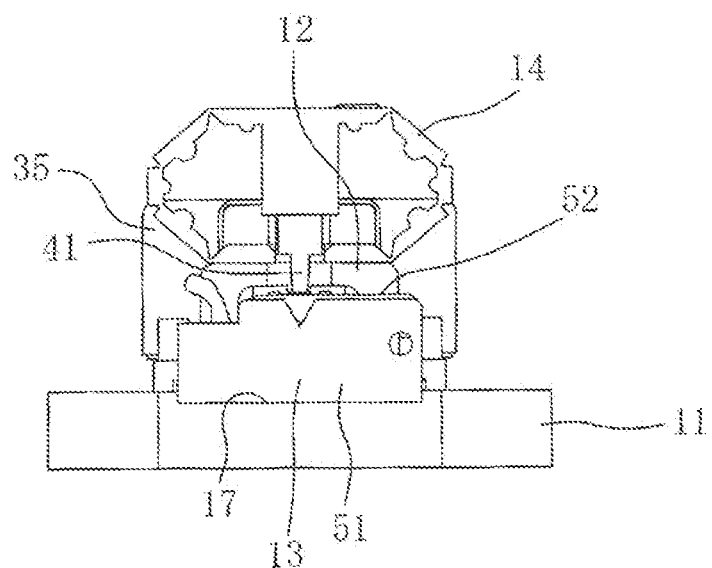
FIG. 6 is a right side view showing FIG. 5.

FIG. 4 is an enlarged view showing the vicinity of the splicing tool shown in FIG. 2, FIG. 5 is a front view showing FIG. 4, and FIG. 6 is a right side view showing FIG. 5.

Figure 7:
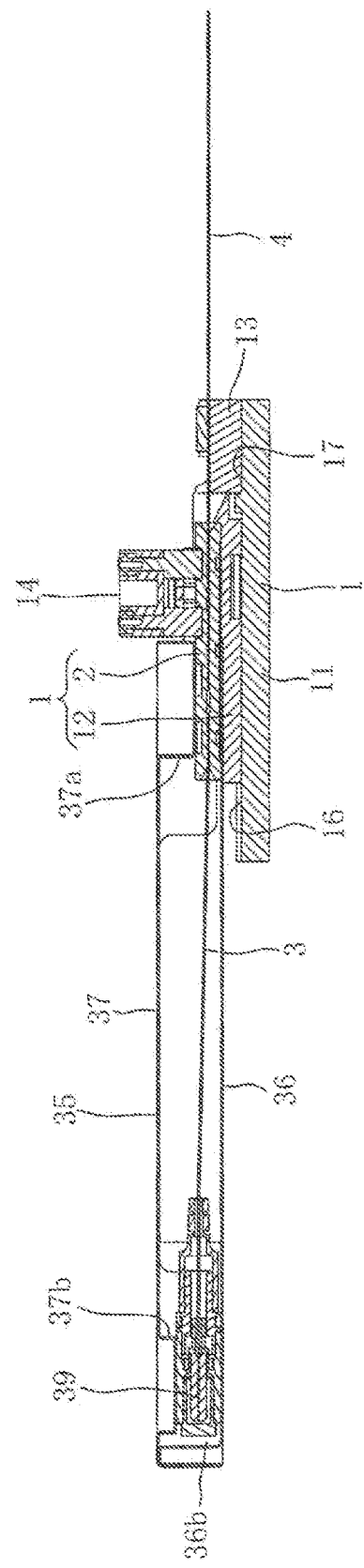
FIG. 7 is a cross-sectional view taken along the line A-A shown in FIG. 2.
Figure 8:
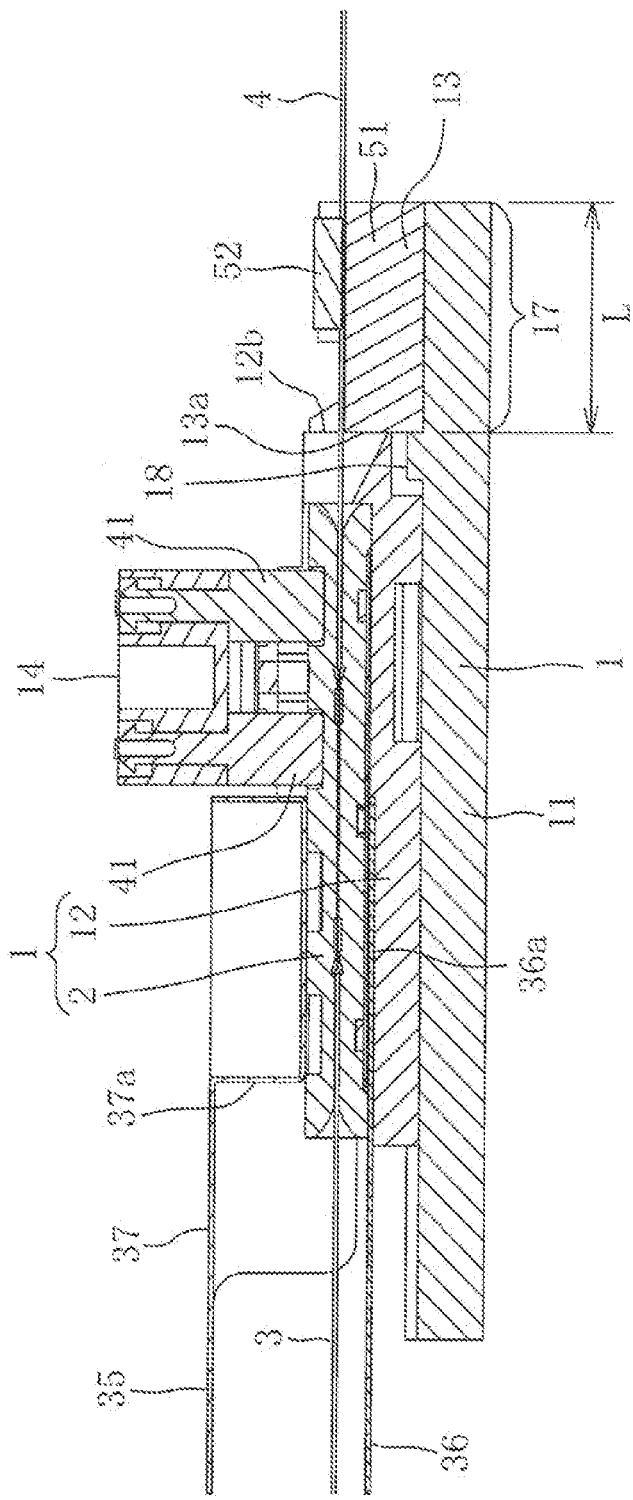
FIG. 8 is an enlarged view showing the vicinity of the splicing tool shown in FIG. 7.
Figure 9:
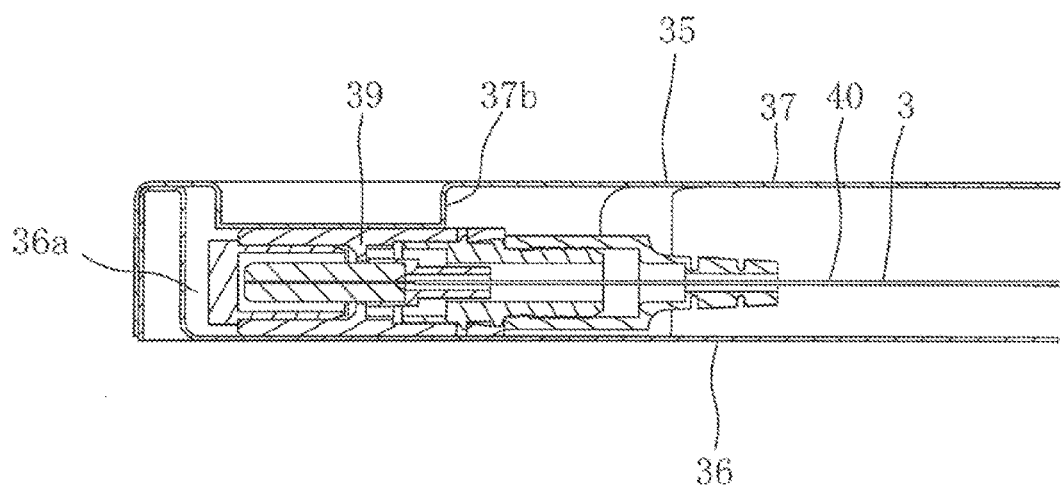
FIG. 9 is an enlarged view showing the vicinity of the optical connector of an optical-connector-attached optical fiber shown in FIG. 7.

Additionally, FIG. 7 is a cross-sectional view taken along the line A-A shown in FIG. 2. FIG. 8 is an enlarged view showing the vicinity of the splicing tool shown in FIG. 7. FIG. 9 is an enlarged view showing the vicinity of the optical connector of an optical-connector-attached optical fiber shown in FIG. 7.

The optical fiber splice auxiliary tool 12 is used when the first optical fiber 3 is butt-jointed to the second optical fiber 4 by use of the mechanical splice 2. Particularly, in the case where an extra length of one of butt-jointed optical fibers is short, for example, in the optical closure provided at the light communication line as described above, the optical fiber splice auxiliary tool is an extremely effective optical fiber splice auxiliary tool.

The mechanical splicing tool 11 is used when the first optical fiber 3 is butt-jointed to the second optical fiber 4 by use of the mechanical splice 2. Particularly, in the case where an extra length of one of butt-jointed optical fibers is short, for example, in the optical closure provided at the light communication line as described above, the mechanical splicing tool is an extremely effective mechanical splicing tool.

Figure 10C:
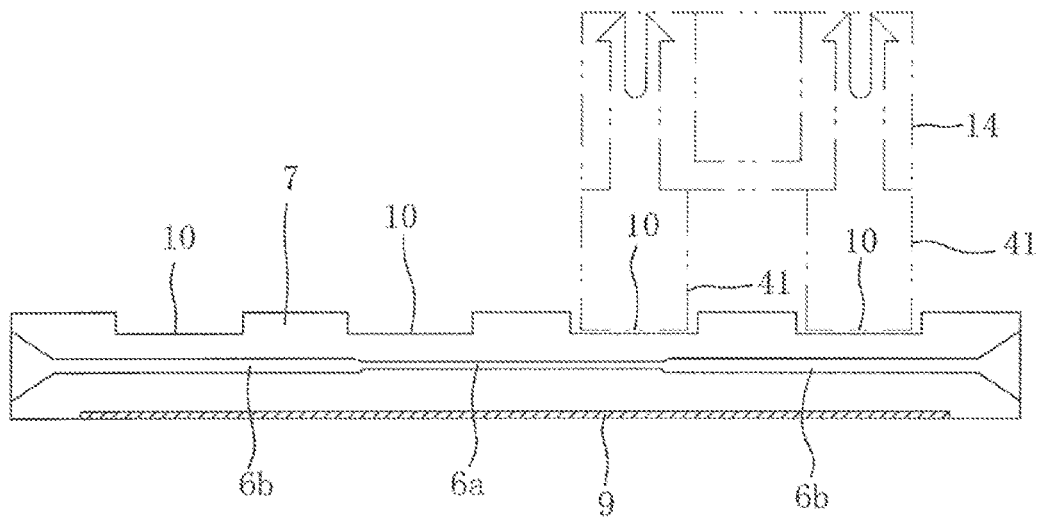
FIG. 10C is a cross-sectional view taken along the line B-B shown in FIG. 10B, showing the mechanical splice used in the first embodiment of the invention.
Figure 10A:
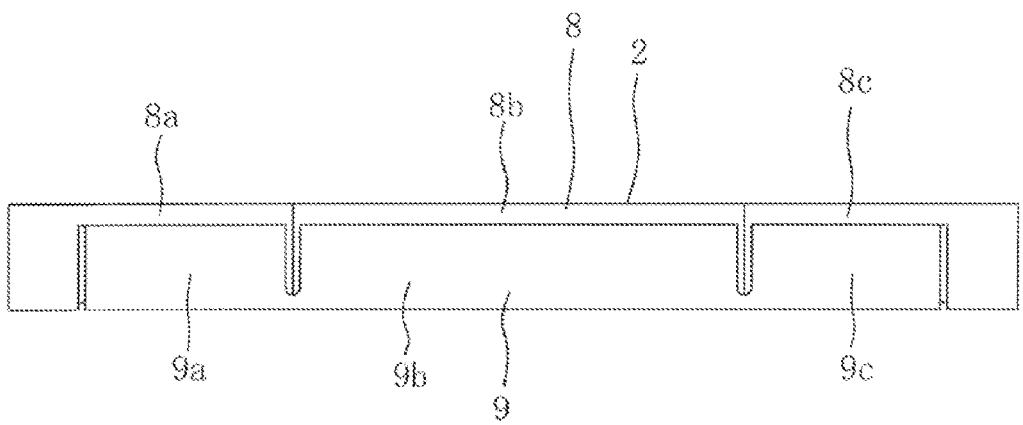
FIG. 10 A is a front view showing the mechanical splice used in the first embodiment of the invention.
FIG. 10B is an enlarged right side view showing the mechanical splice used in the first embodiment of the invention.
Figure 10B:
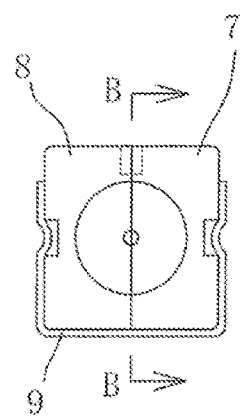

As shown in FIGS. 10A to 10C, this mechanical splice is generally known and is configured to include: a base 7 having optical fiber guide grooves 6a and 6b (hereinafter, simply refer to guide groove); a lid 8 that is to be covered with the base 7; and a C-shaped plate spring 9 clamping the base 7 and the lid 8 in a state where the base and the lid are attached to each other.

In other cases, it is only necessary to form the optical fiber guide groove in at least one of the base 7 and the lid 8.

Reference numeral 6a is a groove accommodating a bare fiber having a diameter of 0.125 mm. Reference numeral 6b is a groove accommodating a cover portion having a diameter of 0.25 mm.

Particularly, both the first optical fiber 3 and the second optical fiber 4, which are described in the first embodiment of the invention, are constituted of an optical fiber; the optical fiber has a bare fiber having 0.125 mmφ, a 0.25-mmφ UV resin coating formed on the bare fiber, and a 0.5-mmφ UV resin coating formed thereon.

These fibers are not distinguished from each other in each of the drawings, a 0.5 mmφ-optical fiber is located at the inlet port of the mechanical splice 2, a 0.25 mmφ-optical fiber is located at the guide groove 6b in the mechanical splice 2, and a bare fiber having a diameter of 0.125 mm is located at the guide groove 6a.

In the mechanical splice 2 shown as an example in the drawing, the lid 8 is divided into three portions, that is, divided into a divided lid 8a positioned at one end side into which the first optical fiber 3 is inserted, a divided lid 8c positioned at the other end side into which the second optical fiber inserted, and a divided lid 8b positioned at the center thereof.

The C-shaped plate spring 9 has three parts: 9a, 9b, and 9c which are divided by slits and correspond to the three lids: 8a, 8b, and 8c, respectively.

However, the lid 8 is not necessarily divided.

Wedge-insertion recesses 10 which are formed between the base 7 and the lid 8 are provided at four portions of the mechanical splice 2.

In FIGS. 1 to 9, reference numeral 11 represents a mechanical splicing tool that is used in the first embodiment of the invention, reference numeral 12 represents a slider serving as the optical fiber splice auxiliary tool of the first embodiment of the invention, reference numeral 13 represents an optical fiber holder grasping the second optical fiber 4, reference numeral 14 represents a wedge unit, and reference numeral 35 represents a case.

As shown in FIGS. 4 to 8, 11, 12, or the like, the mechanical splicing tool 11 of the first embodiment of the invention (hereinafter, simply refer to splicing tool in some cases) is provided with: a mechanical splice guide portion 16 that is formed of a single member and allows the mechanical splice 2 to slidably guide in a linear manner as a result of allowing the slider 12 serving as the optical fiber splice auxiliary tool to slidably guide in a linear manner; and a holder fixing portion 17 that is provided at a position opposed to the sliding direction of the mechanical splice 2 and fixes an optical fiber holder 13 grasping the second optical fiber 4.

The mechanical splice guide portion 16 is configured to form a wall-shaped guiding surfaces 16b having a low height at both sides of a flat slide surface 16a.

Figure 12:
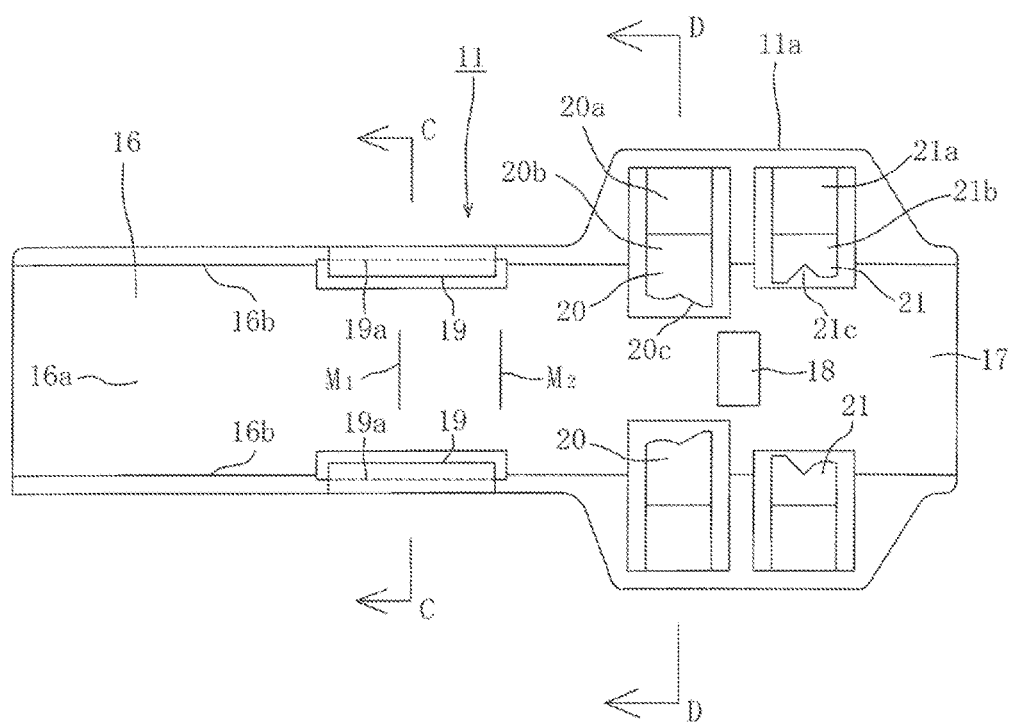
FIG. 12 is a plan view showing the splicing tool of FIG. 11.

Front-end position marks M are provided on the slide surface 16a on which the slider 12 slides; the marks M indicate the front-end position of the second optical fiber 4 that extends from the optical fiber holder 13 in a state where the optical fiber holder 13 is located at the holder fixing portion 17 as shown in FIG. 12.

The front-end position marks M are scale marks used for finding a region at which the coating is to be removed at one view when a coating of the second optical fiber 4 is removed. In the first embodiment of the invention, since coating removal operations which include a 0.5 mm-diameter coating removal operation and a 0.25 mm-diameter coating removal operation are carried out two times, the front-end position marks M1 and M2 are provided at two points.

The front-end position mark M may be a drawn line, an elongated cut line, or the like.

A protruding stopper 18 positioning the optical fiber holder 13 is provided at the boundary portion between the mechanical splice guide portion 16 and the holder fixing portion 17.

Particularly, in the first embodiment of the invention, as shown in FIGS. 5, 8, or the like, when the front-edge face 12b of the slider 12 comes into contact with the positioning face 13a of the front-edge side of the optical fiber holder 13 that is in contact with the stopper 18, the forward movement limit of the slider 12 is defined (the contact position is the forward movement limit).

Additionally, by suitably determining the size of the stopper 18 in the tool longitudinal direction, the surface of the stopper 18 on a side opposite to the optical fiber holder 13 can serve as the stopper determining the forward movement limit of the slider 12.

Moreover, the stopper determining the forward movement limit of the slider 12 can be provided separately from the stopper 18.

As shown in FIG. 8, the length L in the longitudinal direction of the holder fixing portion 17 is substantially the same as the length of the optical fiber holder 13 in the longitudinal direction (represented as L in the same manner).

Figure 13A:
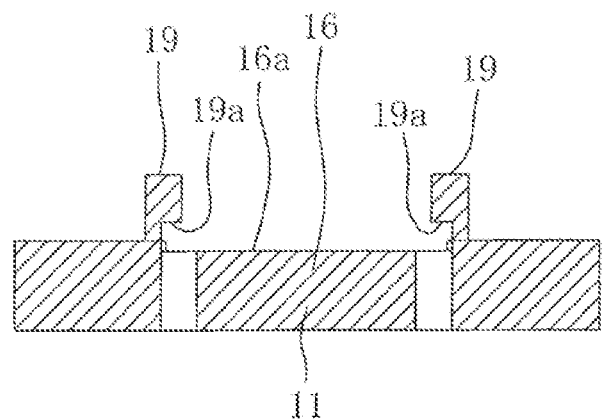
FIG. 13A is a cross-sectional view taken along the line C-C shown in FIG. 12.

As also shown in the cross-sectional view showing FIG. 13A, an anti-slider-separation portion 19, which forms groove portions 19a for preventing the slider 12 from being separated, is provided at both sides in the width direction at near the intermediate portion substantially in the longitudinal direction of the mechanical splice guide portion 16.

Guided portions 12a which are located at both the right and left end portions of the slider 12 described later can be slidably fitted into the groove portions 19a, and the slider 12 is thereby prevented from being separated (prevention of dropping off).

Slider engagement ends 20 engaging with the slider 12 are provided at both sides of the portions close to the stopper 18 of the mechanical splice guide portion 16, and holder engagement ends 21 engaging with the optical fiber holder 13 are provided at both sides of the portions close to the stopper 18 of the holder fixing portion 17.

Figure 13B:
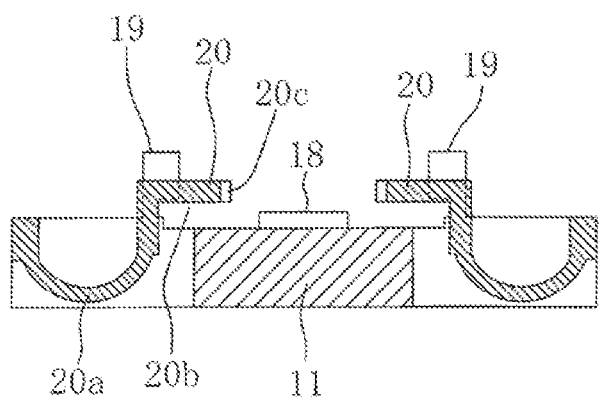
FIG. 13B is a cross-sectional view taken along the line D-D shown in FIG. 12.

As shown in the cross-sectional view showing FIG. 13B, the slider engagement end 20 is provided with: a U-shaped curved portion 20a that is connected to both side portions of a front-end wide portion 11a of the splicing tool 11; and an extending portion 20b that extends from the upper edge of the rising portion located inside the slider engagement end to the center side in the tool width direction. A substantially triangular-shaped engagement recess 20c formed at the extending portions 20b is engaged with a triangle-protuberance 28 formed on both side faces of the slider 12 (described below), and the slider 12 is thereby fixed at the position.

The U-shaped curved portion 20a generates spring action and is capable of elastically holding the slider 12.

The holder engagement end 21 having the same structure as above is provided with a U-shaped curved portion 21a, an extending portion 21b, and an engagement recess 21c.

The slider 12 is a member that grasps the mechanical splice 2 and slides on the mechanical splice guide portion 16 of the splicing tool 11. A mechanical splice unit 1 is constituted of: the mechanical splice 2; the slider 12 serving as the optical fiber splice auxiliary tool grasping the mechanical splice; and a case 35 that accommodates the first optical fiber and is attached to the slider 12.

In other cases, the case 35 may be not used, in this case, the mechanical splice 2 and the slider 12 serving as the optical fiber splice auxiliary tool grasping this constitutes a mechanical splice unit.

Figure 11:
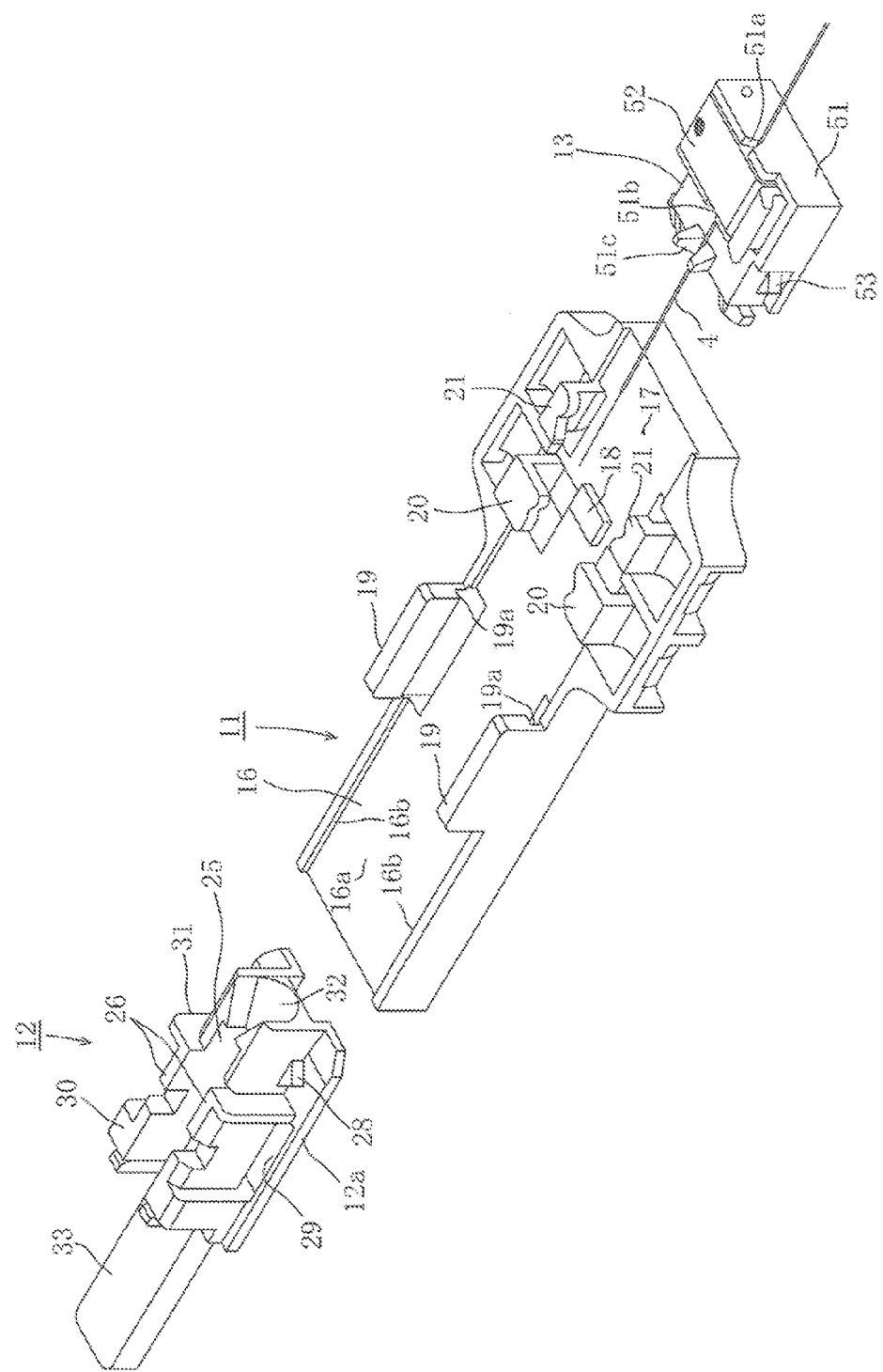
Figure 14:
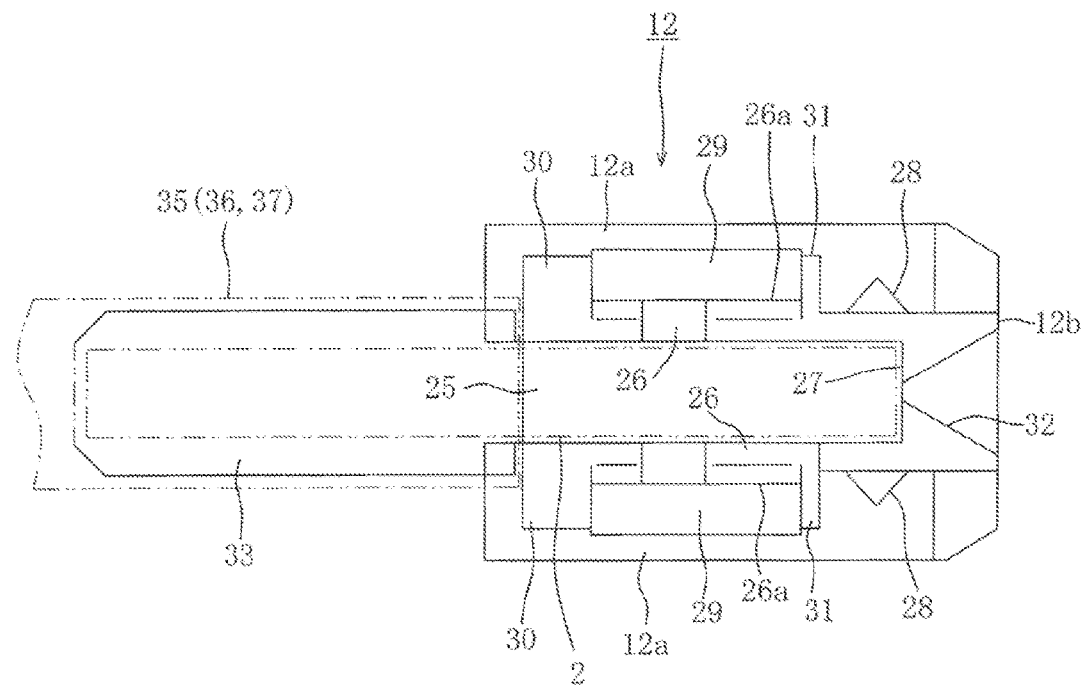
FIG. 14 is a plan view showing the slider of FIG. 11.
Figure 15:
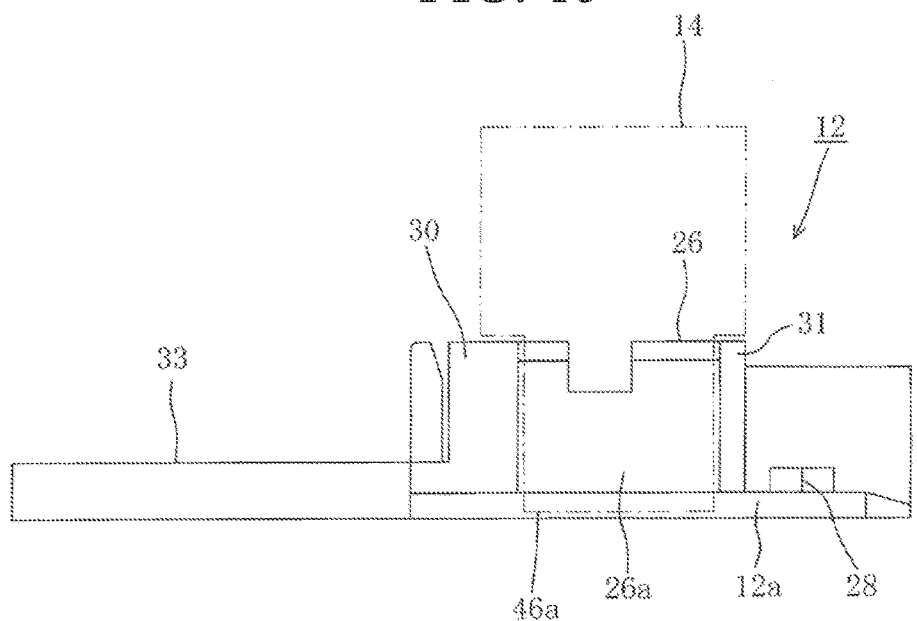
FIG. 15 is a front view showing FIG. 14.

As shown in FIGS. 11, 14, 15, or the like, the slider 12 has: the guided portions 12a at both sides thereof, which are guided on the slide surface 16a of the mechanical splice guide portion 16 of the splicing tool 11 along both guide surfaces 16b; side wall portions 26 at both sides thereof, which form a mechanical splice grasping portion 25 accommodating and grasping the mechanical splice 2 between both the guided portions 12a; and a front wall surface 27 that is located near the front end thereof and comes into contact with the front end of the mechanical splice 2.

The above-described triangle-protuberances 28, which are engaged with the engagement recesses 20c of the slider engagement end 20 formed at the splicing tool 11, are formed on the external surface close to the front wall surface 27 of both the side wall portions 26.

Additionally, a rectangular hole 29 penetrating in a vertical direction is formed outside each side wall portion 26, and protrusion portions 30 and 31 outwardly protruding in the width direction are formed at the back and forth of the rectangular holes 29.

Both attachment ends 46 described later are inserted into the rectangular holes 29 between both back and forth protrusion portions 30 and 31 at both sides thereof, claw portions 46 located at lower edges are engaged with the lower face of the side wall portions 26, and as a result, the wedge unit 14 is attached to the slider 12.

Furthermore, a tapered semi-conical surface 32 for smoothly introducing the second optical fiber 4 into the front wall surface 27 is formed at the portion between the slider front-edge face 12b and the front wall surface 27 of the mechanical splice grasping portion 25.

Moreover, a rearward flat portion 33, on which a forward-end portion of a case main body 36 of the case 35 described later is mounted, is provided at a rear portion.

A rear portion of the mechanical splice 2 is mounted on the rearward flat portion 33 via the case main body 36.

As shown in the drawings, the cases 35 of the first embodiment of the invention is constituted of the case main body 36 and the cover 37, both of which are molded from a sheet made of, for example, a polyethylene terephthalate resin or the like; however, the manufacturing method therefor is optionally selected.

As also shown in FIG. 8, the forward-end portion 36a of the case main body 36 is a portion on which the posterior half of the mechanical splice 2 is mounted.

In addition, the mechanical splice 2 is pressed by a downward protrusion portion 37a which is formed by depressing the upper surface of the front-end portion of the cover 37.

Also, as shown in FIG. 9, an optical-connector storage portion 36b accommodating a portion of an optical connector 39 of an optical-connector-attached optical fiber 40 is provided at a back-end portion of the case main body 36.

In addition, the optical connector 39 is pressed by a downward protrusion portion 37b which is formed by depressing the upper surface of the back-end portion of the cover 37.

Figure 16:
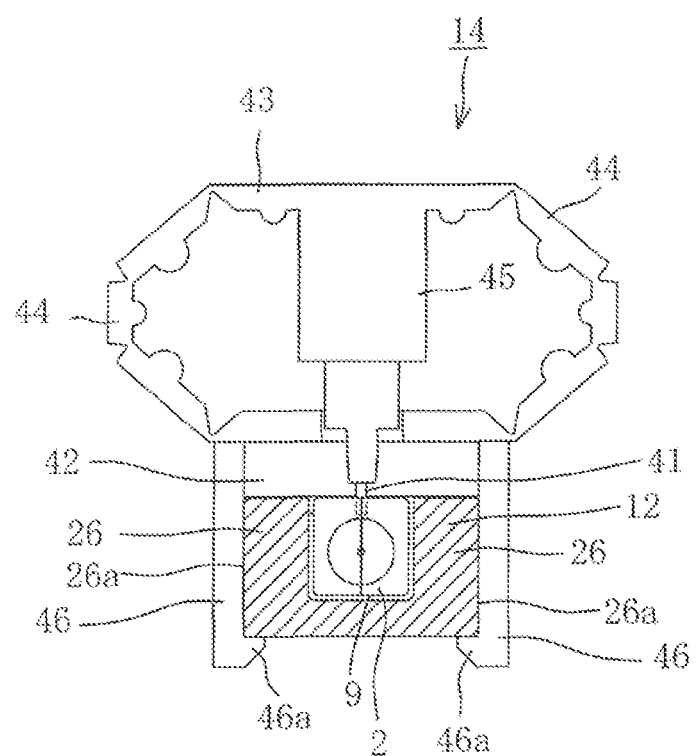
FIG. 16 is a diagram illustrating a state where a wedge unit is attached to the slider.

As shown in FIGS. 8, 10, 16, or the like, the wedge unit 14 is provided with two wedges 41 that opens the lid 8 as a result of inserting the wedges into two wedge-insertion recesses 10 of the mechanical splice 2, and the wedge unit is attached to the slider 12.

The wedge unit 14 includes: the two wedges 41; an abutting portion 42 coming into contact with the upper surface of the slider 12; an upper elevating portion 43 facing the abutting portion 42; right and left wedge-removal operation portions 44 that is deformable and connects the abutting portion 42 to the elevating portion 43; a wedge-grasping portion 45 that droops from the elevating portion 43 and grasps the wedge 41; and the attachment ends 46 having claw portions 46a that downwardly extends from both sides of the abutting portion 42 and engages with both the wall portions 26 of the slider 12 from outside.

When the wedges 41 are inserted into a hole 10 of the mechanical splice 2, and a space is formed between the base 7 and the lid 8.

After the optical fibers are butt-jointed to each other, when the wedge-removal operation portions 44 are pressed into the inside thereof from both sides thereof with a hand, the wedges 41 move up together with the wedge-grasping portion 45 and are pulled out from the insertion hole 10, and an optical fiber is grasped by the base 7 and the lid 8 due to an elastic holding force of the C-shaped plate spring 9.

As shown in FIGS. 1 to 8, 11, or the like, the optical fiber holder 13 is constituted of a holder main body 51 and a lid 52.

In other cases, an integrally assembled article, in which the holder main body 51 and the lid 52 are integrated with a hinge mechanism interposed therebetween, may be used.

The holder main body 51 has V-grooves 51a and 51b at the anteroposterior positions of the lid 52 and has a V-groove 51c formed by a projected portion at the front-end side thereof.

The optical fiber holder 13 grasps the second optical fiber 4 mounted on the holder main body 51 by closing the lid 52 such that the second optical fiber passes through the V-grooves 51a, 51b, and 51c positioning the second optical fiber 4 in the width direction of the holder.

Furthermore, a triangle-protuberance 53, which is engaged with the engagement recess 21c of the holder engagement end 21 close to the splicing tool 11, is provided at both side portions.

As described above, the length L in the longitudinal direction of the holder fixing portion 17 of the splicing tool 11 is substantially the same as the length L of the optical fiber holder 13 in the longitudinal direction. The reason is that, since the optical fiber holder 13 does not move when the optical fibers are butt-jointed to each other as described below, it is not necessary to consider the slide distance of the optical fiber holder 13 on the splicing tool 11 in a state where the second optical fiber 4 is grasped; and it is possible to reduce the length of the splicing tool 11 in the longitudinal direction.

Figure 108A:
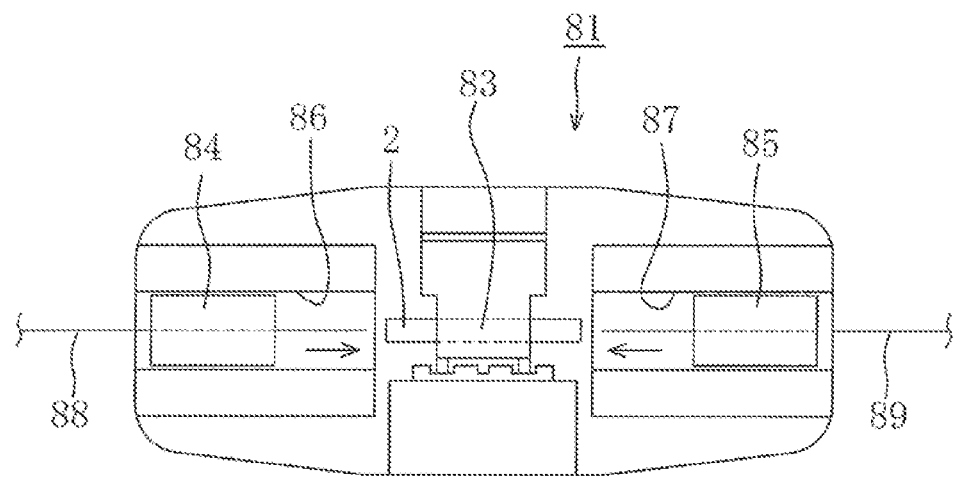
FIG. 108A is a plan view simply showing a generally conventional-used mechanical splicing tool and a usage state thereof.
Figure 108B:
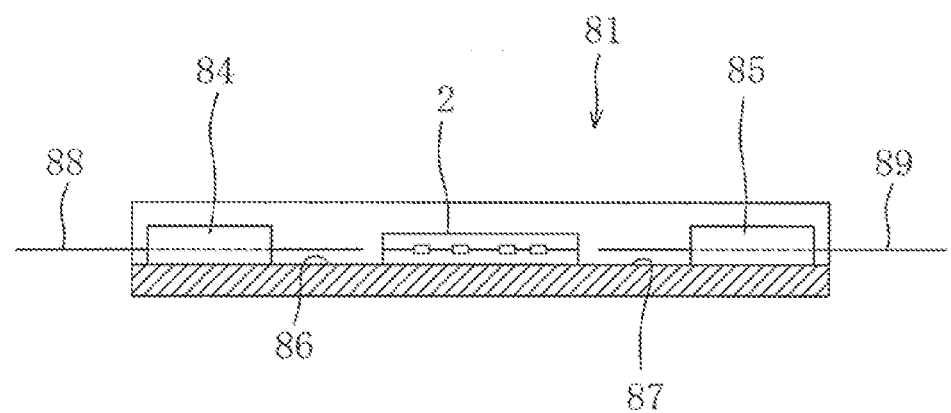
FIG. 108B is a cross-sectional view simply showing a generally conventional-used mechanical splicing tool and a usage state thereof.

A length of the conventional splicing tool 81 in the longitudinal direction shown in FIGS. 108A and 108B is approximately 140 mm; in contrast, the length of the splicing tool 11 of the first embodiment of the invention in the longitudinal direction is, for example, approximately 70 mm and is adequately shortened.

Particularly, when the optical fibers are butt-jointed to each other, the optical fiber holder 13 does not slide; however, in the first embodiment of the invention, a front-end side portion of the optical fiber holder 13 slides on the flat surface of the holder fixing portion 17 of the splicing tool 11 so as to be set at a predetermined position in a preparation step.

An operation of butt-jointing the first optical fiber 3 to the second optical fiber 4 by use of the slider 12 serving as the optical fiber splice auxiliary tool and by use of the splicing tool 11 will be described.

In the explanation of the optical fiber splicing operation below, both the first optical fiber 3 and the second optical fiber 4 are constituted of an optical fiber; the optical fiber has a bare fiber having 0.125 mmφ, a 0.25-mmφ UV resin coating formed on the bare fiber, and a 0.5-mmφ UV resin coating formed thereon.

Furthermore, the first optical fiber 3 is an optical fiber 3 of the optical-connector-attached optical fiber 40 to which the optical connector 39 is attached on the opposite end of the insertion side of the mechanical splice 2.

(1) The wedges are inserted into two wedge-insertion recesses 10 of one end side of the mechanical splice 2 and into two wedge-insertion recesses 10 of the other end side thereof, and the lid is thereby preliminarily maintained to be opened; the first optical fiber 3 having the bare fiber which is exposed by removing the coating of the front-end portion is inserted into the guide groove of the mechanical splice 2; the front end thereof is introduced into the butt-jointing connection point of the mechanical splice 2; thereafter, one end side of the wedges is removed; the base 7 and the lid 8 of the mechanical splice 2 are held by the C-shaped plate spring 9 at one end side thereof; and the first optical fiber 3 is thereby grasped.

The other end side of the wedges 41 is in a state of being inserted as shown in each drawing, and the lid 8b of the other end side of the mechanical splice 2 is in a state of being slightly opened.

Additionally, the forward-end portion 36a of the case main body 36 of the case 35 is fixed to the slider 12 using an adhesive or the like in advance in the first embodiment of the invention, and the mechanical splice 2 and the optical-connector-attached optical fiber 40 are preliminarily housed in the case 35.

Moreover, the front half of the mechanical splice 2 is directly housed in the mechanical splice grasping portion 25 of the slider 12.

(2) In a state where the lid 52 is opened, the front-end portion of the optical fiber holder 13 is mounted on the holder fixing portion 17 of the splicing tool 11 and slides until being brought into contact with the stopper 18.

(3) The second optical fiber 4, which is to be spliced, passes through the V-grooves 51a, 51b, and 51c of the optical fiber holder 13 and is mounted on the holder main body 51; and the lid 52 is closed to hold the fiber so as to allow the front end of the fiber to reach a predetermined position marked on the splicing tool 11, for example, reaches the position (position M1 in FIG. 12) separated from the front end of the optical fiber holder 13 by, for example, 47 mm in a state where the optical fiber holder is fixed to the holder fixing portion 17.

(4) A 0.5 mm-coating, that is a portion protruding from the optical fiber holder 13, is removed by use of a 0.5 mm-mechanical stripper, and a 0.25 mm-optical fiber is thereby exposed.

(5) The lid 52 of the optical fiber holder 13 is opened, the second optical fiber 4 moves back, the lid 52 is closed and grasped so as to allow the front end thereof to be positioned at a predetermined position differently marked on the splicing tool 11 (for example, 35 mm (position M2 in FIG. 12)).

In other cases, a step of causing the second optical fiber 4 to move back may be completed without backward movement depending on how a holder is configured.

(6) A 0.25 mm-coating, that is a portion protruding from the optical fiber holder 13, is removed by use of a 0.25 mm-mechanical stripper, and a 0.125 mm-bare fiber is thereby exposed.

(7) The optical fiber holder 13 is removed from the splicing tool 11, screening and cleaning of the optical fiber (bare fiber) is carried out, and the optical fiber is cut by a fiber cutter.

At this time, after a exclusively-used spacer is set to the optical fiber cutter, it is possible to cut the optical fiber by a predetermined length defined by the exclusively-used spacer.

Figure 17:
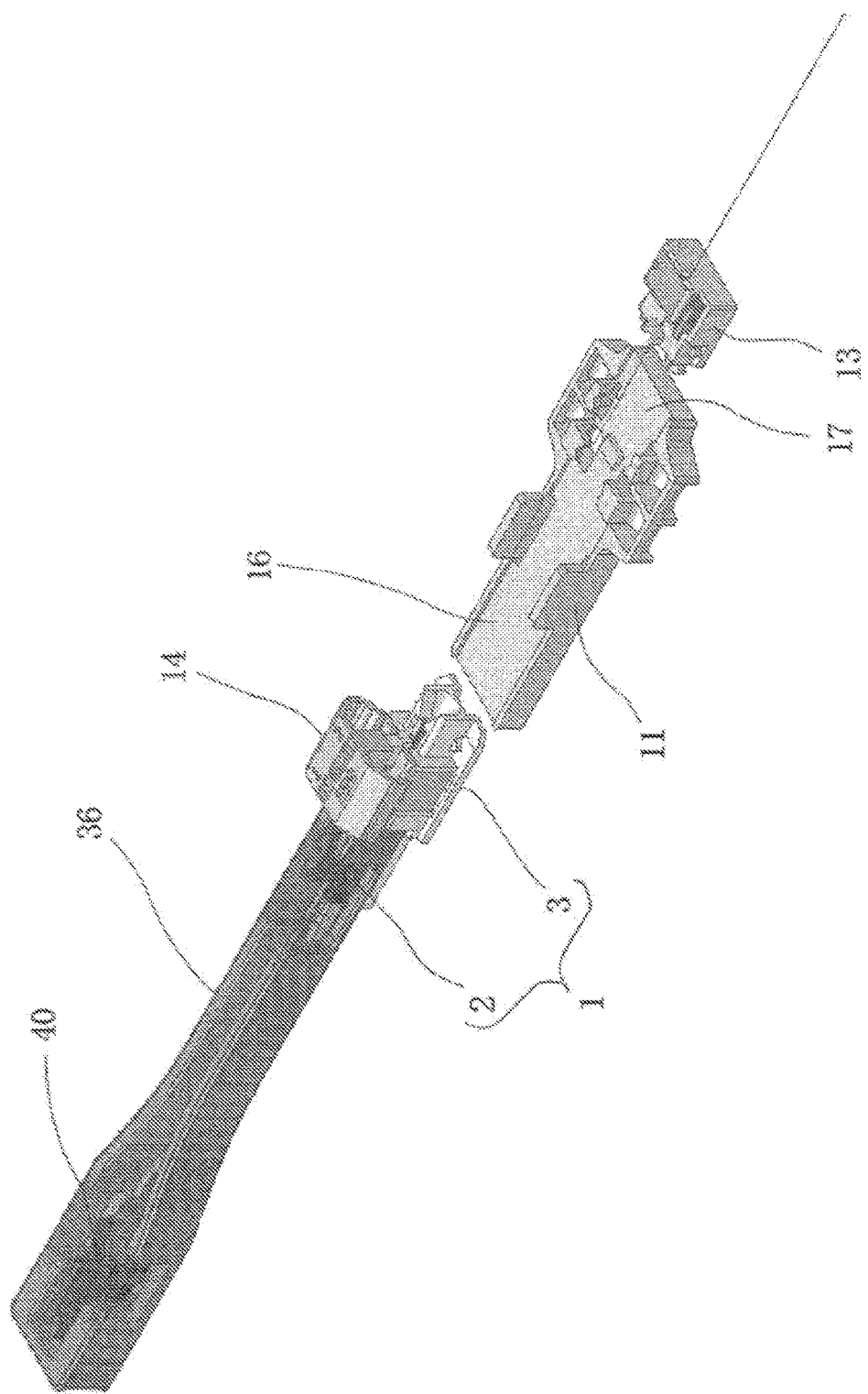
FIG. 17 illustrates a step of butt-jointing a first optical fiber to a second optical fiber by the mechanical splice using the optical fiber splicing method and the mechanical splicing tool of first embodiment of the invention, and is a perspective view showing an initial state when butt-jointing is carried out after a preparation is completed.

(8) FIG. 17 shows a state where the above-described operations are completed; next, the front-end portion of the optical fiber holder 13 is re-mounted on the holder fixing portion 17 of the splicing tool 11 and slides until being brought into contact with the stopper 18.

Figure 18:
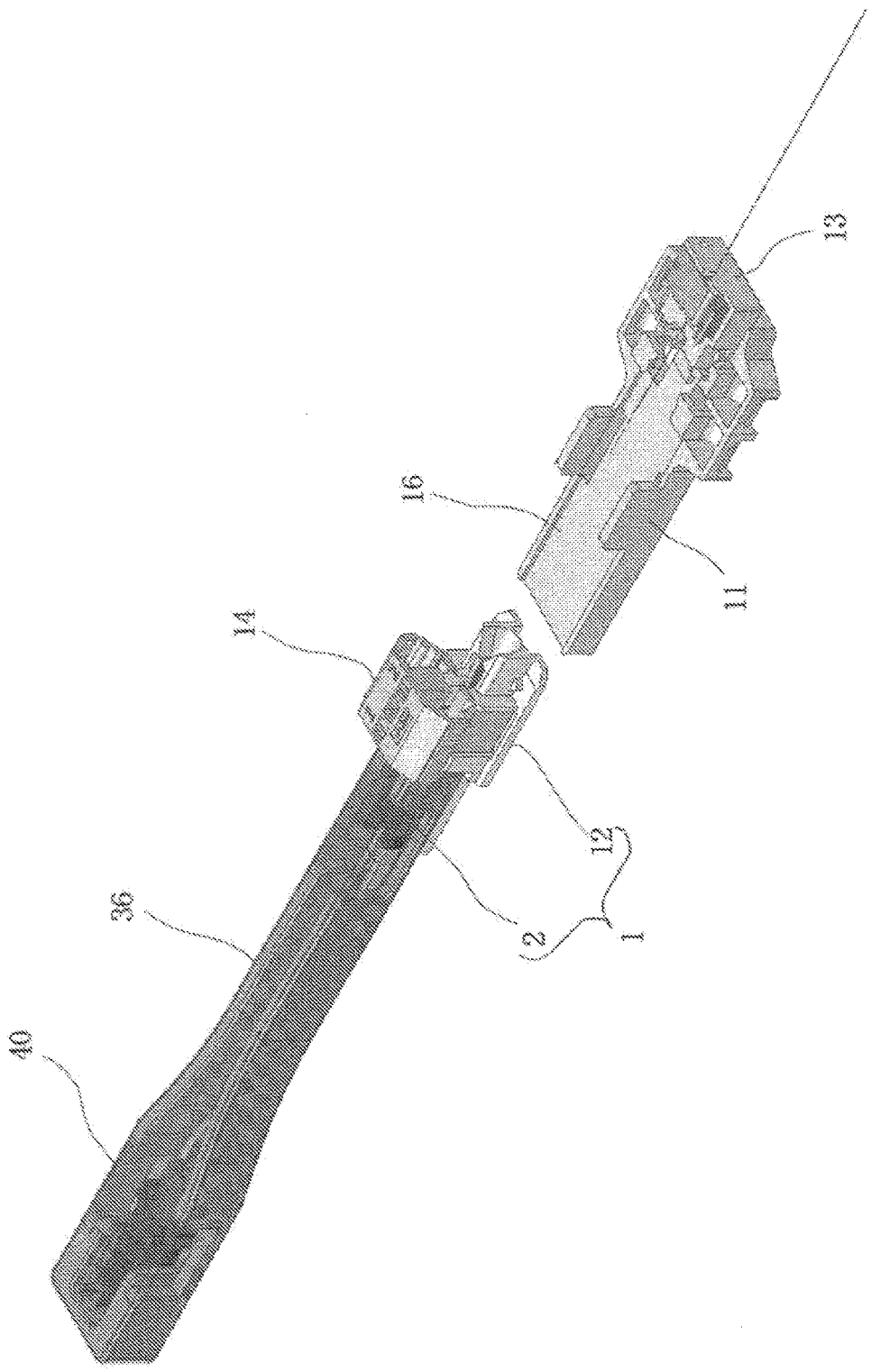
FIG. 18 is a perspective view showing a state where the optical fiber holder is attached to the splicing tool subsequent to the step of FIG. 17.

At this time, both the triangle-protuberances 53 of the optical fiber holder 13 are engaged with the engagement recesses 21c of the holder fixing portion 17 of the splicing tool 11, and the optical fiber holder 13 is grasped so as not to move back from the position (state shown in FIG. 18).

Figure 19:
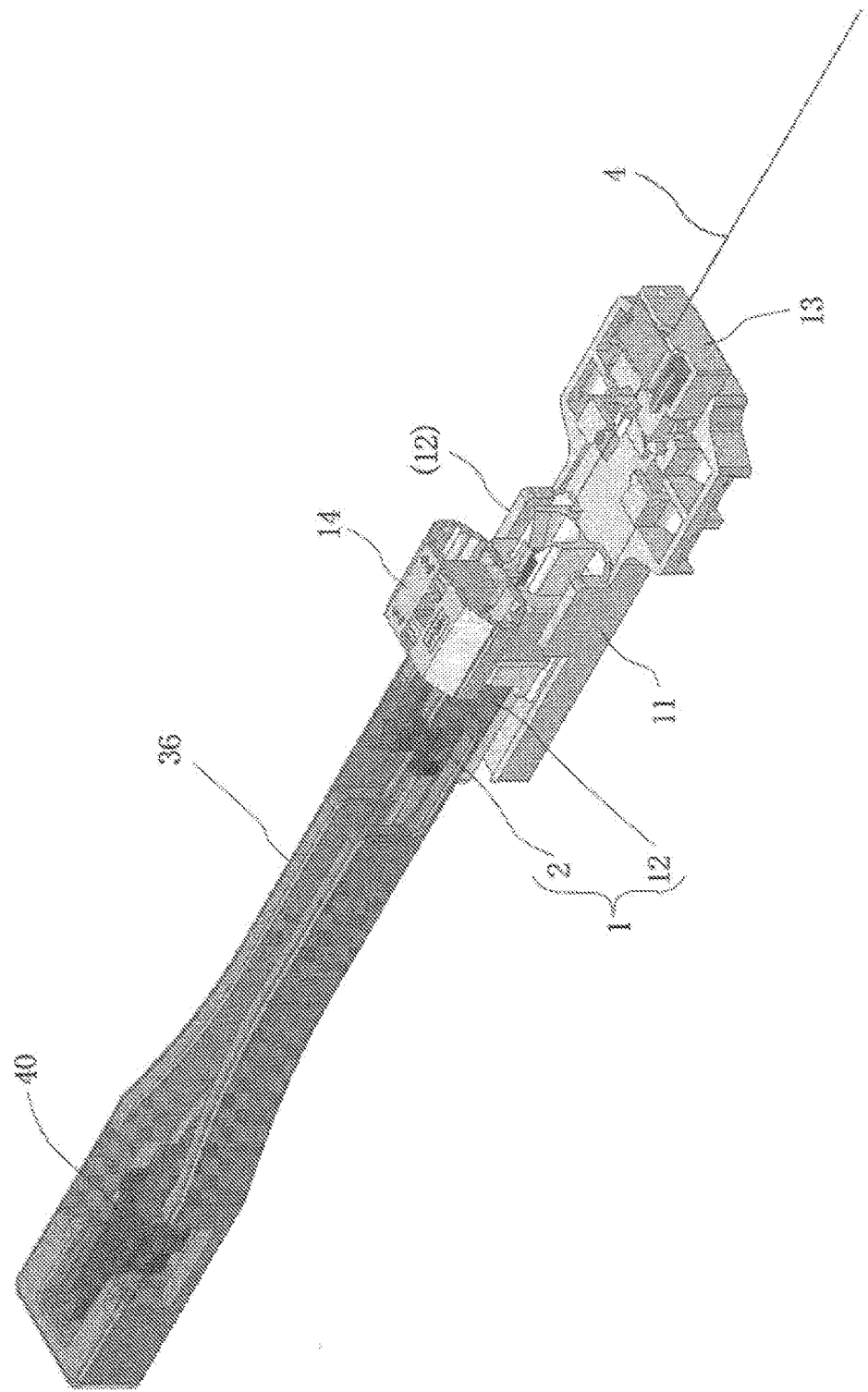
FIG. 19 is a perspective view showing a state where a wedged mechanical splice which is fixed to the slider along with a case is set to the splicing tool subsequent to the step of FIG. 18.

(9) As described above, the slider 12, to which the mechanical splice 2 and the case main body 36 are attached in advance, is set to the mechanical splice guide portion 16 of the splicing tool 11 and slides forward until the front-edge face 12b thereof comes into contact with the positioning face 13a of the optical fiber holder 13 that has already fixed to the splicing tool 11 (FIG. 19 shows a sliding state).

Figure 20:
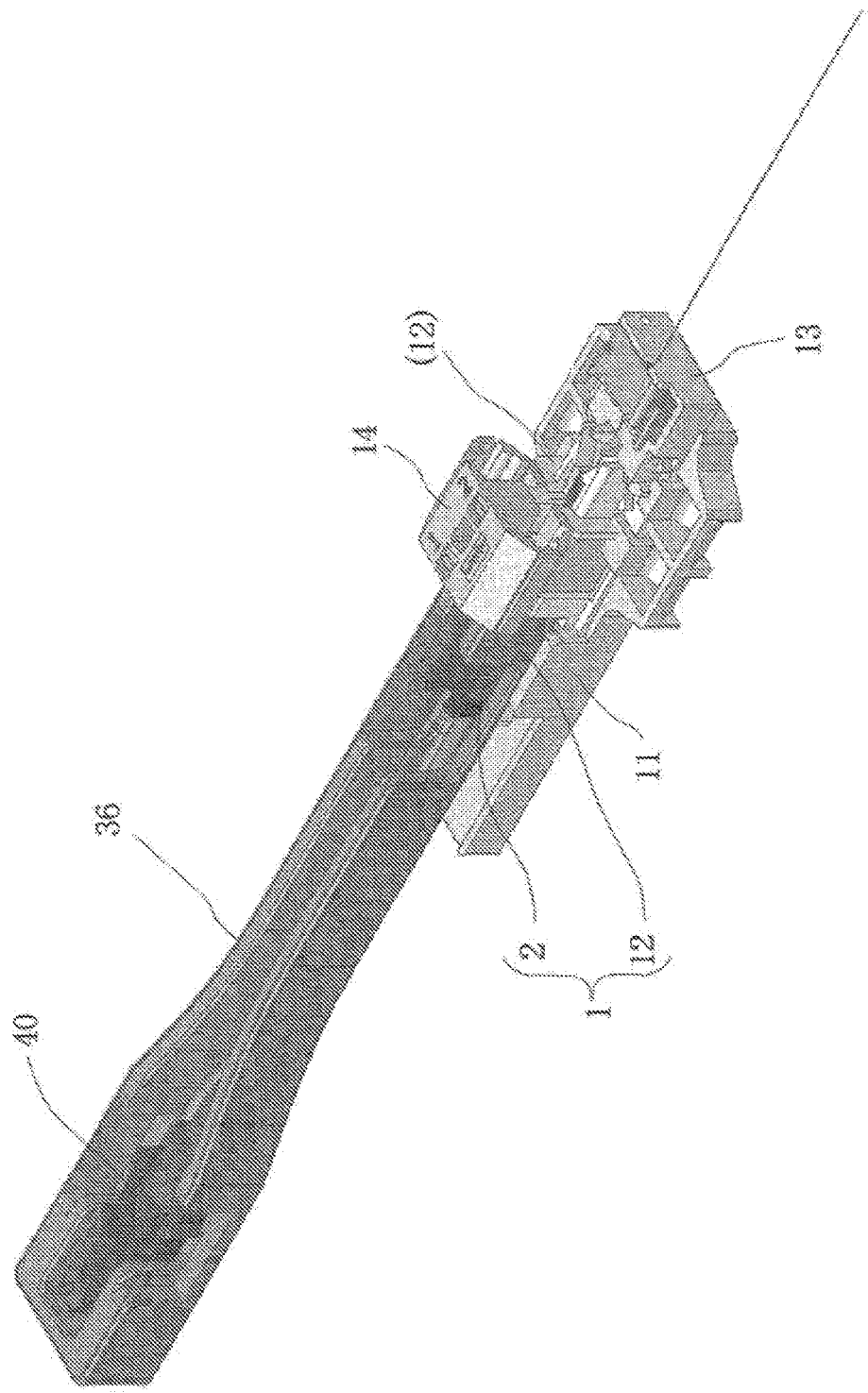
FIG. 20 is a perspective view showing a state where the built-in first optical fiber is butt-jointed to the second optical fiber grasped by the optical fiber holder by causing the wedged mechanical splice that is fixed to the slider with the case to slide on the splicing tool subsequent to the step of FIG. 19 (the state shown in FIG. 1).
Figure 21:
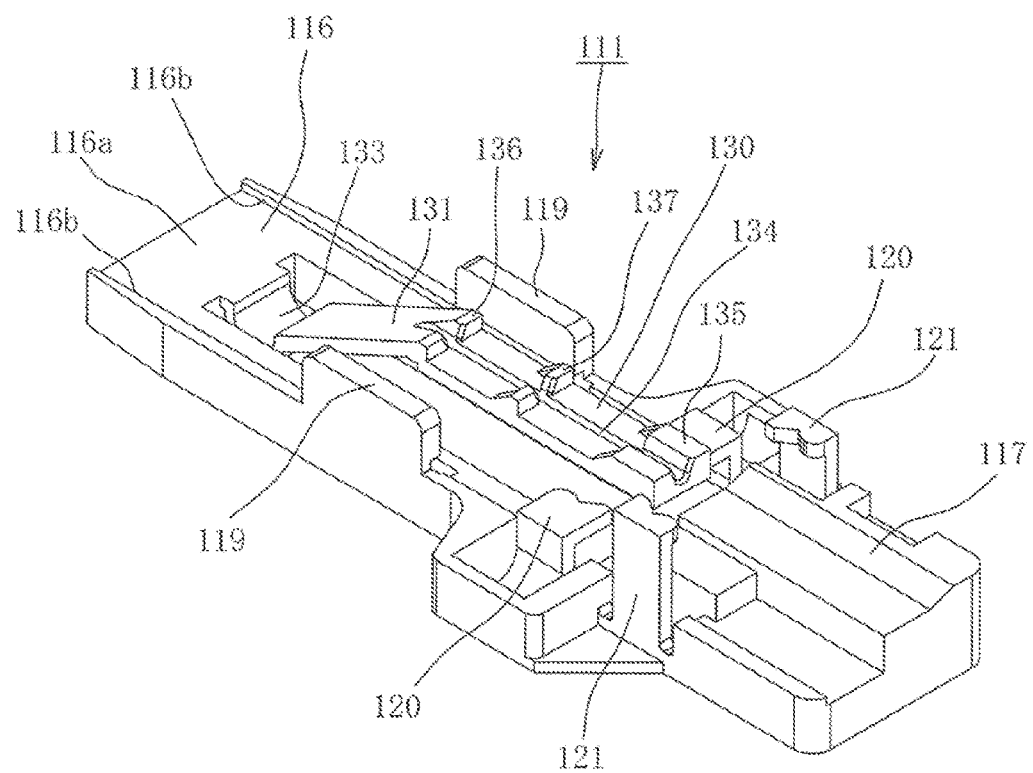
FIG. 21 is a perspective view showing a mechanical splicing tool used in a second embodiment of the invention.
Figure 22:
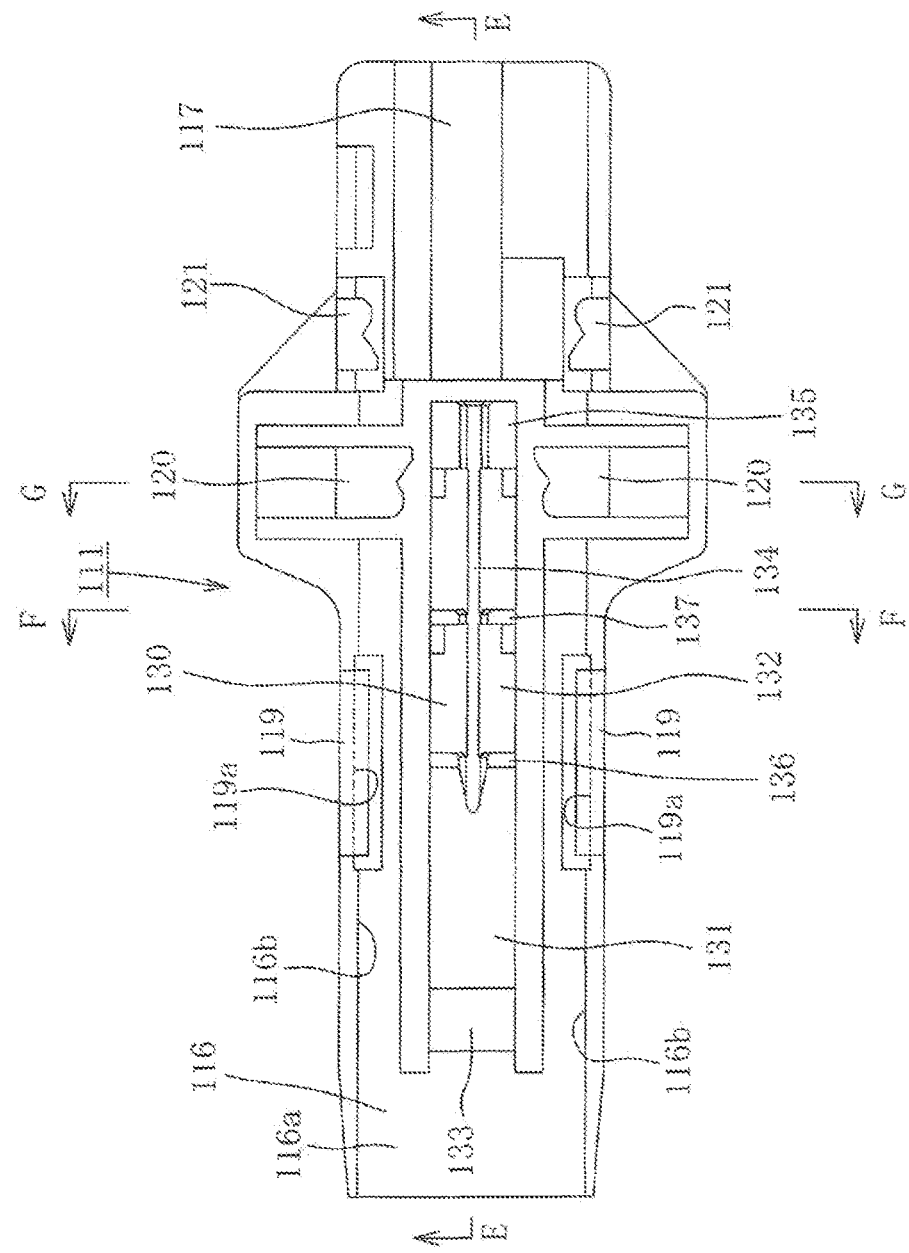
FIG. 22 is a plan view of a mechanical splicing tool shown in FIG. 21.
Figure 23:
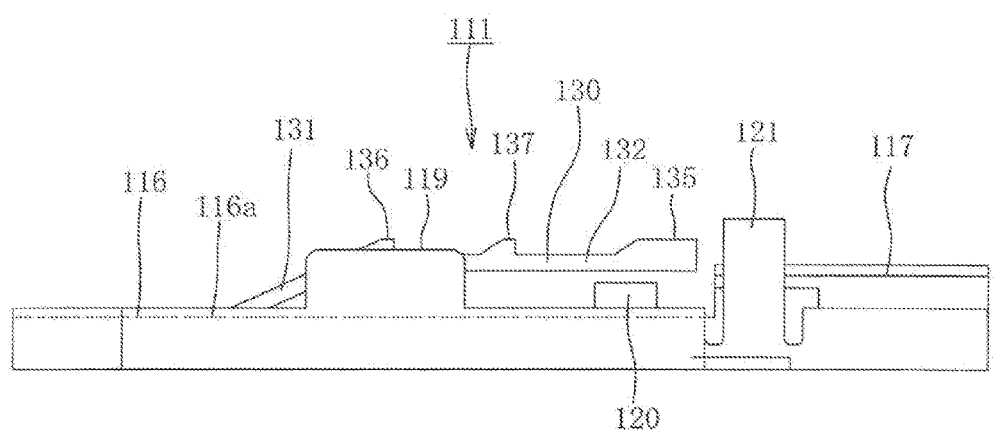
FIG. 23 is a front view of the mechanical splicing tool shown in FIG. 21.
Figure 24:
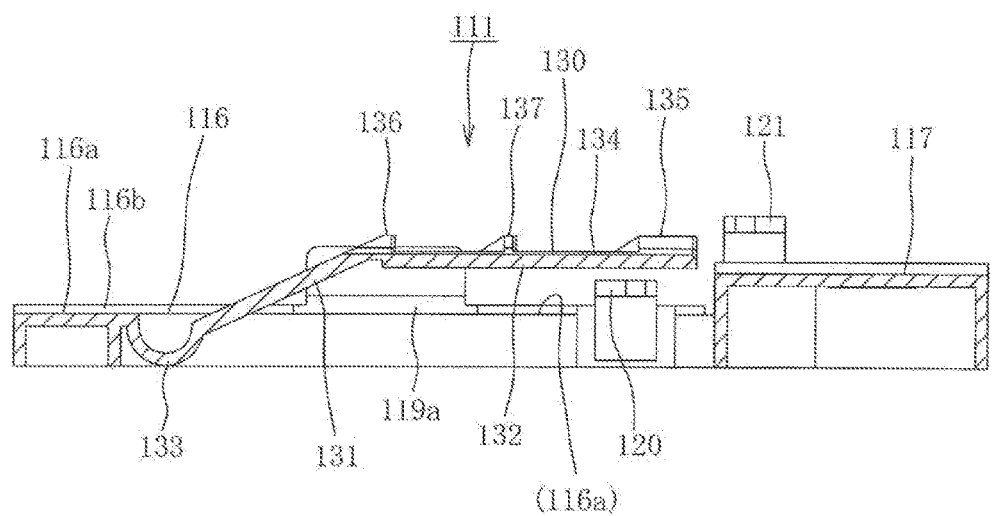
FIG. 24 is a cross-sectional view taken along the line E-E shown in FIG. 22.
Figure 25:
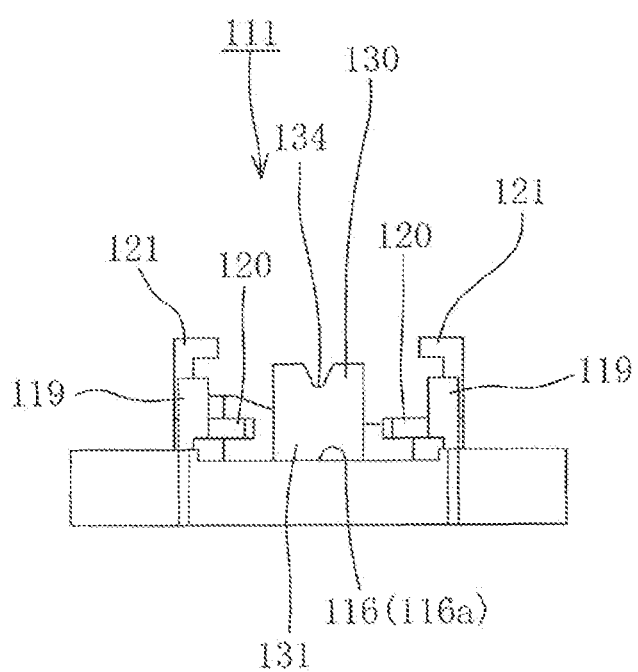
FIG. 25 is a left side view showing FIG. 22.
Figure 26A:
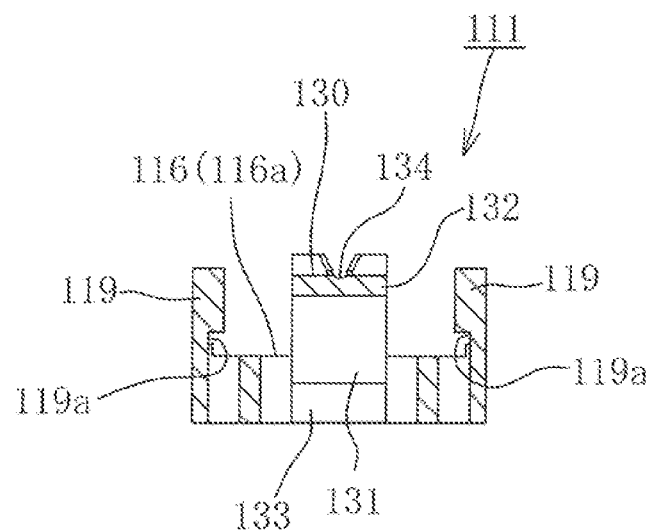
FIG. 26A is a cross-sectional view taken along the line F-F shown in FIG. 22.
Figure 26B:
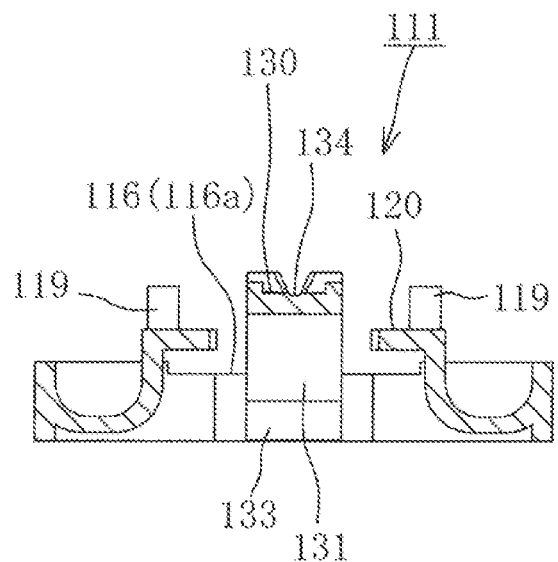
FIG. 26B is a cross-sectional view taken along the line G-G shown in FIG. 22.

Due to the forward movement of the mechanical splice 2 along with the slider 12, the second optical fiber 4 that is grasped by the optical fiber holder 13 is inserted into the guide groove of the mechanical splice 2, and the first optical fiber 3 is butt-jointed to the second optical fiber 4 at the butt-jointing connection point of the guide groove (FIG. 20 shows this step).

(10) After it is confirmed that the second optical fiber 4 protruding from the optical fiber holder 13 is bent in a state where the first optical fiber 3 and the second optical fiber 4 are butt-jointed to each other, right and left wedge-removal operation portions 44 of the wedge unit 14 are picked up from the right and left sides so as to move the operation portions toward the inside thereof, the elevating portion 43 moves up, the wedge 41 is removed from the wedge-insertion recess 10, the base 7 and the lid 8 are thereby elastically clamped by C-shaped plate spring 9, and the optical fiber 4 is thereby grasped.

Because of this, the first optical fiber 3 and the second optical fiber 4 are appropriately butt-jointed to each other.

According to the above-described operation, the butt-jointing for connecting the first optical fiber 3 to the second optical fiber 4 using the mechanical splice 2 is completed; however, practically, subsequent operations are carried out.

(11) The wedge unit 14 is removed from the slider 12.

(12) The lid 52 of the optical fiber holder 13 is opened.

(13) The lid 37 (cover) of the case 35 is opened, and the optical connector 39 is removed from the case main body 36.

(14) The mechanical splice 2 is removed from the case main body 36 and the slider 12 while holding the optical connector 39.

In the above-described manner, optical fiber splicing between the first optical fiber 3 and the second optical fiber 4 is completed by use of the mechanical splice 2.

The above-described slider 12 (optical fiber splice auxiliary tool), the mechanical splicing tool 11, the mechanical splice unit 1, or the optical fiber splicing method is particularly effective in the case where the second optical fiber 4 is an optical fiber having a short extra length in an optical closure.

As described above-described, when an optical line is introduced into, for example, a user's new house, a drop cable is dropped and drawn to the user's house from an optical closure of light communication lines suspended in air. In this case, an optical fiber is suitably extracted from an optical fiber trunk line in the optical closure, the optical fiber is cut, and an optical connector is attached to the station side of the optical fiber of the cutting point thereof and is optically spliced to a drop-cable side of the optical connector. Later, in the case where the optical line is in non-use due to cancellation of contract of the subscriber line, in order to utilize the non-use optical line, it is necessary to re-splice the station side of the optical fiber of the cutting point to the optical fiber at the opposite side thereof.

At this time, it is necessary to optically splice the station side of the optical connector, which is spliced to the optical connector of the drop cable, to the optical fiber, which is on the opposite side of the station into which the optical line is introduced at the cutting point.

In this case, an optical-connector-attached relay optical fiber having one end side to which an optical connector is attached is used, the optical connector (relay optical connector) of the optical-connector-attached optical fiber is jointed to the station side of the optical connector through the connector, and the optical fiber (relay optical fiber) of the optical-connector-attached optical fiber may be spliced to the optical fiber that is located opposite to the station side of the optical fiber of the cutting point using mechanical splicing.

In such a case, regarding the optical fiber that is located opposite to the station side of the optical fiber of the cutting point, the length of the optical fiber extending in the optical closure as an extra length is short such that it is approximately 8 cm. Therefore, if the size of the splicing tool in the longitudinal direction is large, there is a problem in that the operability of optical fiber splicing using mechanical splicing is extremely deteriorated or difficult.

However, since the length of the aforementioned splicing tool 11 in the longitudinal direction is shortened, the splicing of the optical fiber using the mechanical splice can be easily carried out even where the extra length thereof is short, and a problem of deterioration of or difficulty in operability is solved.

Additionally, when the optical fibers are butt-jointed to each other, it is only necessary to slide the mechanical splice 2 that grasps an optical fiber (first optical fiber 3) of an optical-connector-attached relay optical fiber; since it is not necessary to move the optical fiber holder 13 that grasps the optical fiber (second optical fiber 4) having a short extra length and is opposite to the station side of the optical fiber of the cutting point, a problem of deterioration in or difficulty in operability is thereby solved.

Particularly, in the case where the above-described optical fiber splicing operation is practically applied to the optical fiber splicing of an optical-connector-attached relay optical fiber in the optical closure, the optical connector 39 of the optical-connector-attached optical fiber 40 is spliced to the station side of the optical connector that is spliced to the optical connector of the drop cable in succession to the above-described operation, and the optical connector splicing portion is attached to the optical connector attachment portion on a storage tray in the optical closure.

Modified Example of First Embodiment

In the above-described first embodiment, the optical fiber holder grasping the second optical fiber is provided to the splicing tool as a separate member that is attachable thereto and detachable therefrom; however, the optical fiber holder portion may be provided so as to be fixed to the splicing tool, and the optical fiber holding portion may be directly provided on the splicing tool.

The above-described optical fiber splicing operation is carried out in the case of splicing the optical fiber by use of the mechanical splice in the optical closure of the optical fiber trunk line. Additionally, in the case where, for example, a junction box is provided for each floor in collective housing such as condominium building or the like having a plurality of floors, the junction box may need to splice the optical fiber to an optical fiber having a short extra length by use of the mechanical splice all the same.

It is applicable to the foregoing case.

In addition, the splicing tool 11 is formed as a single member in the above-described first embodiment; however, for example, the splicing tool 11 of the first embodiment is used as a tool body, and a structure having the slider 12, which is slidably attached to the tool body, may be applied as a mechanical splicing tool.

In this case, the mechanical splice is removably attached to the slider 12 on the mechanical splicing tool.

Additionally, a constitution in which the mechanical splice is directly and slidably attached to the splicing tool may be adapted without providing a portion corresponding to the slidable slider 12.

Moreover, generally, even where both the first optical fiber and the second optical fiber have a margin of an extra length, it is often the case that, when the optical fiber splicing operation is carried out, an excellent splicing performance cannot be obtained by a one-time operation; therefore, re-cutting of the optical fiber or cutting thereof several times is necessary, as a result, the extra length become short. In such case, an optical fiber having a margin of an extra length is used as the first optical fiber, an optical fiber having a short extra length is used as the second optical fiber, and it is possible to avoid the extra length from excessively short and avoid the butt-jointing from being difficult.

The invention is not limited to the case where the first optical fiber is an optical fiber of an optical-connector-attached optical fiber, naturally, can be applied to a single short optical fiber to which the optical connector is not attached, is not restricted depending on the length of the optical fiber, and can be applied to a long optical fiber.

Furthermore, the invention is similarly applied to the case where the above-described optical fiber is a holey fiber (photonic crystal optical fiber); and the holey fiber is configured to include a plurality of tube-shaped holes extending along a core at the portion of the cladding adjacent to the core and has excellent characteristics in terms of a low-loss, chromatic dispersion characteristics, or the like.

In this case, a solid adhesion connection component, which serves as a single layer and is made of silicone resin or acrylate resin having a refractive index consistency, is preferably interposed between the portions at which the optical fibers are butt-jointed to each other in the mechanical splice.

Second Embodiment

FIGS. 21 to 26 show a second embodiment of a mechanical splicing tool.

In the operation of butt-jointing the above-described first optical fiber to the second optical fiber, when the coating of the second optical fiber 4 is removed, the second optical fiber is grasped in a state of being extended from the optical fiber holder by a predetermined distance, and the coating removal is thereby carried out. However, in the splicing tool 111 (mechanical splicing tool) of the second embodiment of the invention, the extension distance from the optical fiber holder of the second optical fiber can be determined as accurate as possible when the second optical fiber is held by the optical fiber holder.

Accordingly, the basic structure of the splicing tool 111 is the same as the above-described the splicing tool 11 of the first embodiment, provided with the mechanical splice guide portion 116 and a holder fixing portion 117 fixing the optical fiber holder grasping the second optical fiber 4. Additionally, the splicing tool is an integral molding component made of resin and provided with a slider engagement end 120 and a holder engagement end 121.

Particularly, in an example of the drawing, a detailed explanation is omitted, and the external form of an optical fiber holder used by the splicing tool 111 is slightly different from above.

In the second embodiment, identical symbols are used for the elements which are identical to the above-described first embodiment, and the explanations thereof are omitted or simplified.

Similar to the mechanical splice guide portion 16 of the splicing tool 11 of the first embodiment of the invention, the mechanical splice guide portion 116 includes: a flat slide surface 116a on which the bottom face of the slider 12 comes into contact and the slider slides; guiding surfaces 116b having low-height walls and guiding guided portions 12a located at both right and left end portions of the slider 12; an anti-slider-separation portion 119 having groove portions 119a into which the guided portions 12a of the slider 12 is slidably fitted and preventing the slider 12 from separating; and an optical-fiber-temporarily mounted portion 130 that is elastically liftable, located at a center portion of the mechanical splice guide portion 116 in the width direction thereof, and used in a previous step of a coating removal operation of a second optical fiber.

The optical-fiber-temporarily mounted portion 130 includes: a sloped plate portion 131 that is inclined upward from a position close to an edge of the slider entry side of the slide surface 116a of the mechanical splice guide portion 116; a horizontal plate portion 132 that horizontally extends from the upper edge of the sloped plate portion 131; and an elastic deforming portion 133 that is formed in a half-circular arc shape, formed at a rising portion from the slide surface 116a of the sloped plate portion 131, and capable of elastically varying the inclined angle of the sloped plate portion 131.

The position in height of the horizontal plate portion 132 changes depending on variation in the inclined angle of the sloped plate portion 131.

The position in height of the upper surface of the horizontal plate portion 132 is at the same level of the position in height of the second optical fiber grasped by the optical fiber holder that is set in the holder fixing portion 117.

A V-groove 134, which is used for accommodating a second optical fiber in a previous step of removal of coating, is formed on the upper surface of the horizontal plate portion 132.

Bulge portions 135, 136, and 137 are formed at the V-grooves which are located at both ends and the intermediate portion in the longitudinal direction of the horizontal plate portion 132, and the upper edge of the V-groove 134 is high in positions at which the bulge portions 135, 136, and 137 are provided.

The position of the bulge portion 136 close to the sloped plate portion 131 and the position of the bulge portion 137 that is the intermediate portion correspond to the above-described front-end position mark M. The mark M represents the front-end position of the second optical fiber 4 which extends from the optical fiber holder in a state where the optical fiber holder is located at the holder fixing portion 117 when the coating of the second optical fiber 4 is removed. The position of the bulge portion 136 close to the sloped plate portion 131 corresponds to the above-described front-end position mark M1 at which 0.5 mm diameter coating removal is carried out. The position of the bulge portion 137 that is the intermediate portion corresponds to the above-described front-end position mark M2 at which 0.25 mm diameter coating removal is carried out.

In the case of the splicing tool 11 of the first embodiment of the invention shown in FIGS. 11 and 12, since the slide surface 16a of the mechanical splice guide portion 16 is lower than the position in height of the second optical fiber 4 that is grasped by the optical fiber holder 13, the position of the front-end position mark M marked on the slide surface 16a is distant from the second optical fiber 4 in a height direction.

Consequently, even where the front-end position of the second optical fiber is accurately aligned with the front-end position mark M, since the front-end position of the second optical fiber coincides with the front-end position mark M as seen from directly above, the positions can be visually and directly checked; however, in the case where visual check directions vary, since the relative position between both the positions thereof varies, it is not possible to obviously and visually check whether or not the positions coincide with each other, and becomes vague.

In contrast, in the splicing tool 111 of the second embodiment of the invention, the position in height of the upper surface of the horizontal plate portion 132 of the optical-fiber-temporarily mounted portion 130 is at the same level of the position in height of the second optical fiber that is grasped by the optical fiber holder. The optical fiber holder is set in the holder fixing portion 117. Subsequently, since the front-end position marks (bulge portions 136 and 137) are positioned on the horizontal plate portion 132, both positions directly coincide with each other when the front-end position of the second optical fiber and the front-end position mark (bulge portions 136 and 137) coincide with each other. Since the relative positions do not vary depending on the viewing direction, it is possible to visually and reliably check that both positions coincide with each other.

Because of this, when the second optical fiber is held by the optical fiber holder as in a previous step of removing a coating of the second optical fiber, it is possible to accurately and simply determine the extension distance from the optical fiber holder of the second optical fiber.

In the case where an operation of butt-jointing the first optical fiber to the second optical fiber is carried out by use of the splicing tool 111 after the coating of the second optical fiber is completely removed, when the slider 12 is mounted on the slide surface 116a of the mechanical splice guide portion 116 and moves forward at the time of setting the slider 12 in the splicing tool 111, the forward-end portion of the slider 12 comes into contact with the sloped plate portion 131 of the optical-fiber-temporarily mounted portion 130; thereafter, the forward-end portion presses downward the sloped plate portion 131 that is capable of elastically changing an angle due to flexion of the elastic deforming portion 133, the forward-end portion moves forward while allowing the horizontal plate portion 132 to move downward, and the slider is thereby normally attached to the splicing tool 111.

Modified Example of Second Embodiment

The splicing tool 11 is formed as a single member in each of the above-described embodiments; however, for example, the splicing tools 11 and 111 are used as a tool body, and a structure having the slider 12, which is slidably attached to the tool body, may be applied to a mechanical splicing tool.

In this case, the mechanical splice is removably attached to the slider 12 on the mechanical splicing tool.

Additionally, a constitution in which the mechanical splice is directly and slidably attached to the splicing tool may be adapted without providing a portion corresponding to the slidable slider 12.

Furthermore, in each of the above-described embodiments, the optical fiber holder that grasps the second optical fiber is provided to the splicing tool as a separate member which is attachable thereto and detachable therefrom; however, the optical fiber holder portion may be provided so as to be fixed to the splicing tool, and the optical fiber holding portion may be directly provided on the splicing tool.

The above-described optical fiber splicing operation is carried out in the case of splicing the optical fiber by use of the mechanical splice in the optical closure of the optical fiber trunk line. Additionally, in the case where, for example, a junction box is provided for each floor in collective housing such as condominium building or the like having a plurality of floors, the junction box may need to splice the optical fiber to an optical fiber having a short extra length by use of the mechanical splice all the same.

It is applicable to the foregoing case.

Moreover, generally, even where both the first optical fiber and the second optical fiber have a margin of an extra length, it is often the case that, when the optical fiber splicing operation is carried out, an excellent splicing performance cannot be obtained by a one-time operation; therefore, re-cutting of the optical fiber or cutting thereof several times is necessary, as a result, the extra length become short. In such case, an optical fiber having a margin of an extra length is used as the first optical fiber, an optical fiber having a short extra length is used as the second optical fiber, and it is possible to avoid the extra length from excessively short and avoid the butt-jointing from being difficult.

The invention is not limited to the case where the first optical fiber is an optical fiber of an optical-connector-attached optical fiber, can be naturally applied to a single short optical fiber to which the optical connector is not attached, is not restricted depending on the length of the optical fiber, and can be applied to a long optical fiber.

Furthermore, the invention is similarly applied to the case where the above-described optical fiber is a holey fiber (photonic crystal optical fiber); and the holey fiber is configured to include a plurality of tube-shaped holes extending along a core at the portion of the cladding adjacent to the core and has excellent characteristics in terms of a low-loss, chromatic dispersion characteristics, or the like.

In this case, a solid adhesion connection component, which serves as a single layer and is made of silicone resin or acrylate resin having a refractive index consistency, is preferably interposed between the portions at which the optical fibers are butt-jointed to each other in the mechanical splice.

Third Embodiment

FIGS. 27 to 34 show a third embodiment of an attachment used for a spacer determining a coating removal start position when coating removal is carried out.

Figure 27:
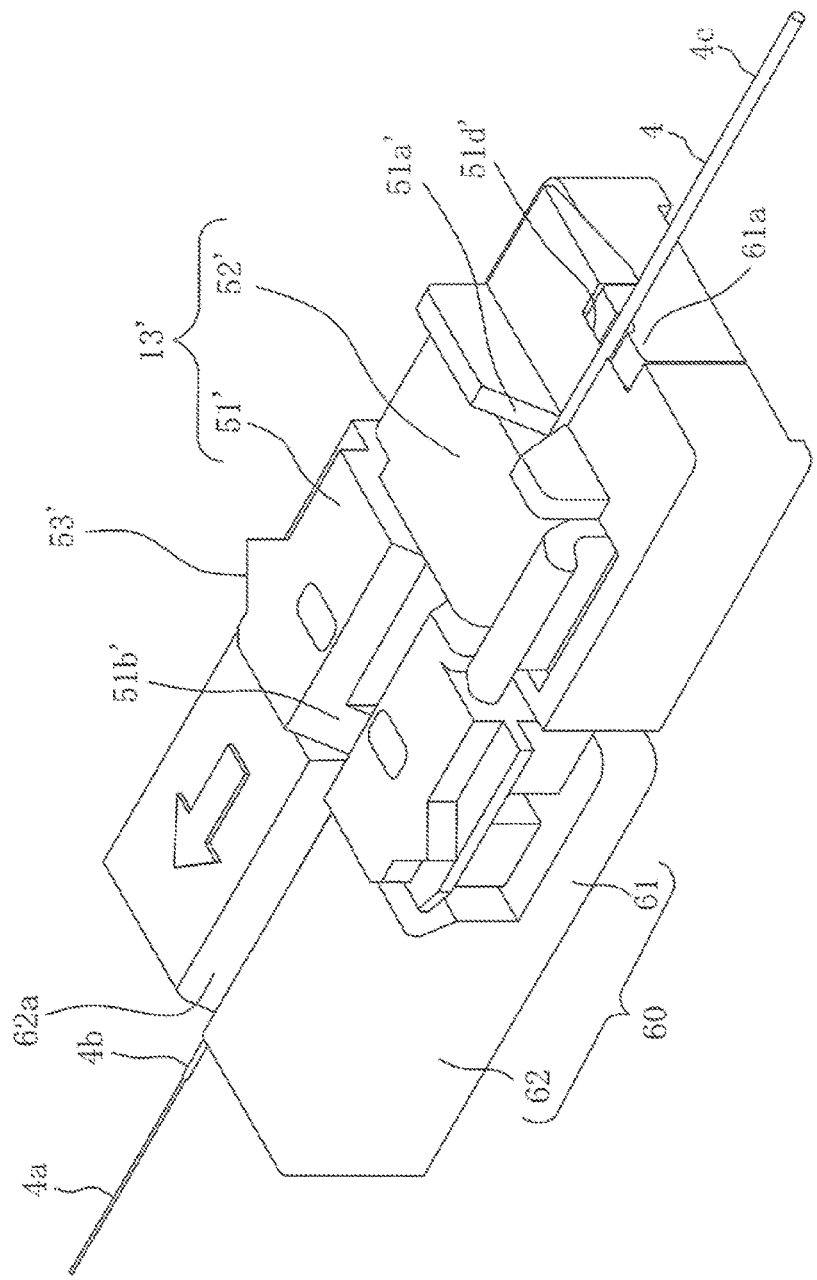
FIG. 27 is a perspective view showing a state where an attachment of a third embodiment of the invention is integrated with the optical fiber holder by detachably attaching the attachment to the optical fiber holder.
Figure 28:
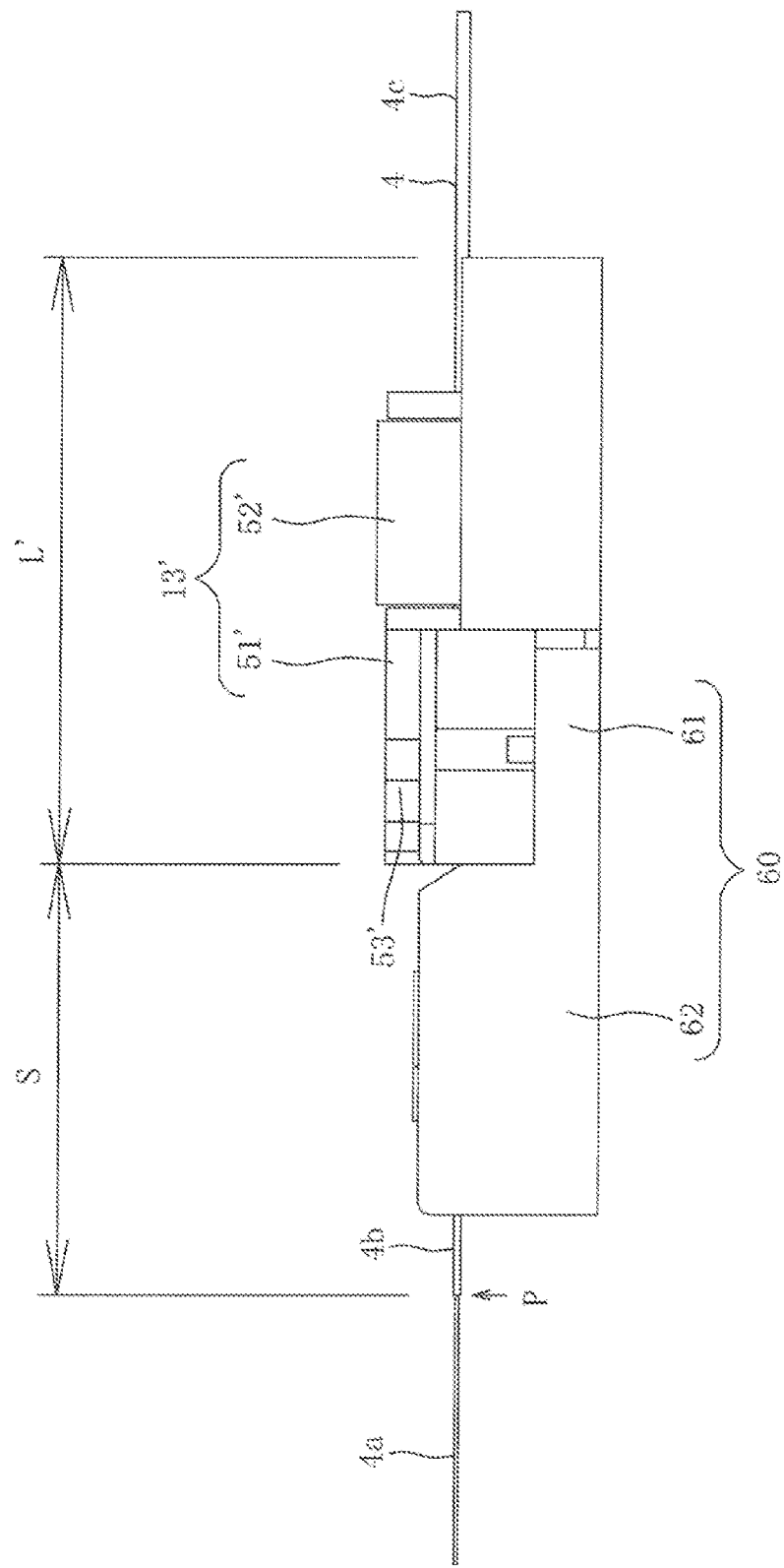
FIG. 28 is a front view showing FIG. 27.
Figure 29:
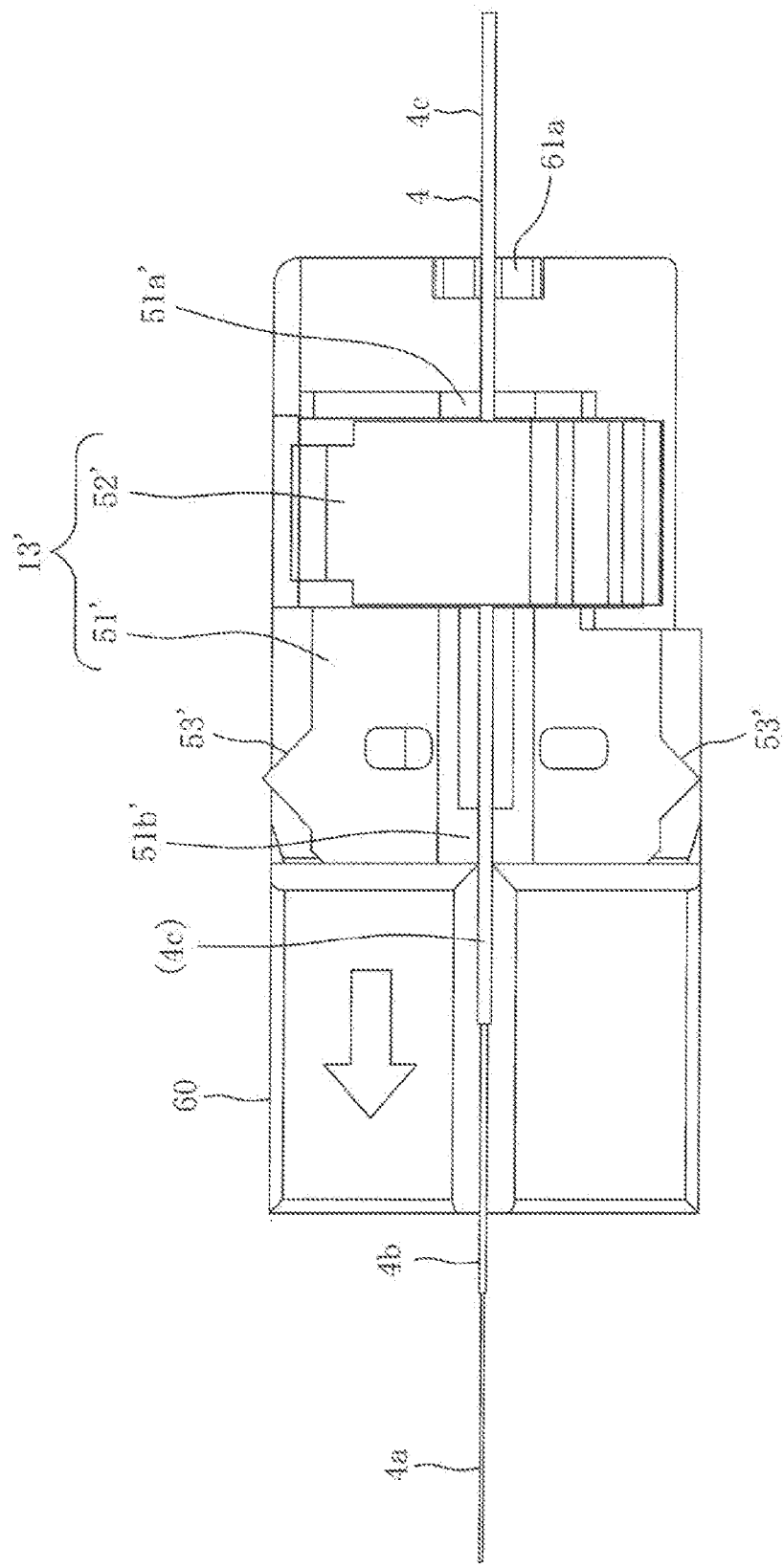
FIG. 29 is a plan view showing FIG. 27.
Figure 30:
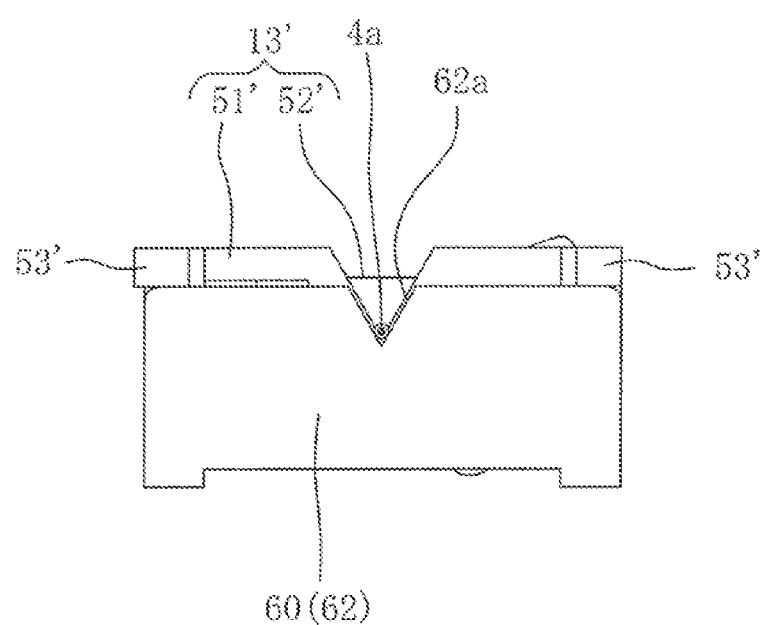
FIG. 30 is a left side view showing FIG. 27.

FIG. 27 is a perspective view showing a state where the attachment 60 is attached to the optical fiber holder 13', FIG. 28 is a front view showing this state, FIG. 29 is a plan view showing this state, and FIG. 30 is a left side view showing this state.

Figure 31:
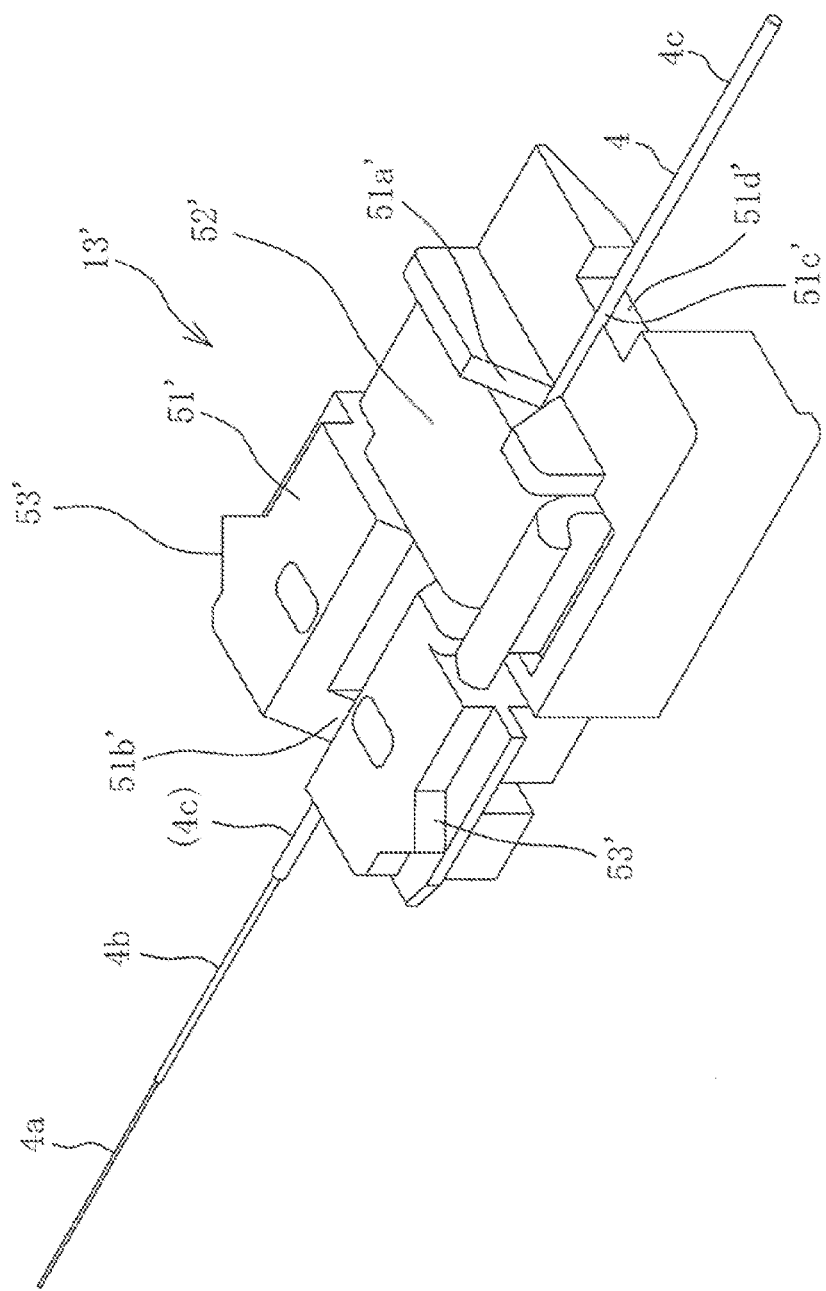
FIG. 31 is a perspective view showing only the optical fiber holder of FIG. 27.
Figure 32:
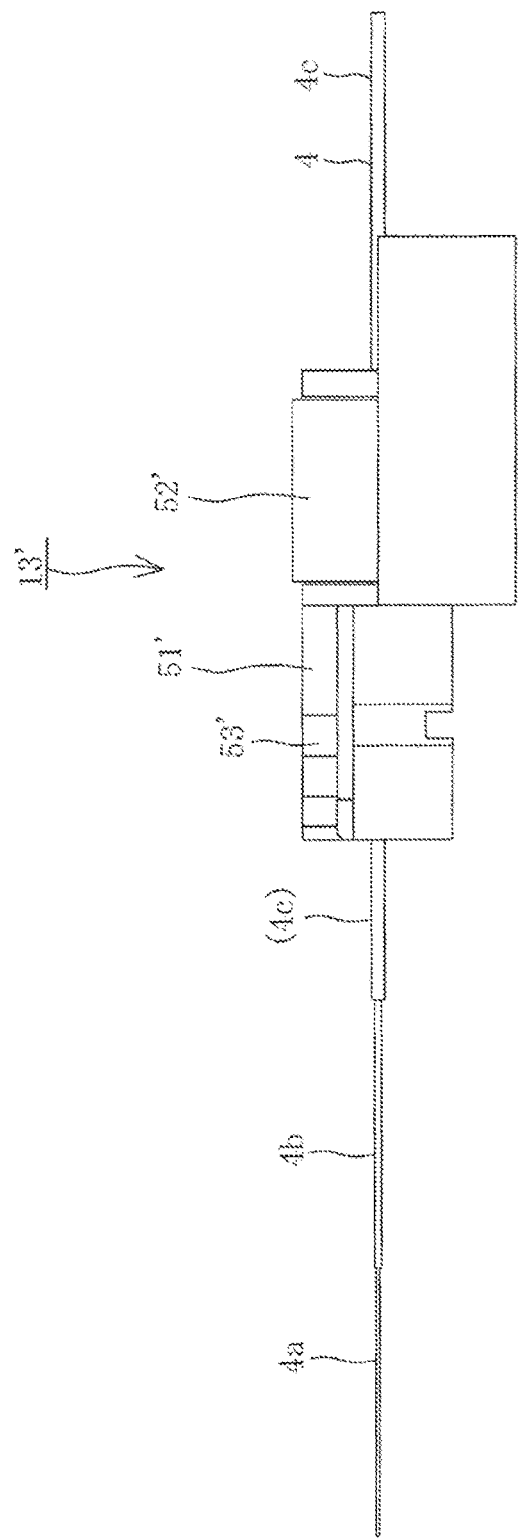
FIG. 32 is a front view showing FIG. 31.
Figure 33:
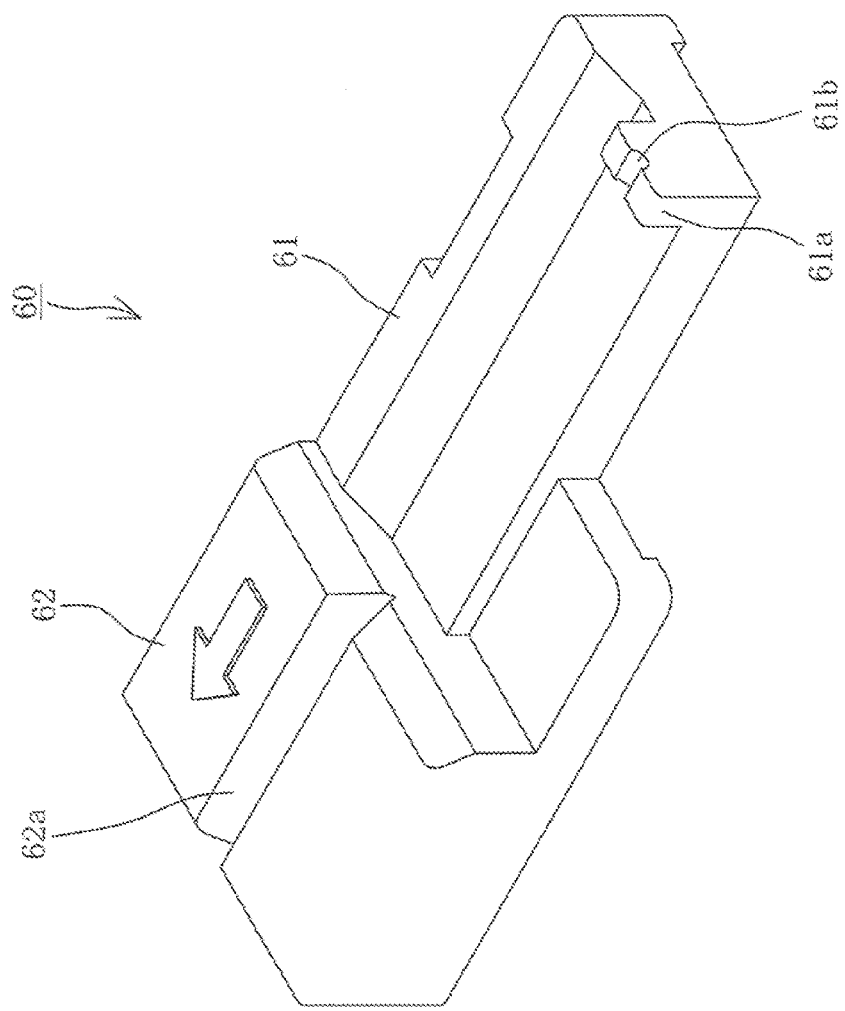
FIG. 33 is a perspective view showing only the attachment of FIG. 27.
Figure 34:
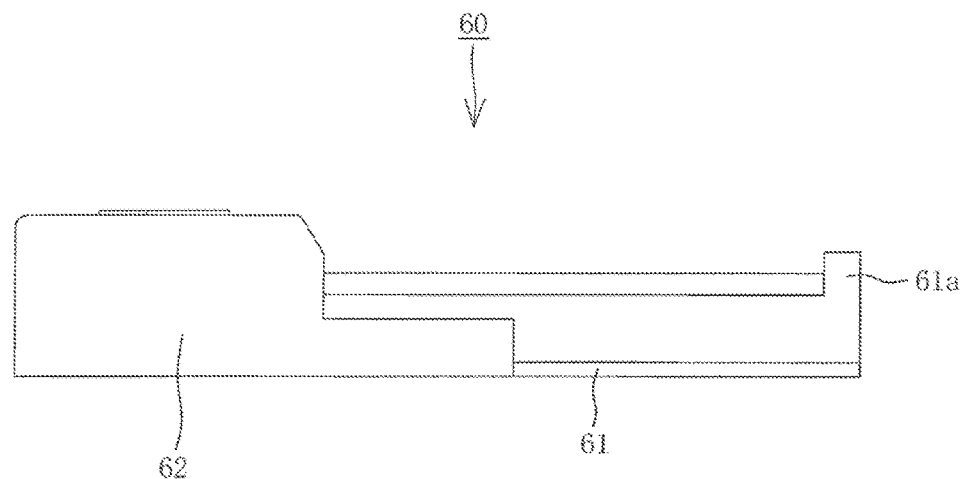
FIG. 34 is a front view showing FIG. 33.

FIG. 31 is a perspective view showing only the optical fiber holder 13' of FIG. 27, FIG. 32 is a front view showing FIG. 31, FIG. 33 is a perspective view showing only an the attachment 60 of FIG. 27, and FIG. 34 is a front view showing FIG. 33.

The optical fiber holder 13' shown as an example in the drawing is slightly different from but is the same in the basic structure of the optical fiber holder 13 shown in FIG. 11 or the like.

Similar to the above-described the optical fiber holder 13, the optical fiber holder 13' is constituted of the holder main body 51' and the lid 52'.

In other cases, an integrally assembled article, in which the holder main body 51' and the lid 52' are integrated with a hinge mechanism interposed therebetween, may be used.

The holder main body 51' includes: a deep V-groove 51a' which serves as a groove accommodating an optical fiber, is located behind the lid 52' (right side in FIGS. 31 and 32), and is formed by a projected portion; a deep V-groove 51b' which is located at a forward-end portion of the holder main body 51'; and a shallow V-groove 51c' which is located under the lid 52' and located at a back position of the V-groove 51a'.

The optical fiber holder 13' grasps the second optical fiber 4 mounted on the holder main body 51' by closing the lid 52' such that the second optical fiber passes through the V-grooves 51c', 51a', and 51b' positioning the second optical fiber 4 in the width direction of the holder.

Additionally, the optical fiber holder has triangle-protuberances 53' which are located at both side portions close to a front end and which are to be engaged with engagement recesses 21c of holder engagement ends 21 close to the above-described splicing tool 11.

Furthermore, the length L in the longitudinal direction of the holder fixing portion 17 of the splicing tool 11 is substantially the same as the length L in the longitudinal direction of the optical fiber holder 13'.

In a step of setting the optical fiber holder 13' of a third embodiment of the invention to the splicing tool 11 after the second optical fiber 4 is cut by a predetermined length with the mechanical stripper, the optical fiber holder 13' is set to a predetermined position as a result of allowing the front-end side portion of the optical fiber holder 13' to slide on the flat surface of the holder fixing portion 17 of the splicing tool 11.

Figure 35:
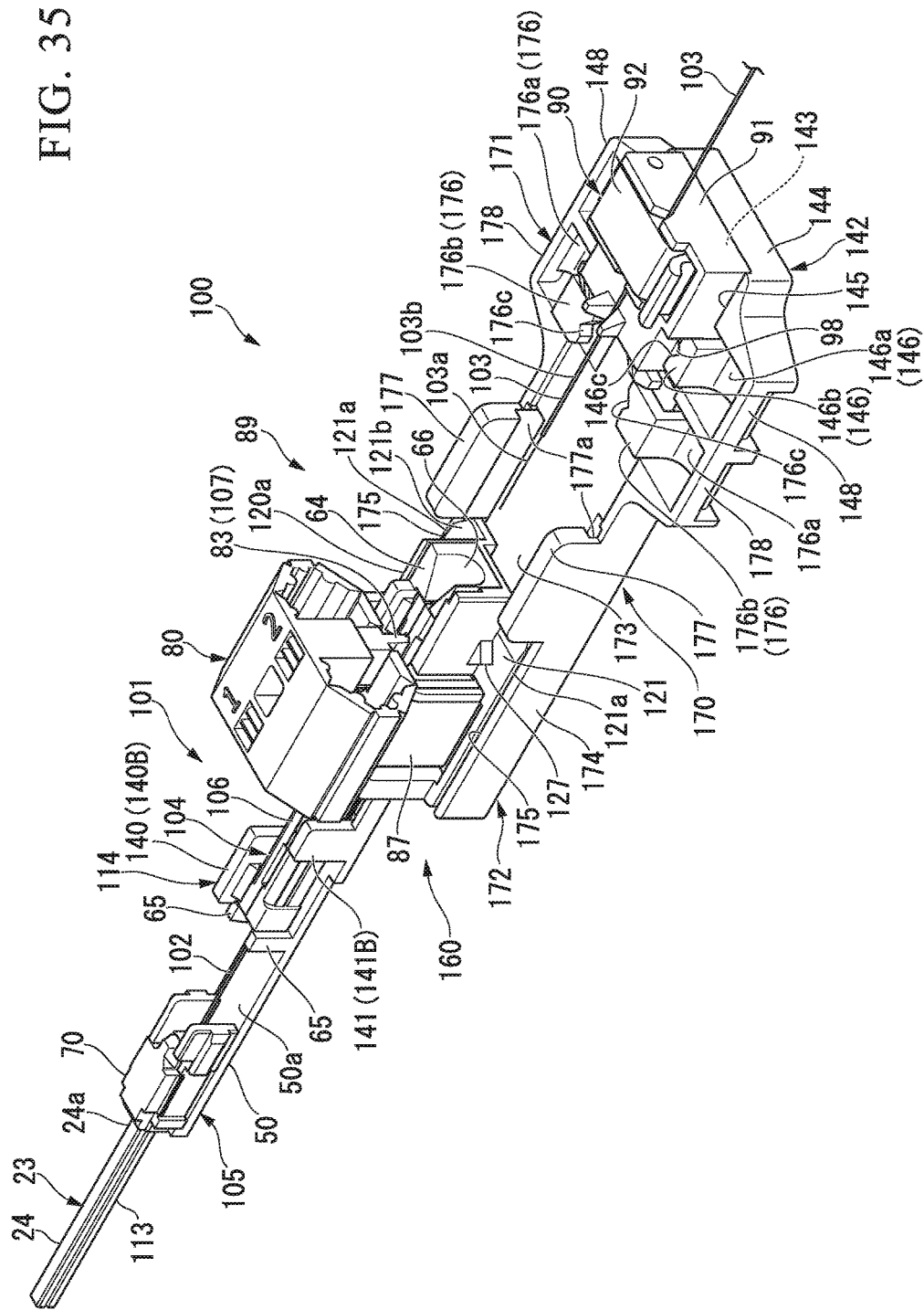
FIG. 35 is a perspective view showing an optical fiber splicing device using an optical fiber splicing unit of a fourth embodiment of the invention.

As shown in FIGS. 33 and 35, the attachment 60 includes: a table portion 61 on which the optical fiber holder 13' is detachably mounted; a forward portion 62 that is formed at a front side of the table portion 61 and has a deep V-groove 62a corresponding to a V-groove 51b' close to the optical fiber holder 13'; and a projected portion 61a that is formed at a back-end side of the table portion 61 and provided with an arc-shaped groove 61b accommodating the second optical fiber.

The optical fiber holder 13' has a U-shaped recess 51d' into which the projected portion 61a close to the back-end of the table portion 61 of the attachment 60 is fitted; the projected portion 61a is fitted into the U-shaped recess 51d', and the attachment 60 and the optical fiber holder 13' are thereby detachably integrated together in a state where they are positioned to each other.

The above-described attachment 60 is attached to the optical fiber holder 13' in a step where the 0.5 mm-coating of the second optical fiber 4 was removed.

Here, when the 0.25 mm-coating of the second optical fiber 4 is removed by use of the 0.25 mm-mechanical stripper, the attachment 60 is set to a predetermined position of the 0.25 mm-mechanical stripper, and the 0.25 mm-coating is thereby removed.

Particularly, when the attachment 60 is set to the 0.25 mm-mechanical stripper, the position of the coating removal blade of the 0.25 mm-mechanical stripper is accurately located at the 0.25 mm-coating removal start position (the position which is indicated by an arrow P in FIG. 28 (the position which is substantially separated from the front-edge face of the optical fiber holder 13' by the distance S)) with respect to the attachment 60.

In FIGS. 27 to 32, the portion of the bare fiber of the second optical fiber 4 is represented by reference numeral 4a, the portion of the 0.25 mm-coating fiber is represented by reference numeral 4b, and the position of the 0.5 mm-coating fiber is represented by reference numeral 4c.

Subsequently, screening and cleaning of the optical fiber (bare fiber) is carried out; thereafter, the optical fiber is cut by the fiber cutter.

Even when the optical fiber is cut, the aforementioned attachment 60 is attached to the optical fiber holder 13' while being unmodified.

The attachment 60 functions as a spacer during coating removal and fiber cutting in common use, when a fiber cutter is set to the attachment 60, the fiber cutter can cut the optical fiber by a predetermined length defined by the attachment 60.

According to use of the above-described the attachment 60, it is possible to accurately determine the 0.25 mm-coating removal start position when the 0.25 mm-coating is removed in the above-described manner.

Moreover, all of a conventional spacer used to remove a coating and a conventional spacer used to cut an optical fiber are separated from an optical fiber holder. Conventionally, when operations of coating removal and optical fiber cutting are carried out, two spacers are prepared or optical fiber cutting operation is performed by removing at least spacer used to remove a coating. In contrast, according to the aforementioned attachment 60, since this attachment is integrated with the optical fiber holder 13' and has a shape for common use during the operations of coating removal and optical fiber cutting, steps of the 0.25 mm-coating removal and the optical fiber cutting can be carried out by use of single attachment 60 without replacement, and the working efficiency thereof is thereby improved.

Furthermore, since the optical fiber holder 13' is a considerably smaller component, handling of this with a hand is difficult. Since the optical fiber holder 13' is integrated with the attachment 60, when an optical fiber cutting is carried out in a subsequent step, the operability of setting a fiber to a fiber cutter is easy and operability is improved.

Fourth Embodiment

Hereinbelow, an optical fiber splicing device 100 using an optical fiber splicing unit 101 of a fourth embodiment of the invention will be described with reference to drawings.

As shown in FIGS. 35 to 37 and 46, the optical fiber splicing device 100 is provided with: the optical fiber splicing unit 101 that is to be attached to one terminal 24a of an optical fiber cable 24; and a device base 89 that holds a fiber holder 90 grasping an inserted optical fiber 103 that is butt-jointed to an extended optical fiber 102 drawn from the terminal 24a.

The optical fiber splicing unit 101 is configured to include: an extended-optical-fiber-attached mechanical splice 104 (hereinbelow, may be referred to as an extended-optical-fiber-attached splice 104); and a unit base 105 holding the extended-optical-fiber-attached splice 104.

Figure 46:
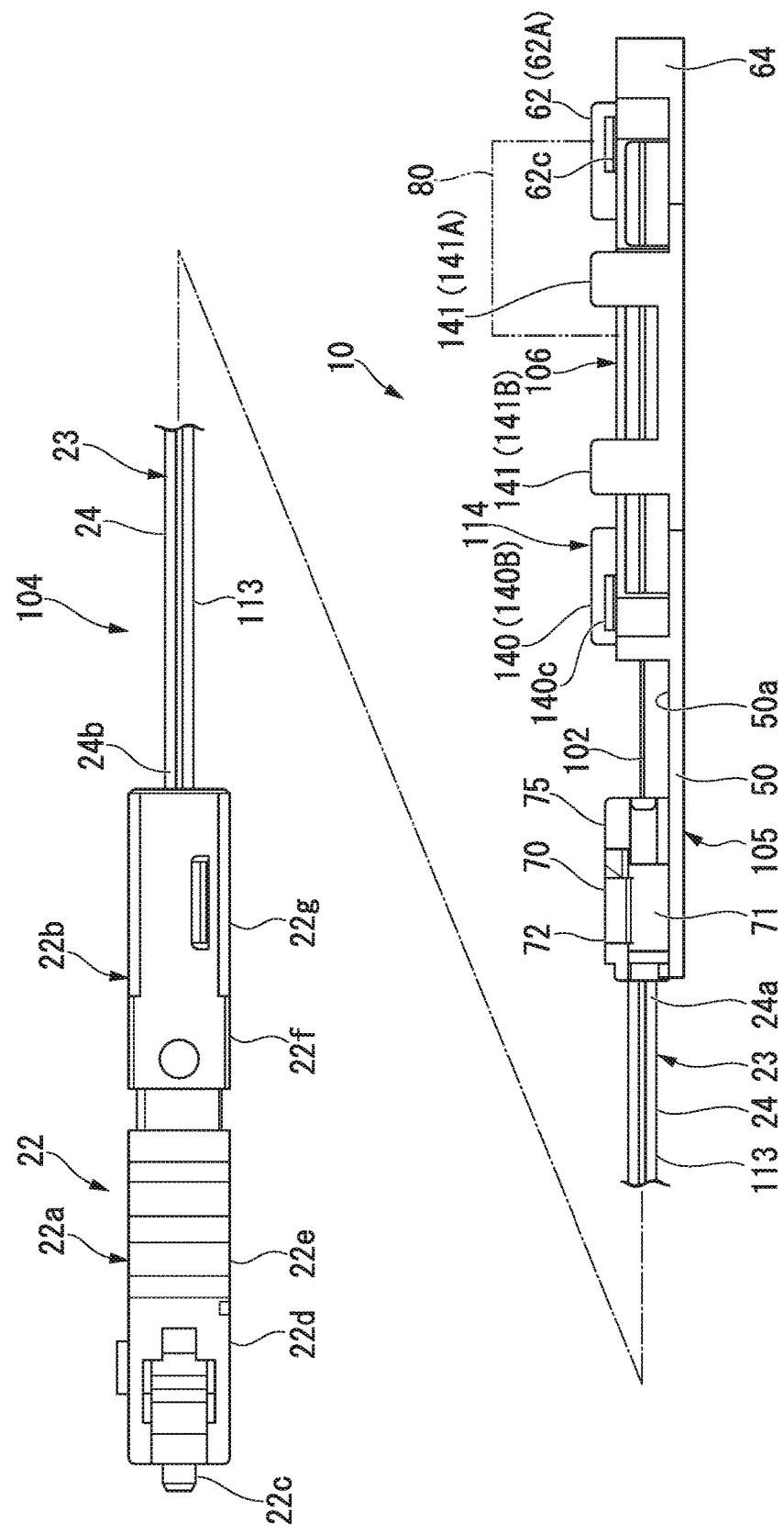
FIG. 46 is a side view showing the optical fiber splicing unit shown in FIG. 35.

As shown in FIG. 46, the extended-optical-fiber-attached splice 104 is configured so that the extended optical fiber 102 (hereinbelow, may be referred to as an optical fiber 102) drawn from one terminal 24a of the optical fiber cable 24 is grasped and fixed to a mechanical splice 106 (hereinbelow, refer to as splice).

Between the terminal 24a and the splice 106, it is preferable that the optical fiber 102 have flexibility to the extent that it is possible to obtain sufficient butting force to be applied to the inserted optical fiber 103.

An optical connector 22 is attached to the other terminal 24b of the optical fiber cable 24.

A part of the optical fiber 102 which is extended from the end in the longitudinal direction of the splice 106, the optical fiber cable 24, and the optical connector 22 may be referred to as a connector-attached pigtail 23.

That is, the extended-optical-fiber-attached splice 104 has a constitution in which the connector-attached pigtail 23 is extended from the splice 106.

The splice 106 has a splicing tool 80 that is attached thereto and interposes the grasping members 34 by interposing an interposing member 107 therebetween.

Particularly, the optical fiber splicing unit 101 will be described, particularly, an upper side thereof is referred to as "above", and a lower side thereof is referred to as "below" in FIGS. 35 and 36.

As shown in FIGS. 40, 41, 42, and 46, the mechanical splice 106 of the extended-optical-fiber-attached splice 104 is configured to include: an elongated-plate-shaped base member 108; a press lid 109 that is constituted of three lid members 321, 322, and 323 which are arrayed and placed along the longitudinal direction of the base member 108; and an extended clamp spring 110 that has an elongated configuration, is formed in a U-shape or a C-shaped in the cross-sectional face thereof (as an example in the drawing, U-shape), and integrally holds the base member and press lid which are positioned inside the clamp spring.

The splice 106 has a halved grasping member 34 that is configured to include: the base member 108 (base-side element) and the lid members 321, 322, and 323 (lid side element).

Due to an elastic action of the clamp spring 110, the base member 108 and the lid members 321, 322, and 323 elastically press each other in a direction in which they connect to each other and are closed.

As shown in FIGS. 40 to 42 and 46, an end of the optical fiber 102 of the extended-optical-fiber-attached splice 104 is inserted through one end of the elongated halved grasping member 34 of the splice 106 in the longitudinal direction to the center portion thereof in the longitudinal direction.

Hereinbelow, the optical fiber 102 may be referred to as an extended optical fiber; and a portion between the base member 108 and the press lid 109 forming the halved grasping member 34, into which the optical fiber 102 is inserted, may be referred to as an insertion end.

In the description, the splice 106 will be described, particularly, the side thereof from which the connector-attached pigtail 23 extends is defined as "back", and the opposite side thereof is defined as "front" in the longitudinal direction.

The connector-attached pigtail 23 extends from the back end of the halved grasping member 34 of the splice 106.

Hereinbelow, of three lid members (lid side element) 321, 322, and 323 configuring the press lid 109 of the splice 106, a lid member that is located at the backmost position and represented as reference numeral 321 may be referred to as a rear lid member, and a lid member that is located at the foremost position and represented as reference numeral 323 may be referred to as a front lid member.

Additionally, a lid member that is located between the rear lid member 321 and the front lid member 323 and represented as reference numeral 322 may be referred to as a middle lid member, hereinbelow.

Figure 40:
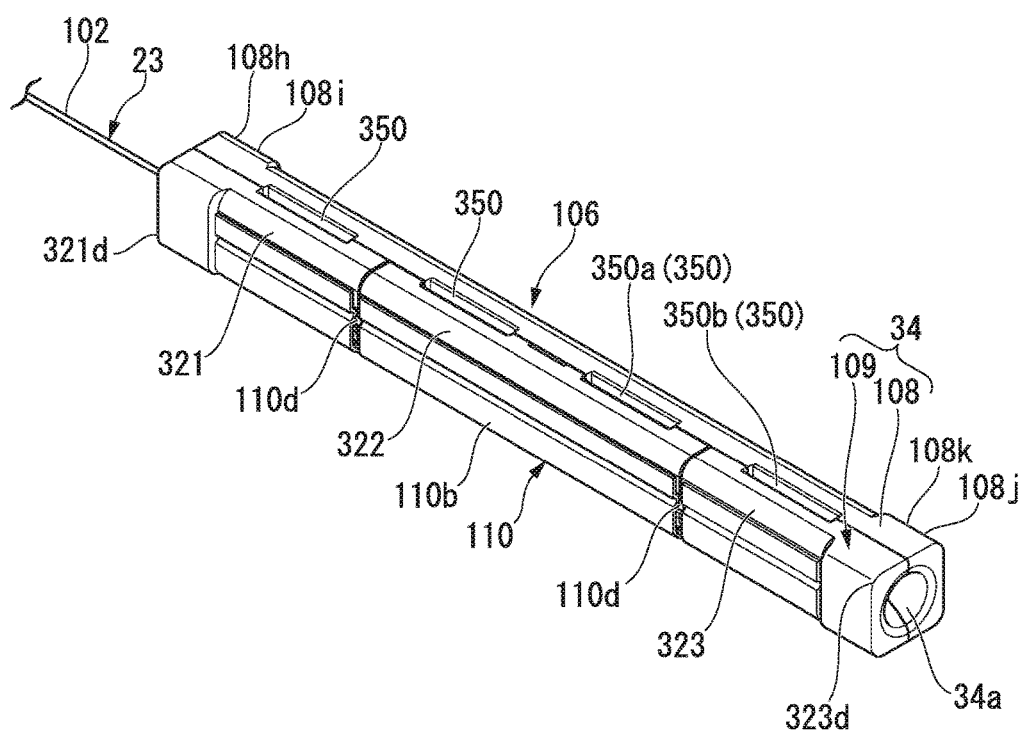
FIG. 40 is a perspective view showing a mechanical splice of the optical fiber splicing unit shown in FIG. 35.
Figure 41:
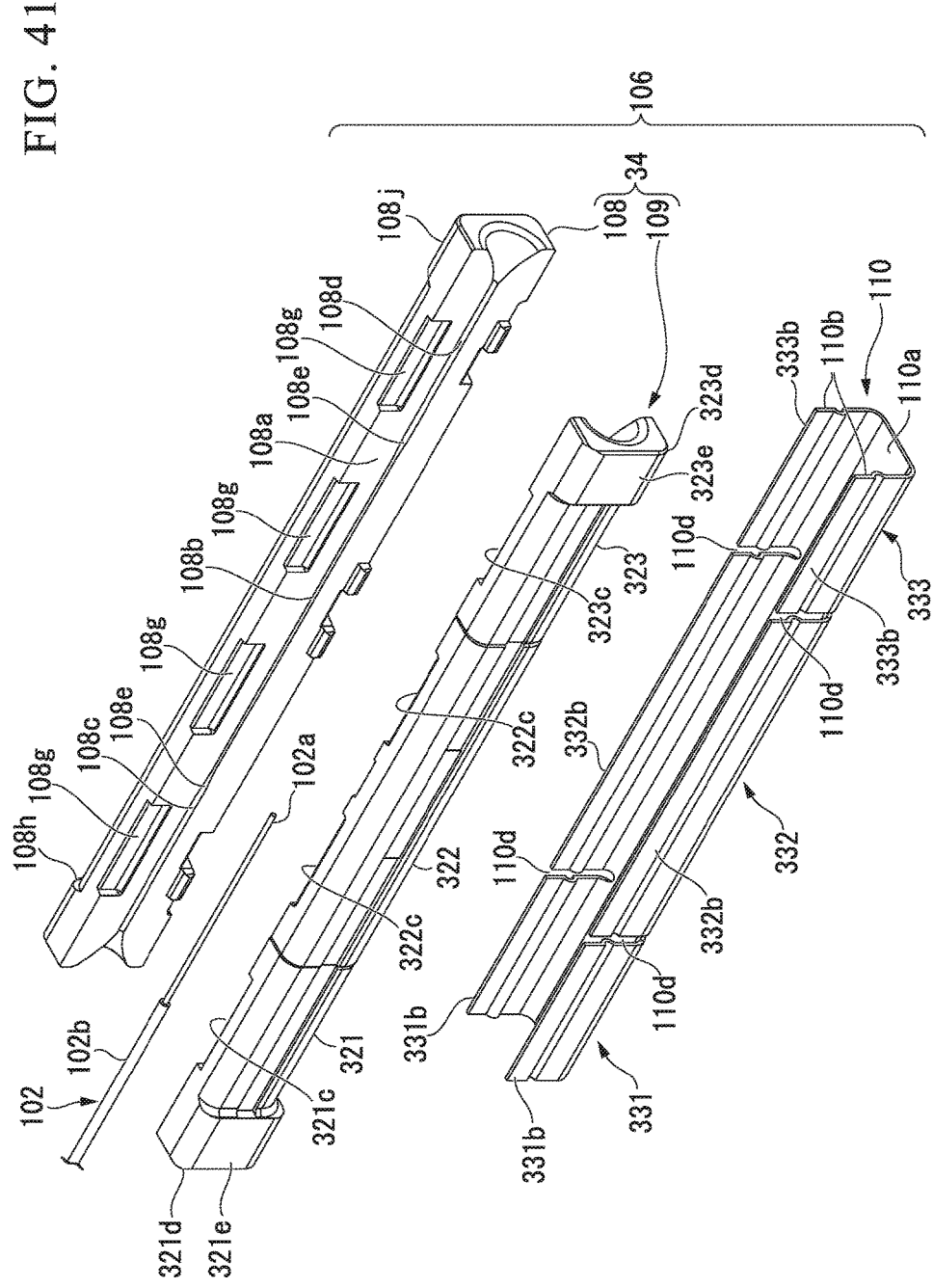
FIG. 41 is an exploded perspective view illustrating a structure of the mechanical splice shown in FIG. 40.
Figure 42:
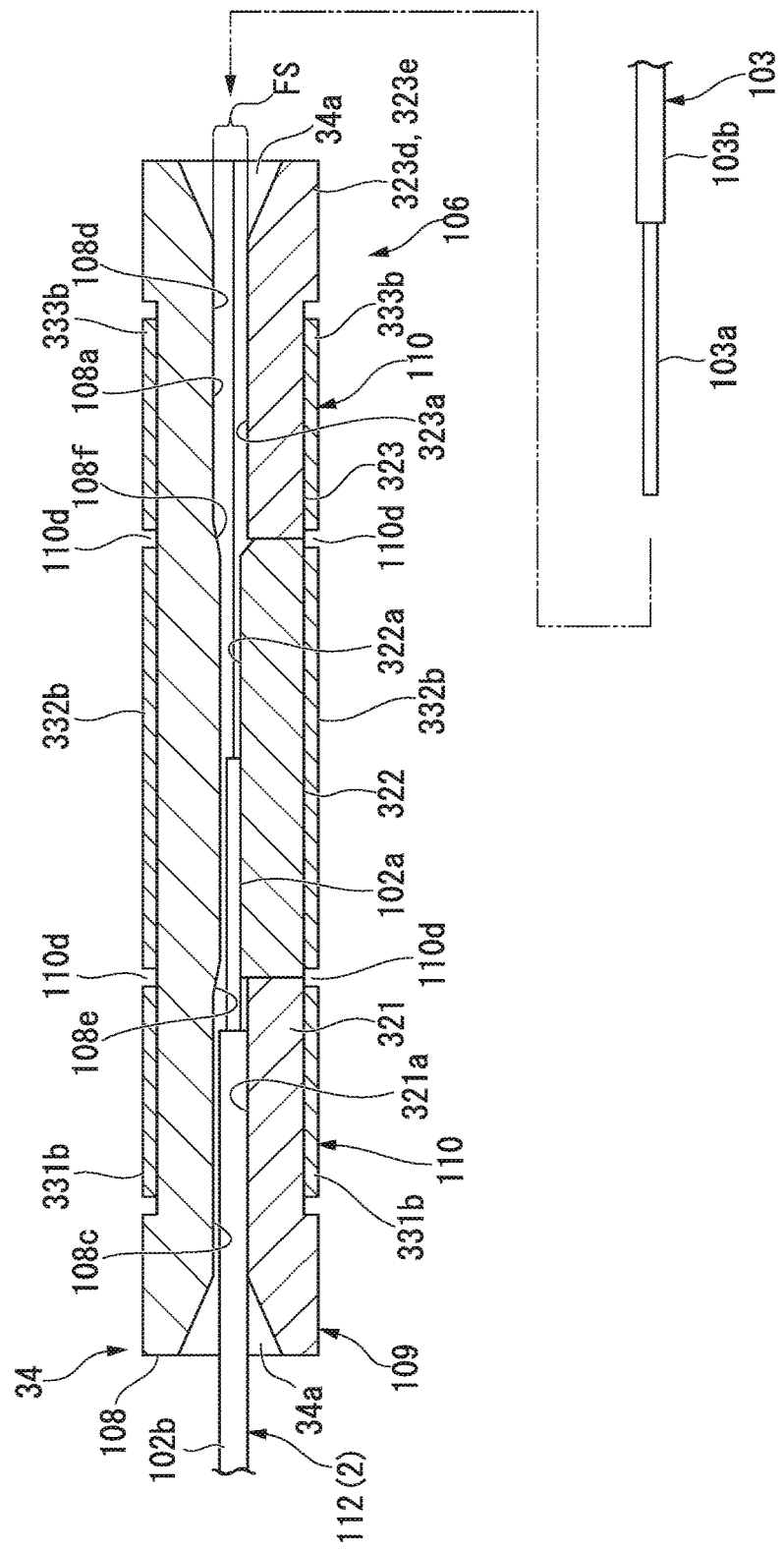
FIG. 42 is a cross-sectional view illustrating a pigtail insertion state or a pigtail grasping state in the mechanical splice shown in FIG. 40.

As shown in FIGS. 40 to 42, the clamp spring 110 having U-shape in the cross-sectional face is formed of a single metal plate by shaping and is configured so that side plate parts 110b are provided at the entire longitudinal area of the elongated plate-shaped back plate part 110a in the longitudinal direction so as to perpendicularly protrude from both sides of the back plate part 110a.

In the splice 106, counterface surfaces 108a, 321a, 322a, and 323a, at which the base member 108 faces the three lid members 321, 322, and 323, are sandwiched between a pair of the side plate parts 110b in the direction substantially perpendicular to the direction in which a pair of the side plate parts 110b of the clamp spring 110 makes a space.

One of the side plate parts 110b comes into contact with the base member 108, and the other of the side plate parts 110b comes into contact with the press lid 109.

Regarding the insertion end of the extended optical fiber 102, the front-end thereof is located between the base member 108 of the splice 106 and the middle lid member 322, and the portion that is located between the front-end and the optical connector side 22 (extension end side) is grasped and fixed between the base member 108 of the splice 106 and the rear lid member 321.

As a result of inserting the optical fiber 103 between the base member 108 and the middle lid member 322 through the front side of the splice 106, the front end of the optical fiber 103 (hereinbelow, may be referred to as an inserted optical fiber) can be butt-jointed to the front end of the extended optical fiber 102 (the front end of the insertion end) with the extended-optical-fiber-attached splice 104.

Additionally, in the extended-optical-fiber-attached splice 104, due to elastic action of the clamp spring 110, it is possible to grasp and fix the extended optical fiber 102 and the optical fiber that was brought into contact with the optical fiber 102 between halved elements of the splice 106, that is, between the base member 108 (base-side element) and the press lid 109 (lid side element).

Figure 52:
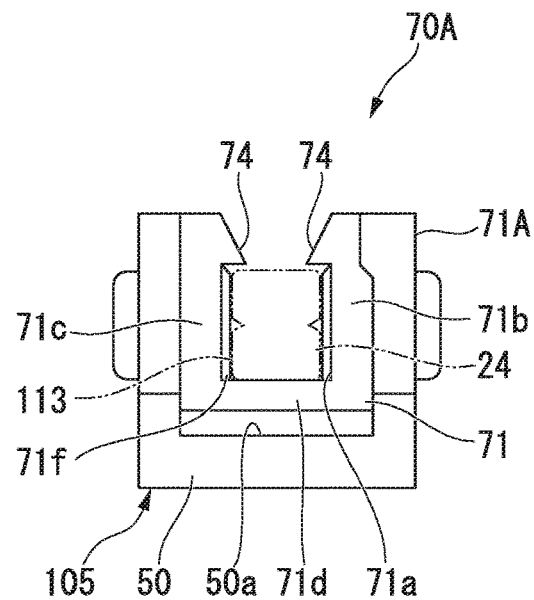
FIG. 52 is a rear view showing another example of the outer coating grasping portion.
Figure 53:
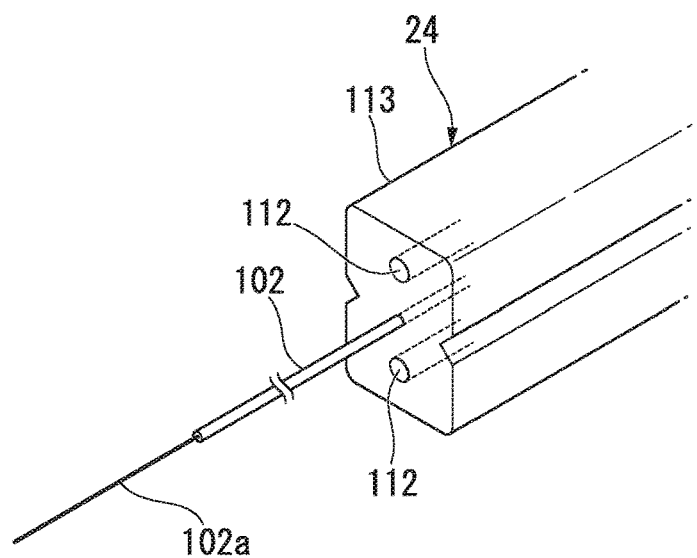
FIG. 53 is a perspective view showing an example of a structure of an optical fiber cable.

As shown in FIG. 52, the optical fiber cable 24 is used as an optical drop cable, a light indoor cable, or the like, and is an optical fiber cable that has a substantially rectangular cross section and has a structure in which, for example, the optical fiber 102 is integrally implanted in a resin-coating member 113 (hereinbelow, may be referred to as an outer coating) with a pair of linear tensile strength bodies 112 that extends parallel to the optical fiber 102 in the longitudinal direction thereof.

The optical fiber 102 is disposed at the center portion in the cross-sectional face of the optical fiber cable 24, and the pair of tensile strength bodies 112 is located at the positions that are separated from the optical fiber 102 toward both sides of the optical fiber cable 24 in the longitudinal direction of the cross-sectional face.

The optical fiber 102 is a coated optical fiber such as an optical core fiber, a bare optical fiber, or the like.

The extended optical fiber 102 and the inserted optical fiber 103 are a coating-attached optical fiber such as an optical core fiber, a bare optical fiber, or the like.

In an example of the drawing, as the extended optical fiber 102 and the inserted optical fiber 103, a single core optical fiber is adopted.

A bare optical fiber 102a is exposed at the front end of the insertion end of the extended optical fiber 102 (fore end).

As a result of butt-jointing a bare optical fiber 103a exposed at the front end of the inserted optical fiber 103 to the bare optical fiber 102a located at the front end of the insertion end of the extended optical fiber 102, butt-jointing connection between the extended optical fiber 102 and the inserted optical fiber 103 in the splice 106 is realized.

As shown in FIGS. 41 and 42, the counterface surface 108a facing the lid members 321, 322, and 323 is formed on the entire base member 108 of the splice 106 so as to extend in the longitudinal direction thereof.

An alignment groove 108b is formed at the center portion in the longitudinal direction (extending direction) of the counterface surface 108a of the base member 108; and the alignment groove allows the bare optical fiber 102a exposed at the front end of the extended optical fiber 102 and the bare optical fiber 103a exposed at the front end of the inserted optical fiber 103 to be butt-jointed to each other (optical splice) and to align the positions thereof with a high level of precision.

The alignment groove 108b is a V-groove formed along the longitudinal direction of the base member 108.

However, the alignment groove 108b is not limited to the V-groove; for example, a groove having a semicircular cross-sectional face, U-groove, or the like may be adopted thereto.

The alignment groove 108b is formed at the portion that faces the middle lid member 322 of the counterface surface 108a of the base member 108.

Coated-portion insertion grooves 108c and 108d, each of which has a groove width wider than the alignment groove 108b, are formed at the portion that faces the rear lid member 321 of the counterface surface 108a of the base member 108 and at the portion that faces the front lid member 323.

The coated-portion insertion grooves 108c and 108d are formed at both sides of the alignment groove 108b in the longitudinal direction of the base member 108 so as to extend along the longitudinal direction of the base member 108.

Tapered grooves 108e and 108f, which have a tapered shape and have a groove width that gradually becomes small in the direction from the coated-portion insertion grooves 108c and 108d to the alignment groove side 108b, are formed between the coated-portion insertion groove 108c and the alignment groove 108b and between the coated-portion insertion groove 108d and the alignment groove.

The coated-portion insertion grooves 108c and 108d are communicated with the alignment groove 108b through the tapered grooves 108e and 108f, respectively.

Figure 43:
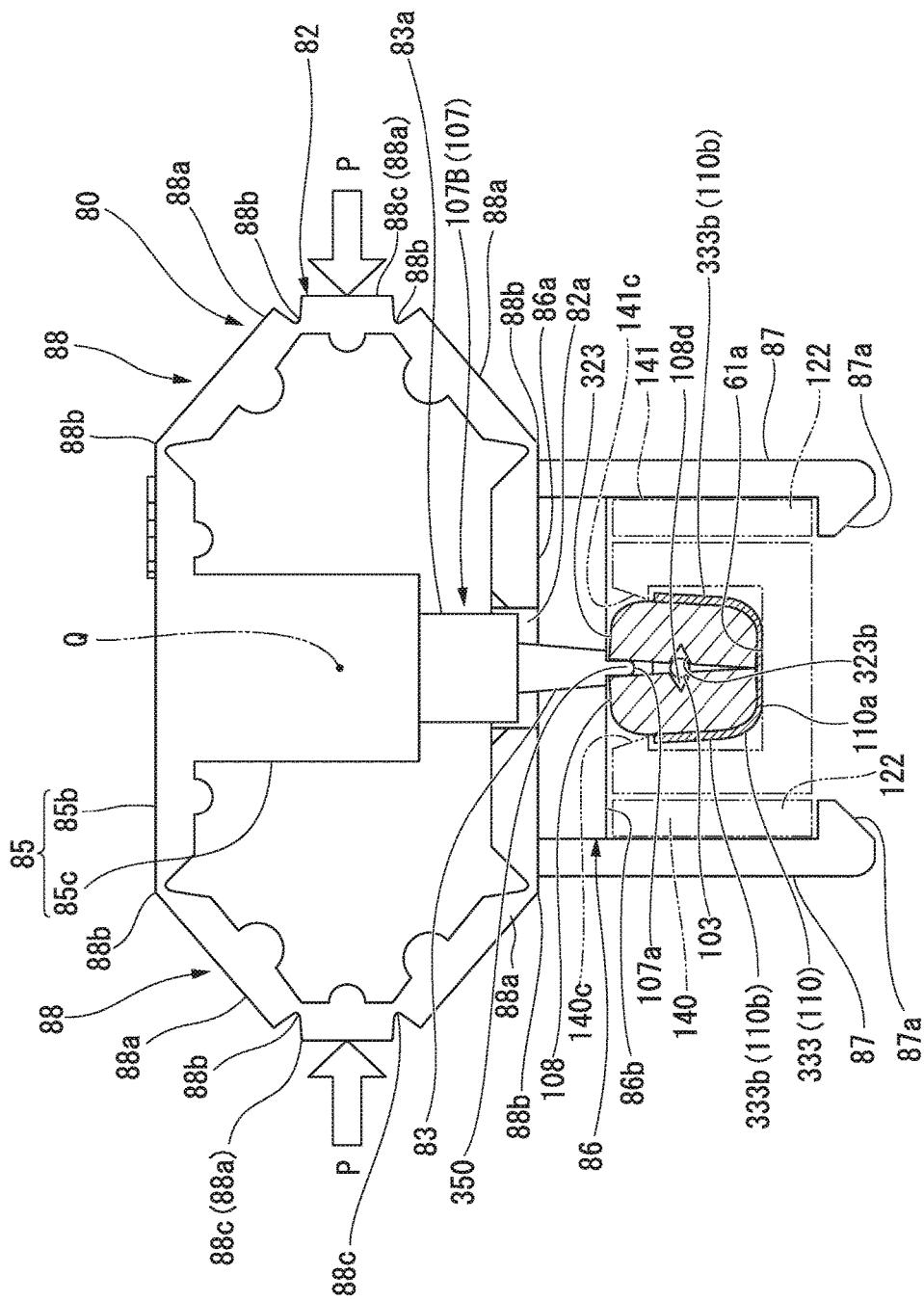
FIG. 43 is a front cross-sectional view illustrating an example of a splice having an interposing member which is opened by interposing an interposing member of the splicing tool between a middle lid member of the mechanical splice shown in FIG. 40 and a base member and between a front lid member and the base member.

In the splice 106 shown as an example in the drawing, the coated-portion insertion grooves 108c and 108d are a V-groove (the coated-portion insertion groove 108d is referred by FIG. 43).

However, the coated-portion insertion grooves 108c and 108d are not limited to the V-groove; for example, a groove having a semicircular cross-sectional face, U-groove, or the like may be adopted thereto.

A coated portion, at which the outer-periphery of the bare optical fiber 102a is covered with a coating 102b, is inserted into the coated-portion insertion grooves 108c and 321b where the coated-portion insertion grooves are formed on the counterface surfaces 108a and 321a and where the rear lid member 321 and the base member 108 face each other at the counterface surfaces; the bare optical fiber 102a that protrudes from the terminal of the coated portion is inserted into the alignment groove 108b; and the insertion end of the extended optical fiber 102 is thereby provided between the base member 108 and the press lid 109.

Subsequently, at the insertion end of the extended optical fiber 102, the coated portion is grasped and fixed between the rear lid member 321 and the base member 108, due to elastic action of the clamp spring 110.

The coated-portion insertion groove 108c of the rear lid member 321 is formed at the position corresponding to the coated-portion insertion groove 108c of the base member 108 at the counterface surface 321a of the rear lid member 321.

Additionally, the depth of the coated-portion insertion groove 321b of the rear lid member 321 and the depth of the coated-portion insertion groove 108c of the base member 108 are adjusted so that the coated portion of the extended optical fiber 102 can be firmly grasped and fixed between the rear lid member 321 and the base member 108 in view of the external diameter of the coated portion of the extended optical fiber 102.

Particularly, the depth of the coated-portion insertion groove 321b of the rear lid member 321 and the depth of the coated-portion insertion groove 108c of the base member 108 are adjusted so that the total of the depth is lower than the outer diameter of the coated portion of the extended optical fiber 102.

As shown in FIGS. 41 and 42, a coated portion, which is the portion at which the outer-periphery of the bare optical fiber 103a of the inserted optical fiber 103 is covered with a coating 103b, is inserted into the coated-portion insertion groove 108d that is formed at the front side of the alignment groove 108b.

Moreover, in the splice 106 shown as an example in the drawing, the coated-portion insertion groove 323b, into which the coated portion of the inserted optical fiber 103 is inserted, is also formed at the position corresponding to the coated-portion insertion groove 108d of the base member 108 and at the counterface surface 323a of the front lid member 323.

The inserted optical fiber 103 is inserted into the coated-portion insertion grooves 108d and 323b through the front side of the splice 106 in a state where the bare optical fiber 103a is preliminarily exposed at the front end of the inserted optical fiber.

Figure 44:
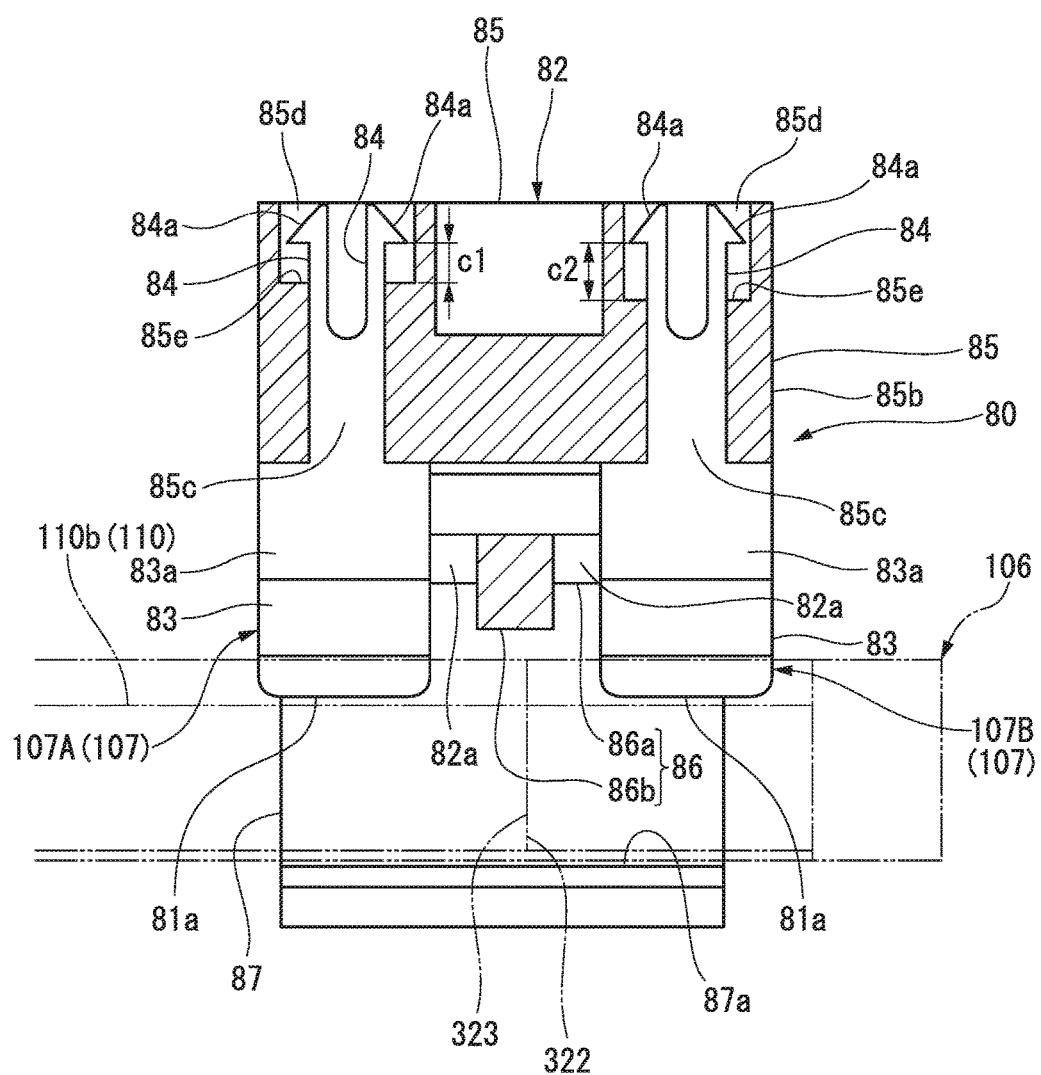
FIG. 44 is a side cross-sectional view showing the splice having the interposing member of FIG. 43, which is close to the splicing tool.

As shown in FIG. 44, the splicing tool 80 includes two interposing members 107.

One of the two interposing members 107 (represented as reference numeral 107a in drawing) is interposed between the forward-end portion of the middle lid member 322 of the splice 106 and the base member 108, and the other thereof (represented as reference numeral 107b in drawing) is interposed between the front lid member 323 and the base member 108.

Spaces between the front lid member 323 of the splice 106 and the base member 108 and between the front lid member 323 and the base member 108 are opened against an elastic action of the clamp spring 110 by interposing members 107A and 107B.

The interposing members 107 are not interposed between the rear lid member 321 and the base member 108 and between the back-end portion of the middle lid member 322 and the base member 108.

In particular, hereinbelow, the interposing member 107A that is interposed between the forward-end portion of the middle lid member 322 of the splice 106 and the base member 108 may be referred to as a first interposing member, and the interposing member 107B that is interposed between the front lid member 323 and the base member 108 may be referred to as a second interposing member.

As shown in FIG. 42, the front lid member 323 is separated (opened) from the base member 108 to such an extent that the coated portion of the inserted optical fiber 103 can be easily inserted into the coated-portion insertion grooves 108d and 323b through the front side of the splice 106.

The forward-end portion of the middle lid member 322 is separated (opened) from the base member 108 to such that the bare optical fiber 103a that is exposed at the front end of the inserted optical fiber 103 can be easily inserted into the alignment groove 108b.

The interposing member 107 of the splicing tool 80 shown as an example in the drawing causes a plate-shaped front-end portion 107a to interpose between the base member 108 of the splice 106 and the press lid 109.

The degrees of opening between the front lid member 323 and the base member 108 and between the forward-end portion of the middle lid member 322 and the base member 108 are determined depending on the thickness of a plate-shaped front-end portion 107a of the interposing member 107.

A distance between the forward-end portion of the middle lid member 322 and the base member 108 which are opened by the first interposing member 107A is set to be in the range that the bare optical fibers 102a and 103a are not out from between the alignment groove 108b and the counterface surface 322a of the middle lid member 322.

A distance between the front lid member 323 and the base member 108 which are opened by the second interposing member 107B is set to be in the range that the inserted optical fiber 103 (the coated portion thereof) is not out from between the coated-portion insertion grooves 108d and 323b.

In other cases, regarding the interposing member, the front-end portion (interposing-end portion) that is interposed between the base member 108 of the splice 106 and the press lid 109 is not limited to a plate shape.

As the interposing-end portion of the interposing member, for example, a sheet, a rod, or the like may be adopted.

An interposing-member main body 83 of the interposing member 107 shown in FIG. 43 as an example has a plate-shaped front-end portion 107a serving as an interposing-end portion.

Hereinafter, the plate-shaped front-end portion 107a of the interposing-member main body 83 may be referred to as an interposing-end portion.

the portion other than the interposing-end portion 107a of the interposing-member main body 83 is formed in a plate shape that has a plate thickness (thickness) greater than that of the interposing-end portion 107a.

Moreover, the front end of the plate-shaped interposing-end portion 107a of the interposing member 107 is formed in a tapered shape.

After the interposing member 107 is detached from the halved grasping member 34 of the splice 106, the interposing-end portion 107a thereof can be interposed between the base member 108 and the press lid 109 by pushing (an interposing-member-attached splice is assembled).

In addition, the optical fiber splicing unit 101 may be supplied to a workplace in a state where the interposing member is removed from the splice 106; and the interposing-member-attached splice may be assembled at the workplace by interposing the interposing-end portions of the interposing members between the middle lid member 322 of the splice 106 and the base member 108 and between the front lid member 323 and the base member 108.

The depths of the coated-portion insertion groove 323b of the front lid member 323 and the coated-portion insertion groove 108d of the base member 108 are adjusted in view of the outer diameter of the coated portion of the inserted optical fiber 103 so that the coated portion of the inserted optical fiber 103 can be grasped and fixed between the front lid member 323 and the base member 108 when the interposing member 107B is removed from between the front lid member 323 and the base member 108.

Particularly, the depths of the coated-portion insertion groove 323b of the front lid member 323 and the coated-portion insertion groove 108d of the base member 108 are adjusted so that the total of the depths is less than the outer diameter of the coated portion of the inserted optical fiber 103.

In the splice 106 shown as an example in the drawing, the coated-portion insertion grooves 321b and 323b of the rear lid member 321 and the front lid member 323 is a V-groove (the coated-portion insertion groove 323b of the front lid member 323 is shown in FIG. 43).

However, the coated-portion insertion grooves 321b and 323b are not limited to the V-groove; for example, a groove having a semicircular cross-sectional face, U-groove, or the like may be adopted thereto.

Additionally, it is not necessary to form the coated-portion insertion groove at both portions of the rear lid member 321 and the base member 108 which face each other.

As a splice, a constitution may be adopted in which the coated-portion insertion groove is formed at one of the portions at which the rear lid member 321 and the base member 108 face each other.

This is similarly adopted to the portions at which the front lid member 323 and the base member 108 face each other; as a splice, a constitution may be adopted in which the coated-portion insertion groove is formed at one of the portions at which the front lid member 323 and the base member 108 face each other.

As shown in FIGS. 41 and 42, the middle lid member 322 is formed in an elongated-plate shape extending in a longitudinal direction that is a direction extending along the longitudinal direction of the base member 108.

As has been described, the forward-end portion of the middle lid member 322 opens with respect to the base member 108 by use of the first interposing member 107A.

The interposing member is not interposed between the base member 108 and the portion that is from the forward-end portion of the middle lid member 322 to the rear side thereof.

As shown in FIG. 42, regarding the middle lid member 322, as a distance from the base member 108 thereto increases in the direction from the rear side thereof to the front side thereof, the middle lid member is inclined with respect to the base member 108.

Consequently, the bare optical fiber 102a that is exposed at the front end of the insertion end of the extended optical fiber 102 is grasped and fixed between the base member 108 and the back-end portion of the elongated plate-shaped middle lid member 322 extending in the longitudinal direction of the base member 108, but is not grasped and fixed between the base member 108 and the portion from the back-end portion of the middle lid member 322 to the front side thereof.

As shown in FIG. 40, in the halved grasping member 34 of the splice 106, interposing member insertion holes 350, into which the interposing member 107 to be inserted, open at the side face (hereinbelow, may be referred to as an exposed side) which is exposed to a side opposite to the back plate part 110a of the clamp spring 110.

As shown in FIG. 41, the interposing member insertion holes 350 are ensured between the base member 108 and the lid members 321, 322, and 323 with interposing member insertion grooves 108g, 321c, 322c, and 323c. The interposing member insertion grooves 108g, 321c, 322c, and 323c are formed at the positions corresponding to the counterface surfaces 108a and 321a, 322a, and 323a of the base member and the three lid members.

Particularly, the interposing member insertion holes 350 are formed so as to have depths that do not reach the alignment groove 108b and the coated-portion insertion grooves 108c, 108d, 321b, and 323b at the exposed side of the halved grasping member 34.

Furthermore, as the interposing member insertion holes 350, a structure may be adopted which is ensured by interposing member insertion grooves only formed at one side of the base member 108 and the lid members 321, 322, and 323.

As shown in FIG. 40, in the splice 106 shown as an example in the drawing, the interposing member insertion holes 350 are formed at four positions; two positions thereof are places corresponding to the back-end portion and the forward-end portion of the middle lid member 322, and the other portions thereof are places corresponding to the center portions of the rear lid member 321 and the front lid member 323 in the front-back direction along the longitudinal direction of the base member 108.

Of four portions of the interposing member insertion holes 350, the interposing members 107A and 107B are inserted into the interposing member insertion hole 350 (represented as reference numeral 350a in FIG. 40) which is formed at the position corresponding to the forward-end portion of the middle lid member 322 and into the interposing member insertion hole 350 (represented as reference numeral 350b in FIG. 40) which is formed at the position corresponding to the center portion of the front lid member 323 in the front-back direction thereof, respectively.

As shown in FIG. 42, a flat counterface surface 322a is formed on the portion of the middle lid member 322 facing the alignment groove 108b of the base member 108.

When the first interposing member 107A that is interposed between the middle lid member 322 and the base member 108 is removed, due to elastic action of the clamp spring 110, at the counterface surface 322a, the middle lid member 322 presses the bare optical fiber 102a of the front end of the extended optical fiber 102 onto the bare optical fiber 103a of the inserted optical fiber 103 that is brought into contact with the front end of the bare optical fiber 102a, and can push them against the alignment groove 108b.

As shown in FIGS. 41 and 42, the paired side plate parts 110b of the clamp spring 110 are separated into three parts corresponding to the three lid members 321, 322, and 323 of the press lid 109 of the splice 106.

A side plate part 110b (the side plate part 110b is located at an upper side in FIGS. 41 and 42) that is to be in contact with the press lid 109 is separated into three parts corresponding to the three lid members 321, 322, and 323 by slit-shaped cut portions 110d where the cut portions are formed at portions corresponding to a boundary between the rear lid member 321 and the middle lid member 322 and a boundary between the middle lid member 322 and the front lid member 323.

The side plate part 110b that is to be in contact with the base member 108 is separated into three parts corresponding to the three lid members 321, 322, and 323 by the cut portions 110d where the cut portions are formed at positions corresponding to the cut portions 110d of the side plate part 110b that is to be in contact with the lid members 321, 322, and 323.

The clamp spring 110 is configured to include: a first clamp spring portion 331 holding the rear lid member 321 and the base member 108; a second clamp spring portion 332 holding the middle lid member 322 and the base member 108; and a third clamp spring portion 333 holding the front lid member 323 and the base member 108.

Each of the first to third clamp spring portions 331 to 333 functions as an independent clamp spring.

In particular, in FIGS. 41, 42, or the like, a pair of side plate parts of the first clamp spring portion 331 is represented as reference numeral 331b, a pair of side plate parts of the second clamp spring portion 332 is represented as reference numeral 332b, and a pair of side plate parts of the third clamp spring portion 333 is represented as reference numeral 333b.

The splice 106 includes three clamp portions corresponding to the three clamp spring portions.

That is, the splice 106 has a first clamp portion that holds the rear lid member 321 and the base member 108 inside the first clamp spring portion 331; a second clamp portion that holds the middle lid member 322 and the base member 108 inside the second clamp spring portion 332; and a third clamp portion that holds the front lid member 323 and the base member 108 which are lateral to the third clamp spring portion 333.

Due to each elastic action of the clamp spring portion corresponding to the clamp portion, the three clamp portions can grasp and fix an optical fiber between the halved elements (between the base member 108 (base-side element) and the lid member (lid side element)).

Due to elastic action of the first clamp spring portion 331, the coated portion of the extended optical fiber 102 is in a state of being grasped and fixed between the rear lid member 321 and the base member 108 by the first clamp portion of the splice 106.

In the splice 106, for example, even where the middle lid member 322 opens or closes (i.e., opening and closing of the second clamp portion) as a result of inserting the interposing member between the middle lid member 322 and the base member 108 or of removing the interposing member therebetween, a state where the extended optical fiber 102 is grasped and fixed by the first clamp portion is stably maintained.

Furthermore, opening or closing of the third clamp portion, which is due to inserting or removing of the interposing member, does not affect a state where the extended optical fiber 102 of the first clamp portion is grasped and fixed at all.

As shown in FIGS. 43 and 44, the splicing tool 80 is configured to include: two interposing members 107 having a front-end portion (interposing-end portion 107a) that interposes between the base member 108 of the splice 106 and the press lid 109; and a sleeve-shaped interposing member driving unit 82 to which the interposing member 107 is attached.

The interposing member 107 includes a plate-shaped interposing-member main body 83 that protrudes outside the interposing member driving unit 82 through a cut-off portion 82a formed at the interposing member driving unit 82.

The interposing-end portion 107a of the interposing member 107 constitutes the front-end portion of the interposing-member main body 83 protruding outside the interposing member driving unit 82 through the cut-off portion 82a.

The splicing tool 80 has a constitution in which the base end side that is opposite to the interposing-end portion 107a of the interposing member 107 is attached to a locking wall portion 85 where the locking wall portion faces a pressure-receiving wall portion 86 and where the pressure-receiving wall portion is a wall portion on which the cut-off portion 82a of the interposing member driving unit 82 is formed.

The pressure-receiving wall portion 86 has a constitution in which contact-protuberance wall portions 86b protruding toward the outside of the interposing member driving unit 82 is provided on and protrudes from a tabular main wall portion 86a on which the cut-off portion 82a is formed.

The contact-protuberance wall portion 86b of the pressure-receiving wall portion 86 is a rib-shaped protuberance wall that is provided at a center portion of the plate-shaped main wall portion 86a in the extending direction thereof where the plate-shaped main wall portion extends along the front-back direction of the interposing member driving unit 82; and the contact-protuberance wall portion protrudes perpendicular to the extending direction (front-back direction) of the plate-shaped main wall portion 86a.

Additionally, the contact-protuberance wall portion 86b is formed so as to extend in the horizontal direction (horizontal direction in FIG. 43) that is the direction in which both drive-part side wall portions 88 makes a space; and the drive-part side wall portions connect the pressure-receiving wall portion 86 (particularly, plate-shaped main wall portion 86a) to the locking wall portion 85 (particularly, a plate-shaped main wall portion 85a which will be described below) in the interposing member driving unit 82.

The cut-off portion 82a is formed in an elongated shape at the plate-shaped main wall portion 86a of the pressure-receiving wall portion 86 so as to extend along the front-back direction from both ends in the front-back direction.

The contact-protuberance wall portions 86b of the pressure-receiving wall portion 86 are located between the back and forth cut-off portions 82a in the front-back direction of the interposing member driving unit 82.

In the two interposing members 107 of the splicing tool 80, the interposing-member main bodies 83 thereof are provided to pass through the back and forth cut-off portions 82a and penetrate the contact protuberance wall 86a.

The interposing-member main body 83 of the interposing member 107 has a contact wall 83a that is formed at a base end side on the opposite side of the interposing-end portion 107a and at the locking wall portion 85 and comes into contact with the pressure-receiving wall portion 86.

The locking wall portion 85 of the interposing member driving unit 82 of the splicing tool 80 shown as an example in the drawing has a constitution in a protruding wall portion 85b protruding in the direction from the plate-shaped main wall portion 85a to the pressure-receiving wall portion 86 is provided on and protrudes from the plate-shaped main wall portion 85a formed in parallel with the plate-shaped main wall portion 86a of the pressure-receiving wall portion 86.

The contact wall 83a of the interposing member 107 can come into contact with the edge face of the protuberance edge of the protruding wall portion 85b of the locking wall portion 85 from the pressure-receiving wall portion 86.

Additionally, the interposing member 107 has engagement ends 84 that extend from a base end (contact wall 83a) of the interposing-member main body 82 to the opposite side (base end side of the interposing member 107) of the interposing-end portion 107a.

Consequently, in the interposing member 107, the engagement ends 84 pass through through holes 85c penetrating through the locking wall portion 85; engagement claws 84a are disposed to be able to engage with the locking wall portion 85 where the engagement claws protrude from the side face of the front-end portions (extending end portion) of the engagement ends 84 projecting to the outside of the locking wall portion 85 (on the opposite side of the pressure-receiving wall portion 86); and the engagement claws are attached to the interposing member driving unit 82.

One end of the through hole 85c of the locking wall portion 85 of the interposing member driving unit 82 of the splicing tool 80 shown as an example in the drawing opens at the edge face of the protuberance edge of the protruding wall portion 85b.

The other end of the through hole 85c opens at the inside of the recess portion 85d where the recess portion is formed in a hollow shape on the outer surface (surface on the opposite side of the inside of the interposing member driving unit 82) of the plate-shaped main wall portion 85a in the locking wall portion 85.

The recess portion 85d is formed in a hole shape such that the other end of the through hole 85c expands.

The engagement claw 84a of the engagement end 84 of the interposing member 107 protrudes from the side face of the front-end portion of the engagement end 84 protruding from a step-difference face 85e formed at the boundary between the other end of the through hole 85c and the recess portion 85d in the outer direction of the interposing member driving unit 82.

The engagement claw 84a is engageable with the step-difference face 85e from the opposite side of the pressure-receiving wall portion 86.

In the interposing member 107 shown as an example in the drawing, a separation distance that is slightly longer than the length of the through hole 85c of the locking wall portion 85 (the length in the axis direction) is ensured between the engagement claw 84a of the engagement ends 84 and the contact wall 83a.

Because of this, the interposing member 107 ensures a little movable range in the axis direction of the through hole 85c with respect to the locking wall portion 85 and is attached to the interposing member driving unit 82 (particularly, the locking wall portion 85).

In other cases, as the splicing tool, a constitution may be adopted in which the separation distance between the engagement claw 84a of the engagement end 84 of the interposing member 107 and the contact wall 83a is made the same as the length of the through hole 85c of the locking wall portion 85 and the interposing member 107 is attached to the interposing member driving unit 82 (particularly, the locking wall portion 85).

With this configuration, the locking wall portion 85 is held between the engagement claw 84a of the engagement end 84 and the contact wall 83a, and the interposing member 107 is attached to this in a state where the displacement thereof is restricted in the axis direction of the through hole 85c with respect to the interposing member driving unit 82 (particularly, the locking wall portion 85).

The two interposing members 107A and 107B are attached to the interposing member driving unit 82 so that they are separated from each other in the axis line direction thereof (central axis line Q).

Hereinbelow, the splicing tool 80 will be described while the axis direction of the interposing member driving unit 82 is referred to as a front-back direction.

The interposing member 107 is attached to the interposing member driving unit 82 in the direction such that the thickness direction of the plate-shaped interposing-member main body 83 is perpendicular to the front-back direction of the interposing member driving unit 82.

Consequently, the splicing tool 80 causes the front-end portion protruding outside the interposing member driving unit 82 of the interposing-member main body 83 of the interposing member 107 to interpose between the base member 108 of the splice 106 and the press lid 109 and is thereby attached to the splice 106.

The front-back direction of the splicing tool 80 is aligned along the front-back direction of the splice 106.

The interposing-member main body 83 is grasped between the base member 108 and the press lid 109 by action of relatively strong force due to elastic action of the clamp spring 110 of the splice 106.

As shown in FIG. 43, the halved grasping member 34 of the splice 106 protrudes from the clamp spring 110 toward the exposed side thereof (the opposite side of the back plate part 110a).

The splicing tool 80 is attached to the splice 106 so that the contact-protuberance wall portion 86b of the pressure-receiving wall portion 86 comes into contact with the halved grasping member 34 of the splice 106.

In the cross-sectional face that is perpendicular to the axis line direction thereof (central axis line Q) of the interposing member driving unit 82, as a result of pressing (applying a lateral pressure P) the portions of the splicing tool 80 between which the interposing member 107 is interposed and which are located at both sides (right and left sides in FIG. 43, the horizontal direction in FIG. 43, hereinbelow, refer to the horizontal direction of the splicing tool 80) so that they approach each other, the separation distance between the pressure-receiving wall portion 86 of the interposing member driving unit 82 and the locking wall portion 85 increases.

Consequently, the splicing tool 80 can remove the interposing member 107 from the splice 106 (particularly, halved grasping member 34).

The work operation of applying the lateral pressure P to the interposing member driving unit 82 so that the right and left side portions approach each other and thereby removing the interposing member 107 from the splice 106 is carried out by, for example, an operator grasping the interposing member driving unit 82 with fingers of their hand.

Furthermore, the splicing tool 80 includes a pair of engagement wall portions 87 outwardly protruding from the interposing member driving unit 82 in a direction parallel to the interposing-member main body 83; and the engagement wall portions protrudes from both sides between which the cut-off portion 82a of the pressure-receiving wall portion 86 is interposed, i.e., from both sides (right and left sides in FIG. 43) between which the interposing-member main body 83 passing through the cut-off portion 82a in the direction perpendicular to the pressure-receiving wall portion 86 is interposed.

Consequently, in the splicing tool 80, protruding claws 87a protrude from the protruding ends of the pair of engagement wall portions 87 toward the inner face side in which the pair of engagement wall portions 87 face each other, the protruding claws engage with bottom ends of the side wall portions 122 of the slider 120a, and the splicing tool is attached to the slider 120a.

As the engagement wall portions 87 engage with the slider 120a, it is less likely for the splicing tool 80 to be displaced with respect to the slider 120a.

However, when work operation of removing the interposing member 107 from the splice 106 in the splicing tool 80 is carried out by applying the lateral pressure P to the right and left sides of the interposing member driving unit 82, even after the separation distance between the pressure-receiving wall portion 86 of the interposing member driving unit 82 and the locking wall portion 85 is maximized, if the interposing member driving unit 82 is continuously deformed by applying the lateral pressure P, an engagement state of the pair of engagement wall portions 87 with respect to the slider 120a can be released.

Engagement or release of engagement regarding the pair of engagement wall portions 87 with respect to the slider 120a will be described below.

As shown in FIGS. 35 to 39, the unit base 105 of the optical fiber splicing unit 101 is provided with a substrate unit 50 (base body), a splice holder portion 114 detachably holding the splice 106 of the extended-optical-fiber-attached splice 104, and an outer coating grasping portion 70 (terminal grasping portion) removably grasping an outer coating 113 of the terminal 24a of the optical fiber cable 24.

The substrate unit 50 is formed in an elongated plate shape, and may be, for example, substantially rectangular as seen in a plan view.

Figure 39:
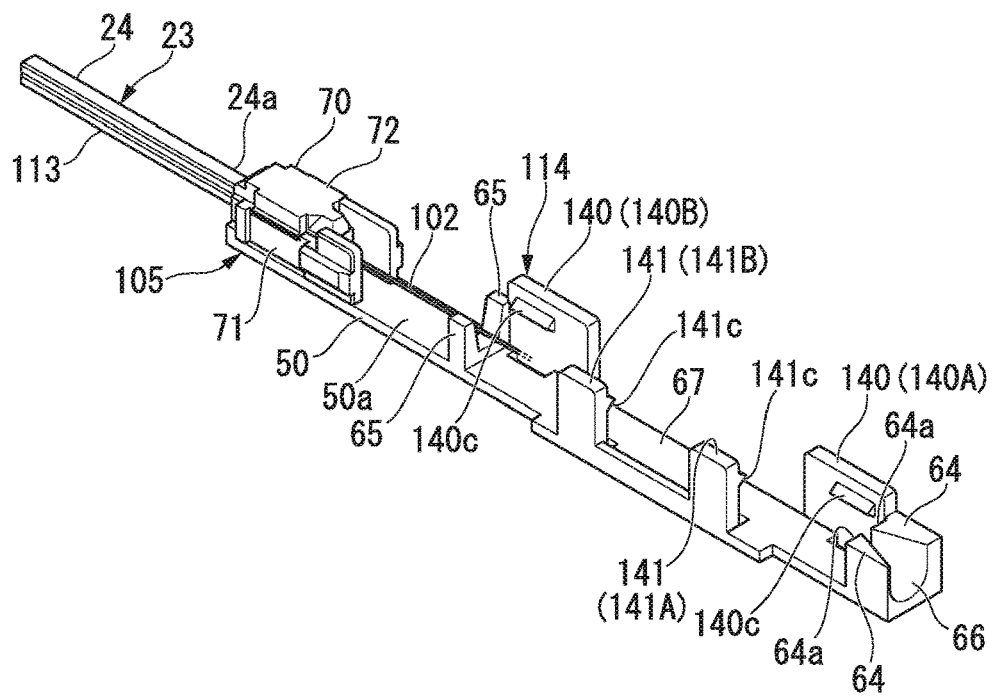
FIG. 39 is a perspective view showing a unit base of the optical fiber splicing unit shown in FIG. 35.

As shown in FIG. 39, the splice holder portion 114 is provided with a pair of one-side-protruding wall portions 140 that is placed upright at one side edge 50c of the substrate unit 50, a pair of another-side-protruding wall portions 141 that is placed upright at another side edge 50b, a pair of front-side-protruding wall portions 64 that is provided at both sides of the forward-end portion of the substrate unit 50, and a pair of rear-side-protruding wall portions 65 that is provided at both sides of the back-end portion of the one-side-protruding wall portion 140.

The protruding wall portions 140, 141, 64, and 65 are formed to protrude from the upper surface 50a of the substrate unit 50 (one of surface).

The splice holder portion 114 accommodates the splice 106 in a splice storage space 67, that is ensured between the one-side-protruding wall portion 140 and the another-side-protruding wall portion 141, and thereby holds the splice 106.

As shown in FIGS. 35 to 39, the pair of one-side-protruding wall portions 140 is formed at a distance in the back and forth direction.

The one-side-protruding wall portion 140 that is close to the front side is referred to as a one-side-protruding wall portion 140A and the one-side-protruding wall portion 140 that is close to the rear side is referred to as a one-side-protruding wall portion 140B.

The paired another-side-protruding wall portions 141 are formed at a distance in the back and forth direction.

The another-side-protruding wall portion 141A that is close to the front side is positioned closer to the rear side than the one-side-protruding wall portion 140A and the another-side-protruding wall portion 141B that is close to the rear side is positioned closer to the front side than the one-side-protruding wall portion 140B.

At the inner faces of the one-side-protruding wall portions 140, locking claws 140c protruding toward the inner face side therefrom are formed.

Similarly, at the inner faces of the another-side-protruding wall portions 141, locking claws 141c protruding toward the inner face side therefrom are formed.

By such locking claws 140c and 141c, it is possible to restrict upward movement of the splice 106.

The splice 106 is pushed into the splice storage space 67, thereby moves downward to the lower sides of the locking claws 140c and 141c, and the upward movement is restricted.

The paired front-side-protruding wall portions 64 are formed to be further closer to the front side than the one-side-protruding wall portion 140A.

A front-side-stopper protuberance 64a is formed at the inner faces of the front-side-protruding wall portions 64 facing each other.

The paired rear-side-protruding wall portions 65 are formed to be further closer to the rear side than the one-side-protruding wall portion 140B.

The separation distance between the front-side-protruding wall portion 64 and the rear-side-protruding wall portion 65 is set depending on the length of the splice 106 in the longitudinal direction, and the displacement of the splice 106 with respect to the substrate unit 50 in the front-back direction is restricted by the front-side-protruding wall portion 64 and the rear-side-protruding wall portion 65.

In the third clamp portion of the splice 106, when the interposing member 107B that is interposed between the front lid member 323 and the base member 108 is detached from the splice 106, since the separation distance between the paired side plate parts 333b of the third clamp spring portion 333 of the clamp spring 110 is reduced, the splice 106 is easily removed from the splice holder portion 114.

Accordingly, the splice holder portion 114 can removably hold the splice 106.

Moreover, the locking or the releasing of the splice 106 by the locking claws 140c and 141c of the one-side-protruding wall portions 140 and the another-side-protruding wall portions 141 can also be carried out as a result of elastically deforming the one-side-protruding wall portions 140 and the another-side-protruding wall portions 141 in a direction away from each other by, for example, an operator with their fingers.

As shown in FIGS. 40 to 42, in the splice 106 hereinbelow, the direction perpendicular to the counterface surface 108a of the base member 108 is referred to as the width direction.

Both engagement faces 108k and 323e of a front-end engagement protuberance portion of the halved grasping member 34 of the splice 106 are located at both sides of the front-end engagement protuberance portion in the width direction, and both engagement faces 108i and 321e of a back-end engagement protuberance portion are located at both sides of a rear-side engagement protuberance portion in the width direction.

Additionally, both side plate parts 110b of the clamp spring 110 are located both sides of the halved grasping member 34 interposed therebetween in the width direction.

In the splice 106, the protruding lengths of a back-end projected portion 108h and a front-end projected portion 108j from the back face of the base member 108 with which the side plate part 110b of the clamp spring 110 comes into contact are made slightly larger than the plate thickness of the side plate part 110b of the clamp spring 110.

Furthermore, the protruding length of the back-end projected portion 321d from the back face of the rear lid member 321 with which the side plate part 110b of the clamp spring 110 comes into contact and the protruding length of the front-end projected portion 323d from the back face of the front lid member 323 with which the side plate part 110b of the clamp spring 110 comes into contact are made slightly larger than the plate thickness of the side plate part 110b of the clamp spring 110.

The thickness of the plate-shaped middle lid member 322, that is, the distance between the counterface surface 322a of the middle lid member 322 and the back face with which the side plate part 110b of the clamp spring 110 comes into contact, the thickness of the plate-shaped portion other than the back-end projected portion 321d of the rear lid member 321, and the thickness of the plate-shaped portion other than the front-end projected portion 323d of the front lid member 323 are made the same as each other.

In the splice 106 (interposing-member-attached splice) in which the interposing members 107A and 107B are interposed between the middle lid member 322 and the base member 108 and between the front lid member 323 and the base member 108, the front-end engagement protuberance portion of the third clamp portion has the largest width in the width direction in the first to the third clamp portions.

As shown in FIG. 39, the width of the front-end engagement protuberance portion of the third clamp portion of the interposing-member-attached splice in the width direction (maximum width) can be the same as the distance in the width direction between the protruding wall portions 140 and 141 of the splice holder portion 114.

The width of the interposing-member-attached splice in the width direction is slightly larger than the distance between the protuberance edges of the locking claws 140c and 141c protruding from the protruding wall portions 140 and 141 and can be less than the distance between the protruding wall portions 140 and 141 in the width direction.

The widths of the front-side portion from the back-end engagement protuberance portion of the first clamp portion of the interposing-member-attached splice and the second clamp portion in the width direction are smaller than the width of the back-side portion from the front-end engagement protuberance portion of the third clamp portion in the width direction.

As shown in FIGS. 41 and 42, a tapered-opening portion 34a, which is provided at each of the front lid member 323 and the base member 108 and which is formed of a recess having a tapered shape gradually becomes fine in the direction from the front-edge face thereof to the rear side, opens at the front end of the halved grasping member 34 of the splice 106.

The rear end (back end) of the tapered-opening portion 34a is communicated with the coated-portion insertion grooves 323b and 108d.

Figure 38:
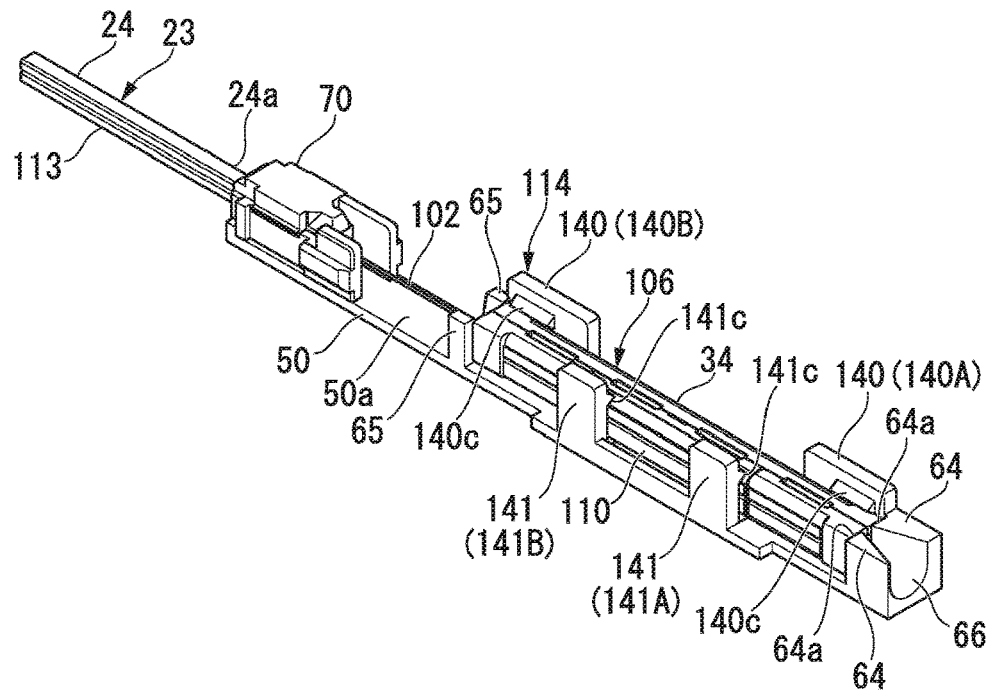
FIG. 38 is a perspective view showing a state where a splicing tool is removed from the optical fiber splicing unit shown in FIG. 35.

As shown in FIG. 38, a hole edge portion, which is provided around the tapered-opening portion 34a of the halved grasping member 34 of the splice 106, comes into contact with the rear side of the front-side-stopper protuberance 64a.

Additionally, the paired front-side-stopper protuberances 64a are not disposed at the position overlapping the tapered-opening portion 34a and do not interfere the insertion of the inserted optical fiber 103 from the tapered-opening portion 34a to the coated-portion insertion grooves 323b and 108d.

Moreover, a fiber introduction recess portion 66 is ensured between the pair of front-side-stopper protuberances 64a; and the fiber introduction recess portion smoothly guides the inserted optical fiber 103 that is to be inserted into the coated-portion insertion grooves 323b and 108d of the splice 106 held by the splice holder portion 114 through the front side of the splice holder portion 114, into the tapered-opening portion 34a that opens at the front end of the splice 106.

The fiber introduction recess portion 66 is a tapered groove having the groove width that gradually decreases in the direction from the front side thereof to the rear side.

The inserted optical fiber 103 that is to be inserted from the front side of the substrate unit 50 into the splice 106 can be guided into the splice 106 held by the splice holder portion 114 through the fiber introduction recess portion 66.

As shown in FIGS. 41 and 42, a tapered-opening portion 34b, which is provided at each of the rear lid member 321 and the base member 108 and which is formed of a recess having a tapered shape gradually becomes fine in the direction from the rear-edge face thereof to the front side, opens at the back end of the halved grasping member 34 of the splice 106.

The front end (back end) of the tapered-opening portion 34b is communicated with the coated-portion insertion grooves 321b and 108c.

As shown in FIG. 38, a hole edge portion, which is provided around the tapered-opening portion 34b at the back end of the base member 108, comes into contact with the front side of the rear-side-protruding wall portion 65.

The outer coating grasping portion 70 is formed above the upper surface 50a of the substrate unit 50 and at the position that is separated from the splice holder portion 114, specifically, formed at the position that is separated rearward from the splice holder portion 114 formed at the position including the forward-end portion of the substrate unit 50.

In an example of the drawing, the outer coating grasping portion 70 is formed at the upper surface 50a and at the position including the back-end portion of the substrate unit 50.

Figure 47:
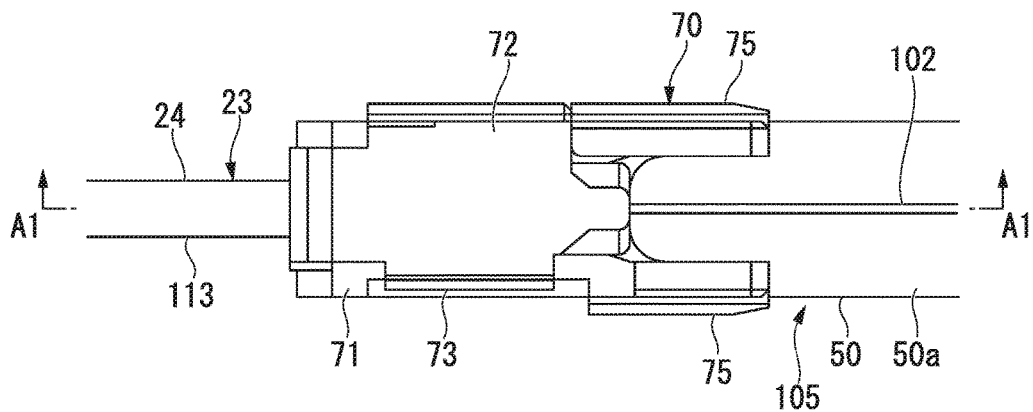
FIG. 47 is a plan view showing an outer coating grasping portion.

FIG. 47 is a plan view showing the outer coating grasping portion 70.

Figure 48:
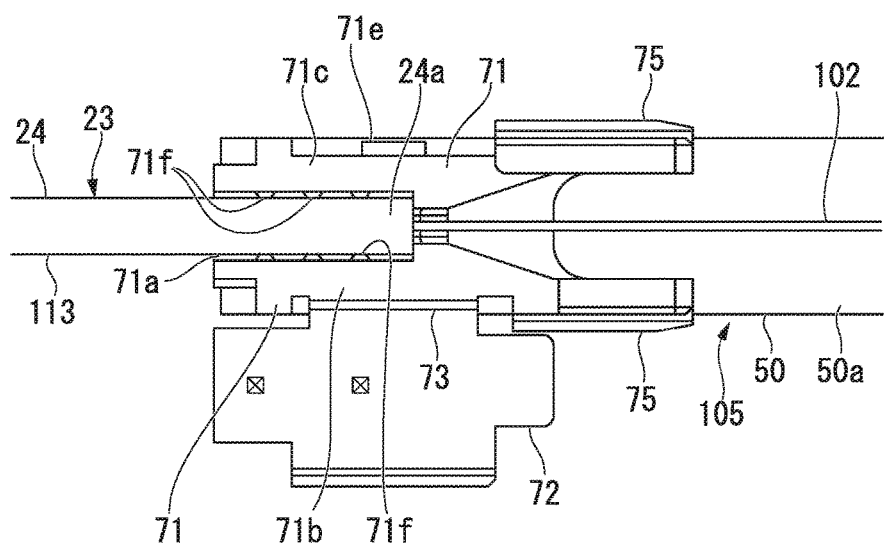
FIG. 48 is a plan view showing the outer coating grasping portion of FIG. 47 and showing a state where the lid is opened.

FIG. 48 is a plan view showing the outer coating grasping portion 70 in a state where a lid 72 opens.

Figure 49:
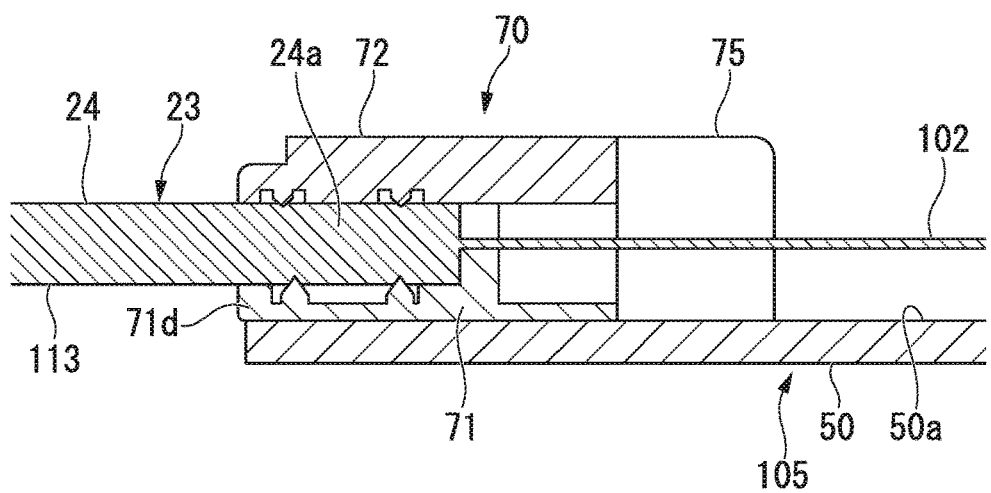
FIG. 49 is a cross-sectional view showing the outer coating grasping portion of FIG. 47 and is the view taken along the line A1-A1 shown in FIG. 47.

FIG. 49 is a cross-sectional view showing the outer coating grasping portion 70 taken along the line A1-A1 shown in FIG. 47.

Figure 50:
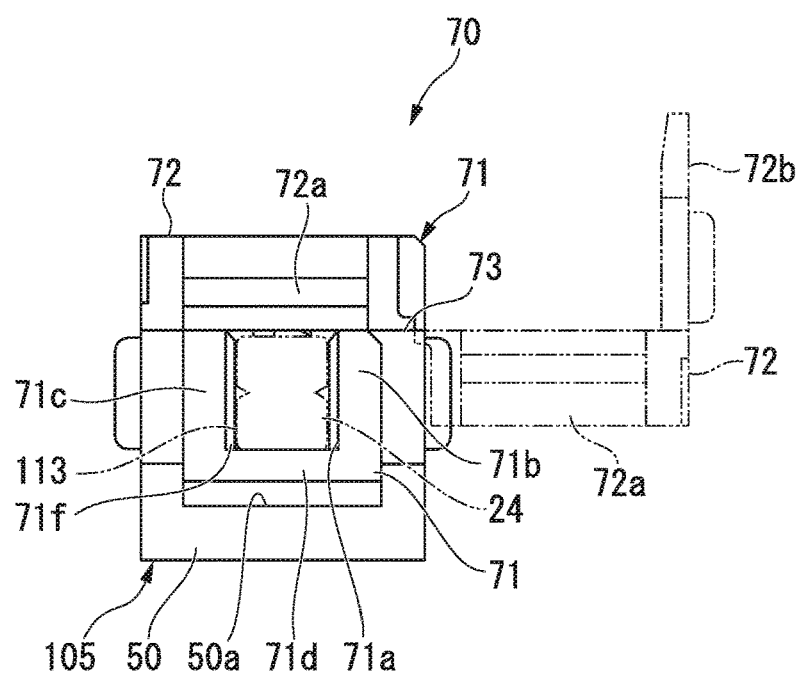
FIG. 50 is a rear view showing the outer coating grasping portion of FIG. 47.

FIG. 50 is a rear view showing the outer coating grasping portion 70.

Figure 51:
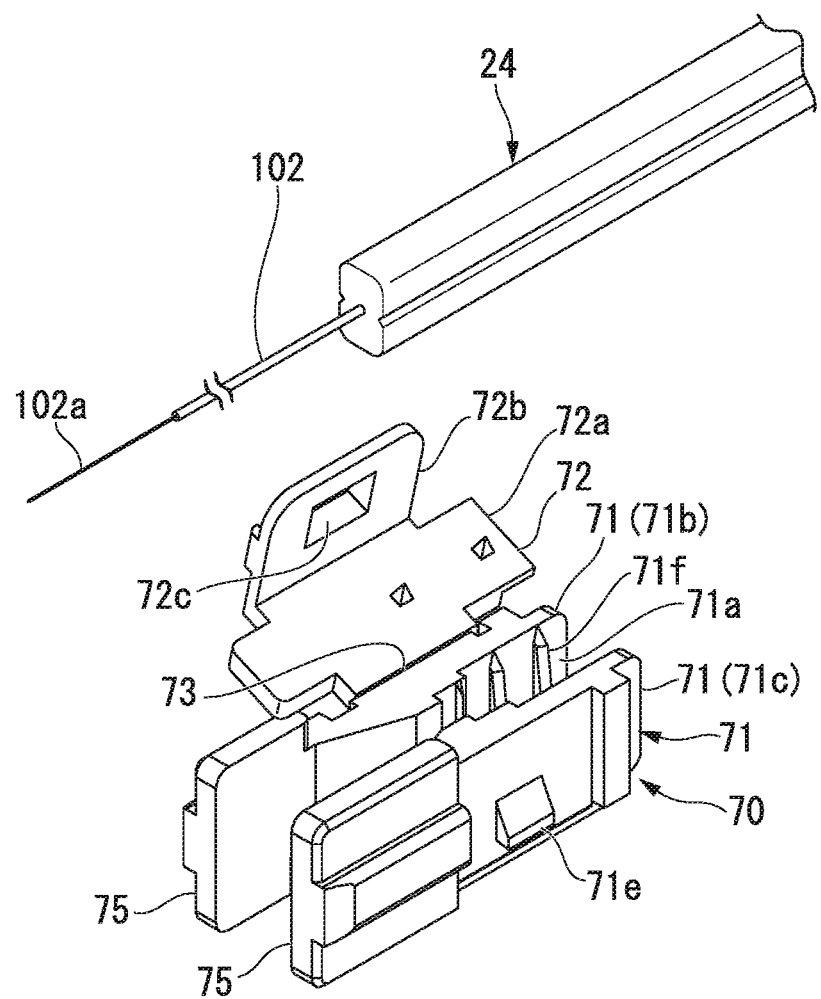
FIG. 51 is a perspective view showing the outer coating grasping portion of FIG. 47.

FIG. 51 is a perspective view showing the outer coating grasping portion 70.

As shown in FIGS. 47 to 51, the outer coating grasping portion 70 includes: a grasping base 71 that is formed in a U-shape in the cross-sectional face and has a cable-fitting groove 71a into which the optical fiber cable 24 is fitted; and a press lid 72 that is pivotally provided to one of side wall portions 71b and 71c of the cable-fitting groove 71a in the groove-width direction of the grasping base 71.

In the outer coating grasping portion 70, a plurality of grasping protrusions 71f, that is provided to protrude from the faces at which the paired side wall portions 71b and 71c of the grasping base 71 face each other, bites into the outer coating 113 of the optical fiber cable 24 which is fitted into the cable-fitting groove 71a, and it is thereby possible to grasp and fix the optical fiber cable 24 between the paired side wall portions 71b and 71c.

The grasping base 71 is a member which has a U-shaped cross-sectional face and in which the cable-fitting groove 71a is ensured between the paired side wall portions 71b and 71c provided at one-face side of a bottom wall portion 71d so as to protrude therefrom.

The groove width direction of the cable-fitting groove 71a is a direction in which both side wall portions 71b and 71c facing each other with the cable-fitting groove 71a interposed therebetween make a space.

The grasping protrusions 71f of the outer coating grasping portion 70 shown as an example in the drawing are protuberances which have a triangular shape in the cross-sectional face and extend in the depth direction of the cable-fitting groove 71a.

After the grasping base 71 is externally fitted onto and fixed to the terminal of optical fiber cable 24 in an opened state where the press lid 72 is separated from the side wall portion 71c, the press lid 72 rotates to be positioned at the closed position so as to close an opening portion of the cable-fitting groove 71a where the opening portion is located between upper ends of the side wall portions 71b and 71c of the grasping base 71, the press lid 72 is locked to the side wall portion 71c, and the outer coating grasping portion 70 is attached to the terminal of the optical fiber cable 24.

The outer coating grasping portion 70 shown as an example in the drawing is an integral molding product made of plastic.

The press lid 72 is linked to one of protuberance edges (first side wall portion 71b) of the paired side wall portions 71b and 71c with a thin portion 73 serving as a hinge portion interposed therebetween.

The press lid 72 is pivotally provided so as to be able to rotate with respect to the first side wall portion 71b of the grasping base 71 via the thin portion 73 along the axis line extending along the extending direction of the cable-fitting groove 71a.

In particular, the other of the side wall portions 71c of the grasping base 71 is also referred to as a second side wall portion 71c.

The press lid 72 of the outer coating grasping portion 70 shown as an example in the drawing is formed in an L-shaped plate.

The press lid 72 includes: a top panel portion 72a that is pivotally provided to the first side wall portion 71b of the grasping base 71 via the thin portion 73; and a lock plate portion 72b that is formed at the top panel portion 72a vertically from the end portion of the top panel portion 72a on the opposite side of the thin portion 73.

In the press lid 72, when the top panel portion 72a comes into contact with the protuberance edges of the pair of side wall portions 71b and 71c of the grasping base 71 and is positioned at the closed position at which the opening portion of the cable-fitting groove 71a is closed, the lock plate portion 72b can overlap the outer face of the cable-fitting groove 71a on the opposite side of the second side wall portion 71c of the grasping base 71.

Subsequently, the press lid 72 causes a locking claw 71e, that is provided to protrude from the outer face of the second side wall portion 71c of the grasping base 71, to be inserted into a locking window 72c formed at the lock plate portion 72b, the press lid is locked to the grasping base 71, and it is thereby possible to stably maintain a closed state with respect to the grasping base 71.

The outer coating grasping portion 70 (fixing member for fastening) shown as an example in the drawing includes a pair of front-side-protruding wall portions 75 protruding from one end of the cable-fitting groove 71a of the grasping base 71 in the front-back direction extending along the extending direction thereof.

The paired front-side-protruding wall portions 75 are formed in a plate shape protruding from both side wall portions 71b and 71c of the grasping base 71 so as to extend along the front-back direction of the grasping base 71 of the side wall portions 71b and 71c.

As shown in FIG. 48, when the terminal 24a of the optical fiber cable 24 is fitted into the cable-fitting groove 71a, the protruding claws 71f that are provided to protrude from the face (inner face) exposed to the cable-fitting groove 71a of the paired side wall portions 71b and 71c of the grasping base 71 are in contact with the side face of the outer coating 113 of the optical fiber cable 24, and the terminal 24a of the terminal 24a is grasped and fixed between the paired side wall portions 71b and 71c.

Additionally, as described above, as a result of maintaining a closed state where the L-shaped plate lid 72 is locked by the locking claw 71e of the outer face of the second side wall portion 71c, it is possible to reliably prevent separation between the protuberance edges of the paired side wall portions 71b and 71c of the grasping base 71 and removal of the optical fiber cable 24 from the cable-fitting groove 71a, and it is possible to stably maintain a fixed state where the outer coating grasping portion 70 is fixed to the terminal 24a of the optical fiber cable 24.

The optical fiber cable 24 can be removed from the outer coating grasping portion 70 by opening the lid 72 and by extracting the optical fiber cable 24 from the cable-fitting groove 71a.

That is, the outer coating grasping portion 70 is attachable to and detachable from the optical fiber cable 24.

The outer coating grasping portion 70 is preferably an integral molding product made of plastic.

The outer coating grasping portion 70 is preferably formed integrally with the substrate unit 50.

For example, the outer coating grasping portion 70 and the substrate unit 50 may be an integral molding product made of plastic.

In the case of forming the outer coating grasping portion 70 and the substrate unit 50 to be integrated in one body, the optical fiber cable 24 is reliably fixed thereto, damage to the optical fiber 102 is prevented, the reliability thereof can be improved.

In other cases, the outer coating grasping portion 70 is not limited to an integral molding, as long as a structure that is tightly fixed to the substrate unit 50 is adopted, a body separated from the substrate unit 50 may be adopted.

The unit base 105 is preferably formed integrally with the splice holder portion 114.

For example, the unit base 105 may be an integral molding product made of plastic.

In other cases, the outer coating grasping portion is not limited to constitution shown as an example in the drawing.

As an outer coating grasping portion, a press lid may be adopted which has a structure in which, for example, the lock plate portion 72b is omitted and an engagement portion to be engaged with the protuberance edge of the second side wall portion 71c of the grasping base 71 is provided on the top panel portion 72a.

Moreover, as the outer coating grasping portion, a structure that is formed of only the grasping base may be adopted.

Furthermore, the outer coating grasping portion is not limited to an integral molding product made of plastic, and a structure which is constituted of a plurality of members may be adopted.

The outer coating grasping portion may be a member that is fixed to, for example, the periphery of the terminal of the optical fiber cable 24 by adhesive fixation using adhesive, thermal welding, or the like.

FIG. 52 shows other example of the outer coating grasping portion; the outer coating grasping portion 70A does not include a lid and is different from the outer coating grasping portion 70 shown in FIG. 50 or the like in that the outer coating grasping portion is constituted of the grasping bases 71A in which both side wall portions 71b and 71c are provided on the bottom plate portion 71d so as to protrude in parallel with each other with the cable-fitting groove 71a interposed therebetween.

Removal prevention protrusions 74 that project to the inside, restrict upward movement of the optical fiber cable 24, and thereby prevent the optical fiber cable 24 from being removed are formed at the protuberance edges (upper edges shown in FIG. 52) of the side wall portions 71b and 71c.

In the outer coating grasping portion 70A having this configuration, since a lid is not provided, the constitution thereof is simple, an operation of inserting the optical fiber cable 24 into the cable-fitting groove 71a is easy.

In addition, since the structure is simple, the manufacturing thereof is easy, and it is also possible to reduce the cost thereof.

Figure 54:
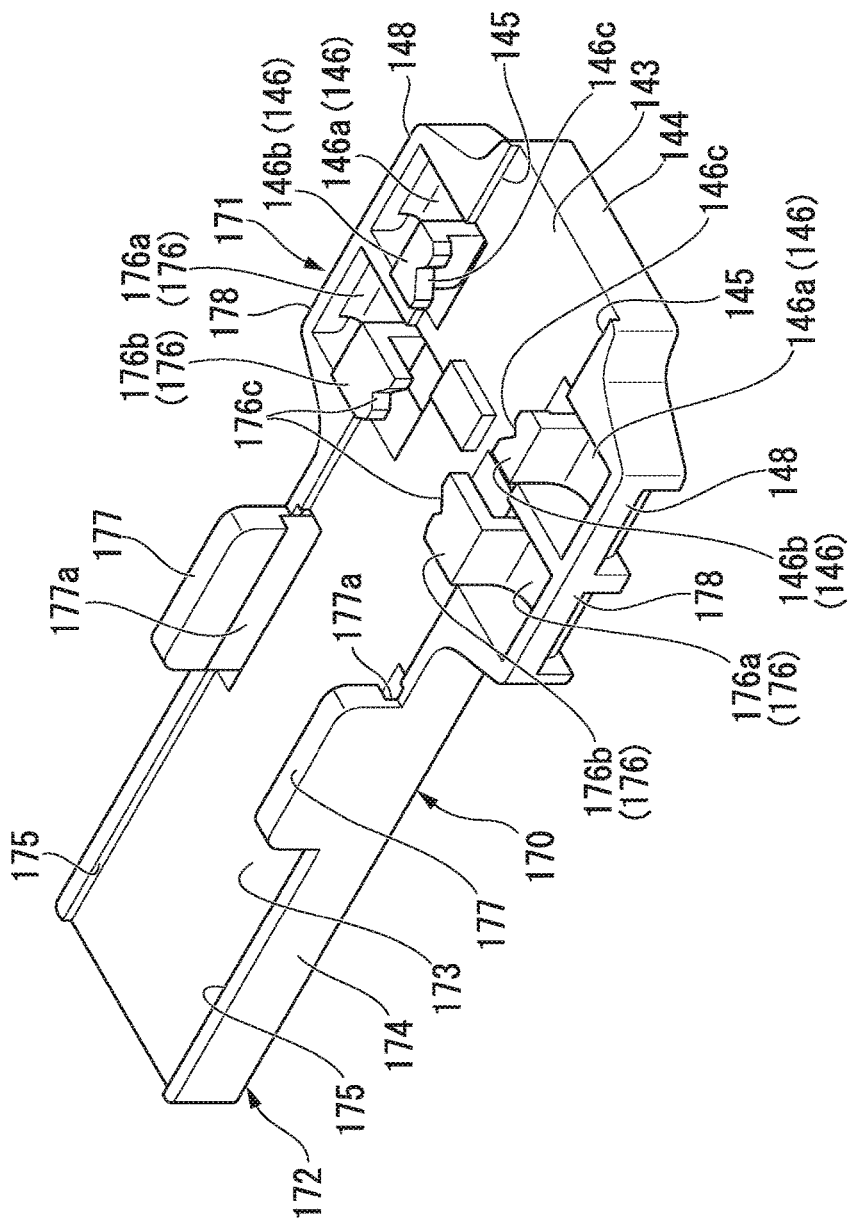
FIG. 54 is a perspective view showing a base main body of the optical fiber splicing device of FIG. 35.

As shown in FIGS. 35 and 54, a device base 89 of the optical fiber splicing device 100 holds the fiber holder 90 grasping the inserted optical fiber 103 and includes: a base 170 that is formed in a substantially tray shape; and a slider 120a that is slide-movably provided on the base 170.

The base 170 includes: a main portion 171; a first rail portion 172 that unidirectionally extends from the main portion 171; and a second rail portion 172 that extends from the main portion 171 in the opposite direction relative to the first rail portion 172.

An elastic locking end 176 that locks the slider 120a and an elastic locking end 146 that locks the fiber holder 90 are formed on the main portion 171.

The first rail portion 172 is substantially configured so that, guide wall portions 175 are provided to protrude from both side edges of a table portion 174, a slide surface 173 is formed on the table portion that allows the slider 120a to slide thereon, and the guide wall portions guide the slider 120a.

The paired guide wall portions 175 are formed to extend in the formation direction (front-back direction) of the first rail portion 172, come into contact with both side edge portions 121a of a substrate unit 121b of the slider 120a mounted on the slide surface 173, and thereby can align the position of the slider 120a in the width direction thereof.

The elastic locking end 176 is configured so that, curved-plate portions 176a protrude from projected portions 178 that are provided to protrude from both sides of the main portion 171 toward the slide surface side 173 in the width direction, plate-shaped engagement end portions 176b at which engagement recesses 176c are formed are provided at the ends of the curved-plate portions so as to protrude therefrom, and locking protrusions 127 of the slider 120a engage with the engagement recesses.

The curved-plate portions 176a are formed in a circular arc plate shape that is curved along the axis line extending in the front-back direction of the first rail portion 172.

The protuberance edges of the curved-plate portions 176a are located above the slide surface 173 that is formed on the region from the first rail portion 172 to the main portion 171.

The engagement end portions 176b protrude from the protuberance edges of the curved-plate portions 176a to the inside thereof above the slide surface 173.

The engagement recesses 176c of the engagement end portions 176b are formed in a cut-off shape and at a substantially center portion between the back and forth positions of the engagement end portions 176b, at which the protuberance edges of the engagement end portions 176b are depressed.

When the locking protrusions 127 of the slider 120a are inserted into the engagement recesses 176c and are engaged with the locking protrusions 127, the elastic locking ends 176 can restrict movement of the slider 120a in the front-back direction thereof with respect to the first rail portion 172.

In this state, the elastic locking ends 176 sandwich the slider 120a due to elastic action of the curved-plate portions 176a and thereby stably hold the slider 120a.

The elastic locking ends 176 function as a splice locking mechanism that is engaged with the slider 120a moving forward along the first rail portion 172 and restricts backward movement thereof.

Side wall portions 177 are placed upright at both side edges of the first rail portion 172.

The side wall portions 177 are formed at a part of the region of the first rail portion 172 in the length direction, and groove portions 177a that restrict upward movement of the slider 120a are formed at lower inner faces of the side wall portions 177.

The groove portions 177a are formed along the formation direction of the first rail portion 172 (front-back direction); when both side edge portions 121a of the substrate unit 121b are intruded into the groove portions, it is possible to restrict the upward movement of the slider 120a.

The second rail portion 172 is substantially configured so that, a pair of guide wall portions 145 is provided to protrude from both side edges of a table portion 144, a slide surface 143 is formed on the table portion that allows the fiber holder 90 to slide thereon, and the guide wall portions guide the fiber holder 90.

The paired guide wall portions 145 are formed to extend in the formation direction (front-back direction) of the second rail portion 172, come into contact with both side edges of the fiber holder 90 mounted on the slide surface 143, and thereby can align the position of the fiber holder 90 in the width direction thereof.

The elastic locking end 146 is configured so that, curved-plate portions 146a protrude from projected portions 148 that are provided to protrude from both sides of the main portion 141 toward the slide surface side 143 in the width direction, plate-shaped engagement end portions 146b at which engagement recesses 146c are formed are provided at the ends of the curved-plate portions so as to protrude therefrom, and locking protrusions 98 of the fiber holder 90 engage with the engagement recesses.

The curved-plate portions 146a are formed in a circular arc plate shape that is curved along the axis line extending in the front-back direction of the second rail portion 172.

The protuberance edges of the curved-plate portions 146a are located above the slide surface 143 that is formed on the region from the second rail portion 172 to the main portion 141.

The engagement end portions 146b protrude from the protuberance edges of the curved-plate portions 146a to the inside thereof above the slide surface 143.

The engagement recesses 146c of the engagement end portions 146b are formed in a cut-off shape and at a substantially center portion between the back and forth positions of the engagement end portions 146b, at which the protuberance edges of the engagement end portions 146b are depressed.

When the locking protrusions 98 of the fiber holder 90 are inserted into the engagement recesses 146c and are engaged with the locking protrusions 98, the elastic locking ends 146 can restrict movement of the fiber holder 90 in the front-back direction thereof with respect to the second rail portion 172.

In this state, the elastic locking ends 146 sandwich the fiber holder 90 due to elastic action of the curved-plate portions 146a and thereby stably hold the fiber holder 90.

The elastic locking ends 146 function as a splice locking mechanism that is engaged with the fiber holder 90 moving forward along the second rail portion 172 and restricts backward movement thereof.

Figure 55:
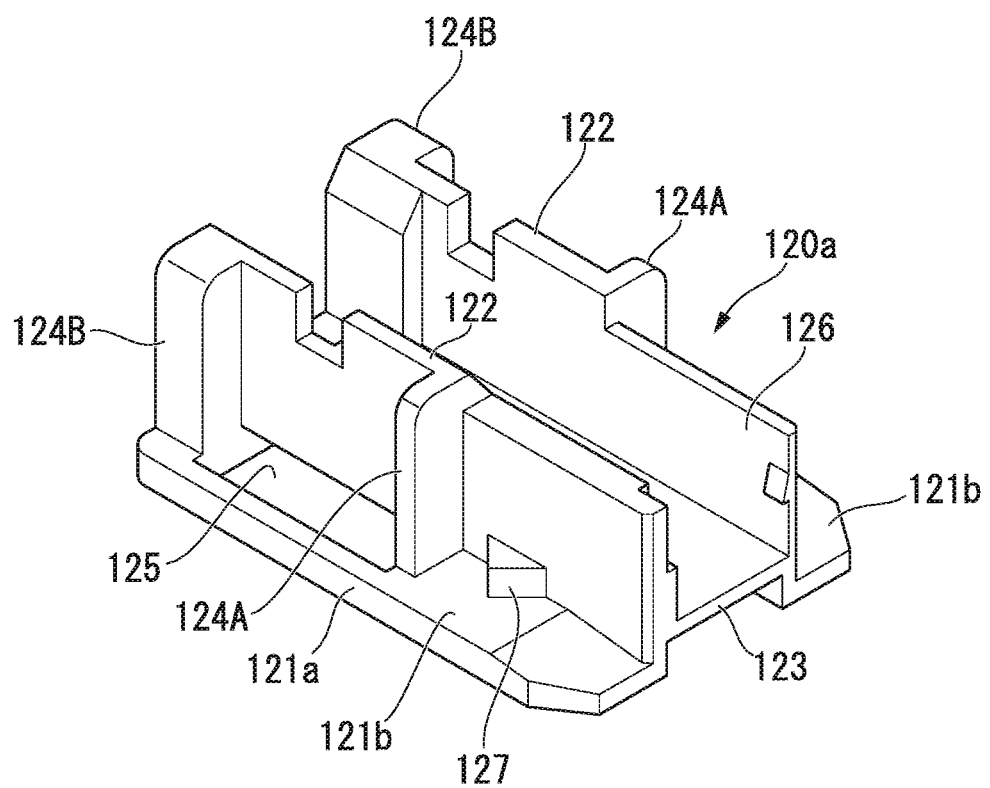
FIG. 55 is a perspective view showing a slider of the optical fiber splicing device of FIG. 35.

As shown in FIGS. 35 and 55, the slider 120a includes: a pair of substrate unit 121b; a pair of side wall portions 122 that is placed upright at the inner edge portions 121b thereof; and a bottom plate portion 123 formed between the side wall portions 122.

The slider 120a functions as a unit maintaining member that accommodates the optical fiber splicing unit 101 in a unit storage space 126 ensured between the side wall portions 122 and holds the optical fiber splicing unit 101.

Figure 36:
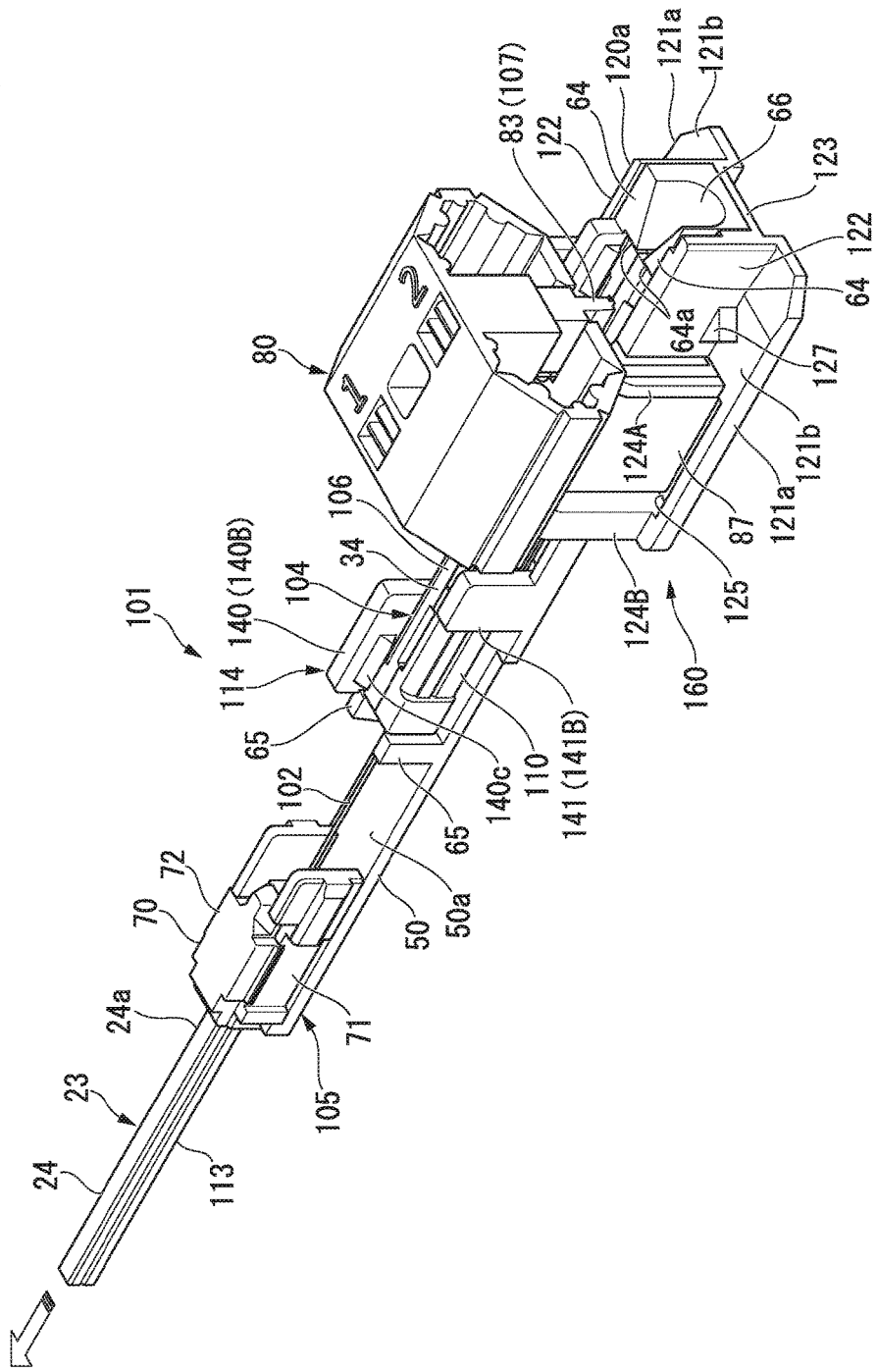
FIG. 36 is a perspective view showing the optical fiber splicing unit of FIG. 35.
Figure 37:
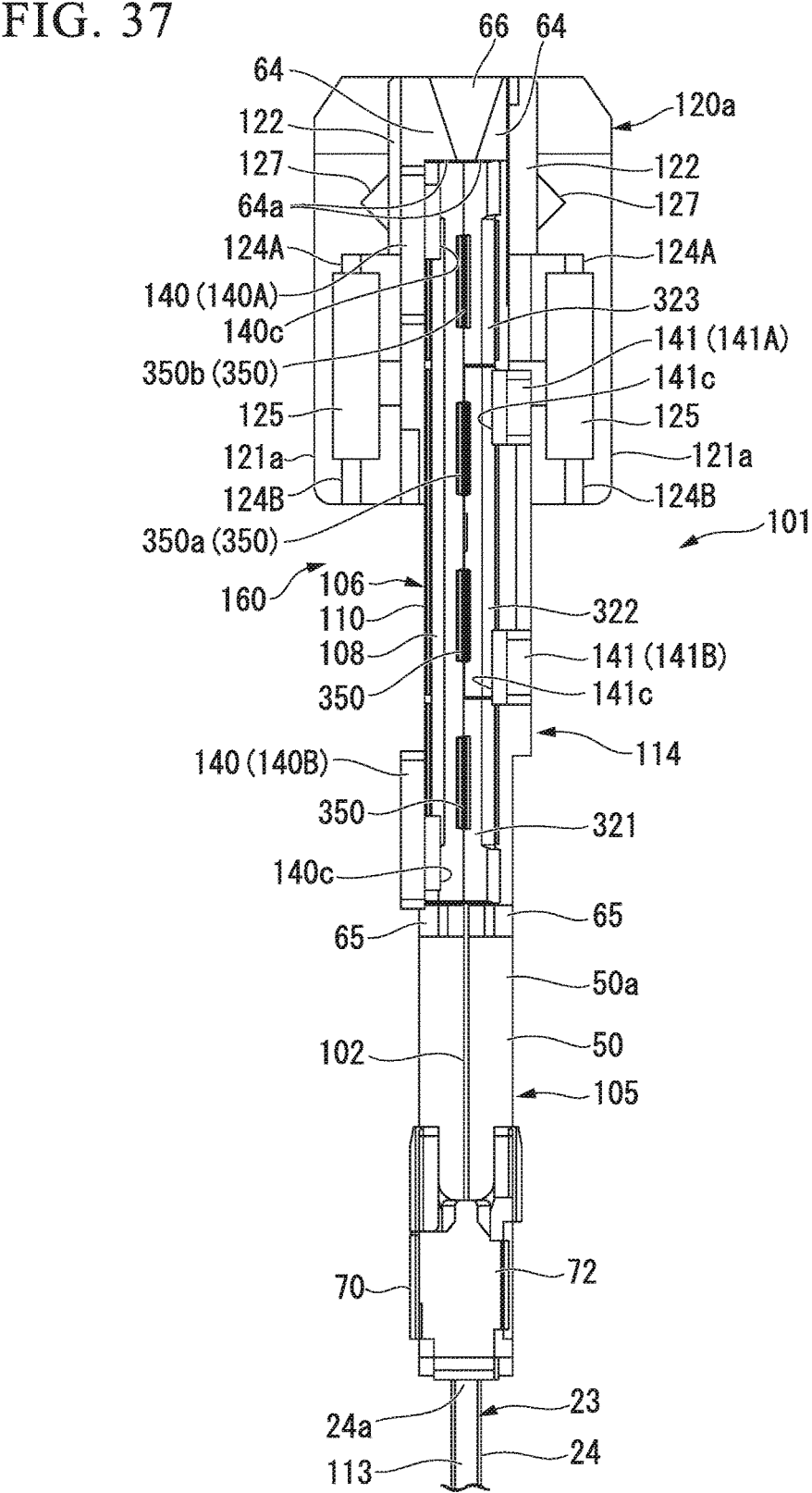
FIG. 37 is a plan view showing the optical fiber splicing unit of FIG. 35.

The slider 120a and the optical fiber splicing unit 101 held thereby constitute a movement unit 160 that can slide on the first rail portion 172 (refer to FIGS. 35 to 37).

A paired positioning protuberance portions 124A and 124B are formed on the outer face of the side wall portions 122 at a distance in the back and forth direction.

The engagement wall portion 87 of the splicing tool 80 is disposed between the positioning protuberance portions 124A and 124B, and the positioning protuberance portions 124A and 124B determine the position of the engagement wall portion 87 in the front-back direction thereof.

The locking protrusion 127 is provided on the outside surface of the side wall portion 122 and at the position in front of the positioning protuberance portion 124A so as to protrude outward therefrom, and the locking protrusion engages with an engagement recess 176c of the elastic locking end 176 of the base 170.

The shape of the locking protrusion 127 when seen in a plan view is preferably a tapered shape (for example, triangular shape, refer to FIG. 55) having the length in the back and forth direction where the length thereof increases in the direction from the protuberance edge to the base end side.

A long hole 125 into which the engagement wall portion 87 is to be inserted is formed on the substrate unit 121*b*.

As shown in FIG. 43, the splicing tool 80 causes a pair of engagement wall portions 87 to be inserted into the long holes 125, causes the protruding claws 87*a* of the protruding ends of the engagement wall portions 87 to engage with the bottom ends of the side wall portion 122, and is thereby attached to the optical fiber splicing unit 101 and the slider 120*a*.

As the splicing tool 80 is attached to the optical fiber splicing unit 101 and the slider 120*a*, the movement of the optical fiber splicing unit 101 in the front-back direction is restricted with respect to the slider 120*a*, and the optical fiber splicing unit is in a state of being positioned thereto.

Figure 56:
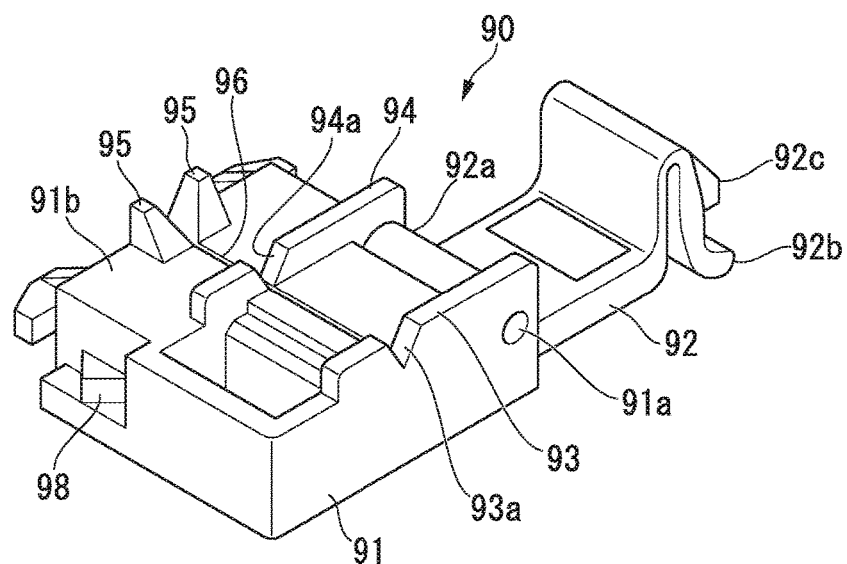
FIG. 56 is a perspective view showing a fiber holder used for the optical fiber splicing device of FIG. 35.
Figure 57:
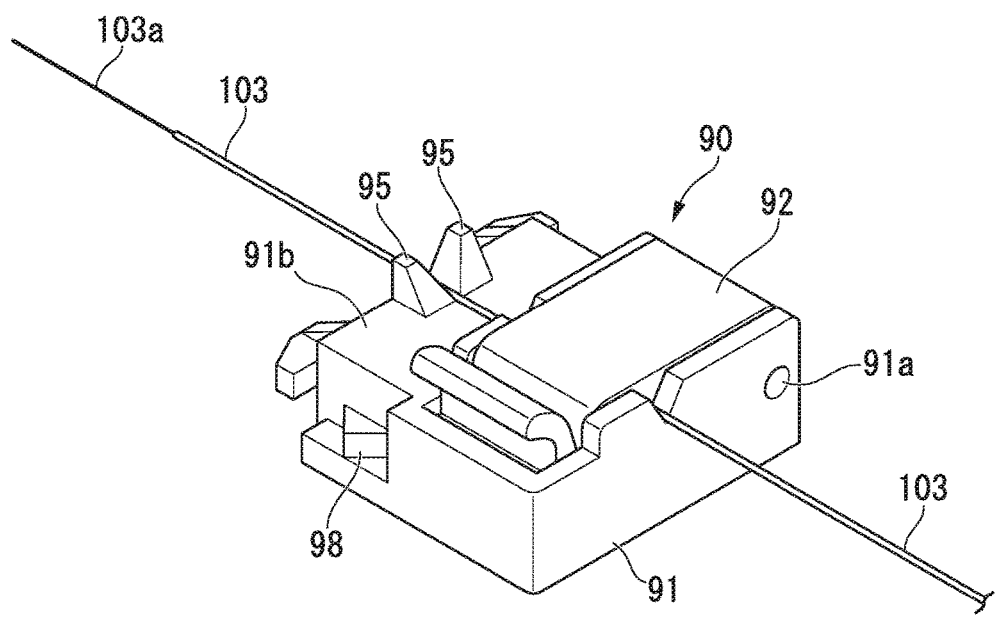
FIG. 57 is a perspective view illustrating operation of the fiber holder of FIG. 55.

As shown in FIGS. 56 and 57, the optical fiber holder 90 is a holder holding the optical fiber, has a base 91 and a lid 92 that is rotatably coupled to the base 91 via a hinge portion 91*a*, and can grasp and fix the inserted optical fiber 103 on the base 91 with the lid 92 by pushing it against the base.

A first holding wall portion 93 that has a positioning recess portion 93*a* in which the inserted optical fiber 103 is accommodated, a second holding wall portion 94 that has a positioning recess portion 94*a*, and a pair of positioning protuberances 95 are formed on the upper surface 91*b* of the base 91.

The second holding wall portion 94 is formed separately from the first holding wall portion 93 in front of the first holding wall portion 93, and the positioning protuberance 95 is formed separately from the second holding wall portion 94 in front of the second holding wall portion 94.

A linear positioning groove 96 that passes from the positioning recess portion 93*a* through the positioning recess portion 94*a* and passes between the pair of positioning protuberances 95 is formed on the upper surface of the base 91.

The positioning groove 96 is a groove portion used for positioning the inserted optical fiber 103 and may be formed in, for example, a substantially V-shape, a substantially U-shape, a semicircular shape, or the like in the cross-sectional face thereof.

The locking protrusion 98 is provided on the outside surface of the base 91 so as to protrude therefrom, and the locking protrusion engages with an engagement recess 146*c* of the elastic locking end 146 of the base 170 (refer to FIGS. 35 and 57).

The shape of the locking protrusion 98 when seen in a plan view is preferably a tapered shape (for example, triangular shape) having the length in the back and forth direction where the length thereof increases in the direction from the protuberance edge to the base end side.

As shown in FIG. 57, in a state where the upper surface 91*b* of the base 91 is covered with the lid 92 (closed state), the lid 92 is disposed between the holding wall portions 93 and 94.

A locking protuberance 92*c* is formed at a front-end portion 92*b* that is located at an end portion on the opposite side of the base end 92*a* at which the hinge portion 91*a* of the lid 92 is provided, and this locking protuberance is detachably fitted into and engaged with a locking recess portion (not shown in the figure) that is formed at the base 91.

In a state where the upper surface 91*b* of the base 91 is covered with the lid (closed state), as a result of engaging the locking protuberance 92*c* with the locking recess portion (not shown in the figure) of the base 91, the base 91 can grasp and fix the inserted optical fiber 103 by pushing it against the base 91.

As shown in FIG. 46, as the optical connector 22, a connector may be used including a structure that is provided with, for example, a connector body 22*a* and a fastening mechanism 22*b* that fastens the optical fiber cable 24 to the connector body 22*a*.

The connector body 22*a* is provided with a housing 22*d* that accommodates an optical ferrule 22*c* (hereinbelow, may be simply referred to as a ferrule) and a finger grip 22*e* that is attached to the outside of the housing 22*d*.

A splicing mechanism (not shown in the figure) is provided inside the housing 22*d*, and the splicing mechanism causes, for example, a built-in optical fiber of the ferrule 22*c* to splice the optical fiber that is drawn from the optical fiber cable 24 by butt-jointing connection or the like.

The fastening mechanism 22*f* is provided with a body unit (not shown in the figure), a cable grasping portion (not shown in the figure) that grasps the terminal of the optical fiber cable 24, and a fastening cover 22*g* that fastens the cable grasping portion.

As a structure of the connector body 22*a*, for example, SC-type optical connector (refer to JIS C 5973), LC-type optical connector (registered trademark, Lucent Technologies, Inc.), MU-type optical connector (refer to JIS C 5983), SC2-type optical connector (structure in which a finger grip is removed from SC-type optical connector), or the like may be adopted.

Next, an operation of splicing (optical splice) the extended optical fiber 102 to the inserted optical fiber 103 (method of splicing optical fiber) by use of the optical fiber splicing device 100 will be described.

As shown in FIGS. 56 and 57, the inserted optical fiber 103 is disposed inside the positioning groove 96 of the base 91, is pressed against the base 91 by the lid 92, and thereby grasped and fixed thereto.

The inserted optical fiber 103 having the protruding length that is ensured in the predetermined anterior direction is fixed to the fiber holder 90.

As shown in FIG. 35, in a state where the bare optical fiber 103*a* is exposed by removing the coating of the front end of the portion that protrudes forward from the fiber holder 90, the inserted optical fiber 103 is inserted into the splice 106 held by the splice holder portion 114 of the optical fiber splicing unit 101 and is used for a butt-jointing connection with respect to the extended optical fiber 102.

As a result of making the protruding length of the inserted optical fiber 103 from the fiber holder 90 slightly longer than the distance from this to the bare optical fiber 102*a* of the extended optical fiber 102 in the splice 106, a butting force between the bare optical fibers 103*a* and 102*a* which is due to elastic action of flexion formed at the inserted optical fiber 103 is ensured, and it is possible to butt-joint the bare optical fibers 103*a* and 102*a* to each other.

The fiber holder 90 is mounted on the slide surface 143 of the second rail portion 172 of the base 170, and the locking protrusion 98 is engaged with the engagement recess 146*c* of the elastic locking end 146.

Accordingly, the fiber holder 90 is sandwiched between the elastic locking ends 146 in a state of being stably held and positioned on the slide surface 143.

As shown in FIG. 35, the optical fiber splicing unit 101 and the slider 120*a* accommodating this are mounted on the slide surface 173 of the first rail portion 172 of the base 170.

The slider 120*a* causes both side edge portions 121*a* of the substrate unit 121*b* to come into contact with the guide wall portions 175 of both sides of the first rail portion 172 in the width direction, and the positions thereof in the width direction are determined.

the slider 120a on the first rail portion 172 moves toward the fiber holder 90.

In the movement of the optical fiber splicing unit 101 and the slider 120a, as both side edge portions 121a of the substrate unit 121b are inserted into the groove portions 177a formed on the inner surface of the side wall portions 177, upward movement of the slider 120a is restricted, and precise positioning with respect to the inserted optical fiber 103 is thereby realized.

Due to the forward movement of the optical fiber splicing unit 101, the inserted optical fiber 103 can be inserted into the coated-portion insertion grooves 108d and 323b of the splice 106 through the fiber introduction recess portion 66 that opens at the front end of the splice holder portion 114.

The bare optical fiber 103a, that is exposed at the front end of the inserted optical fiber 103, is inserted into the alignment groove 108b through the coated-portion insertion grooves 108d and 323b and can be brought into contact with the front end of the bare optical fiber 102a of the extended optical fiber 102.

Figure 58:
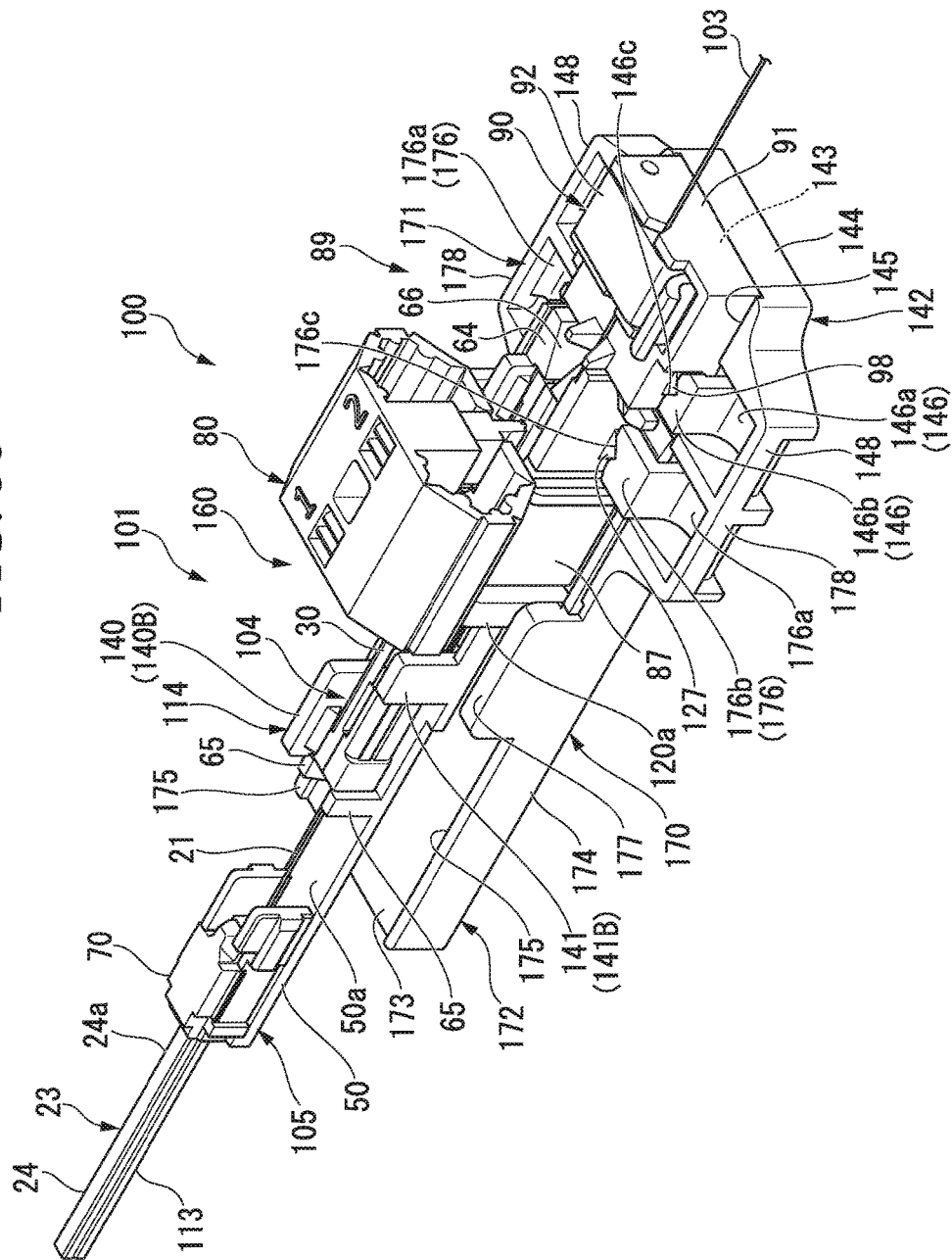
FIG. 58 is a perspective view illustrating operation of the optical fiber splicing device of FIG. 35.

As shown in FIG. 58, when the optical fiber splicing unit 101 and the slider 120a further move forward, the locking protrusion 127 is engaged with the engagement recess 176c of the elastic locking end 176.

Consequently, the fiber holder 90 is sandwiched between the elastic locking ends 146 in a state of being stably held and positioned on the slide surface 143.

The positions of the optical fiber splicing unit 101 and the slider 120a are referred to as the forward-movement limit positions.

When the optical fiber splicing unit 101 reaches the forward-movement limit position, the bare optical fiber 103a that is inserted into the alignment groove 108b of the splice 106 is brought into contact with the front end of the bare optical fiber 102a of the extended optical fiber 102, and the coated portion thereof is inserted into the coated-portion insertion grooves 108d and 323b.

Flexion occurs at the inserted optical fiber 103, due to elastic action thereof, the butting force generated between the bare optical fibers 103a and 102a is ensured, and the bare optical fibers 103a and 102a can be butt-jointed to each other.

Next, as shown in FIG. 43, a lateral pressure P is applied to the interposing member driving unit 82 of the splicing tool 80 from the right and left sides, and the interposing members 107A and 107B are thereby removed from the splice 106.

When the interposing members 107A and 107B are removed from the splice 106, due to elastic action of the clamp spring 110 (particularly, second clamp spring portion 332), the second clamp portion of the splice 106 grasps and fixes the bare optical fibers 103a and 102a between the base 31 and the middle lid member 322 in a state of being butt-jointed to each other.

Additionally, due to elastic action of the clamp spring 110 (particularly, third clamp spring portion 333), the third clamp portion grasps and fixes the coated portion of the inserted optical fiber 103 between the base 31 and the front lid member 323.

Consequently, the operation of butt-jointing connection (optical splice) between the extended optical fiber 102 and the inserted optical fiber 103 in the splice 106 is completed.

As a result of grasping and fixing the extended optical fiber 102 and the inserted optical fiber 103, in which the splicing operation is completed, to the halved grasping member 34 of the splice 106, a state where the bare optical fibers 103a and 102a are butt-jointed to each other is stably maintained.

As has been described, the splicing tool 80 deforms the interposing member driving unit 82 by the lateral pressure P applied thereto from the right and left thereof, causes the separation distance between the pressure-receiving wall portion 86 and the locking wall portion 85 of the interposing member driving unit 82 to increase, and can remove the interposing members 107A and 107B from the splice 106.

As shown in FIG. 43, each of the drive-part side wall portions 88 at right and left sides of the interposing member driving unit 82 of the splicing tool 80 connects the pressure-receiving wall portion 86 to the locking wall portion 85, the drive-part side wall portion is configured by three plate parts 88a, the three plate parts are arranged in the circumferential direction of the interposing member driving unit 82 with thin portions 88b interposed therebetween.

Furthermore, via the thin portions 88b, the drive-part side wall portions 88 and the pressure-receiving wall portion 86 are connected and the drive-part side wall portions 88 and the locking wall portion 85 are connected.

Particularly, each of the plate parts 88a including the locking wall portion 85, the pressure-receiving wall portion 86, and the drive-part side wall portion 88, is formed in an elongated plate shape that extends in the axis direction of the sleeve-shaped interposing member driving unit 82.

The lateral pressure P causing the interposing member driving unit 82 to be deformed affects at the portion at which the distance of overhanging at the right and left sides is maximum in both drive-part side wall portions 88 at the right and left sides where the central axis line Q of the interposing member driving unit 82 is interposed between the sides, i.e., at the center plate part 88a between the plate parts 88a at both sides of the three plate parts 88a in the circumferential direction of the interposing member driving unit 82 where the three plate parts constitute each drive-part side wall portion 88.

Hereinafter, the central plate 88a is also referred to as a pressing plate portion.

Additionally, the pressing plate portion is labeled by reference numeral 88c in the drawings.

The interposing member driving unit 82 applies the lateral pressure P from the right and left sides thereof to the right and left pressing plate portions 88c, reduces the separation distance between of the right and left pressing plate portions 88c, as a result, causes the thin portion 88b to be deformed and to serve as a hinge portion; therefore, the separation distance between the pressure-receiving wall portion 86 and the locking wall portion 85 increases.

Figure 45:
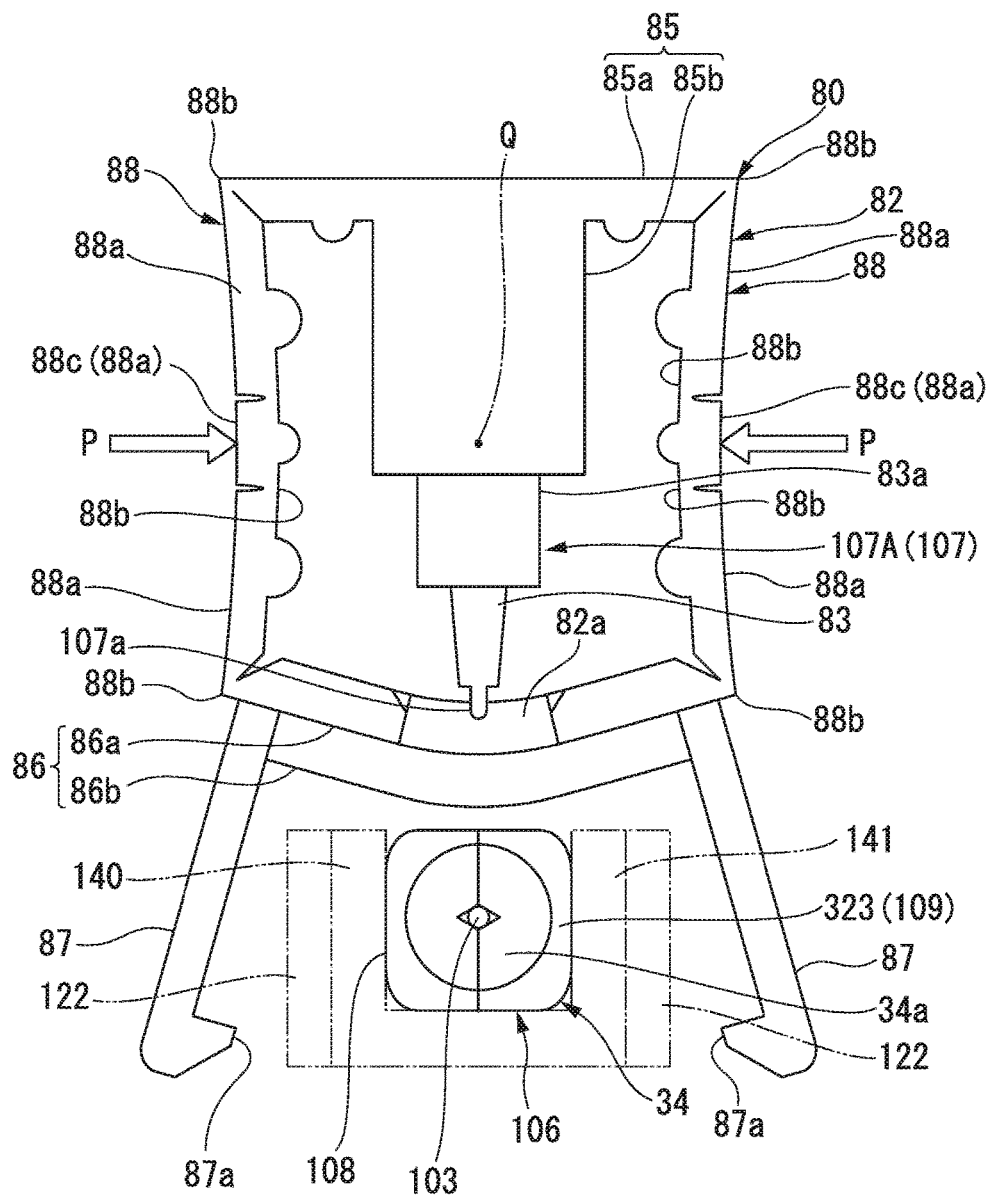
FIG. 45 is a view showing a state where front-ends of a pair of engagement wall portions of the splicing tool of the splice having the interposing member shown in FIG. 43 are opened.

Additionally, as shown in FIG. 45, even after the separation distance between the pressure-receiving wall portion 86 and the locking wall portion 85 becomes maximum as a result of affecting the lateral pressure P applied from the right and left sides, the interposing member driving unit 82 proceeds the deformation of the interposing member driving unit 82 which is due to the lateral pressure P; therefore, the right and left drive-part side wall portions 88 is deformed in a substantially bow shape that is the position coming closest to the central axis line Q of the pressing plate portion 88c.

Consequently, the interposing member driving unit 82 is deformed in a circular arc plate shape such that the center portion of the pressure-receiving wall portion 86 is located at the outside of the interposing member driving unit 82 and outer than both ends in the circumferential direction of the interposing member driving unit 82.

As a result, in the splicing tool 80, the relative directions of the paired engagement wall portions 87 varied so that the distance between the ends thereof (protuberance edges) increases in accordance with the deformation of the pressure-receiving wall portion 86, engagement with respect to the side wall portions 122 of the pair of engagement wall portions 87 is released.

When the engagement with respect to the side wall portions 122 of the pair of engagement wall portions 87 is released, the splicing tool 80 can be easily removed.

As shown in FIG. 44, in the splicing tool 80 shown as an example in the drawing, when the contact walls 83a of the interposing members 107A and 107B come into contact with the locking wall portion 85 (particularly, the protuberance edges of the protruding wall portions 85b), the separation distances c1 and c2 between the engagement claw 84a of the engagement end 84 of the interposing member 107 and the locking wall portion 85 of the interposing member driving unit 82 (particularly, a step-difference face 85e) are not the same as each other but are different from each other.

In the splicing tool 80 shown as an example in the drawing, the separation distance c1 of the first interposing member 107A that is inserted into the second clamp portion of the splice 106 is shorter than the separation distance c2 of the second interposing member 107B that is inserted into the third clamp portion.

Consequently, when the splicing tool 80 is deformed by the lateral pressure P applied from the right and left of the interposing member driving unit 82, after the first interposing member 107A is removed from the second clamp portion of the splice 106, removal of the second interposing member 107B from the third clamp portion is completed.

The splicing tool 80 realizes time-difference removal such that removal of the first interposing member 107A from the second clamp portion is carried out before removal of the second interposing member 107B from the third clamp portion.

After the splicing operation of the extended optical fiber 102 and the inserted optical fiber 103 is completed, the entire optical fiber splicing unit 101 in which the optical fibers are connected can be used in a state of being removed from the device base 89.

Specifically, after the optical fiber splicing unit 101 and the slider 120a is removed from the base 170, the optical fiber splicing unit 101 can be used in a state of being removed from the slider 120a.

The extended-optical-fiber-attached splice 104 can be connected to the other optical fiber through the connector by use of the optical connector 22.

Because of this, the inserted optical fiber 103 and another connector-attached optical fiber can be optically spliced to each other through the extended-optical-fiber-attached splice 104.

Figure 59:
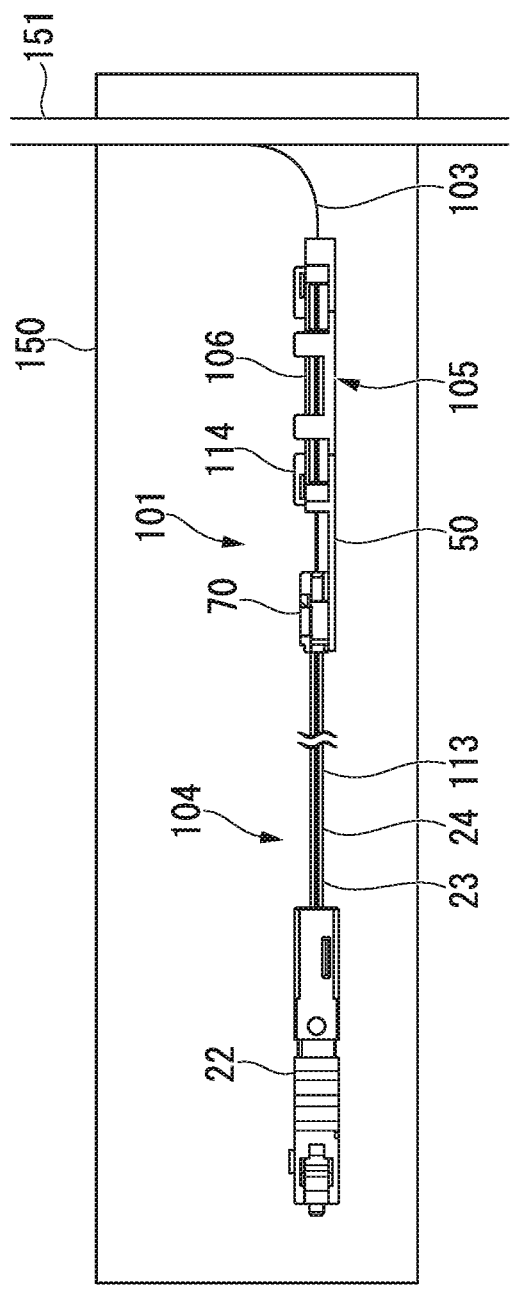
FIG. 59 is an explanatory diagram illustrating an example of how of the optical fiber splicing unit shown in FIG. 35 is used.

FIG. 59 is a diagram illustrating example of use of the optical fiber splicing unit 101 and the extended-optical-fiber-attached splice 104 therefor.

The inserted optical fiber 103 that is drawn from the optical fiber cable 151 is spliced to the extended-optical-fiber-attached splice 104 by use of the above-described splicing method.

The optical fiber cable 151 is, for example, an optical fiber cable or the like trunk that is installed in a vertical hole (for example, a hoistway used for an elevator) provided at each floor of a construction including a plurality of floors.

The optical fiber splicing unit 101 to which the inserted optical fiber 103 is spliced is stored in an optical fiber splicing box 150 (for example, referred to as an optical termination box or the like), if required, the optical connector 22 is spliced to the other optical fiber (not shown in the figure) through the connector, and therefore, it is possible to optically splice the inserted optical fiber 103 to another connector-attached optical fiber (not shown in the figure).

The other optical fiber (not shown in the figure) of the optical fiber splicing unit 101 which is to be spliced is not particularly limited, but may be indoor optical fibers, optical fibers that are provided in an optical composite electronic device, or the like.

In the optical fiber splicing unit 101, since the splice holder portion 114 and the outer coating grasping portion 70 are commonly provided on the substrate unit 50, the position of the terminal 24a of the optical fiber cable 24 relative to the splice 106 is always constant.

Consequently, during an operation of accommodating optical fibers to the optical fiber splicing box or the like, excessive force is not applied to the optical fiber 102 between the terminal 24a and the splice 106, and it is possible to prevent damage thereto.

Therefore, excellent operability is realized.

Moreover, the optical fiber splicing unit 101 has a simple structure and can be reduced in size, therefore, is accommodated in an optical joint box (optical termination box or the like) and can be used without modification.

In the optical fiber splicing unit 101, since both the splice holder portion 114 and the outer coating grasping portion 70 are provided on the upper surface side 50a of the substrate unit 50, the structure is simple and can be reduced in size.

In addition, since the splice holder portion 114, the outer coating grasping portion 70, and the optical fiber 102 are less easily affected by external force that is applied from the lower face side of the substrate unit 50, it is possible to increase the durability thereof.

The optical fiber splicing unit 101 can efficiently and simply realize splicing of the optical fibers to each other (the inserted optical fiber 103 is spliced to the extended optical fiber 102) by use of the mechanical splice.

Furthermore, the optical fiber splicing unit 101 realizes a structure simpler than that of the optical fiber splicing tool disclosed in Japanese Unexamined Patent Application, First Publication No. 2008-003218 as has been described and can easily be realized at a low cost.

Moreover, since the optical fiber splicing unit 101 can be easily reduced in size, it is advantageous to insertion into a little space, and it can be widely applied to a work operation of splicing the extended optical fiber 102 to the optical fiber (inserted optical fiber 103) or a work operation (optical fiber relay-splicing method) of splicing optical fibers through the extended-optical-fiber-attached splice 104.

Additionally, in a constitution in which the interposing member 107 of the splicing tool 80 as has been described is adopted as the interposing member of the interposing-member-attached splice, the sleeve-shaped interposing member driving unit 82 of the splicing tool 80 is deformed due to the lateral pressure P applied from both sides thereof, and removal of the interposing member 107 from the splice 106 can be realized; therefore, an operation of removing the interposing member from the splice 106 can be realized by only ensuring a slight space on the splicing tool 80.

Particularly, a slight space is ensured on the splicing tool 80 in the case of adopting the splicing tool 80 as compared with, for example, the case of adopting a constitution as an interposing member which is removed from the splice 106 by an operator directly pulling the interposing member with fingers in the direction in which this is separated from the splice 106.

This means that it is advantageous to use of the optical fiber splicing unit 101 which is inserted into a little space and is used for splicing the extended optical fiber 102 to the inserted optical fiber 103.

In other cases, as the interposing member of the interposing-member-attached splice, a constitution may be adopted which is removed from the splice 106 by an operator directly pulling the interposing member with fingers in the direction in which this is separated from the splice 106.

As the interposing member including this configuration, an interposing member may be adopted in which a removal grasping portion is provided on the portion protruding from the splice 106 at, for example, the base end side on the opposite side of the front-end side interposing-end portion interposed between the base member 108 of the splice 106 and the press lid 109; and the removal grasping portion is used for operation of pulling the interposing member in the direction in which this is separated from the splice 106 while an operator grasps this with fingers.

As the removal grasping portion, for example, a protuberance or the like may be adopted which protrudes in a direction perpendicular to the extending direction of the interposing-member main body and is provided at the base end of the interposing-member main body extending toward the base end side that protrudes from the front-end side interposing-end portion to the outside of the splice 106.

In the aforementioned splicing method, after the inserted optical fiber 103 is positioned with respect to the base 170, splicing of the optical fiber 102 and the inserted optical fiber 103 is carried out by causing the optical fiber splicing unit 101 to come close to the inserted optical fiber 103. In the invention, conversely, after the optical fiber 102 is positioned with respect to the base 170, splicing of the optical fiber 102 and the inserted optical fiber 103 can also be carried out by causing the fiber holder 90 to slide in the direction in which this approaches the optical fiber 102 on the second rail portion 172.

Particularly, a method may be adopted in which, after the optical fiber splicing unit 101 and the slider 120a move forward to the forward-movement limit position, the fiber holder 90 slides on the second rail portion 172 in the direction in which the fiber holder approaches the optical fiber splicing unit 101.

Fifth Embodiment

Hereinbelow, a fifth embodiment of the invention of the invention will be described with reference to drawings.

In the fifth embodiment, identical symbols are used for the elements which are identical to the above-described fourth embodiment, and the explanations thereof are omitted or simplified.

Figure 60:
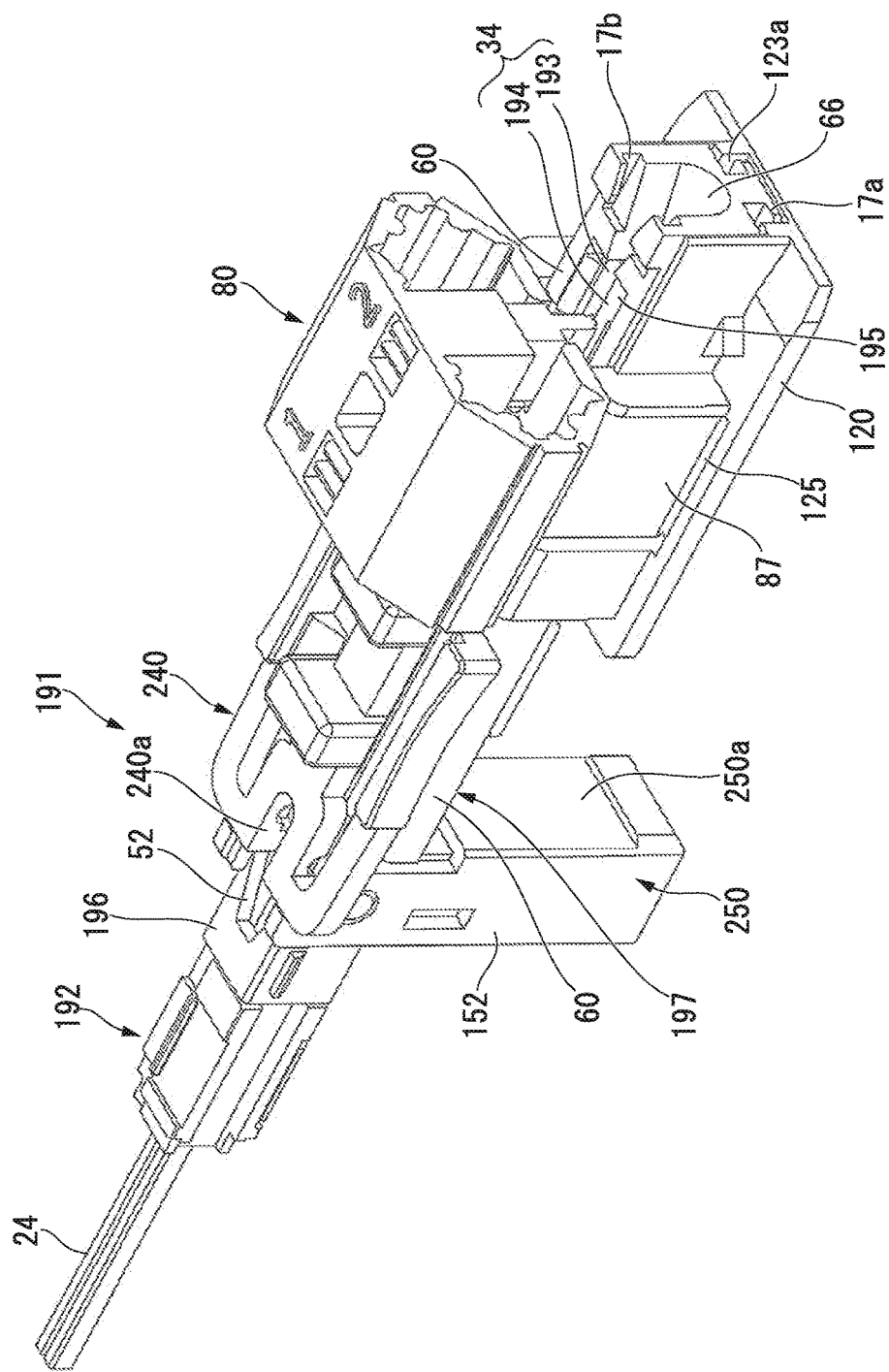
FIG. 60 is a perspective view showing an optical fiber splicing unit of a fifth embodiment of the invention.
Figure 61:
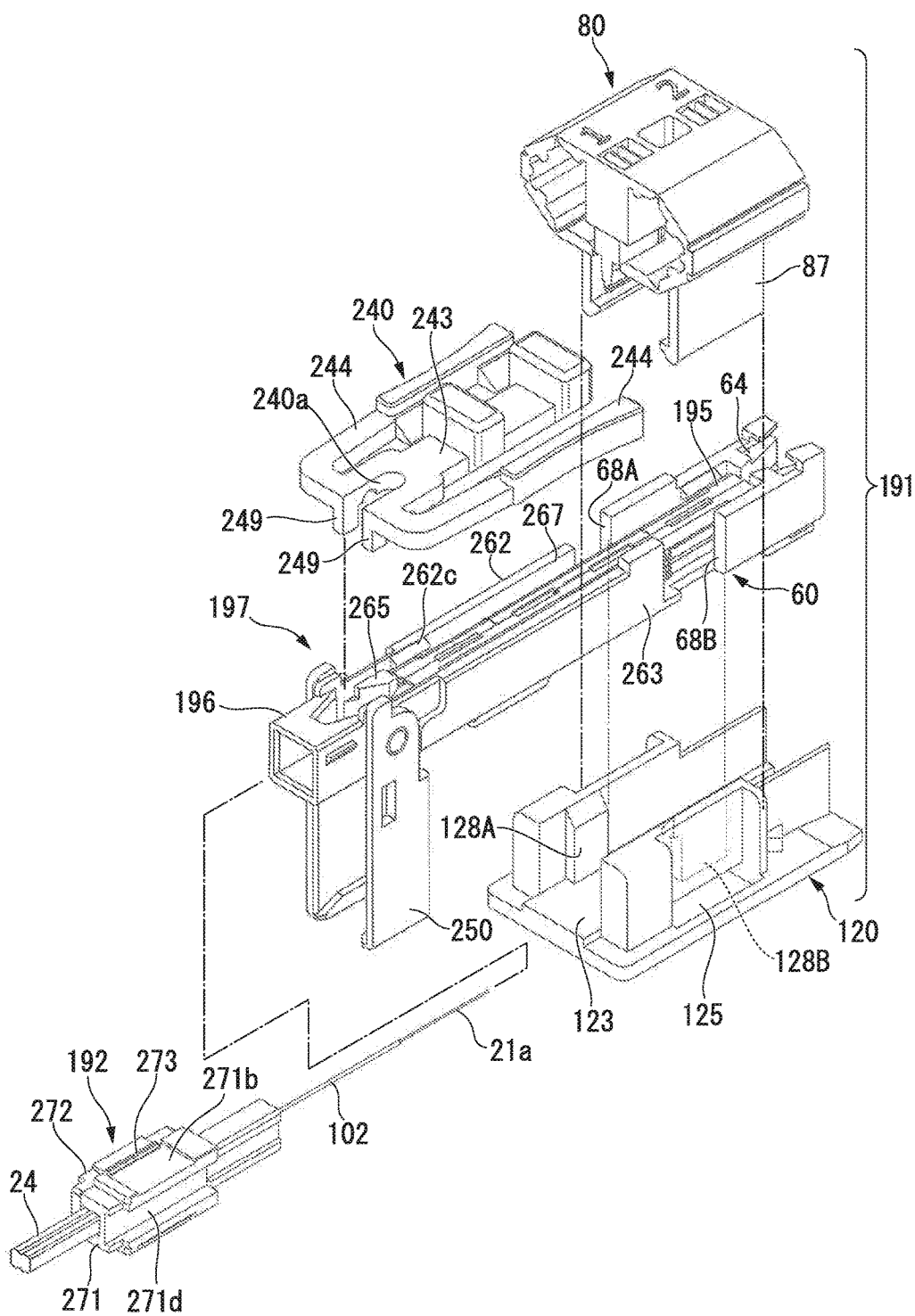
FIG. 61 is an exploded perspective view showing the optical fiber splicing unit of FIG. 60.

As shown in FIGS. 60 and 61, the optical fiber splicing unit 191 includes: a cable grasping member 192 that grasps the optical fiber cable 24; a mechanical splice 195 that causes the extended optical fiber 102 drawn from the terminal of the optical fiber cable 24 to be butt-jointed to the inserted optical fiber 103 serving as the other optical fiber (refer to FIG. 78) and to be interposed between halved elements 193 and 194, and thereby grasps and fixes them; a splice holder portion 60 that holds the mechanical splice 195; a grasping member holding portion 196 that holds the cable grasping member 192 at the position at which the front-end portion of the extended optical fiber 102 is inserted between the halved elements 193 and 194 through one end side of the mechanical splice 195 in the longitudinal direction thereof; and an unit base 197 that integrates the splice holder portion 60 and the grasping member holding portion 196.

Particularly, the optical fiber splicing unit 191 will be described, particularly, an upper side thereof is referred to as "above", and a lower side thereof is referred to as "below" in FIGS. 60 and 82.

Figure 76:
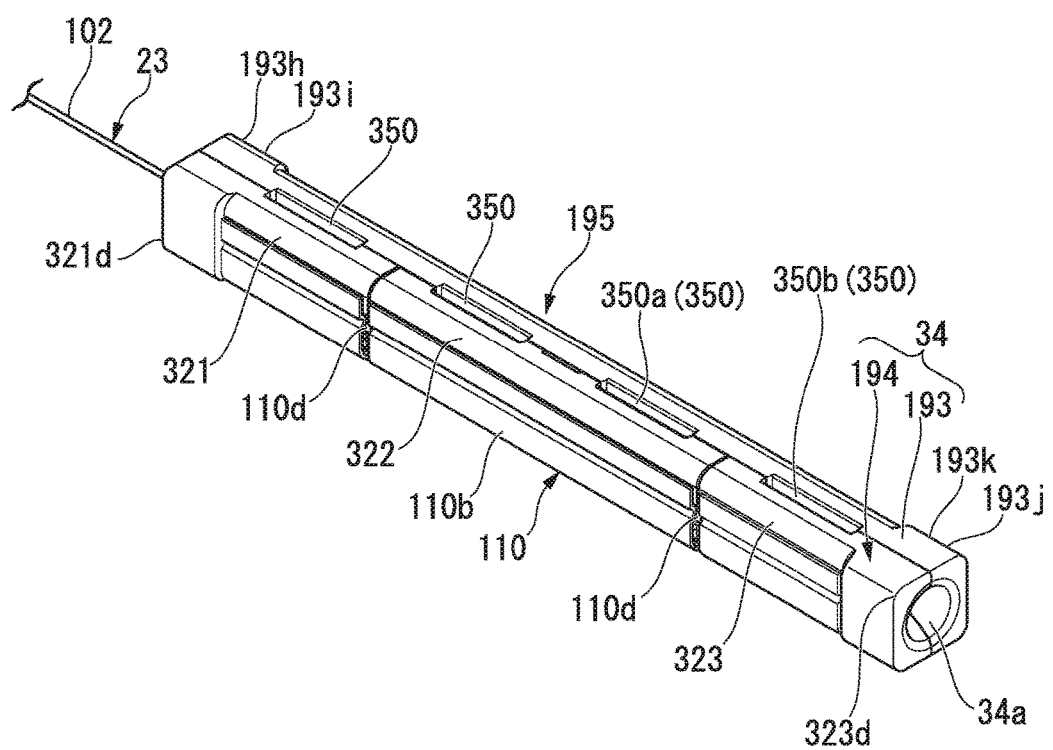
FIG. 76 is a perspective view showing an example of a mechanical splice.
Figure 77:
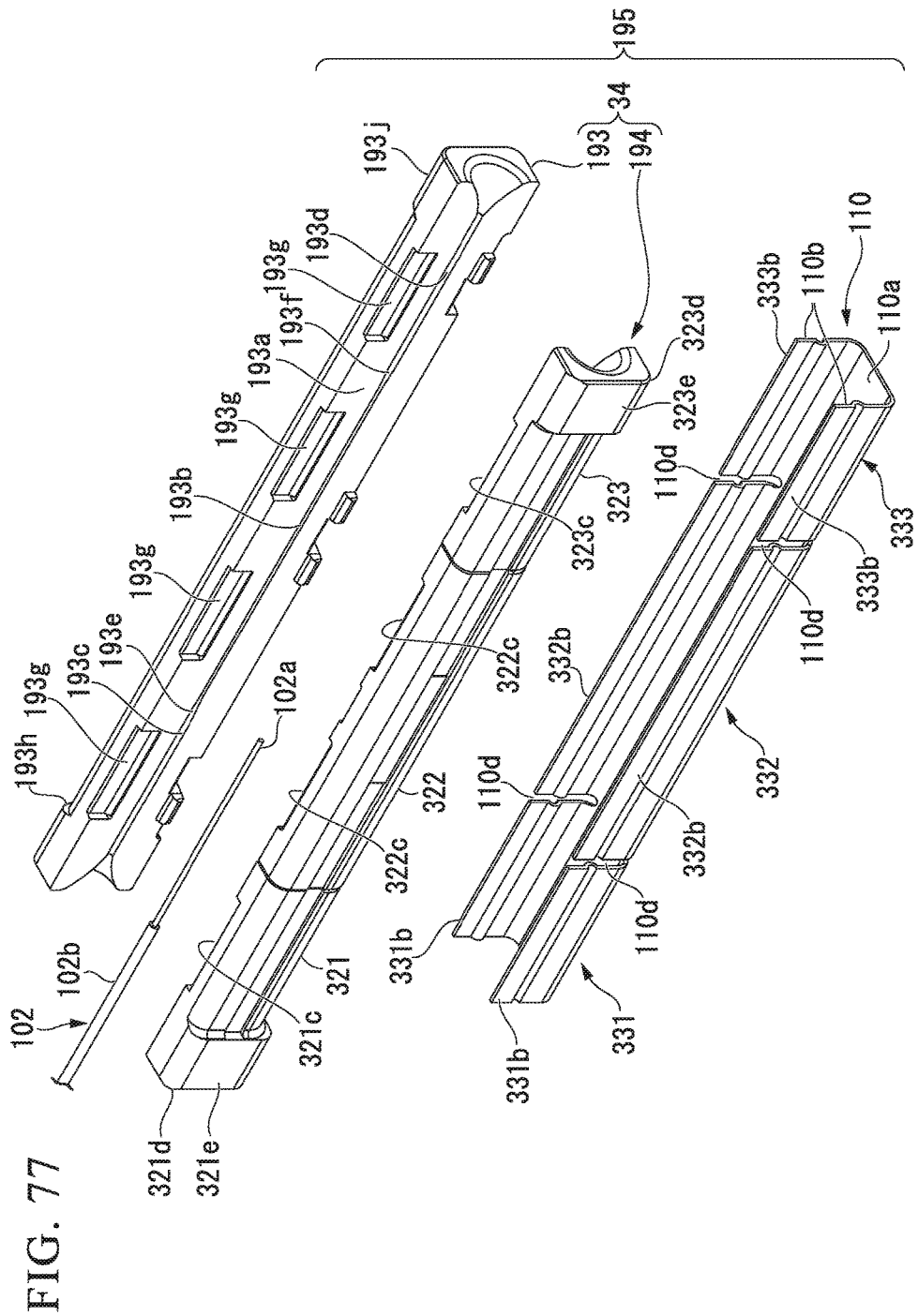
FIG. 77 is an exploded perspective view illustrating a structure of the mechanical splice shown in FIG. 76.
Figure 78:
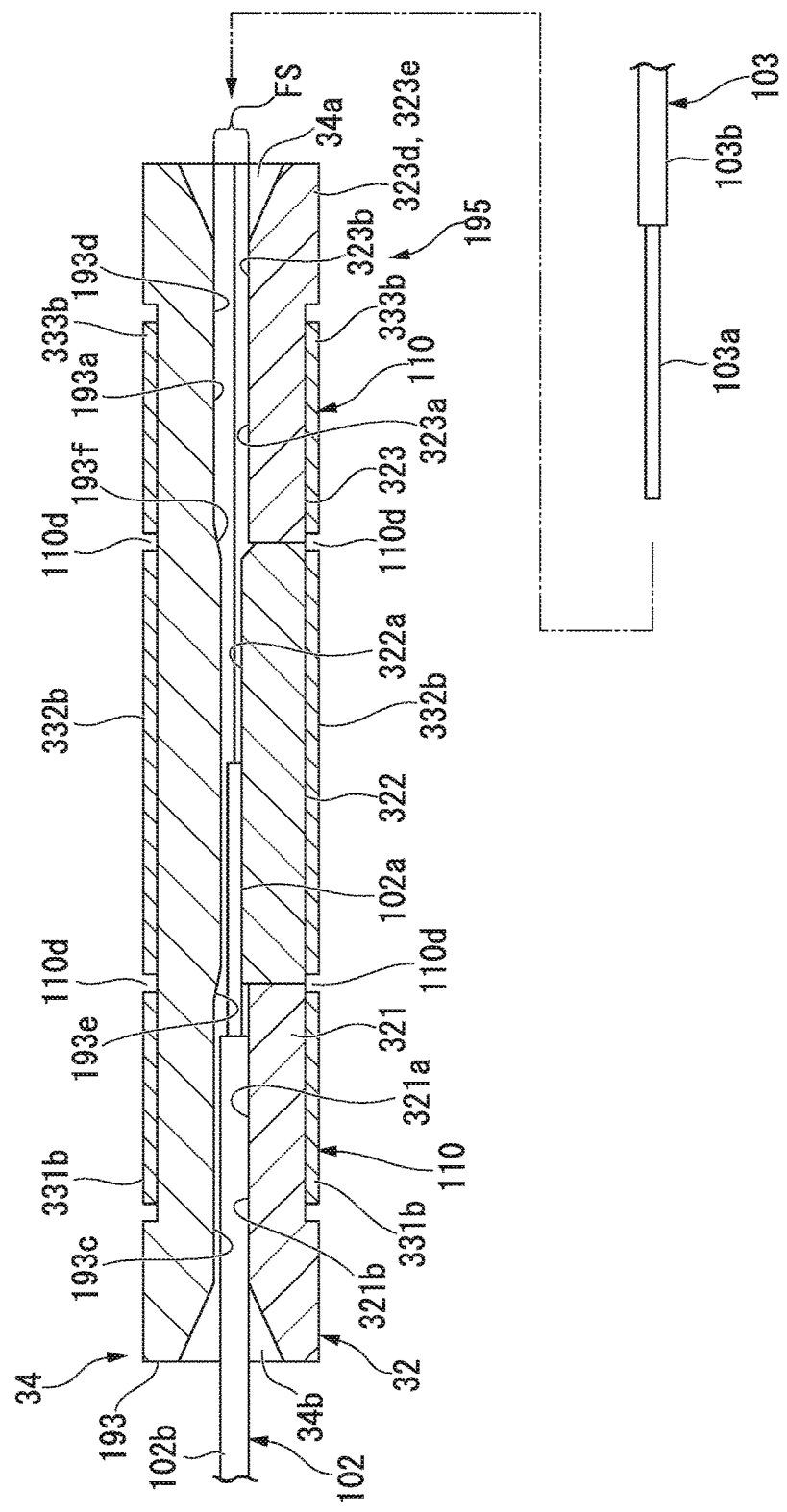
FIG. 78 is a cross-sectional view illustrating insert and grasping states of an optical fiber in the mechanical splice shown in FIG. 76.

As shown in FIGS. 76 to 78, the mechanical splice 195 is configured to include: an elongated-plate-shaped base member 193; a press lid 194 that is constituted of three lid members 321, 322, and 323 which are arrayed and placed along the longitudinal direction of the base member 193; and an extended clamp spring 110 that has an elongated configuration, is formed in a U-shape or a C-shaped in the cross-sectional face thereof (as an example in the drawing, U-shape), and integrally holds the base member and press lid which are positioned inside the clamp spring.

The mechanical splice 195 has a halved grasping member 34 that is configured to include: the base member 193 (base-side element) and the lid members 321, 322, and 323 (lid side element).

Due to an elastic action of the clamp spring 110, the base member 193 and the lid members 321, 322, and 323 elastically press each other in a direction in which they connect to each other and are closed.

Hereinafter, the mechanical splice is also referred to as a splice.

As shown in FIG. 78, an end of the extended optical fiber 102 is inserted through one end of the elongated halved grasping member 34 of the splice 195 in the longitudinal direction to the center portion thereof in the longitudinal direction.

Hereinbelow, in the extended optical fiber 102, the portion that is inserted between the base member 193 and the press lid 194 which constitute the halved grasping member 34 is referred to as a insertion end.

In the description, the splice 195 will be described, particularly, the side thereof (left side in FIG. 78) from which the extended optical fiber 102 extends is defined as "back", and the opposite side thereof (right side in FIG. 78) is defined as "front" in the longitudinal direction.

The extended optical fiber 102 extends from the back end of the halved grasping member 34 of the splice 195.

Hereinbelow, of three lid members (lid side element) 321, 322, and 323 configuring the press lid 194 of the splice 195, a lid member that is located at the backmost position and represented as reference numeral 321 may be referred to as a rear lid member, and a lid member that is located at the foremost position and represented as reference numeral 323 may be referred to as a front lid member.

Additionally, a lid member that is located between the rear lid member 321 and the front lid member 323 and represented as reference numeral 322 may be referred to as a middle lid member, hereinbelow.

As shown in FIGS. 76 to 78, the clamp spring 110 having U-shape in the cross-sectional face is formed of a single metal plate by shaping and is configured so that side plate parts 110b are provided at the entire longitudinal area of the elongated plate-shaped back plate part 110a in the longitudinal direction so as to perpendicularly protrude from both sides of the back plate part 110a.

In the splice 195, counterface surfaces 193a, 321a, 322a, and 323a, at which the base member 193 faces the three lid members 321, 322, and 323, are sandwiched between a pair of the side plate parts 110b in the direction substantially perpendicular to the direction in which a pair of the side plate parts 110b of the clamp spring 110 makes a space.

One of the side plate parts 110b comes into contact with the base member 193, and the other of the side plate parts 110b comes into contact with the press lid 194.

Regarding the insertion end of the extended optical fiber 102, the front-end thereof, that is, the part of the bare optical fiber 102a is located between the base member 193 of the splice 195 and the middle lid member 322, and the portion having the coating 102b is disposed between the base member 193 of the splice 195 and the rear lid member 321.

As a result of inserting the other optical fiber 103 between the base member 193 and the middle lid member 322 through the front side of the splice 195, the front end of the optical fiber 103 (hereinbelow, may be referred to as an inserted optical fiber) can be butt-jointed to the front end of the extended optical fiber 102 (the front end of the insertion end).

Additionally, due to elastic action of the clamp spring 110, it is possible to grasp and fix the extended optical fiber 102 and the inserted optical fiber 103 that was brought into contact with the optical fiber 102 between halved elements of the splice 195, that is, between the base member 193 (base-side element) and the press lid 194 (lid side element).

Figure 87:
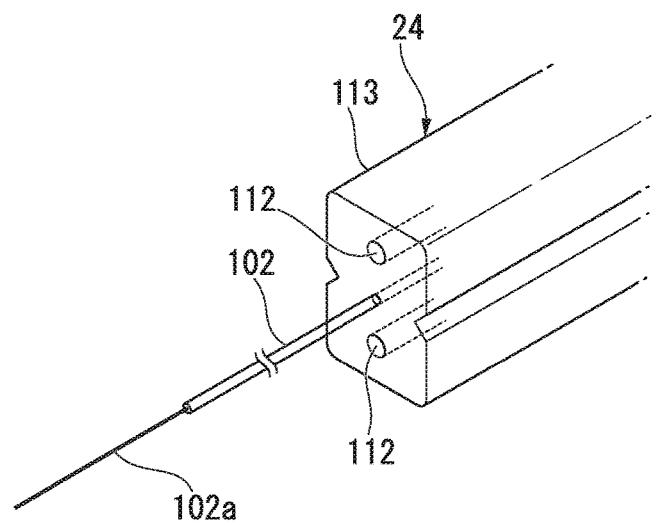
FIG. 87 is a perspective view showing an example of a structure of an optical fiber cable.

As shown in FIG. 87, the optical fiber cable 24 is used as an optical drop cable, a light indoor cable, or the like, and is an optical fiber cable that has a substantially rectangular cross section and has a structure in which, for example, the optical fiber 102 is integrally implanted in a resin-coating member 113 (hereinbelow, may be referred to as an outer coating) with a pair of linear tensile strength bodies 112 that extends parallel to the optical fiber 102 in the longitudinal direction thereof.

The optical fiber 102 is disposed at the center portion in the cross-sectional face of the optical fiber cable 24, and the pair of tensile strength bodies 112 is located at the positions that are separated from the optical fiber 102 toward both sides of the optical fiber cable 24 in the longitudinal direction of the cross-sectional face.

The optical fiber 102 is a coated optical fiber such as an optical core fiber, a bare optical fiber, or the like.

The extended optical fiber 102 and the inserted optical fiber 103 are a coating-attached optical fiber such as an optical core fiber, a bare optical fiber, or the like.

In an example of the drawing, as the extended optical fiber 102 and the inserted optical fiber 103, a single core optical fiber is adopted.

A bare optical fiber 102a is exposed at the front end of the insertion end of the extended optical fiber 102 (fore end).

As a result of butt-jointing a bare optical fiber 103a exposed at the front end of the inserted optical fiber 103 to the bare optical fiber 102a located at the front end of the insertion end of the extended optical fiber 102, butt-jointing connection between the extended optical fiber 102 and the inserted optical fiber 103 in the splice 195 is realized.

As shown in FIGS. 77 and 78, the counterface surface 193a facing the lid members 321, 322, and 323 is formed on the entire base member 193 of the splice 195 so as to extend in the longitudinal direction thereof.

An alignment groove 193b is formed at the center portion in the longitudinal direction (extending direction) of the counterface surface 193a of the base member 193; and the alignment groove allows the bare optical fiber 102a exposed at the front end of the extended optical fiber 102 and the bare optical fiber 103a exposed at the front end of the inserted optical fiber 103 to be butt-jointed to each other (optical splice) and to align the positions thereof with a high level of precision.

The alignment groove 193b is a V-groove formed along the longitudinal direction of the base member 193.

However, the alignment groove 193b is not limited to the V-groove; for example, a groove having a semicircular cross-sectional face, U-groove, or the like may be adopted thereto.

The alignment groove 193b is formed at the portion that faces the middle lid member 322 of the counterface surface 193a of the base member 193.

Coated-portion insertion grooves 193c and 193d, each of which has a groove width wider than the alignment groove 193b, are formed at the portion that faces the rear lid member 321 of the counterface surface 193a of the base member 193 and at the portion that faces the front lid member 323.

The coated-portion insertion grooves 193c and 193d are formed at both sides of the alignment groove 193b in the longitudinal direction of the base member 193 so as to extend along the longitudinal direction of the base member 193.

Tapered grooves 193e and 193f, which have a tapered shape and have a groove width that gradually becomes small in the direction from the coated-portion insertion grooves 193c and 193d to the alignment groove side 193b, are formed between the coated-portion insertion groove 193c and the alignment groove 193b and between the coated-portion insertion groove 193d and the alignment groove.

The coated-portion insertion grooves 193c and 193d are communicated with the alignment groove 193b through the tapered grooves 193e and 193f, respectively.

Figure 79:
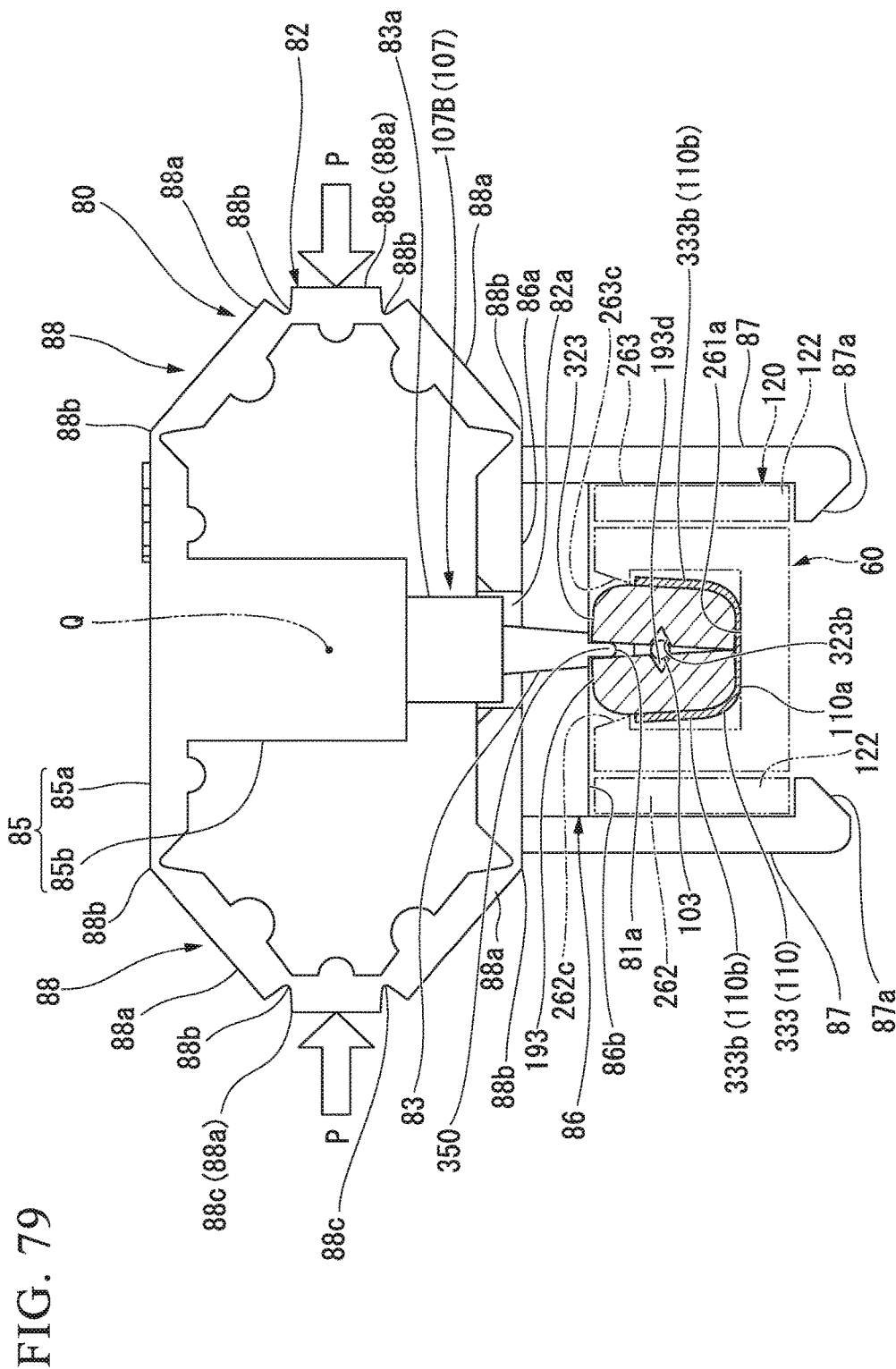
FIG. 79 is a cross-sectional view showing a state where a second interposing member is inserted between halved elements of the mechanical splice.

In the splice 195 shown as an example in the drawing, the coated-portion insertion grooves 193c and 193d are a V-groove (the coated-portion insertion groove 193d is referred by FIG. 79).

However, the coated-portion insertion grooves 193c and 193d are not limited to the V-groove; for example, a groove having a semicircular cross-sectional face, U-groove, or the like may be adopted thereto.

A coated portion, at which the outer-periphery of the bare optical fiber 102a is covered with a coating 102b, is inserted into the coated-portion insertion grooves 193c and 321b where the coated-portion insertion grooves are formed on the counterface surfaces 193a and 321a and where the rear lid member 321 and the base member 193 face each other at the counterface surfaces; the bare optical fiber 102a that protrudes from the terminal of the coated portion is inserted into the alignment groove 193b; and the insertion end of the extended optical fiber 102 is thereby provided between the base member 193 and the press lid 194.

Subsequently, at the insertion end of the extended optical fiber 102, the coated portion is grasped and fixed between the rear lid member 321 and the base member 193, due to elastic action of the clamp spring 110.

The coated-portion insertion groove 193c of the rear lid member 321 is formed at the position corresponding to the coated-portion insertion groove 193c of the base member 193 at the counterface surface 321a of the rear lid member 321.

Additionally, the depth of the coated-portion insertion groove 321b of the rear lid member 321 and the depth of the coated-portion insertion groove 193c of the base member 193 are adjusted so that the coated portion of the extended optical fiber 102 can be firmly grasped and fixed between the rear lid member 321 and the base member 193 in view of the external diameter of the coated portion of the extended optical fiber 102.

Particularly, the depth of the coated-portion insertion groove 321*b* of the rear lid member 321 and the depth of the coated-portion insertion groove 193*c* of the base member 193 are adjusted so that the total of the depth is lower than the outer diameter of the coated portion of the extended optical fiber 102.

As shown in FIGS. 77 and 78, a coated portion, which is the portion at which the outer-periphery of the bare optical fiber 103*a* of the inserted optical fiber 103 is covered with a coating 103*b*, is inserted into the coated-portion insertion groove 193*d* that is formed at the front side of the alignment groove 193*b*.

Moreover, in the splice 195 shown as an example in the drawing, the coated-portion insertion groove 323*b*, into which the coated portion of the inserted optical fiber 103 is inserted, is also formed at the position corresponding to the coated-portion insertion groove 193*d* of the base member 193 and at the counterface surface 323*a* of the front lid member 323.

The inserted optical fiber 103 is inserted into the coated-portion insertion grooves 193*d* and 323*b* through the front side of the splice 195 in a state where the bare optical fiber 103*a* is preliminarily exposed at the front end of the inserted optical fiber.

Figure 64:
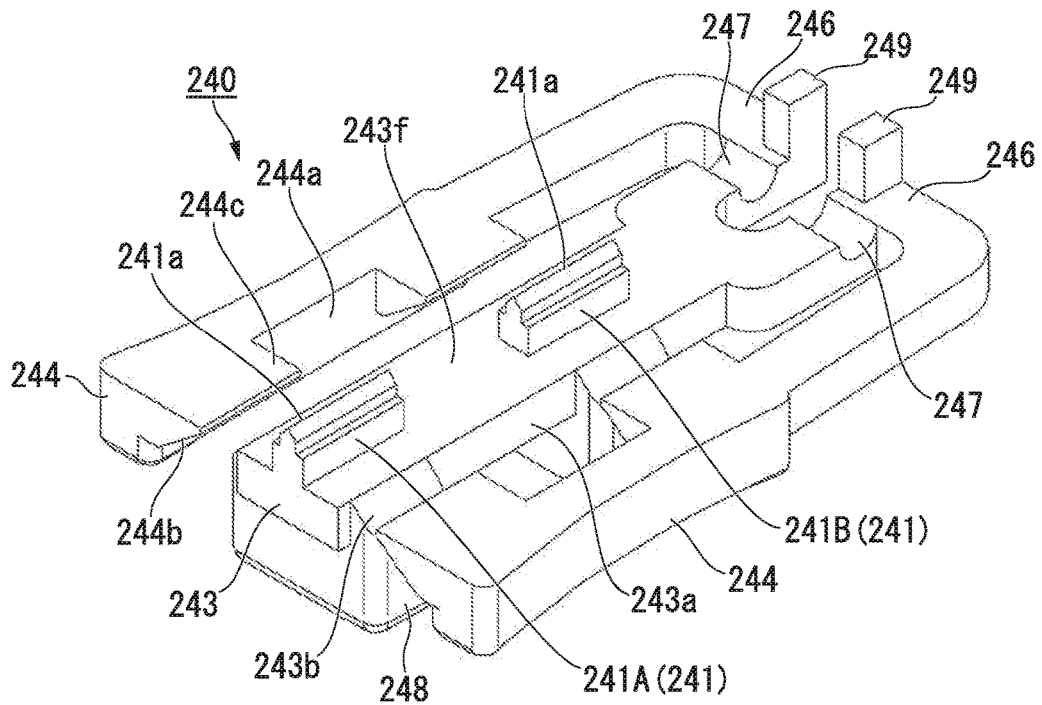
FIG. 64 is a perspective view showing an example of a first splicing tool.

As shown in FIG. 64, a first splicing tool 240 includes two interposing members 241.

One (represented as reference numeral 241A) of the two interposing members 241 is interposed between the back-end portion of the middle lid member 322 of the splice 195 and the base member 193, and the other thereof (represented as reference numeral 241B) is interposed between the rear lid member 321 and the base member 193.

Spaces between the middle lid member 322 of the splice 195 and the base member 193 and between the rear lid member 321 and the base member 193 are opened against an elastic action of the clamp spring 110 by interposing members 241A and 241B.

In particular, hereinbelow, the interposing member 241A that is interposed between the back-end portion of the middle lid member 322 of the splice 195 and the base member 193 may be referred to as a first interposing member 241A, and the interposing member 241B that is interposed between the rear lid member 321 and the base member 193 may be referred to as a second interposing member 241B.

The first splicing tool 240 will be particularly described later.

Figure 80:
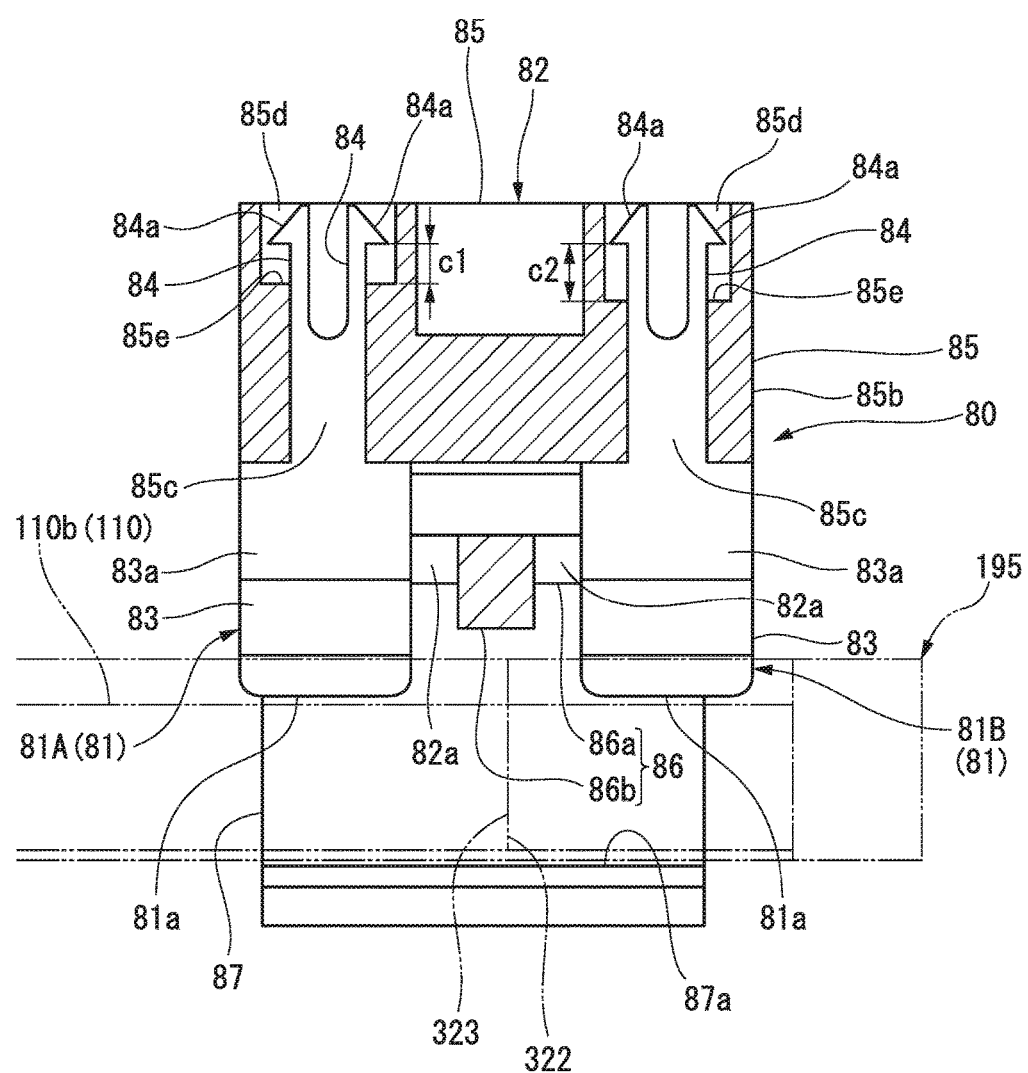
FIG. 80 is a cross-sectional view showing a state where the second interposing member is attached to a second splicing tool.

As shown in FIG. 80, a second splicing tool 80 has two interposing members 107.

One of the two interposing members 107 (represented as reference numeral 107A in drawing) is interposed between the forward-end portion of the middle lid member 322 of the splice 195 and the base member 193, and the other thereof (represented as reference numeral 107B in drawing) is interposed between the front lid member 323 and the base member 193.

Spaces between the front lid member 323 of the splice 195 and the base member 193 and between the middle lid member 322 and the base member 193 are opened against an elastic action of the clamp spring 110 by interposing members 107A and 107B.

In particular, hereinbelow, the interposing member 107A that is interposed between the forward-end portion of the middle lid member 322 of the splice 195 and the base member 193 may be referred to as a first interposing member 107A, and the interposing member 107B that is interposed between the front lid member 323 and the base member 193 may be referred to as a second interposing member 107B.

The second splicing tool 80 will be particularly described later.

As shown in FIG. 78, the front lid member 323 is separated (opened) from the base member 193 to such an extent that the coated portion of the inserted optical fiber 103 can be easily inserted into the coated-portion insertion grooves 193*d* and 323*b* through the front side of the splice 195.

The forward-end portion of the middle lid member 322 is separated (opened) from the base member 193 to such that the bare optical fiber 103*a* that is exposed at the front end of the inserted optical fiber 103 can be easily inserted into the alignment groove 193*b*.

In FIG. 78, a container space of the optical fiber 103, that is constituted of the coated-portion insertion grooves 193*d* and 323*b*, is labeled by reference letter FS.

The interposing member 107 of the second splicing tool 80 shown as an example in the drawing causes a plate-shaped front-end portion 107*a* to interpose between the base member 193 of the splice 195 and the press lid 194.

The degrees of opening between the front lid member 323 and the base member 193 and between the forward-end portion of the middle lid member 322 and the base member 193 are determined depending on the thickness of a plate-shaped front-end portion 107*a* of the interposing member 107.

A distance between the forward-end portion of the middle lid member 322 and the base member 193 which are opened by the first interposing member 107A is set to be in the range that the bare optical fibers 102*a* and 103*a* are not out from between the alignment groove 193*b* and the counterface surface 322*a* of the middle lid member 322.

A distance between the front lid member 323 and the base member 193 which are opened by the second interposing member 107B is set to be in the range that the inserted optical fiber 103 (the coated portion thereof) is not out from between the coated-portion insertion grooves 193*d* and 323*b*.

In other cases, regarding the interposing member, the front-end portion (interposing-end portion) that is to be inserted between the base member 193 of the splice 195 and the press lid 194 is not limited to a plate shape.

As the interposing-end portion of the interposing member, for example, a sheet, a rod, or the like may be adopted.

An interposing-member main body 83 of the interposing member 107 shown in FIG. 79 as an example has a plate-shaped front-end portion 107*a* serving as an interposing-end portion.

Hereinafter, the plate-shaped front-end portion 107*a* of the interposing-member main body 83 may be referred to as an interposing-end portion.

the portion other than the interposing-end portion 107*a* of the interposing-member main body 83 is formed in a plate shape that has a plate thickness (thickness) greater than that of the interposing-end portion 107*a*.

Moreover, the front end of the plate-shaped interposing-end portion 107*a* of the interposing member 107 is formed in a tapered shape.

After the interposing member 107 is detached from the halved grasping member 34 of the splice 195, the interposing-end portion 107*a* thereof can be interposed between the base member 193 and the press lid 194 by pushing (an interposing-member-attached splice is assembled).

In addition, the optical fiber splicing unit 191 may be supplied to a workplace in a state where the interposing member is removed from the splice 195; and the interposing-member-attached splice may be assembled at the workplace by interposing the interposing-end portions of the interposing members between the middle lid member 322 of the splice 195 and the base member 193 and between the front lid member 323 and the base member 193.

The depths of the coated-portion insertion groove 323b of the front lid member 323 and the coated-portion insertion groove 193d of the base member 193 are adjusted in view of the outer diameter of the coated portion of the inserted optical fiber 103 so that the coated portion of the inserted optical fiber 103 can be grasped and fixed between the front lid member 323 and the base member 193 when the interposing member 107B is removed from between the front lid member 323 and the base member 193.

Particularly, the depths of the coated-portion insertion groove 323b of the front lid member 323 and the coated-portion insertion groove 193d of the base member 193 are adjusted so that the total of the depths is less than the outer diameter of the coated portion of the inserted optical fiber 103.

In the splice 195 shown as an example in the drawing, the coated-portion insertion grooves 321b and 323b of the rear lid member 321 and the front lid member 323 is a V-groove (the coated-portion insertion groove 323b of the front lid member 323 is shown in FIG. 79).

However, the coated-portion insertion grooves 321b and 323b are not limited to the V-groove; for example, a groove having a semicircular cross-sectional face, U-groove, or the like may be adopted thereto.

Additionally, it is not necessary to form the coated-portion insertion groove at both portions of the rear lid member 321 and the base member 193 which face each other.

As a splice, a constitution may be adopted in which the coated-portion insertion groove is formed at one of the portions at which the rear lid member 321 and the base member 193 face each other.

This is similarly adopted to the portions at which the front lid member 323 and the base member 193 face each other; as a splice, a constitution may be adopted in which the coated-portion insertion groove is formed at one of the portions at which the front lid member 323 and the base member 193 face each other.

As shown in FIG. 76, in the halved grasping member 34 of the splice 195, interposing member insertion holes 350, into which the interposing member 107 to be inserted, open at the side face (hereinbelow, may be referred to as an exposed side) which is exposed to a side opposite to the back plate part 110a of the clamp spring 110.

As shown in FIG. 77, the interposing member insertion holes 350 are ensured between the base member 193 and the lid members 321, 322, and 323 with interposing member insertion grooves 193g, 321c, 322c, and 323c. The interposing member insertion grooves 193g, 321c, 322c, and 323c are formed at the positions corresponding to the counterface surfaces 193a and 321a, 322a, and 323a of the base member and the three lid members.

Particularly, the interposing member insertion holes 350 are formed so as to have depths that do not reach the alignment groove 193b and the coated-portion insertion grooves 193c, 193d, 321b, and 323b at the exposed side of the halved grasping member 34.

Furthermore, as the interposing member insertion holes 350, a structure may be adopted which is ensured by interposing member insertion grooves only formed at one side of the base member 193 and the lid members 321, 322, and 323.

As shown in FIG. 76, in the splice 195 shown as an example in the drawing, the interposing member insertion holes 350 are formed at four positions; two positions thereof are places corresponding to the back-end portion and the forward-end portion of the middle lid member 322, and the other portions thereof are places corresponding to the center portions of the rear lid member 321 and the front lid member 323 in the front-back direction along the longitudinal direction of the base member 193.

Of four portions of the interposing member insertion holes 350, the interposing members 107A and 107B are inserted into the interposing member insertion hole 350 (represented as reference numeral 350a in FIG. 76) which is formed at the position corresponding to the forward-end portion of the middle lid member 322 and into the interposing member insertion hole 350 (represented as reference numeral 350b in FIG. 76) which is formed at the position corresponding to the center portion of the front lid member 323 in the front-back direction thereof, respectively.

As shown in FIG. 78, a flat counterface surface 322a is formed on the portion of the middle lid member 322 facing the alignment groove 193b of the base member 193.

When the first interposing member 107A interposed between the middle lid member 322 and the base member 193 is removed, due to elastic action of the clamp spring 110, at the counterface surface 322a, the middle lid member 322 presses the bare optical fiber 102a of the front end of the extended optical fiber 102 onto the bare optical fiber 103a of the inserted optical fiber 103 that is brought into contact with the front end of the bare optical fiber 102a, and can push them against the alignment groove 193b.

As shown in FIGS. 77 and 78, the paired side plate parts 110b of the clamp spring 110 are separated into three parts corresponding to the three lid members 321, 322, and 323 of the press lid 194 of the splice 195.

A side plate part 110b (the side plate part 110b is located at an upper side in FIGS. 77 and 78) that is to be in contact with the press lid 194 is separated into three parts corresponding to the three lid members 321, 322, and 323 by slit-shaped cut portions 110d where the cut portions are formed at portions corresponding to a boundary between the rear lid member 321 and the middle lid member 322 and a boundary between the middle lid member 322 and the front lid member 323.

The side plate part 110b that is to be in contact with the base member 193 is separated into three parts corresponding to the three lid members 321, 322, and 323 by the cut portions 110d where the cut portions are formed at positions corresponding to the cut portions 110d of the side plate part 110b that is to be in contact with the lid members 321, 322, and 323.

The clamp spring 110 is configured to include: a first clamp spring portion 331 holding the rear lid member 321 and the base member 193; a second clamp spring portion 332 holding the middle lid member 322 and the base member 193; and a third clamp spring portion 333 holding the front lid member 323 and the base member 193.

Each of the first to third clamp spring portions 331 to 333 functions as an independent clamp spring.

In particular, in FIGS. 77, 78, or the like, a pair of side plate parts of the first clamp spring portion 331 is represented as reference numeral 331b, a pair of side plate parts of the second clamp spring portion 332 is represented as reference numeral 332b, and a pair of side plate parts of the third clamp spring portion 333 is represented as reference numeral 333b.

The splice 195 includes three clamp portions corresponding to the three clamp spring portions.

That is, the splice 195 has a first clamp portion that holds the rear lid member 321 and the base member 193 inside the first clamp spring portion 331; a second clamp portion that holds the middle lid member 322 and the base member 193 inside the second clamp spring portion 332; and a third clamp portion that holds the front lid member 323 and the base member 193 which are lateral to the third clamp spring portion 333.

Due to each elastic action of the clamp spring portion corresponding to the clamp portion, the three clamp portions can grasp and fix an optical fiber between the halved elements (between the base member 193 (base-side element) and the lid member (lid side element)).

The first clamp portion of the splice 195 can grasp and fix the coated portion of the extended optical fiber 102 between the rear lid member 321 and the base member 193 due to elastic action of the first clamp spring portion 331.

In the splice 195, for example, even where the middle lid member 322 opens or closes (i.e., opening and closing of the second clamp portion) as a result of inserting the interposing member between the middle lid member 322 and the base member 193 or of removing the interposing member therebetween, a state where the extended optical fiber 102 is grasped and fixed by the first clamp portion is stably maintained.

Furthermore, opening or closing of the third clamp portion, which is due to inserting or removing of the interposing member, does not affect a state where the extended optical fiber 102 of the first clamp portion is grasped and fixed at all.

The splice 195 has the splicing tools 240 and 80 that are attached thereto and interpose the halved elements 193 and 194 by interposing the interposing members 241 and 107 therebetween.

The first splicing tool 240 has the first interposing member 241 that interposes between the halved elements 193 and 194 between which the extended optical fiber 102 can be inserted at one end side of the splice 195 in the longitudinal direction thereof.

The second splicing tool 80 has the second interposing member 107 that interposes between the halved elements 193 and 194 between which the inserted optical fiber 103 can be inserted at another end side of the splice 195 in the longitudinal direction thereof.

Figure 72:
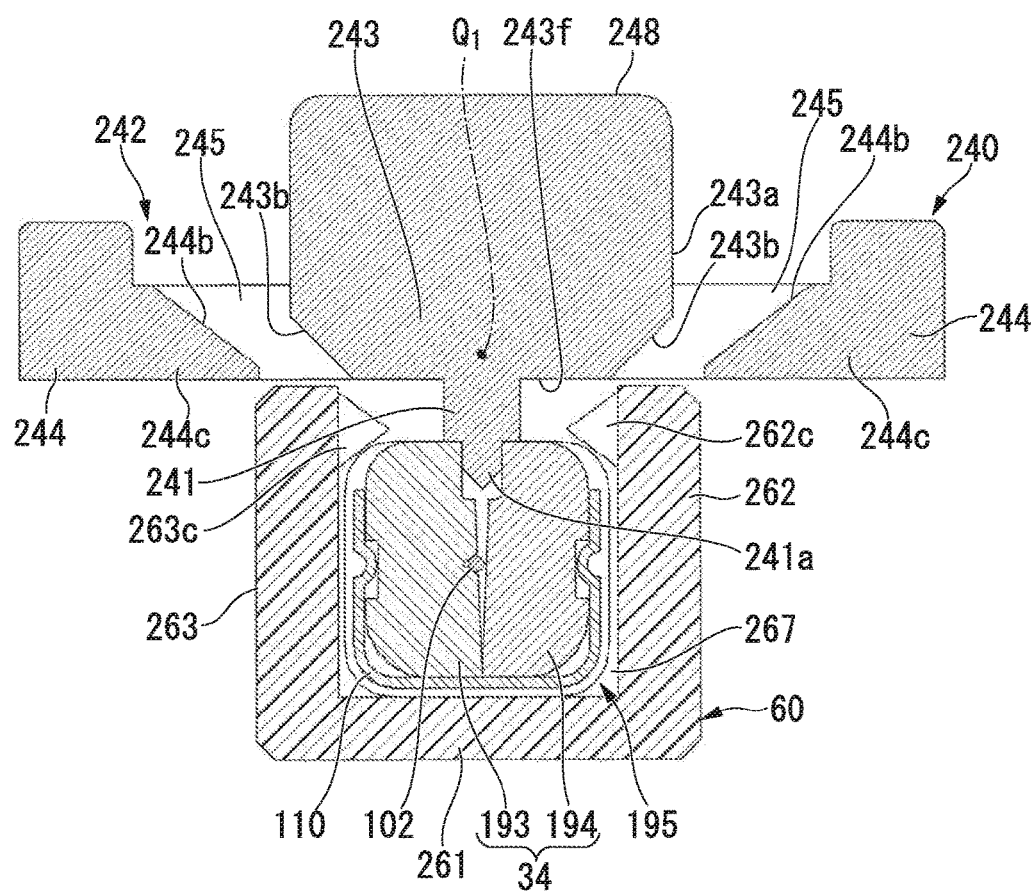
FIG. 72 is a cross-sectional view showing a state where a first interposing member is inserted between halved elements of the mechanical splice.
Figure 73:
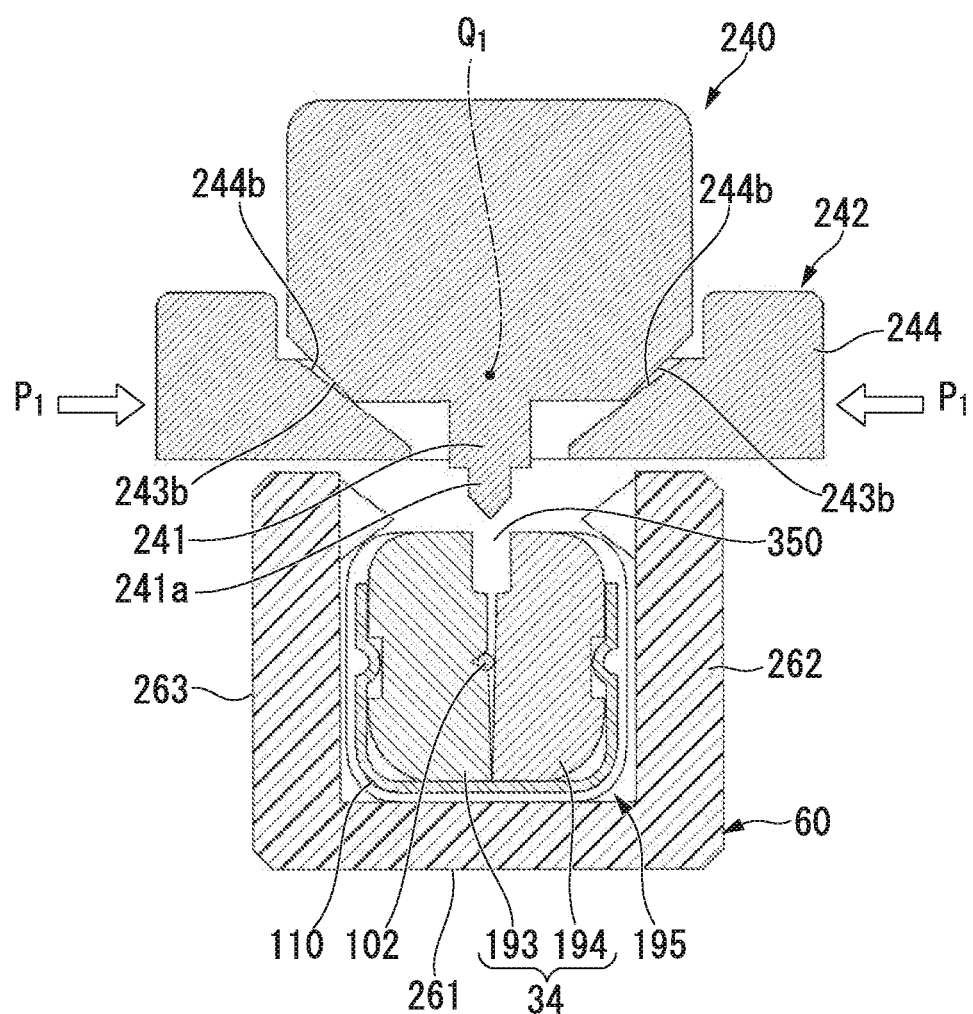
FIG. 73 is a cross-sectional view showing a state where the first interposing member is removed from the halved elements of the mechanical splice.

As shown in FIGS. 64, 72, and 73, the first splicing tool 240 includes: two interposing members 241 that interpose the front-end portion (interposing-end portion 241a) thereof between the base member 193 of the splice 195 and the press lid 194; and an interposing member driving unit 242 to which the interposing members 241 are attached.

The interposing member driving unit 242 includes: an interposing member support 243 that supports the interposing member 241, disposed at both sides thereof; and a pair of interposing member operation portions 244.

A space 245 is formed between the interposing member support 243 and the interposing member operation portion 244 along the longitudinal direction of the interposing member support 243; and the end portion of the interposing member operation portion 244 is bended toward the interposing member support side 243 and is connected to the interposing member support 243 at a base 246 that is located at one end side thereof in the longitudinal direction (upper right in FIG. 64).

A thin hinge portion 247 is provided between the base 246 and the interposing member support 243.

The interposing member support 243 has an interposing member formation surface 243f on which the interposing member 241 is provided; the formation surface is depressed at the hinge portion 247 (that faces the splice 195); and the interposing member support 243 can rotate on the base 246 serving as a fulcrum point in the direction which is away from the splice 195.

The two interposing members 241A and 241B are attached to the interposing member support 243 in the axis line direction thereof (central axis line Q1) so as to be separated from each other.

Hereinbelow, the first splicing tool 240 will be illustrated, particularly, the axis direction of the interposing member support 243 is referred to as a front-back direction.

The thickness direction of the plate-shaped interposing member 241 is perpendicular to the front-back direction of the interposing member support 243.

Consequently, the first splicing tool 240 causes the front-end portion 241a of the interposing member 241 which outwardly protrudes from the interposing member support 243 to interpose between the base member 193 of the splice 195 and the press lid 194 and is thereby attached to the splice 195.

The front-back direction of the splicing tool 240 is aligned along the front-back direction of the splice 195.

The interposing member 241 is grasped between the base member 193 and the press lid 194 by action of relatively strong force due to elastic action of the clamp spring 110 of the splice 195.

The interposing member support 243 has press protrusions 248 that are provided on and protrude from the opposite side of the interposing member formation surface 243f.

Figure 69:
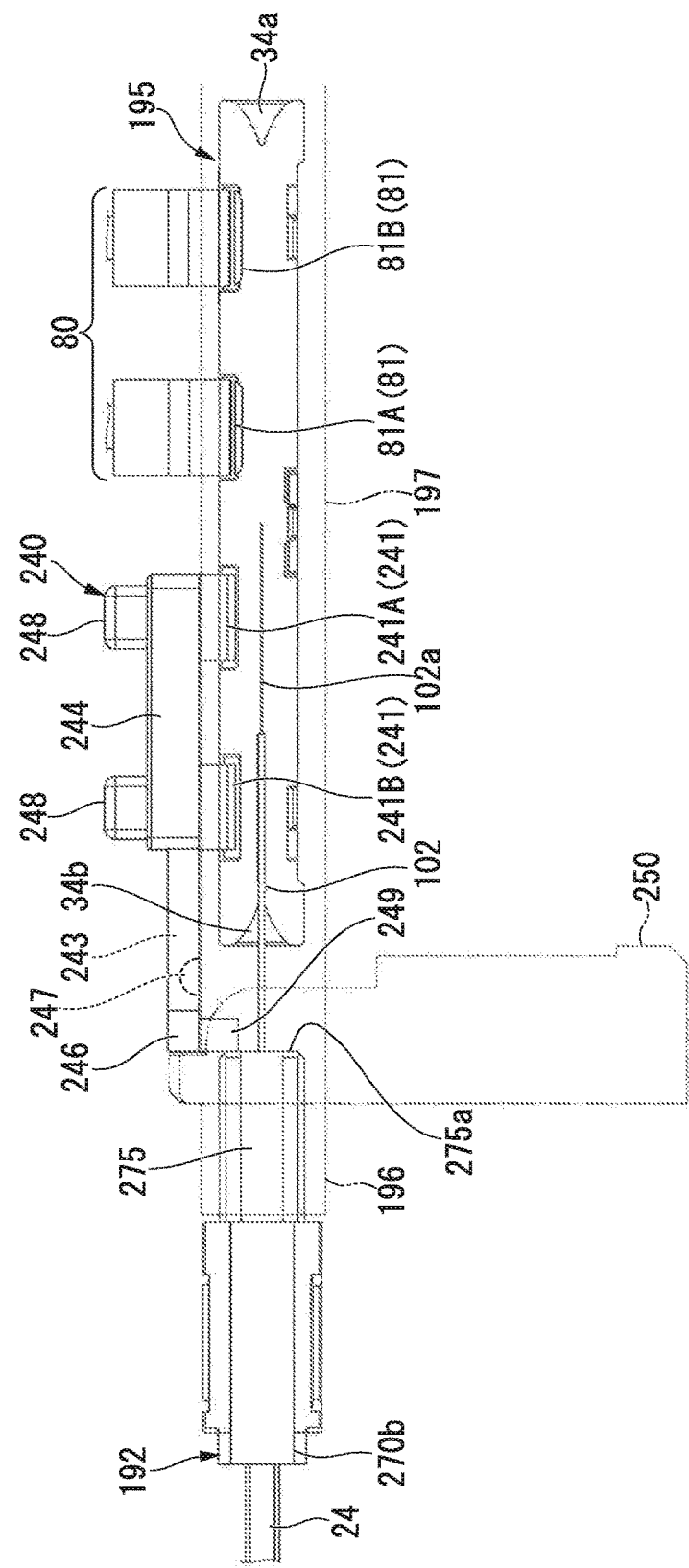
FIG. 69 is a side view showing a state where a spacer provided at the first splicing tool stops forward movement of the cable grasping member.

As shown in FIG. 69, the press protrusions 248 are formed on the opposite side of the interposing members 241 at the positions corresponding thereto, and the interposing member 241 easily interposes between the base member 193 of the splice 195 and the press lid 194 by pressing the press protrusion 248.

As shown in FIGS. 64 and 72, an inclined face 243b is formed at a side face 243a that faces the interposing member operation portion 244 of the interposing member support 243. At the inclined face, as the distance from the splice 195 increases, the width of the interposing member support 243 (in horizontal direction in FIG. 72) increases.

Furthermore, projected portions 244c having inclined faces 244b are formed at the side faces 244a that face the interposing member support 243 of the interposing member operation portion 244. At the inclined face, as the distance from the splice 195 increases, the width of the interposing member operation portion 244 (in horizontal direction in FIG. 72) decreases.

In the first splicing tool 240, in the cross-sectional face perpendicular to the axis line direction (central axis line Q1) of the interposing member support 243, the portions that are located at both sides between where the interposing member 241 is interposed (described below where the horizontal direction of FIG. 72 is referred to as a horizontal direction of the splicing tool 240) are pressed (applying the lateral pressure P1) so as to come close to each other, the inclined faces 244b of the interposing member operation portion 244 thereby come into contact with the inclined faces 243b of the interposing member support 243 as shown in FIG. 73, and pressing forces are applied to the inclined faces in the normal direction thereof.

As a result of synthesizing the pressing forces that are applied to the both inclined faces 244b of the interposing member support 243, the interposing member support 243 is deformed in the direction in which the interposing member support is away from the splice 195, and it is possible to remove the interposing member 241 from the splice 195 (in details, halved grasping member 34).

At this time, as the interposing member support 243 rotates on the base 246 serving as a fulcrum point as described above, the distance between the splice 195 and the first interposing member 241A that is located far from the base 246 increases in advance more than the distance between the splice and the second interposing member 241B that is located near the base 246.

The splicing tool 240 realizes time-difference removal such that removal of the first interposing member 241A from the second clamp portion is carried out before removal of the second interposing member 241B from the first clamp portion.

The work operation of applying the lateral pressure P to the interposing member driving unit 242 so that the right and left side portions approach each other and thereby removing the interposing member 241 from the splice 195 is carried out by, for example, an operator grasping the interposing member driving unit 242 with fingers of their hand.

As shown in FIGS. 79 and 80, the second splicing tool 80 is configured to include: two interposing members 107 having a front-end portion (interposing-end portion 107a) interposing between the base member 193 of the splice 195 and the press lid 194; and a sleeve-shaped interposing member driving unit 82 to which the interposing member 107 is attached.

The interposing member 107 includes a plate-shaped interposing-member main body 83 that protrudes outside the interposing member driving unit 82 through a cut-off portion 82a formed at the interposing member driving unit 82.

The interposing-end portion 107a of the interposing member 107 constitutes the front-end portion of the interposing-member main body 83 protruding outside the interposing member driving unit 82 through the cut-off portion 82a.

The second splicing tool 80 has a constitution in which the base end side that is opposite to the interposing-end portion 107a of the interposing member 107 is attached to a locking wall portion 85 where the locking wall portion faces a pressure-receiving wall portion 86 and where the pressure-receiving wall portion is a wall portion on which the cut-off portion 82a of the interposing member driving unit 82 is formed.

The pressure-receiving wall portion 86 has a constitution in which contact-protuberance wall portions 86b protruding toward the outside of the interposing member driving unit 82 is provided on and protrudes from a tabular main wall portion 86a on which the cut-off portion 82a is formed.

The contact-protuberance wall portion 86b of the pressure-receiving wall portion 86 is a rib-shaped protuberance wall that is provided at a center portion of the plate-shaped main wall portion 86a in the extending direction thereof where the plate-shaped main wall portion extends along the front-back direction of the interposing member driving unit 82; and the contact-protuberance wall portion protrudes perpendicular to the extending direction (front-back direction) of the plate-shaped main wall portion 86a.

Additionally, the contact-protuberance wall portion 86b is formed so as to extend in the horizontal direction (horizontal direction in FIG. 79) that is the direction in which both drive-part side wall portions 88 makes a space; and the drive-part side wall portions connect the pressure-receiving wall portion 86 (particularly, plate-shaped main wall portion 86a) to the locking wall portion 85 (particularly, a plate-shaped main wall portion 85a which will be described below) in the interposing member driving unit 82.

The cut-off portion 82a is formed in an elongated shape at the plate-shaped main wall portion 86a of the pressure-receiving wall portion 86 so as to extend along the front-back direction from both ends in the front-back direction.

The contact-protuberance wall portions 86b of the pressure-receiving wall portion 86 are located between the back and forth cut-off portions 82a in the front-back direction of the interposing member driving unit 82.

In the two interposing members 107 of the second splicing tool 80, the interposing-member main bodies 83 thereof are provided to pass through the back and forth cut-off portions 82a and penetrate the contact protuberance wall 86a.

The interposing-member main body 83 of the interposing member 107 has a contact wall 83a that is formed at a base end side on the opposite side of the interposing-end portion 107a and at the locking wall portion 85 and comes into contact with the pressure-receiving wall portion side 86.

The locking wall portion 85 of the interposing member driving unit 82 of the second splicing tool 80 shown as an example in the drawing has a constitution in a protruding wall portion 85b protruding in the direction from the plate-shaped main wall portion 85a to the pressure-receiving wall portion 86 is provided on and protrudes from the plate-shaped main wall portion 85a formed in parallel with the plate-shaped main wall portion 86a of the pressure-receiving wall portion 86.

The contact wall 83a of the interposing member 107 can come into contact with the edge face of the protuberance edge of the protruding wall portion 85b of the locking wall portion 85 from the pressure-receiving wall portion side 86.

Additionally, the interposing member 107 has engagement ends 84 that extend from a base end (contact wall 83a) of the interposing-member main body 83 to the opposite side (base end side of the interposing member 107) of the interposing-end portion 107a.

Consequently, in the interposing member 107, the engagement ends 84 pass through through holes 85c penetrating through the locking wall portion 85; engagement claws 84a are disposed to be able to engage with the locking wall portion 85 where the engagement claws protrude from the side face of the front-end portions (extending end portion) of the engagement ends 84 projecting to the outside of the locking wall portion 85 (on the opposite side of the pressure-receiving wall portion 86); and the engagement claws are attached to the interposing member driving unit 82.

One end of the through hole 85c of the locking wall portion 85 of the interposing member driving unit 82 of the second splicing tool 80 shown as an example in the drawing opens at the edge face of the protuberance edge of the protruding wall portion 85b.

The other end of the through hole 85c opens at the inside of the recess portion 85d where the recess portion is formed in a hollow shape on the outer surface (surface on the opposite side of the inside of the interposing member driving unit 82) of the plate-shaped main wall portion 85a in the locking wall portion 85.

The recess portion 85d is formed in a hole shape such that the other end of the through hole 85c expands.

The engagement claw 84a of the engagement end 84 of the interposing member 107 protrudes from the side face of the front-end portion of the engagement end 84 protruding from a step-difference face 85e formed at the boundary between the other end of the through hole 85c and the recess portion 85d in the outer direction of the interposing member driving unit 82.

The engagement claw 84a is engageable with the step-difference face 85e from the opposite side of the pressure-receiving wall portion 86.

In the interposing member 107 shown as an example in the drawing, a separation distance that is slightly longer than the length of the through hole 85c of the locking wall portion 85 (the length in the axis direction) is ensured between the engagement claw 84a of the engagement ends 84 and the contact wall 83a.

Because of this, the interposing member 107 ensures a little movable range in the axis direction of the through hole 85c with respect to the locking wall portion 85 and is attached to the interposing member driving unit 82 (particularly, the locking wall portion 85).

In other cases, as the splicing tool, a constitution may be adopted in which the separation distance between the engagement claw 84a of the engagement end 84 of the interposing member 107 and the contact wall 83a is made the same as the length of the through hole 85c of the locking wall portion 85 and the interposing member 107 is attached to the interposing member driving unit 82 (particularly, the locking wall portion 85).

With this configuration, the locking wall portion 85 is held between the engagement claw 84a of the engagement end 84 and the contact wall 83a, and the interposing member 107 is attached to this in a state where the displacement thereof is restricted in the axis direction of the through hole 85c with respect to the interposing member driving unit 82 (particularly, the locking wall portion 85).

The two interposing members 107A and 107B are attached to the interposing member driving unit 82 so that they are separated from each other in the axis line direction thereof (central axis line Q).

Hereinbelow, the second splicing tool 80 will be described while the axis direction of the interposing member driving unit 82 is referred to as a front-back direction.

The interposing member 107 is attached to the interposing member driving unit 82 in the direction such that the thickness direction of the plate-shaped interposing-member main body 83 is perpendicular to the front-back direction of the interposing member driving unit 82.

Consequently, the second splicing tool 80 causes the front-end portion protruding outside the interposing member driving unit 82 of the interposing-member main body 83 of the interposing member 107 to interpose between the base member 193 of the splice 195 and the press lid 194 and is thereby attached to the splice 195.

The front-back direction of the second splicing tool 80 is aligned along the front-back direction of the splice 195.

The interposing-member main body 83 is grasped between the base member 193 and the press lid 194 by action of relatively strong force due to elastic action of the clamp spring 110 of the splice 195.

As shown in FIG. 79, the halved grasping member 34 of the splice 195 protrudes from the clamp spring 110 toward the exposed side thereof (the opposite side of the back plate part 110a).

The second splicing tool 80 is attached to the splice 195 so that the contact-protuberance wall portion 86b of the pressure-receiving wall portion 86 comes into contact with the halved grasping member 34 of the splice 195.

In the cross-sectional face that is perpendicular to the axis line direction thereof (central axis line Q) of the interposing member driving unit 82, as a result of pressing (applying a lateral pressure P) the portions of the second splicing tool 80 between which the interposing member 107 is interposed and which are located at both sides (right and left sides in FIG. 79, the horizontal direction in FIG. 79, hereinbelow, refer to the horizontal direction of the second splicing tool 80) so that they approach each other, the separation distance between the pressure-receiving wall portion 86 of the interposing member driving unit 82 and the locking wall portion 85 increases.

Consequently, the second splicing tool 80 can remove the interposing member 107 from the splice 195 (particularly, halved grasping member 34).

The work operation of applying the lateral pressure P to the interposing member driving unit 82 so that the right and left side portions approach each other and thereby removing the interposing member 107 from the splice 195 is carried out by, for example, an operator grasping the interposing member driving unit 82 with fingers of their hand.

Furthermore, the second splicing tool 80 includes a pair of engagement wall portions 87 outwardly protruding from the interposing member driving unit 82 in a direction parallel to the interposing-member main body 83; and the engagement wall portions protrudes from both sides between which the cut-off portion 82a of the pressure-receiving wall portion 86 is interposed, i.e., from both sides (right and left sides in FIG. 79) between which the interposing-member main body 83 passing through the cut-off portion 82a in the direction perpendicular to the pressure-receiving wall portion 86 is interposed.

Consequently, in the second splicing tool 80, protruding claws 87a protrude from the protruding ends of the pair of engagement wall portions 87 toward the inner face side in which the pair of engagement wall portions 87 face each other, the protruding claws engage with bottom ends of the side wall portions 122 of the slider 120a, and the second splicing tool is attached to the slider 120a.

As the engagement wall portions 87 engage with the slider 120a, it is less likely for the second splicing tool 80 to be displaced with respect to the slider 120a.

However, when work operation of removing the interposing member 107 from the splice 195 in the second splicing tool 80 is carried out by applying the lateral pressure P to the right and left sides of the interposing member driving unit 82, even after the separation distance between the pressure-receiving wall portion 86 of the interposing member driving unit 82 and the locking wall portion 85 is maximized, if the interposing member driving unit 82 is continuously deformed by applying the lateral pressure P, an engagement state of the pair of engagement wall portions 87 with respect to the slider 120a can be released.

Engagement or release of engagement regarding the pair of engagement wall portions 87 with respect to the slider 120a will be described below.

As shown in FIG. 61, the unit base 197 of the optical fiber splicing unit 191 is provided with a splice holder portion 60 detachably holding the splice 195, and the grasping member holding portion 196 holding the cable grasping member 192 removably grasping an outer coating 113 of the terminal 24a of the optical fiber cable 24.

The unit base 197 may be, for example, substantially rectangular as seen in a plan view.

As shown in FIGS. 61 and 72, the splice holder portion 60 includes: a base portion 261 constituting a part of the unit base 197; a one-side-protruding wall portion 262 that is placed upright at one side edge of the base portion 261; an another-side-protruding wall portion 263 that is placed upright at another side edge of the base portion 261; a pair of front-side-protruding wall portions 264 that are provided at both sides of the forward-end portion; and a pair of rear-side-protruding wall portions 265 that is provided at both sides of the back-end portion.

The protruding wall portions 262 to 265 are formed to protrude from the upper surface side of the base portion 261.

The splice holder portion 60 accommodates the splice 195 in a splice storage space 267, that is ensured between the one-side-protruding wall portion 262 and the another-side-protruding wall portion 263, and thereby holds the splice 195.

At the inner face of the one-side-protruding wall portion 262, locking claws 262c protruding toward the inner face side therefrom are formed.

Similarly, at the inner face of the another-side-protruding wall portion 263, locking claws 263c protruding toward the inner face side therefrom are formed.

By such locking claws 262c and 263c, it is possible to restrict upward movement of the splice 195.

The splice 195 is pushed into the splice storage space 267, thereby moves downward to the lower sides of the locking claws 262c and 263c, and the upward movement is restricted.

The separation distance between the front-side-protruding wall portion 264 and the rear-side-protruding wall portion 265 is set depending on the length of the splice 195 in the longitudinal direction, and the displacement of the splice 195 with respect to the base portion 261 in the front-back direction is restricted by the front-side-protruding wall portion 264 and the rear-side-protruding wall portion 265.

When the interposing member is detached from the splice 195, since the separation distance between the paired side plate parts 110b of the clamp spring 110 is reduced, the splice 195 is easily removed from the splice holder portion 60.

Accordingly, the splice holder portion 60 can removably hold the splice 195.

Moreover, the locking or the releasing of the splice 195 by the locking claws 262c and 263c of the one-side-protruding wall portion 262 and the another-side-protruding wall portion 263 can also be carried out as a result of elastically deforming the one-side-protruding wall portion 262 and the another-side-protruding wall portion 263 in a direction away from each other by, for example, an operator with its fingers.

As shown in FIGS. 76 to 78, in the splice 195, hereinbelow, the direction perpendicular to the counterface surface 193a of the base member 193 is referred to as the width direction.

Both engagement faces 193k and 323e of a front-end engagement protuberance portion (front-end projected portions 193j and 323d) of the halved grasping member 34 of the splice 195 are located at both sides of the front-end engagement protuberance portion in the width direction, and both engagement faces 193i and 321e of a back-end engagement protuberance portion (back-end projected portions 193h and 321d) are located at both sides of a rear-side engagement protuberance portion in the width direction.

Additionally, both side plate parts 110b of the clamp spring 110 are located both sides of the halved grasping member 34 interposed therebetween in the width direction.

In the splice 195, the protruding lengths of a back-end projected portion 193h and a front-end projected portion 193j from the back face of the base member 193 with which the side plate part 110b of the clamp spring 110 comes into contact are made slightly larger than the plate thickness of the side plate part 110b of the clamp spring 110.

Furthermore, the protruding length of the back-end projected portion 321d from the back face of the rear lid member 321 with which the side plate part 110b of the clamp spring 110 comes into contact and the protruding length of the front-end projected portion 323d from the back face of the front lid member 323 with which the side plate part 110b of the clamp spring 110 comes into contact are made slightly larger than the plate thickness of the side plate part 110b of the clamp spring 110.

The thickness of the plate-shaped middle lid member 322, that is, the distance between the counterface surface 322a of the middle lid member 322 and the back face with which the side plate part 110b of the clamp spring 110 comes into contact, the thickness of the plate-shaped portion other than the back-end projected portion 321d of the rear lid member 321, and the thickness of the plate-shaped portion other than the front-end projected portion 323d of the front lid member 323 are made the same as each other.

As shown in FIGS. 77 and 78, a tapered-opening portion 34a, which is provided at each of the front lid member 323 and the base member 193 and which is formed of a recess having a tapered shape gradually becomes fine in the direction from the front-edge face thereof to the rear side, opens at the front end of the halved grasping member 34 of the splice 195.

The rear end (back end) of the tapered-opening portion 34a is communicated with the coated-portion insertion grooves 323b and 193d.

Moreover, a fiber introduction recess portion 66 is ensured between the front-side-protruding wall portions 264; and the fiber introduction recess portion smoothly guides the inserted optical fiber 103 that is to be inserted into the coated-portion insertion grooves 323b and 193d of the splice 195 held by the splice holder portion 60 through the front side of the splice holder portion 60, into the tapered-opening portion 34a that opens at the front end of the splice 195.

The fiber introduction recess portion 66 is a tapered groove having the groove width that gradually decreases in the direction from the front side thereof to the rear side.

The inserted optical fiber 103 that is to be inserted from the front side into the splice 195 can be guided into the splice 195 held by the splice holder portion 60 through the fiber introduction recess portion 66.

As shown in FIGS. 77 and 78, a tapered-opening portion 34b, which is provided at each of the rear lid member 321 and the base member 193 and which is formed of a recess having a tapered shape gradually becomes fine in the direction from the rear-edge face thereof to the front side, opens at the back end of the halved grasping member 34 of the splice 195.

The front end (back end) of the tapered-opening portion 34b is communicated with the coated-portion insertion grooves 321b and 193c.

As shown in FIG. 61, a hole edge portion, which is provided around the tapered-opening portion 34b at the back end of the base member 193, comes into contact with the front side of the rear-side-protruding wall portion 265.

Figure 62:
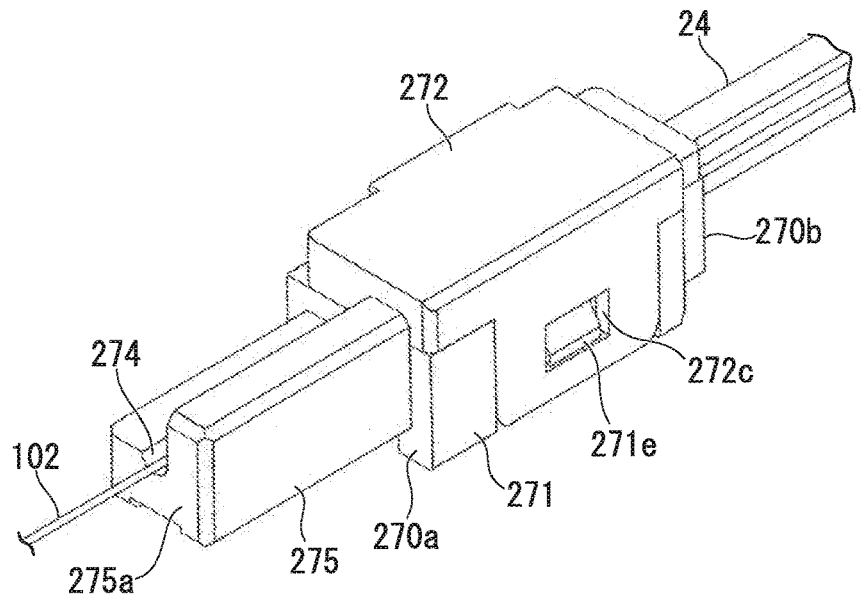
FIG. 62 is a perspective view showing an example of a cable grasping member.
Figure 63:
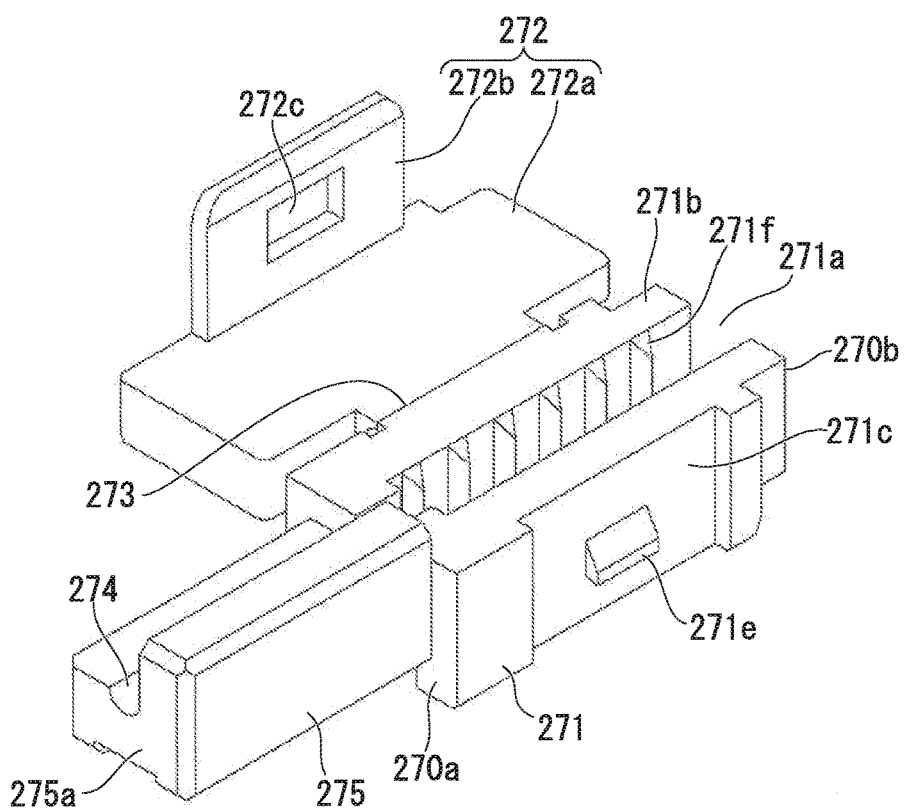
FIG. 63 is a perspective view showing a state where a lid of the cable grasping member shown in FIG. 62 is opened.

As shown in FIGS. 62 to 63, the cable grasping member 192 includes: a grasping base 271 that is formed in a U-shape in the cross-sectional face and has a cable-fitting groove 271a into which the optical fiber cable 24 is fitted; and a press lid 272 that is pivotally provided to one of side wall portions 271b and 271c of the cable-fitting groove 271a in the groove-width direction of the grasping base 271.

As shown in FIGS. 74A and 74B, in the cable grasping member 192, a plurality of grasping protrusions 271f, that is provided to protrude from the faces at which the paired side wall portions 271b and 271c of the grasping base 271 face each other, bites into the outer coating 113 of the optical fiber cable 24 which is fitted into the cable-fitting groove 271a, and it is thereby possible to grasp and fix the optical fiber cable 24 between the paired side wall portions 271b and 271c.

Figure 66:
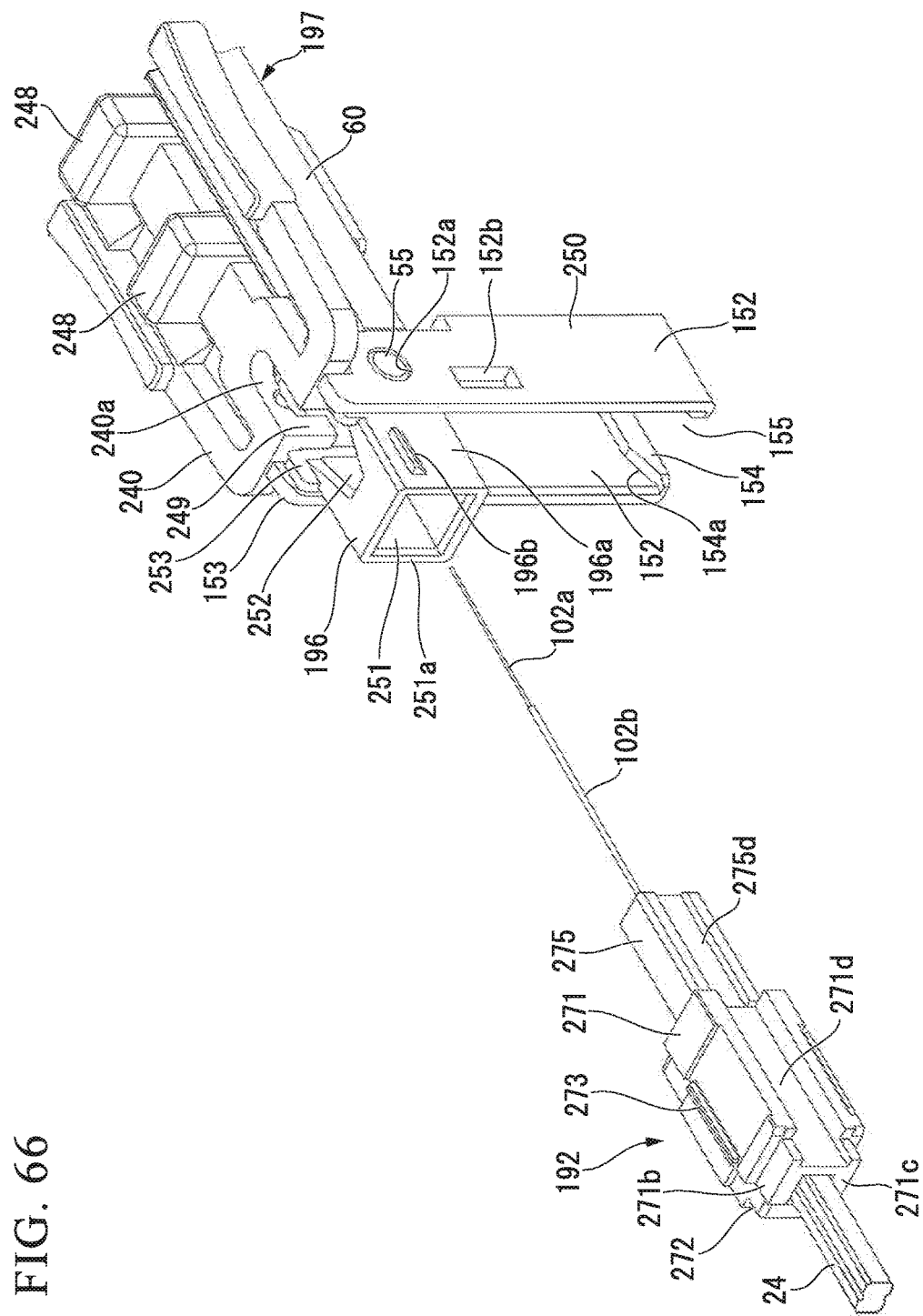
FIG. 66 is a perspective view showing a state of inserting the cable grasping member into a grasping member holding portion.

The grasping base 271 is a member which has a U-shaped cross-sectional face and in which the cable-fitting groove 271a is ensured between the paired side wall portions 271b and 271c provided at one-face side of a bottom wall portion 271d so as to protrude therefrom (refer to FIG. 66).

The groove width direction of the cable-fitting groove 271a is a direction in which both side wall portions 271b and 271c facing each other with the cable-fitting groove 271a interposed therebetween make a space.

The grasping protrusions 271f of the cable grasping member 192 shown as an example in the drawing are protuberances which have a triangular shape in the cross-sectional face and extend in the depth direction of the cable-fitting groove 271a.

After the grasping base 271 is externally fitted onto and fixed to the terminal of optical fiber cable 24 in an opened state where the press lid 272 is separated from the side wall portion 271c, the press lid 272 rotates to be positioned at the closed position so as to close an opening portion of the cable-fitting groove 271a where the opening portion is located between upper ends of the side wall portions 271b and 271c of the grasping base 271, the press lid 272 is locked to the side wall portion 271c, and the cable grasping member 192 is attached to the terminal of the optical fiber cable 24.

The cable grasping member 192 shown as an example in the drawing is an integral molding product made of plastic.

The press lid 272 is linked to one of protuberance edges (first side wall portion 271b) of the paired side wall portions 271b and 271c with a thin portion 273 serving as a hinge portion interposed therebetween.

The press lid 272 is pivotally provided so as to be able to rotate with respect to the first side wall portion 271b of the grasping base 271 via the thin portion 273 along the axis line extending along the extending direction of the cable-fitting groove 271a.

In particular, the other of the side wall portions 271b and 271c of the grasping base 271 is also referred to as a second side wall portion 271c.

The press lid 272 of the cable grasping member 192 shown as an example in the drawing is formed in an L-shaped plate.

The press lid 272 includes: a top panel portion 272a that is pivotally provided to the first side wall portion 271b of the grasping base 271 via the thin portion 273; and a lock plate portion 272b that is formed at the top panel portion 272a vertically from the end portion of the top panel portion 272a on the opposite side of the thin portion 273.

In the press lid 272, when the top panel portion 272a comes into contact with the protuberance edges of the pair of side wall portions 271b and 271c of the grasping base 271 and is positioned at the closed position at which the opening portion of the cable-fitting groove 271a is closed, the lock plate portion 272b can overlap the outer face of the cable-fitting groove 271a on the opposite side of the second side wall portion 271c of the grasping base 271.

Subsequently, the press lid 272 causes a locking claw 271e, that is provided to protrude from the outer face of the second side wall portion 271c of the grasping base 271, to be inserted into a locking window 272c formed at the lock plate portion 272b, the press lid is engaged with the grasping base 271, and it is thereby possible to stably maintain a closed state with respect to the grasping base 271.

When the terminal 24a of the optical fiber cable 24 is fitted into the cable-fitting groove 271a, the plurality of grasping protrusions 271f, that protrudes from the faces (inner surface) of the pair of side wall portions 271b and 271c of the grasping base 271 which are exposed to the cable-fitting groove 271a, come into contact with the side face of the outer coating 113 of the optical fiber cable 24, and the terminal 24a of the optical fiber cable 24 is grasped and fixed between the paired side wall portions 271b and 271c.

Additionally, as described above, as a result of maintaining a closed state where the L-shaped plate lid 272 is locked by the locking claw 271e of the outer face of the second side wall portion 271c, it is possible to reliably prevent the optical fiber cable 24 from being removed from the cable-fitting groove 271a, and it is possible to stably maintain a fixed state where the cable grasping member 192 is fixed to the terminal 24a of the optical fiber cable 24.

The optical fiber cable 24 can be removed from the cable grasping member 192 by opening the lid 272 and by extracting the optical fiber cable 24 from the cable-fitting groove 271a.

That is, the cable grasping member 192 is attachable to and detachable from the optical fiber cable 24.

The cable grasping member 192 is preferably an integral molding product made of plastic.

The cable grasping member 192 shown as an example in the drawing includes a front-side protrusion portion 275 that protrudes from one end of the cable-fitting groove 271a of the grasping base 271 in the front-back direction along the extending direction thereof.

The extended optical fiber 102 can be mounted on an optical-fiber holding groove 274 that is formed at the front-side protrusion portion 275.

Additionally, as shown in FIGS. 61 and 66, the grasping member holding portion 196 that holds the cable grasping member 192 is provided at one end of the unit base 197.

As shown in FIG. 66, the grasping member holding portion 196 has an insert hole 251 into which the front-side protrusion portion 275 of the cable grasping member 192 can be fitted.

Figure 67:
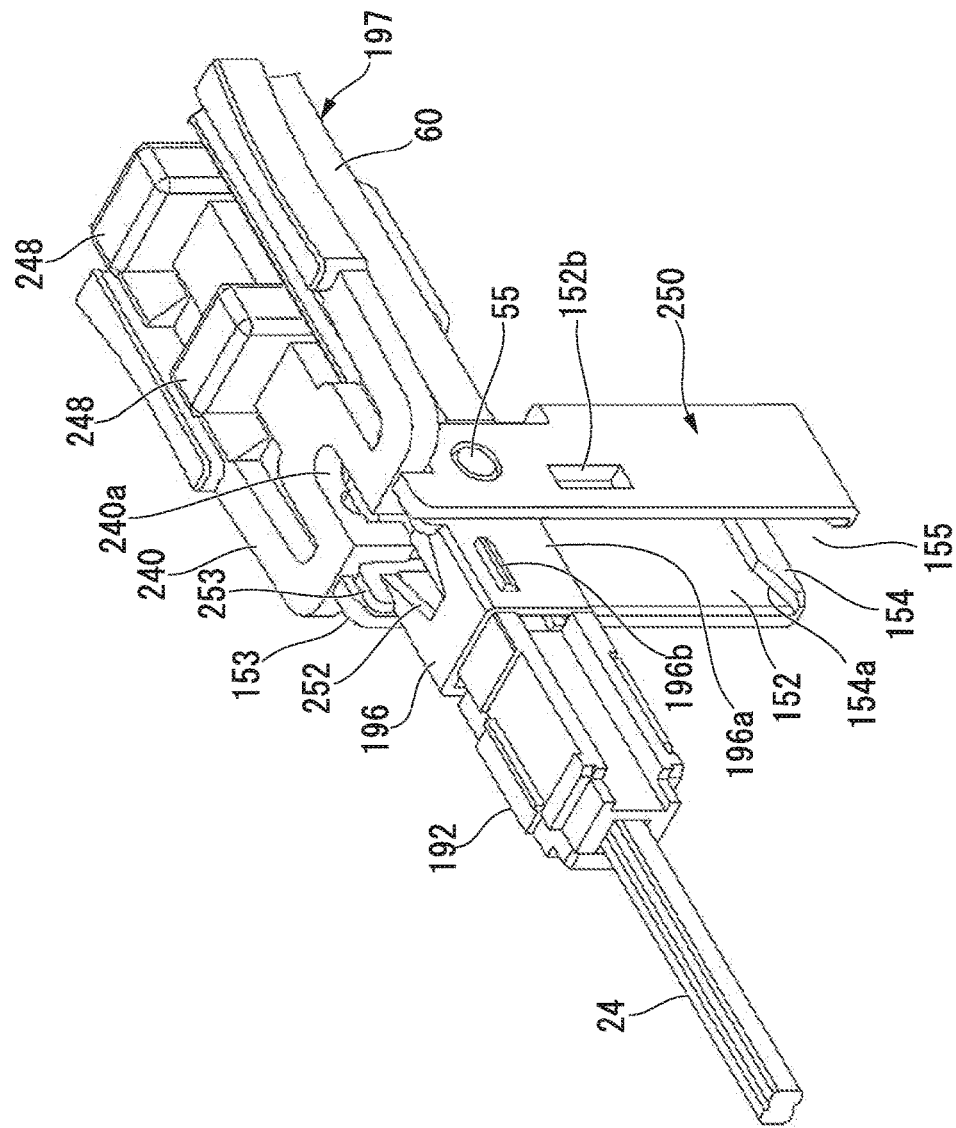
FIG. 67 is a perspective view showing a state where the cable grasping member is inserted into the grasping member holding portion.

As shown in FIG. 67, as the front-side protrusion portion 275 is inserted into the insert hole 251, the front-side protrusion portion 275 of the cable grasping member 192 is fitted thereinto and can be held by the grasping member holding portion 196.

An optical fiber guiding portion 213 is provided between the grasping member holding portion 196 and the splice holder portion 60, and the optical fiber guiding portion guides the front end of the extended optical fiber 102, that protrudes from the front-side protrusion portion 275 of the cable grasping member 192, to the tapered-opening portion 34b of the splice 195.

Accordingly, even where it is difficult to visually check the front end of the extended optical fiber 102 inside the grasping member holding portion 196 when the cable grasping member 192 is inserted into the grasping member holding portion 196, it is possible to reliably guide the cable grasping member into the tapered-opening portion 34b of the splice 195.

The optical fiber guiding portion 213 includes an inclined face 213a that is inclined toward the center of the tapered-opening portion 34b and a U-shaped groove 213b that is upwardly opened; and the upper edge of the inclined face 213a coincides with the lower edge 213c of the U-shaped groove 213b in height.

The height of the lower edge 213c of the U-shaped groove 213b substantially coincides with the height of the groove into which the optical fiber in the halved grasping member 34 of the splice 195.

Particularly, the optical fiber guiding portion 213 in an example of the drawing is formed integrally with the rear-side-protruding wall portions 265 of the splice holder portion 60, and the U-shaped groove 213b is disposed so as to come close to the tapered-opening portion 34b of the splice 195.

Figure 68A:
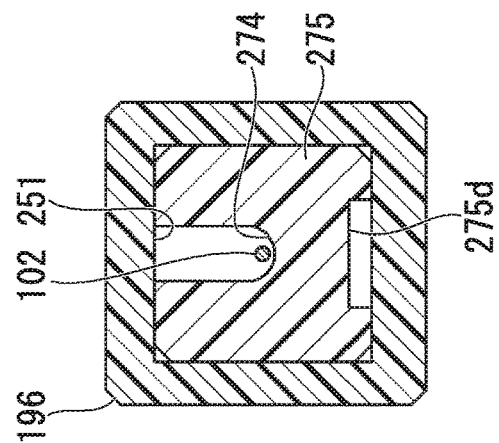
FIG. 68A is a horizontal cross-sectional view showing the grasping member holding portion into which the cable grasping member is inserted.
Figure 68B:
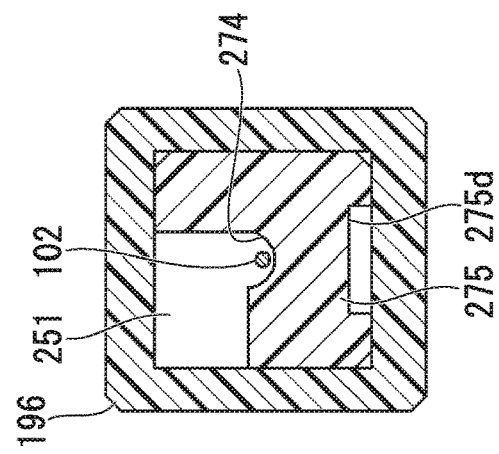
FIG. 68B is a horizontal cross-sectional view showing the grasping member holding portion into which the cable grasping member is inserted.
Figure 68C:
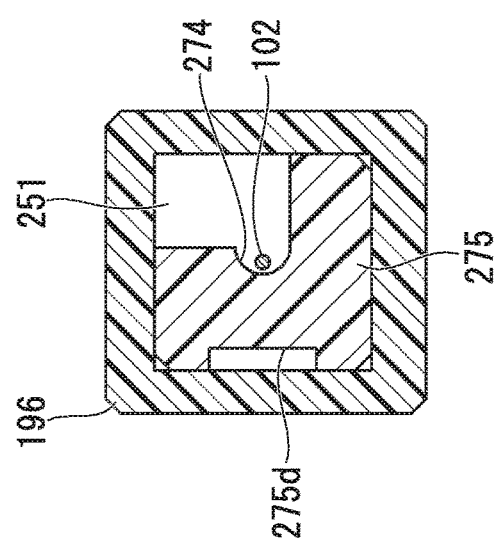
FIG. 68C is a horizontal cross-sectional view showing the grasping member holding portion into which the cable grasping member is inserted.

As shown in FIGS. 68A to 68C, the cross-sectional face of the front-side protrusion portion 275 of the cable grasping member 192 is substantially square; and the insert hole 251 of the grasping member holding portion 196 has a substantially square cross-section so as to be fitted thereinto.

Consequently, as shown in FIGS. 68A to 68C, the cable grasping member 192 can be fitted into the grasping member holding portion 196 in various directions that are different from each other by 90° around the center corresponding to the axis direction of the optical fiber (particularly, the extended optical fiber 102).

Since the external surfaces of the front-side protrusion portion 275 includes the portions that come into contact with four inner faces of the insert hole 251 at at least four places, backlash in a vertical direction or a horizontal direction or vibration in a little angle range (for example, less than several angles in degrees) is prevented, and it is possible to realize stable fitting thereof in various directions that are different from each other by 90°.

Furthermore, as a result of transferring straight the cable grasping member 192 toward the grasping member holding portion 196, it is possible to fit the front-side protrusion portion 275 into the insert hole 251 even in direction.

The cross-sectional shape of the front-side protrusion portion 275 serving as fitting part with respect to the insert hole 251 may have one or more cuttings or chamfer at the side portions and/or the corner portions thereof as long as the shape comes into internal contact with a square.

For example, FIGS. 68A and 68B show that the cable grasping member 192 that is the same as the above is inserted into the grasping member holding portion 196, FIG. 68A shows that the bottom portion 275d of the front-side protrusion portion 275 is directed to left side, and FIG. 68B shows that the bottom portion 275d of the front-side protrusion portion 275 is directed to the lower side.

Even where the cable grasping member 192 is in arrangement shown in FIGS. 68A and 68B, the cross-sectional face of the front-side protrusion portion 275 is an L-shape such that the optical-fiber holding groove 274 is upwardly opened.

The reason is that, the grasping member holding portion 196 shown as an example in the drawing includes an observation window 252 (refer to FIG. 67) at the upper side thereof, which is used for visual observation of the inside condition thereof.

Although disadvantageous effect for a function of the optical fiber splicing unit 191 does not occur even where the bottom portion 275d of the front-side protrusion portion 275 is directed to the observation window side 252, it is possible to prevent the optical-fiber holding groove 274 from being opened in a downward direction as a result of carrying out a work operation in a state where the extended optical fiber 102 is mounted on the optical-fiber holding groove 274 of the front-side protrusion portion 275.

The first splicing tool 240 shown as an example in the drawing includes a cut-off portion 240a (refer to FIGS. 60, 66, or the like) that is continuous to the observation window 252 from the base 246 through a part of the interposing member support 243.

Because of this, a state of the extended optical fiber 102 inside the grasping member holding portion 196 is easy to be saw.

In particular, FIGS. 68A and 68B show a constitution in which the optical-fiber holding groove 274 can be disposed to be opened in two upward directions, but, as shown in FIG. 68C, the optical-fiber holding groove 274 may be disposed to be opened in only one upward direction.

Since the cable grasping member 192 shown as an example in the drawing is applied to the optical fiber cable 24 that has the outer coating 113 having a flat shape in a cross-sectional view as shown in FIG. 87, it is preferable that the cable grasping member can be attached to the optical fiber splicing unit 191 in two directions such that the rotation angles thereof with respect to the longitudinal direction of the optical fiber that is a central axis line are different from each other by 90° as shown in FIGS. 68A and 68B.

Particularly, in the case of the flat-shaped optical fiber cable 24, the outer coating 113 is bended in the short-side direction thereof (horizontal direction in FIG. 87) easier than that in the long-side direction (vertical direction in FIG. 87).

In the case of the drawing shown as an example, that is, in the attachment of the cable grasping member 192 as shown in FIG. 67 corresponding to FIG. 68A, the optical fiber cable 24 is easily bended in the vertical direction with respect to the longitudinal direction of the optical fiber splicing unit 191 in this configuration.

Moreover, in the attachment of the cable grasping member 192 as shown in FIG. 68B, the optical fiber cable 24 is easily bended in the horizontal direction with respect to the longitudinal direction of the optical fiber splicing unit 191 in this configuration.

When the optical fiber splicing unit 191 is accommodated in a narrow space such as a termination box or the like, since it is possible to bend the optical fiber cable 24 in the selected direction from the vertical direction or the horizontal direction, accommodation (storage) of the optical fiber cable 24 is easy.

In the grasping member holding portion 196 shown as an example in the drawing, since the cable grasping member 192 (particularly, the front-side protrusion portion 275 thereof) is inserted and fitted into the insert hole 251 having the same cross-sectional shape throughout in the longitudinal direction, it is possible to movably hold the cable grasping member 192 along the longitudinal direction of the splice 195.

In other cases, as modified examples, the grasping member holding portion 196 may has a plate-shaped guide member (not shown in the figure) on which the cable grasping member 192 is slidably mounted.

This kind of guide member protrudes from the edge face 251a of the insert hole 251 of the grasping member holding portion 196 and thereby receives the cable grasping member 192; and the guide member moves forward along with the cable grasping member 192 and thereby can be accommodated inside the grasping member holding portion 196.

In this case, even where the cable grasping member 192 does not have the portion that is to be fitted into the insert hole 251, as the guide member is fitted into and accommodated in a groove-like guide member accommodating portion (not shown in the figure) formed in the grasping member holding portion 196, slide movement can be realized without vibration.

As shown in FIGS. 64 and 69, the first splicing tool 240 is provides with spacers 249 that stop movement of the cable grasping member 192 along the longitudinal direction of the splice 195 by a predetermined distance relative to the splice 195.

In an example of the drawing, the spacers 249 are configured as a projected portion that protrude from the base 246 of the first splicing tool 240.

By means of this structure, when the cable grasping member 192 is inserted into the grasping member holding portion 196 as shown in FIGS. 66 and 67, the front-end faces 275*a* of the front-side protrusion portion 275 come into contact with the spacers 249, and it is possible to stop the forward movement of the cable grasping member 192 as shown in FIGS. 69 and 74A.

At this time, the extended optical fiber 102 is only inserted into one end side of the splice 195 in the longitudinal direction thereof, and the inserted optical fiber 103 is not inserted into the other end side in the longitudinal direction.

By providing the spacers 249, the forward movement of the cable grasping member 192 can be stopped so that the front end of the extended optical fiber 102 is substantially located at the center of the splice 195 in the longitudinal direction thereof.

The grasping member holding portion 196 has spaces S1 and S2; and the cable grasping member 192 can further move forward in the spaces after the spacers 249 are removed.

As shown in FIG. 74B, when the first splicing tool 240 is removed, the cable grasping member 192 can come close to one end side of the splice 195 in the longitudinal direction thereof.

Specifically, as shown in FIGS. 74A and 74B, as the stopper portion 270*a* of the cable grasping member 192 comes into contact with the edge face 251*a* provided around the insert hole 251 of the grasping member holding portion 196, the forward movement of the cable grasping member 192 is stopped.

As described above, the removal of the first splicing tool 240 is carried out after the front-end portion of the extended optical fiber 102 is butt-jointed to the front-end portion of the inserted optical fiber 103; and the removal is carried out when the front-end portion of the extended optical fiber 102 is sandwiched between the halved elements 193 and 194 and is thereby grasped and fixed therebetween as a result of removing the interposing member 241 of the first splicing tool 240 from between the halved elements 193 and 194 of the splice 195.

As a result of causing the cable grasping member 192 to further come close to one end side of the splice 195 in the longitudinal direction thereof in a state where the front-end portion of the extended optical fiber 102 is butt-jointed to the inserted optical fiber 103 and the outer coating 113 is grasped and fixed to the cable grasping member 192, flexural deformation T can be formed at the extended optical fiber 102 between the cable grasping member 192 and one end side of the splice 195 in the longitudinal direction thereof as shown in FIG. 74B.

Accordingly, when the extended optical fiber 102 is sandwiched between the halved elements 193 and 194 and is thereby grasped and fixed therebetween, it is possible to apply a sufficient pressing force (butting force) for maintaining the butt-jointing of the inserted optical fiber 103 to the extended optical fiber 102.

In order to position the spacers 249 at an adequate position, the spacers 249 can be reliably positioned by pressing the spacer 249 into a spacer accommodating portion 215 that is between a positioning protuberance 253 provided at the grasping member holding portion side 196 and a positioning recess portion 214 provided at the splice holder portion side 60 in an example of the drawing.

Specifically, the length K2 of the spacer accommodating portion 215 that is between the positioning protuberance 253 and the positioning recess portion 214, which are shown in FIG. 74B, is slightly smaller than the length K1 of the spacer 249.

Figure 71:
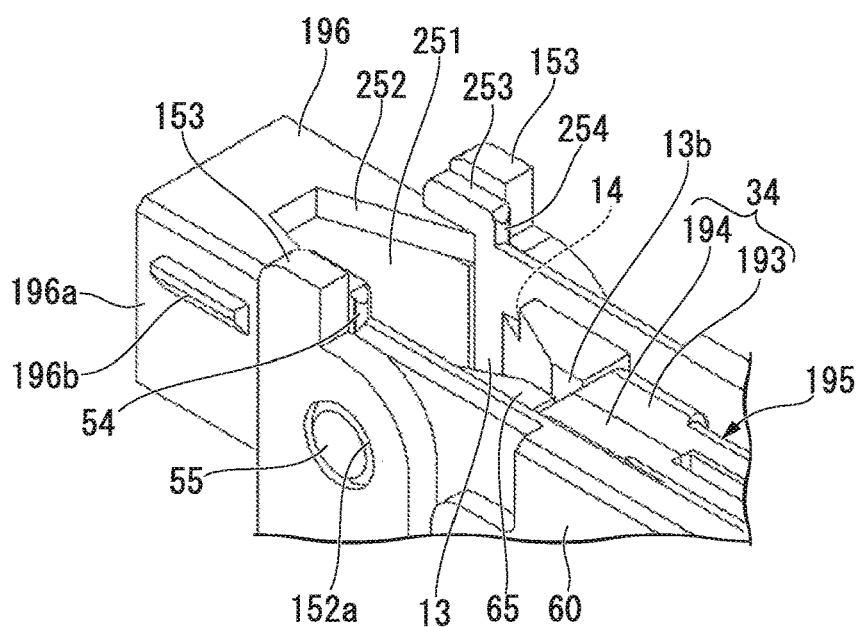
FIG. 71 is a perspective view showing an example of an elastic protrusion pressing the first splicing tool along a longitudinal direction of the mechanical splice.
Figure 74:
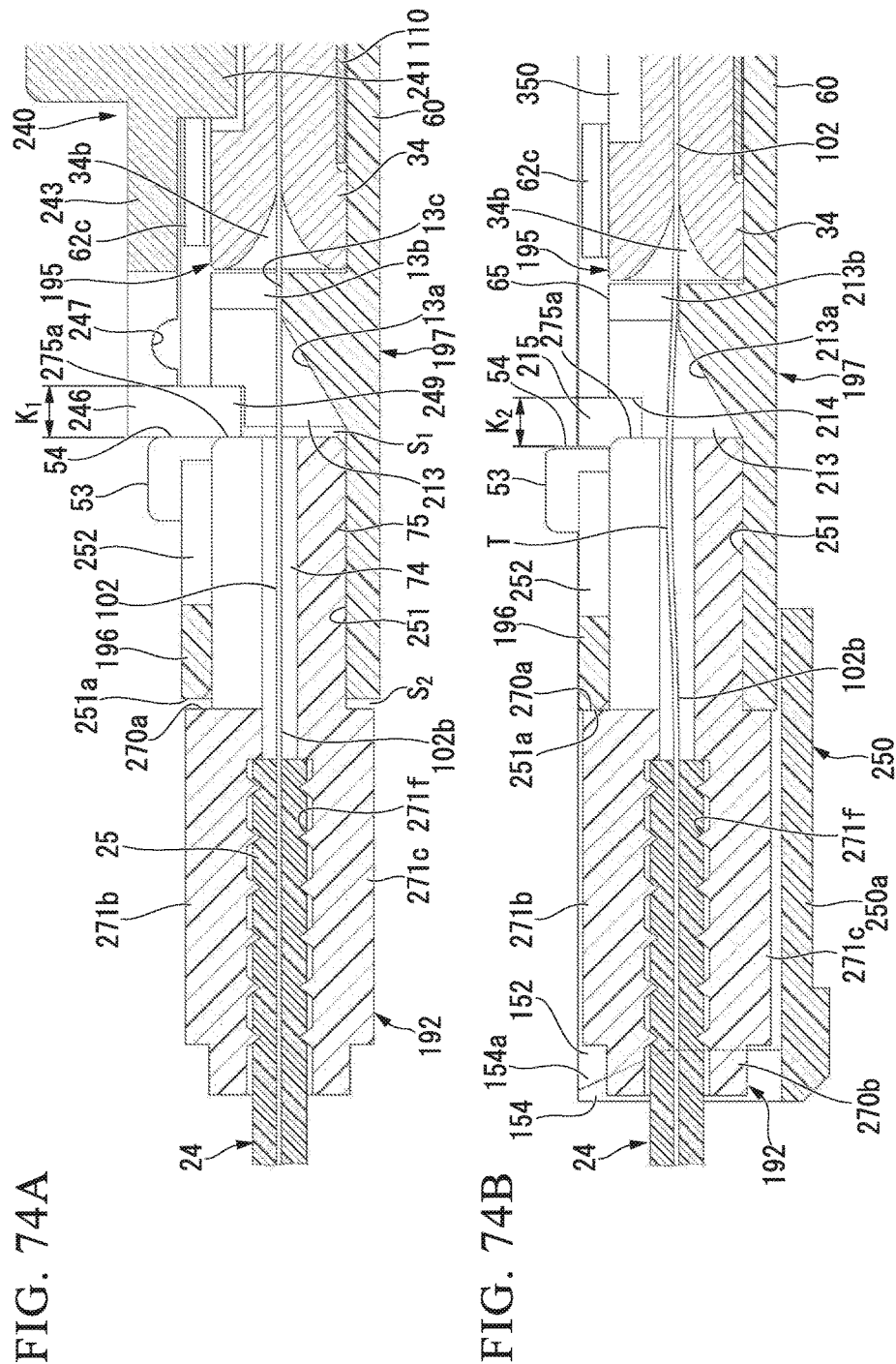
FIG. 74A is a side view showing a state where the spacer provided at the first splicing tool stops forward movement of the cable grasping member.
FIG. 74B is a side view thereof showing a state where the cable grasping member further moves forward and flexural deformation thereby appears at an extended optical fiber.

The grasping member holding portion 196 has an elastic member 54 that presses the spacers 249 against one end side of the splice 195 in the longitudinal direction thereof; and particularly, the member is an elastic protrusion 54 that is provided on the front face of the positioning protuberance 253 shown in FIGS. 71 and 74.

The elastic member 54 elastically constricts when the spacers 249 is pressed into the spacer accommodating portion 215, and the size in which the spacers 249 is received is thereby ensured.

Furthermore, the first splicing tool 240 shown as an example in the drawing is connected to the unit base 197 at the position at which the spacers 249 is accommodated in the spacer accommodating portion 215, and the first splicing tool 240 is not connected to the unit base 197 at the other position.

Consequently, when the interposing member 241 is removed from between the halved elements 193 and 194 and the spacers 249 is removed from the spacer accommodating portion 215, the first splicing tool 240 is separated from the unit base 197.

The spacers 249 is provided at a portion of the base 246 so as to avoid a portion of the interposing member 241 or the interposing member driving unit 242 in the first splicing tool 240, which moves during grasping and fixing.

Accordingly, when the interposing member 241 is driven to perform grasping and fixing, it is possible to prevent the influence on a press fit condition of the spacers 249 from occurring.

As shown in FIGS. 60, 67, 70, 74 or the like, the optical fiber splicing unit 191 shown as an example in the drawing is provided with a lever member 250 that rotates on the axis line X perpendicular to the longitudinal direction of the splice 195 (horizontal direction in FIG. 70) and thereby can rotate between a regulated position 250A (position indicated by a solid line in FIG. 70), at which the back-end portion 270*b* of the cable grasping member 192 is maintained and the backward movement thereof is thereby restricted, and a standby position 250B (position indicated by a chain line in FIG. 70), at which the backward movement of the cable grasping member 192 is not restricted.

The lever member 250 is configured to include: a cover plate 250*a* that covers the cable grasping member 192 held by the grasping member holding portion 196; and linear-shaped rotation arms 152 that are provided in parallel to each other at both sides thereof.

The paired arms 152 have bearing holes 152*a* into which a rotation shaft 55 protruding from both side portions of the grasping member holding portion 196 is inserted.

By inserting the rotation shaft 55 into the bearing holes 152*a*, the lever member 250 is pivotally provided so as to rotate with respect to the grasping member holding portion 196 on the rotation axis line X in the horizontal direction thereof.

Here, the bearing holes 152*a* are through holes that penetrate through the rotation arm 152 in the thickness direction thereof, but may be bottomed holes.

Additionally, a structure of the pivot point is not particularly limited, and a constitution may be adopted in which a bearing hole is formed at the grasping member holding portion 196, a rotation shaft protuberance is formed at the rotation arm 152, or the like.

Figure 70:
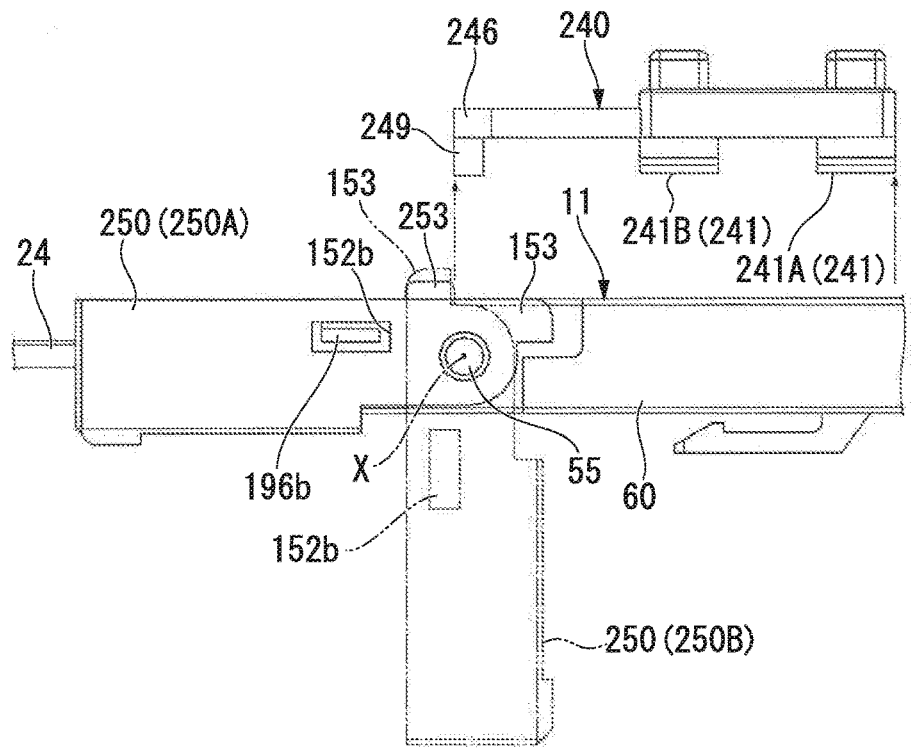
FIG. 70 is a side view showing an example of a locking protuberance provided a lever member.

As shown in FIG. 70, the cable grasping member 192 held by the grasping member holding portion 196 can be covered with the cover plate 250*a* by rotating the lever member 250 on the rotation shaft 55 (refer to FIG. 74B).

Here, the position of the lever member 250 (a solid-line portion in FIG. 70) with respect to the grasping member holding portion 196 is also referred to as a covered position.

As shown in FIG. 66, before the cable grasping member 192 is inserted into the grasping member holding portion 196, the lever member 250 is opened so that the cable grasping member 192 is easily inserted into the grasping member holding portion 196.

The position of the lever member 250 (a chain-line portion in FIG. 70) with respect to the grasping member holding portion 196 in this situation is also referred to as an opened position.

In an example of the drawing, even after the cable grasping member 192 is inserted into the grasping member holding portion 196, the lever member 250 is maintained at the opened position so as to be able to operate the cable grasping member 192 until butt-jointing connection between the extended optical fiber 102 and the inserted optical fiber 103 is completed.

As shown in FIGS. 70 and 71, the lever member 250 has locking protuberances 153 that locks the first splicing tool 240.

By means of this structure, transfer of the lever member 250 from the standby position (opened position) 250B to the regulated position (covered position) 250A is restricted, and it is possible to hold the lever member 250 on the standby position 250B.

In an example of the drawing, engagement by the locking protuberances 153 is released by removing the interposing member 241 of the first splicing tool 240 from between the halved elements 193 and 194 of the splice 195, and the lever member 250 can move rotationally to the regulated position 250A.

Accordingly, movement of the lever member 250 to the regulated position (covered position) 250A can be reliably restricted during a work operation of butt-jointing of the extended optical fiber 102 to the inserted optical fiber 103 by inserting this into the splice 195.

The locking protuberance 153 is engaged with a portion of the base 246 so as to avoid a portion of the interposing member 241 or the interposing member driving unit 242 in the first splicing tool 240, which moves during grasping and fixing.

Accordingly, when the interposing member 241 is driven to perform grasping and fixing, it is possible to prevent the influence on a holding state of the lever member 250 from occurring.

As shown in FIGS. 66, 67, or the like, when the lever member 250 is located at the covered position, backward-movement restriction ends 154 that are provided to protrude from the back-end side can be located at the back side of the cable grasping member 192.

As shown in FIG. 74B, it is possible to restrict backward movement of the cable grasping member 192 relative to the unit base 197 by disposing the backward-movement restriction ends 154 at the back side of the cable grasping member 192.

Since the optical fiber cable 24 protruding from the back side of the cable grasping member 192 is located at cut-off portions 155 between the backward-movement restriction ends 154, the backward-movement restriction ends 154 are provided at both right and left sides of the optical fiber cable 24, and it is possible to cover a wide region of the back-end portion of the cable grasping member 192.

The rotation arms 152 of the lever member 250 have engagement holes 152*b* that are to be engaged with engagement protrusions 196*b* protruding from external faces 196*a* of the grasping member holding portion 196.

The lever member 250 can be maintained to be positioned at the covered position with respect to the grasping member holding portion 196 by causing the engagement protrusions 196*b* to engage with the engagement holes 152*b*.

A fastening operation of restricting backward movement of the cable grasping member 192 relative to the unit base 197 can be carried out by disposing the lever member 250 on the covered position.

Consequently, a state where the cable grasping member 192 and the unit base 197 are integrated is maintained.

The unit base 197 is preferably formed integrally with the grasping member holding portion 196 and the splice holder portion 60.

For example, the unit base 197 may be an integral molding product made of plastic.

In other cases, the outer coating grasping portion is not limited to constitution shown as an example in the drawing.

As an outer coating grasping portion, a press lid may be adopted which has a structure in which, for example, the lock plate portion 272*b* is omitted and an engagement portion to be engaged with the protuberance edge of the second side wall portion 271*c* of the grasping base 271 is provided on the top panel portion 272*a*.

Moreover, as the outer coating grasping portion, a structure that is formed of only the grasping base may be adopted.

Furthermore, the outer coating grasping portion is not limited to an integral molding product made of plastic, and a structure which is constituted of a plurality of members may be adopted.

The outer coating grasping portion may be a member that is fixed to, for example, the periphery of the terminal of the optical fiber cable 24 by adhesive fixation using adhesive, thermal welding, or the like.

An outer coating grasping portion of a modified example does not include a lid and is constituted of a grasping base in which both side wall portions 271*b* and 271*c* are provided on a bottom wall portion 271*d* in parallel with each other so as to protrude therefrom so that the cable-fitting groove 271*a* is interposed therebetween.

Removal prevention protrusions that project to the inside, restrict upward movement of the optical fiber cable 24, and thereby prevent the optical fiber cable 24 from being removed are formed at the protuberance edges of the side wall portions 271*b* and 271*c*.

In the outer coating grasping portion having this configuration, since a lid is not provided, the constitution thereof is simple, an operation of inserting the optical fiber cable 24 into the cable-fitting groove 271*a* is easy.

In addition, since the structure is simple, the manufacturing thereof is easy, and it is also possible to reduce the cost therefor.

Figure 75:
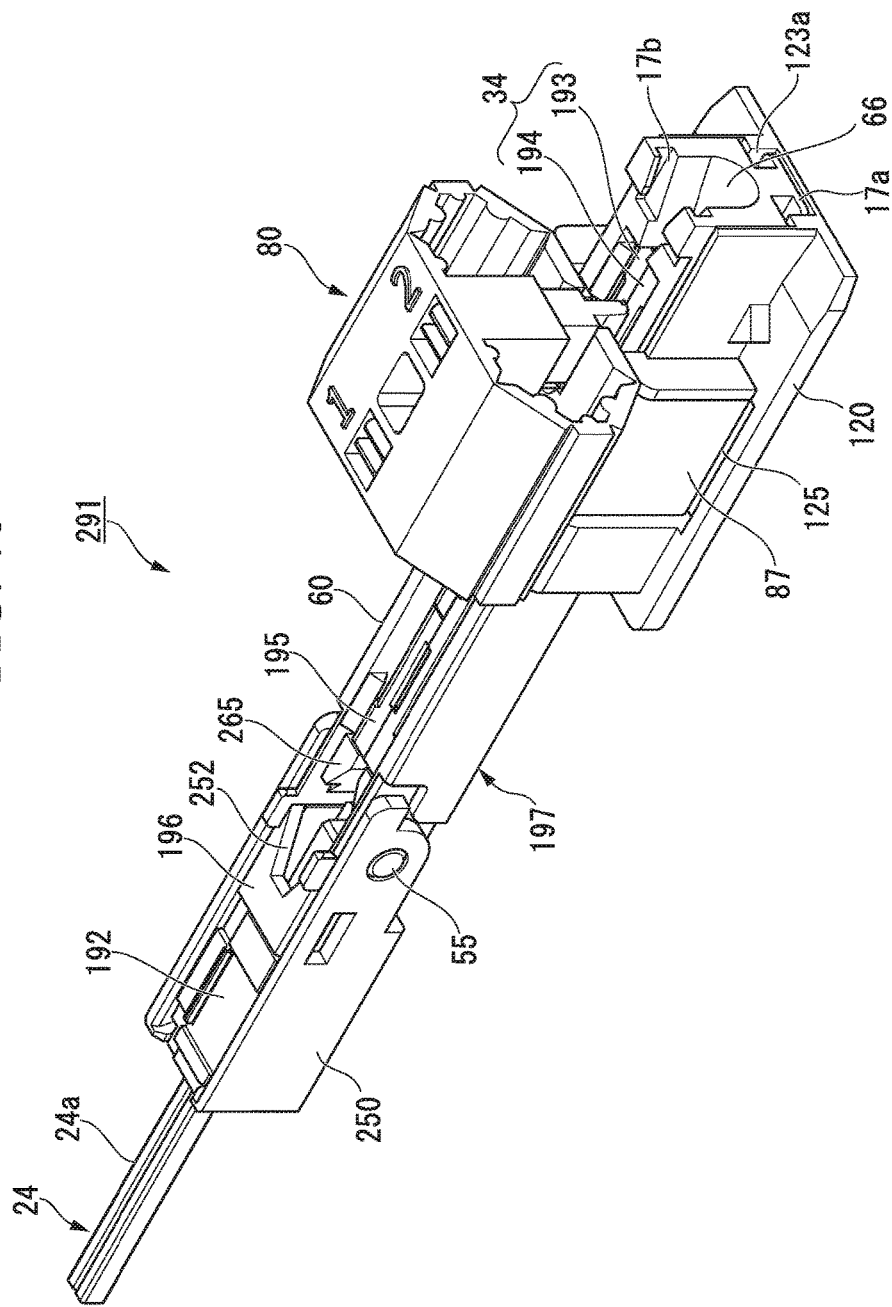
FIG. 75 is a perspective view showing an optical fiber splicing unit to which the extended optical fiber is grasped and fixed.

Next, as shown in FIG. 75, an optical fiber splicing unit 291 in which the extended optical fiber 102 is grasped and fixed to one end side of the splice 195 and a method of assembling thereof will be described.

As shown in FIGS. 66 and 67, the cable grasping member 192 grasping the optical fiber cable 24 is inserted into the grasping member holding portion 196. As shown in FIG. 69, the extended optical fiber 102 is inserted into one end side of the splice 195.

Subsequently, as shown in FIGS. 72 and 73, when the interposing members 241A and 241B are removed from the splice 195 by applying the lateral pressure P1 the interposing member driving unit 242 of the first splicing tool 240 from both right and left sides, the first clamp portion grasps and fixes the coated portion of the extended optical fiber 102 between a base portion 193 and the rear lid member 321 due to elastic action of the clamp spring 110 (particularly, first clamp spring portion 331).

As shown in FIG. 64, in the splicing tool 240 shown as an example in the drawing, as the interposing member support 243 rotates on the base 246 serving as a fulcrum point described above, the distance between the splice 195 and the first interposing member 241A that is located far from the base 246 increases in advance more than the distance between the splice and the second interposing member 241B that is located near the base 246.

Consequently, it is possible to realize time-difference removal such that removal of the first interposing member 241A from the second clamp portion is carried out before removal of the second interposing member 241B from the first clamp portion.

Furthermore, in an example shown in FIGS. 74A and 74B, when the first splicing tool 240 is removed, the restriction of the forward movement of the cable grasping member 192 which is due to the spacers 249 is released, the forward movement of the cable grasping member 192 can be carried out.

When the interposing member 241 of the first splicing tool 240 is removed from between the halved elements 193 and 194 of the splice 195 and the front-end portion of the extended optical fiber 102 is sandwiched between the halved elements 193 and 194 and thereby grasped and fixed therebetween, as a result of causing the cable grasping member 192 to further come close to one end side of the splice 195 in the longitudinal direction thereof, flexural deformation T can be formed at the portion having the coating 102b of the extended optical fiber 102 between the cable grasping member 192 and one end side of the splice 195 in the longitudinal direction thereof as shown in FIG. 74B.

In an example in the drawing, after the restriction of the forward movement of the cable grasping member 192 which is due to the spacers 249 is released by removing the first splicing tool 240, even if an operator forgets to operate the cable grasping member 192 to move forward, when the lever member 250 moves rotationally from the safety position to the regulated position, inclined faces 154a of the backward-movement restriction ends 154 (refer to FIGS. 67 and 74B) come into contact with the back-end portion 270b of the cable grasping member 192, it is possible to apply the pressing force to the cable grasping member 192 to move forward.

For this reason, it is possible to reliably form flexural deformation T at the portion having the coating 102b of the extended optical fiber 102 between the cable grasping member 192 and the splice 195.

Particularly, in an example of the drawing, since the flexural deformation T is formed after the extended optical fiber 102 is grasped and fixed by the splice 195, the elastic force which is due to the flexural deformation T does not affect the bare optical fiber 102a of the front end of the extended optical fiber 102.

However, the butting force of the optical fibers 103 and 102 can be ensured by forming the flexural deformation at the inserted optical fiber 103 between the fiber holder 90 and the splice 195.

The insertion end of the extended optical fiber 102 in the halved grasping member 34 is grasped and fixed to the splice 195, the cable grasping member 192 grasping the outer coating 113 is held by the lever member 250, and as a result, the flexural deformation T is thereby protected.

Even where a force is generated in the direction in which the extended optical fiber 102 drawn into the inside of the outer coating 113 depending on difference in linear coefficient of expansion between the outer coating 113 and the extended optical fiber 102 and variation in ambient temperature, since the foregoing flexural deformation T is formed, the applying of excessive tension to the extended optical fiber 102 is prevented, and damage to the optical fiber is prevented.

Moreover, the position of the front end of the extended optical fiber 102 that is inserted into the splice 195 in advance is important to form suitable flexural deformation between the fiber holder 90 and the splice 195 on the inserted optical fiber 103.

The lengths of both optical fibers 103 and 102 are set so that the butt-jointing of the front ends of both optical fibers 103 and 102 to each other is realized at the center of the splice 195 in the longitudinal direction thereof.

If the position of the front end of the first-insertion extended optical fiber 102 does not reach the center of the splice 195 in the longitudinal direction thereof, there is a concern that the butt-jointing of the inserted optical fiber 103 thereto may be incomplete.

Conversely, if the position of the front end of the first-insertion extended optical fiber 102 exceeds the center of the splice 195 in the longitudinal direction thereof, there is a concern that flexural deformation to be formed on the inserted optical fiber 103 excessively becomes larger when the inserted optical fiber 103 is butt-jointed thereto.

Since the position of the front end of the extended optical fiber 102 can coincide with the center of the splice 195 in the longitudinal direction thereof by use of the spacers 249, splicing operation of the optical fiber can be reliably carried out.

Since the lever member 250 that maintains the back-end portion 270b of the cable grasping member 192 and restricts the backward movement thereof includes the locking protuberances 153 that are engaged with the first splicing tool 240, it is possible to hold the lever member 250 on the standby position before the extended optical fiber 102 is grasped and fixed to the splice 195.

As a result, before completion of the operation of insertion, grasping, and fixing of the inserted optical fiber 103, it is possible to prevent the first splicing tool 240 from being mistakenly removed.

During use of the optical fiber splicing unit 191 shown in FIG. 60, in a step before insertion of the inserted optical fiber 103 into the splice 195, the extended optical fiber 102 of the optical fiber cable 24 is inserted into one end side of the splice 195, the extended optical fiber 102 is grasped and fixed to one end side of the splice 195 by removing the first splicing tool 240, and the cable grasping member 192 grasping the outer coating 113 of the optical fiber cable 24 is fixed to the grasping member holding portion 196 in the optical fiber splicing unit 291 shown as an example in the drawing.

Accordingly, damage to the optical fiber 103 drawn from the terminal of the optical fiber cable 24 is reduced, operatability of the optical fiber cable 24 in the operation of insertion, grasping, and fixing of the inserted optical fiber 103 to the splice 195 can be improved.

In the optical fiber splicing unit 291 in which the extended optical fiber 102 is grasped and fixed to one end side of the splice 195, after the inserted optical fiber 103 is inserted into the other end side of the splice 195 from the fiber introduction recess portion 66, the optical splice between the extended optical fiber 102 and the inserted optical fiber 103 is realized as a result of grasping and fixing the inserted optical fiber 103 to the other end side of the splice 195 by removing the second splicing tool 80.

Figure 88:
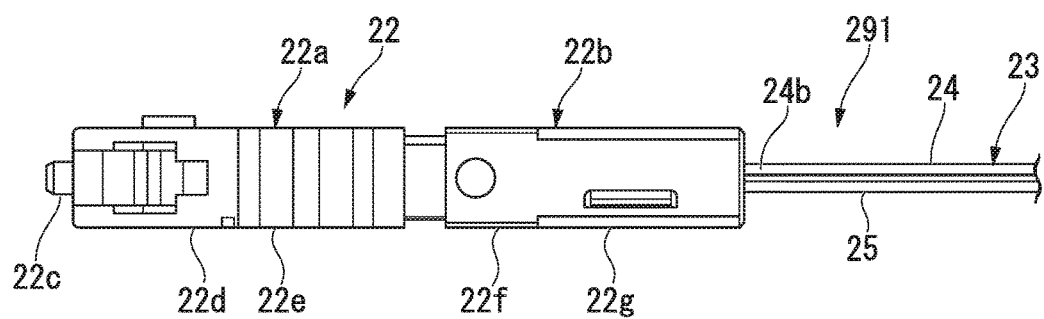
FIG. 88 is a side view showing an example of an optical connector which is attached to the optical fiber cable.

As shown in FIG. 88, a part of the optical fiber 102 which is extended from one end of the splice 195 in the longitudinal direction thereof, the optical fiber cable 24, and the optical connector 22 may be referred to as a connector-attached pigtail 23.

Particularly, in the optical fiber splicing unit 291 shown in FIG. 75, the splice 195, in which the extended optical fiber 102 is grasped and fixed to one end side of the splice 195, has a constitution in which the connector-attached pigtail 23 extends form the splice 195.

At this time, the splice 195 has the second splicing tool 80 that is attached thereto and interpose the halved grasping member 34 by interposing the interposing member 107 therebetween.

Spaces between the front lid member 323 of the splice 195 and the base member 193 and between the front lid member 323 and the base member 193 are opened against an elastic action of the clamp spring 110 by the interposing members 107A and 107B; and the interposing member is not interposed between the rear lid member 321 and the base member 193 and between the back-end portion of the middle lid member 322 and the base member 193.

Because of this, regarding the middle lid member 322, as a distance from the base member 193 thereto increases in the direction from the rear side to which the extended optical fiber 102 is grasped and fixed (left side in FIG. 78) to the front side to which the interposing member 107 is interposed (right side in FIG. 78), the middle lid member is inclined with respect to the base member 193.

The bare optical fiber 102a that is exposed at the front end of the insertion end of the extended optical fiber 102 is grasped and fixed between the base member 193 and the back-end portion of the elongated plate-shaped middle lid member 322 extending in the longitudinal direction of the base member 193, but is not grasped and fixed between the base member 193 and the portion from the back-end portion of the middle lid member 322 to the front side thereof.

Figure 82:
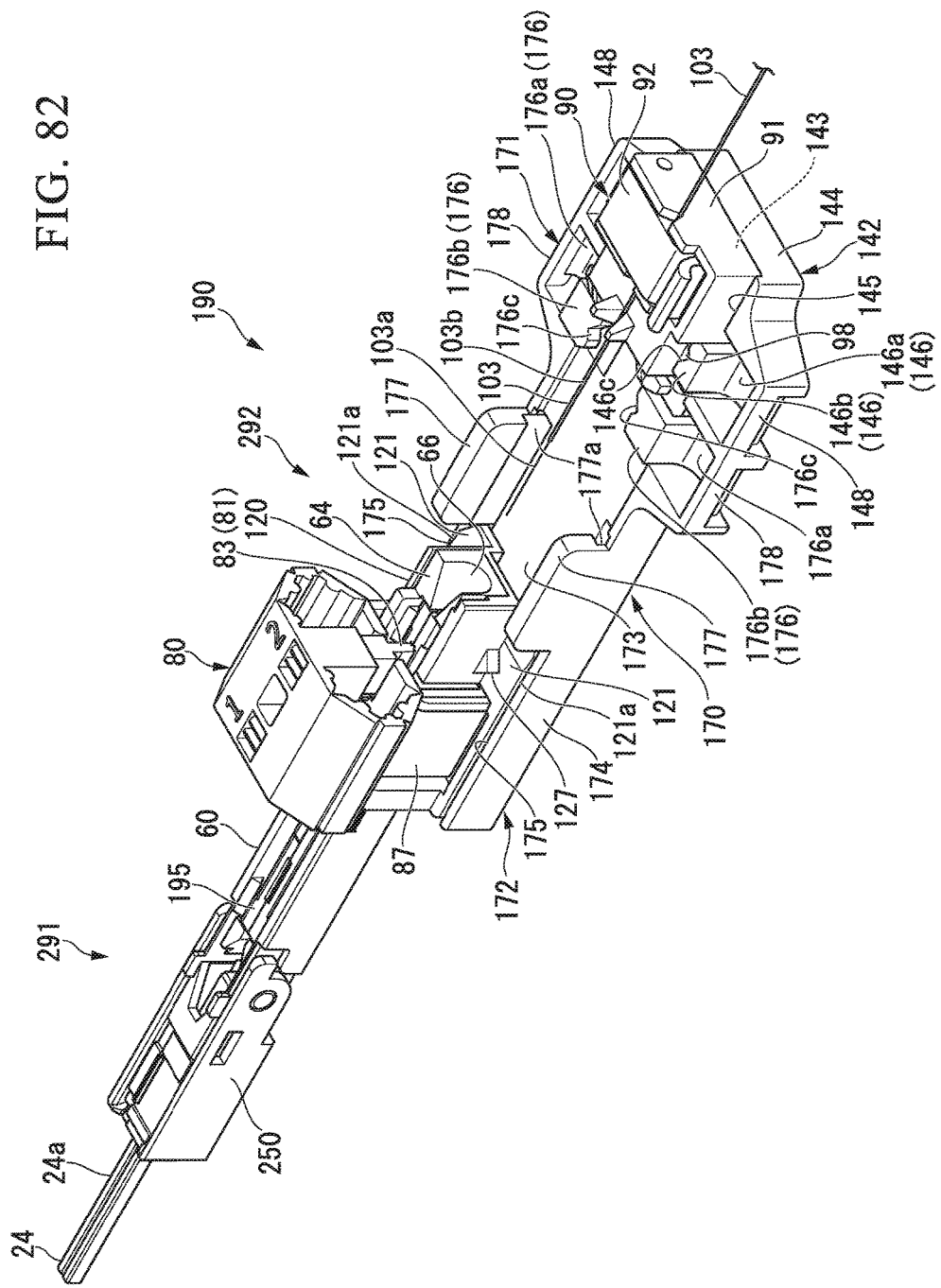
FIG. 82 is a perspective view showing an example of an optical fiber splicing device provided with the optical fiber splicing unit shown in FIG. 75.

The optical fiber splicing device 190 shown in FIG. 82 is provided with: the optical fiber splicing unit 291 that is shown in FIG. 75 and attached to one terminal 24a of an optical fiber cable 24; and a device base 292 that holds a fiber holder 90 grasping an inserted optical fiber 103 that is to be butt-jointed to an extended optical fiber 102 drawn from the terminal 24a.

Figure 83:
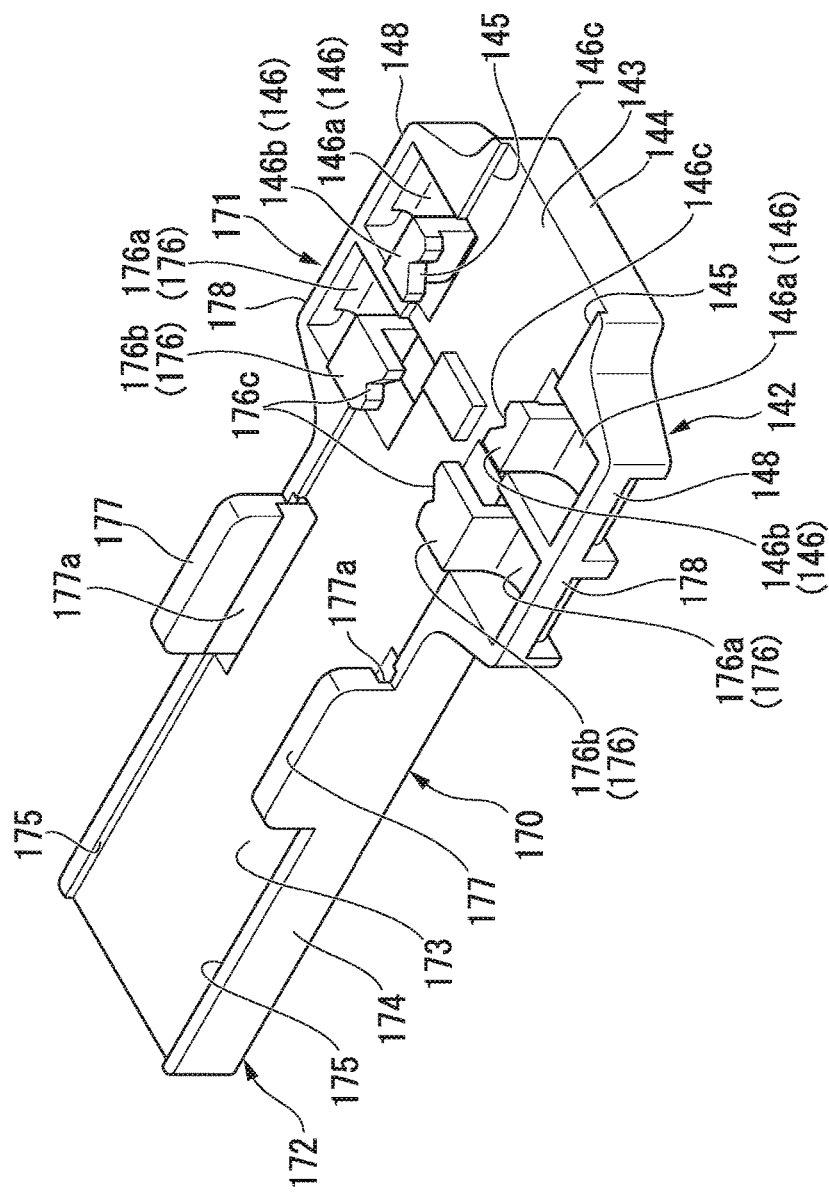
FIG. 83 is a perspective view showing a base main body of the optical fiber splicing device of FIG. 82.

As shown in FIGS. 82 and 83, a device base 292 of the optical fiber splicing device 190 holds the fiber holder 90 grasping the inserted optical fiber 103 and includes: a base 170 that is formed in a substantially tray shape; and a slider 120a that is slide-movably provided on the base 170.

The base 170 includes: a main portion 171; a first rail portion 172 that unidirectionally extends from the main portion 171; and a second rail portion 142 that extends from the main portion 171 in the opposite direction relative to the first rail portion 172.

An elastic locking end 176 that locks the slider 120a and an elastic locking end 146 that locks the fiber holder 90 are formed on the main portion 171.

The first rail portion 172 is substantially configured so that, guide wall portions 175 are provided to protrude from both side edges of a table portion 174, a slide surface 173 is formed on the table portion that allows the slider 120a to slide thereon, and the guide wall portions guide the slider 120a.

The paired guide wall portions 175 are formed to extend in the formation direction (front-back direction) of the first rail portion 172, come into contact with both side edge portions 121a of a substrate unit 121b of the slider 120a mounted on the slide surface 173, and thereby can align the position of the slider 120a in the width direction thereof.

The elastic locking end 176 is configured so that, curved-plate portions 176a protrude from projected portions 178 that are provided to protrude from both sides of the main portion 171 toward the slide surface side 173 in the width direction, plate-shaped engagement end portions 176b at which engagement recesses 176c are formed are provided at the ends of the curved-plate portions so as to protrude therefrom, and locking protrusions 127 of the slider 120a engage with the engagement recesses.

The curved-plate portions 176a are formed in a circular arc plate shape that is curved along the axis line extending in the front-back direction of the first rail portion 172.

The protuberance edges of the curved-plate portions 176a are located above the slide surface 173 that is formed on the region from the first rail portion 172 to the main portion 171.

The engagement end portions 176b protrude from the protuberance edges of the curved-plate portions 176a to the inside thereof above the slide surface 173.

The engagement recesses 176c of the engagement end portions 176b are formed in a cut-off shape and at a substantially center portion between the back and forth positions of the engagement end portions 176b, at which the protuberance edges of the engagement end portions 176b are depressed.

When the locking protrusions 127 of the slider 120a are inserted into the engagement recesses 176c and are engaged with the locking protrusions 127, the elastic locking ends 176 can restrict movement of the slider 120a in the front-back direction thereof with respect to the first rail portion 172.

In this state, the elastic locking ends 176 sandwich the slider 120a due to elastic action of the curved-plate portions 176a and thereby stably hold the slider 120a.

The elastic locking ends 176 function as a splice locking mechanism that is engaged with the slider 120a moving forward along the first rail portion 172 and restricts backward movement thereof.

Side wall portions 177 are placed upright at both side edges of the first rail portion 172.

The side wall portions 177 are formed at a part of the region of the first rail portion 172 in the length direction, and groove portions 177a that restrict upward movement of the slider 120a are formed at lower inner faces of the side wall portions 177.

The groove portions 177a are formed along the formation direction of the first rail portion 172 (front-back direction); when both side edge portions 121a of the substrate unit 121b are intruded into the groove portions, it is possible to restrict the upward movement of the slider 120a.

The second rail portion 142 is substantially configured so that, a pair of guide wall portions 145 is provided to protrude from both side edges of a table portion 144, a slide surface 143 is formed on the table portion that allows the fiber holder 90 to slide thereon, and the guide wall portions guide the fiber holder 90.

The paired guide wall portions 145 are formed to extend in the formation direction (front-back direction) of the second rail portion 142, come into contact with both side edges of the fiber holder 90 mounted on the slide surface 143, and thereby can align the position of the fiber holder 90 in the width direction thereof.

The elastic locking end 146 is configured so that, curved-plate portions 146a protrude from projected portions 148 that are provided to protrude from both sides of the main portion 141 toward the slide surface side 143 in the width direction, plate-shaped engagement end portions 146b at which engagement recesses 146c are formed are provided at the ends of the curved-plate portions so as to protrude therefrom, and locking protrusions 98 of the fiber holder 90 engage with the engagement recesses.

The curved-plate portions 146a are formed in a circular arc plate shape that is curved along the axis line extending in the front-back direction of the second rail portion 142.

The protuberance edges of the curved-plate portions 146a are located above the slide surface 143 that is formed on the region from the second rail portion 142 to the main portion 141.

The engagement end portions 146b protrude from the protuberance edges of the curved-plate portions 146a to the inside thereof above the slide surface 143.

The engagement recesses 146c of the engagement end portions 146b are formed in a cut-off shape and at a substantially center portion between the back and forth positions of the engagement end portions 146b, at which the protuberance edges of the engagement end portions 146b are depressed.

When the locking protrusions 98 of the fiber holder 90 are inserted into the engagement recesses 146c and are engaged with the locking protrusions 98, the elastic locking ends 146 can restrict movement of the fiber holder 90 in the front-back direction thereof with respect to the second rail portion 142.

In this state, the elastic locking ends 146 sandwich the fiber holder 90 due to elastic action of the curved-plate portions 146a and thereby stably hold the fiber holder 90.

The elastic locking ends 146 function as a splice locking mechanism that is engaged with the fiber holder 90 moving forward along the second rail portion 142 and restricts backward movement thereof.

Figure 65:
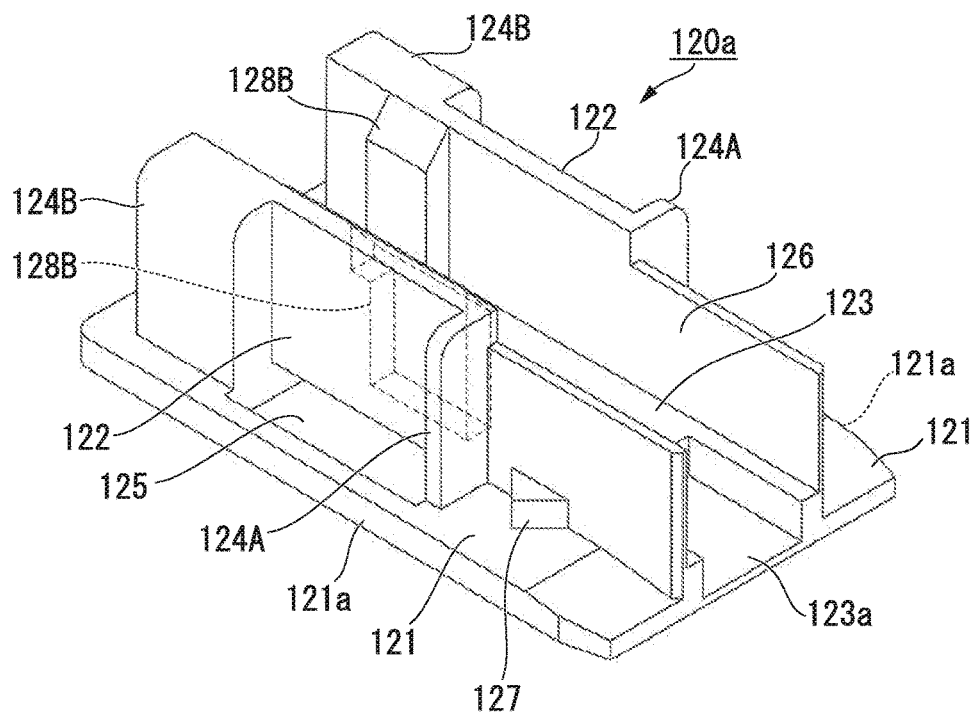
FIG. 65 is a perspective view showing an example of a slider.

As shown in FIGS. 82 and 65, the slider 120a includes: a pair of substrate unit 121b; a pair of side wall portions 122 that is placed upright at the inner edge portions thereof; and a bottom wall portion 123 formed between the side wall portions 122.

The slider 120a functions as a unit maintaining member that accommodates the optical fiber splicing unit 291 in a unit storage space 126 ensured between the side wall portions 122 and holds the optical fiber splicing unit 191.

Figure 86:
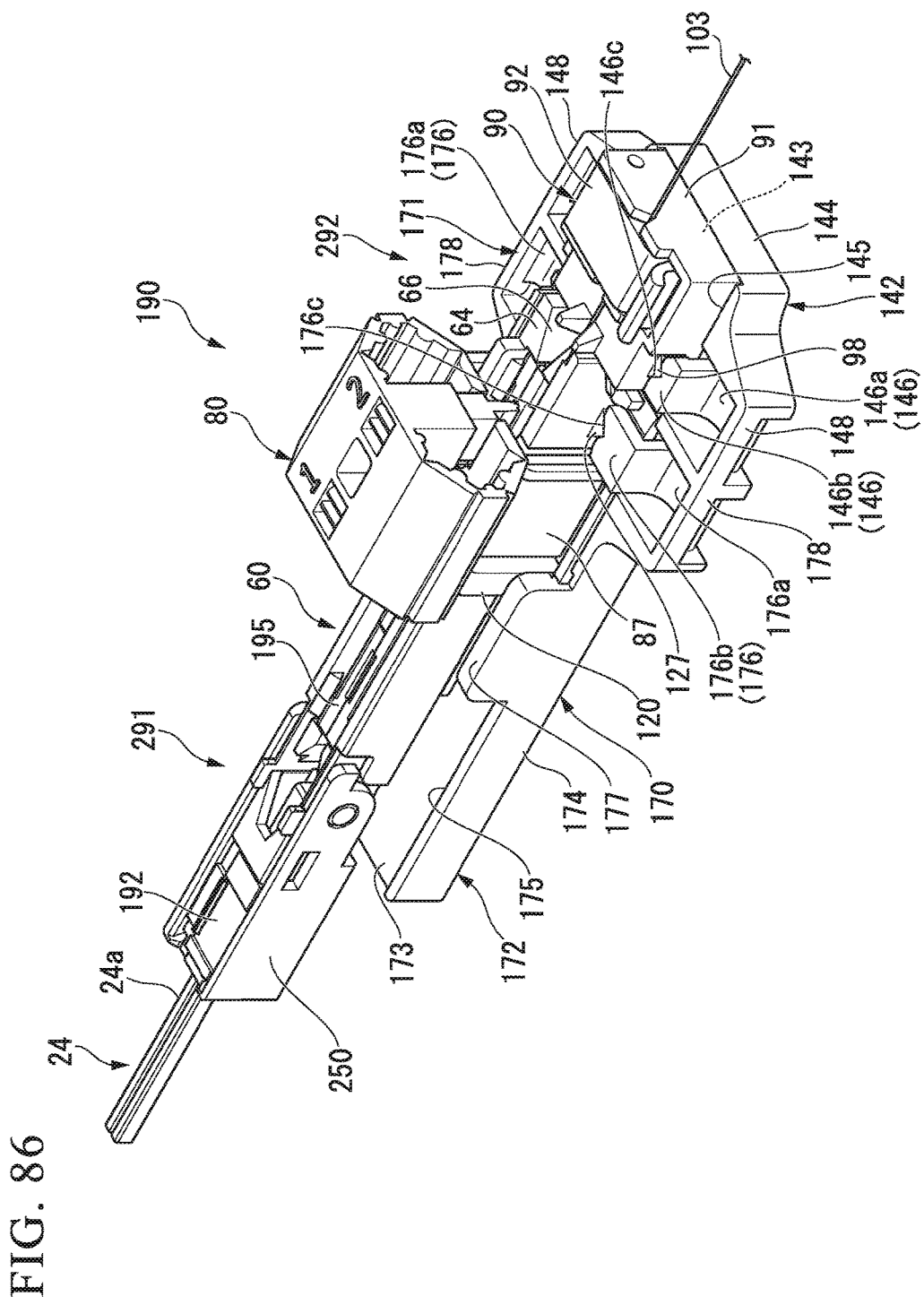
FIG. 86 is a perspective view illustrating operation of the optical fiber splicing device of FIG. 82.

The slider 120a and the optical fiber splicing unit 191 held thereby constitute a movement unit that can slide on the first rail portion 172 (refer to FIGS. 60, 82, and 86).

A paired positioning protuberance portions 124A and 124B are formed on the outer face of the side wall portions 122 at a distance in the back and forth direction.

The engagement wall portion 87 of the second splicing tool 80 is disposed between the positioning protuberance portions 124A and 124B, and the positioning protuberance portions 124A and 124B determine the position of the engagement wall portion 87 in the front-back direction thereof.

The locking protrusion 127 is provided on the outside surface of the side wall portion 122 and at the position in front of the positioning protuberance portion 124A so as to protrude outward therefrom, and the locking protrusion engages with an engagement recess 176c of the elastic locking end 176 of the base 170.

The shape of the locking protrusion 127 when seen in a plan view is preferably a tapered shape (for example, triangular shape, refer to FIG. 65) having the length in the back and forth direction where the length thereof increases in the direction from the protuberance edge to the base end side.

A long hole 125 into which the engagement wall portion 87 is to be inserted is formed on the substrate unit 121b.

As shown in FIG. 79, the second splicing tool 80 causes a pair of engagement wall portions 87 to be inserted into the long holes 125, causes the protruding claws 87a of the protruding ends of the engagement wall portions 87 to engage with the bottom ends of the side wall portion 122, and is thereby attached to the splice holder portion 60 and the slider 120a.

As the second splicing tool 80 is attached to the splice holder portion 60 and the slider 120a, the movement of the splice holder portion 60 in the front-back direction is restricted with respect to the slider 120a, and the splice holder portion is in a state of being positioned thereto.

As shown in FIG. 61, both protruding wall portions 262 and 263 of the splice holder portion 60 includes engagement recesses 68A and 68B that are engaged with positioning protuberance portions 128A and 128B, respectively, where the positioning protuberance portions are formed on the inner face of both side wall portions 122 of the slider 120a.

In an example of the drawing, engagement recesses 68A and 68B are cut-off portions such that the entire protruding wall portions 262 and 263 in thickness direction are removed, they are not particularly limited thereto, they may be recess portions such that the thicknesses of the protruding wall portions 262 and 263 are removed from the outer surfaces thereof.

Figure 84:
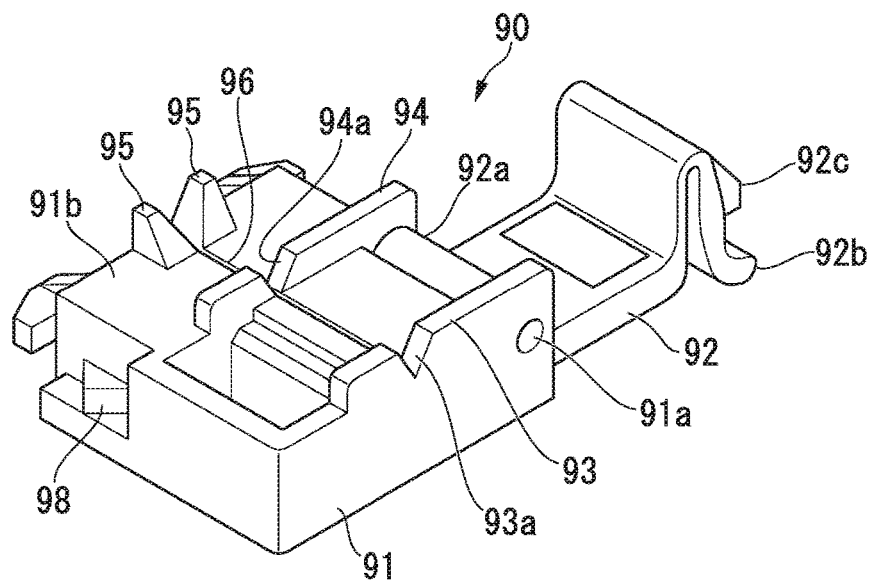
FIG. 84 is a perspective view showing an example of a fiber holder.
Figure 85:
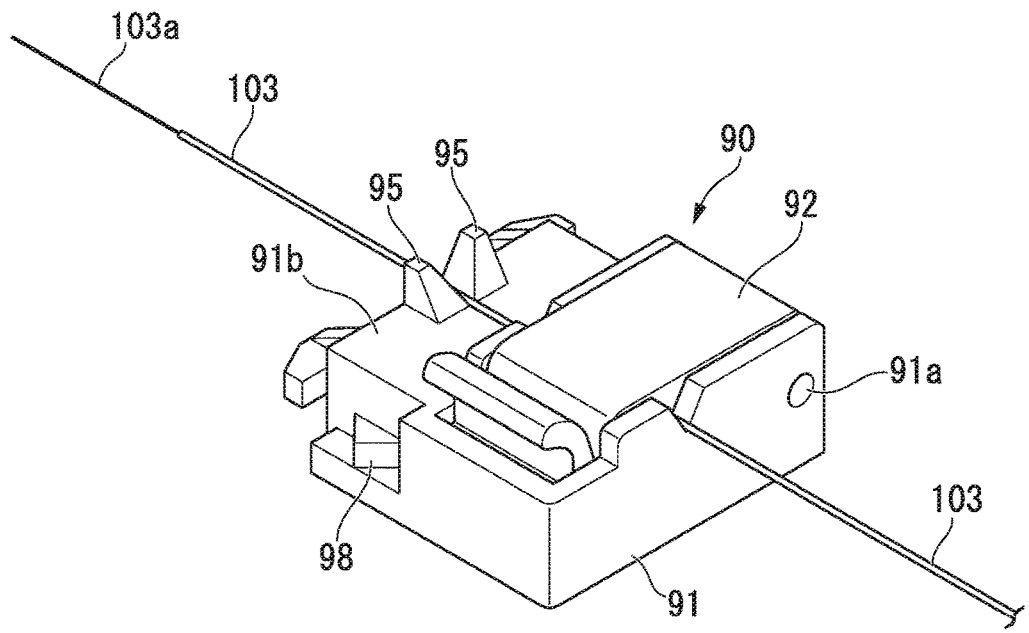
FIG. 85 is a perspective view illustrating operation of the fiber holder shown in FIG. 84.

As shown in FIGS. 84 and 85, the optical fiber holder 90 is a holder holding the optical fiber, has a base 91 and a lid 92 that is rotatably coupled to the base 91 via a hinge portion 91a, and can grasp and fix the inserted optical fiber 103 on the base 91 with the lid 92 by pushing it against the base 91.

A first holding wall portion 93 that has a positioning recess portion 93a in which the inserted optical fiber 103 is accommodated, a second holding wall portion 94 that has a positioning recess portion 94a, and a pair of positioning protuberances 95 are formed on the upper surface 91b of the base 91.

The second holding wall portion 94 is formed separately from the first holding wall portion 93 in front of the first holding wall portion 93, and the positioning protuberance 95 is formed separately from the second holding wall portion 94 in front of the second holding wall portion 94.

A linear positioning groove 96 that passes from the positioning recess portion 93a through the positioning recess portion 94a and passes between the pair of positioning protuberances 95 is formed on the upper surface of the base 91.

The positioning groove 96 is a groove portion used for positioning the inserted optical fiber 103 and may be formed in, for example, a substantially V-shape, a substantially U-shape, a semicircular shape, or the like in the cross-sectional face thereof.

The locking protrusion 98 is provided on the outside surface of the base 91 so as to protrude therefrom, and the locking protrusion engages with an engagement recess 146c of the elastic locking end 146 of the base 170 (refer to FIGS. 82 and 85).

The shape of the locking protrusion 98 when seen in a plan view is preferably a tapered shape (for example, triangular shape) having the length in the back and forth direction where the length thereof increases in the direction from the protuberance edge to the base end side.

As shown in FIG. 85, in a state where the upper surface 91b of the base 91 is covered with the lid 92 (closed state), the lid 92 is disposed between the holding wall portions 93 and 94.

A locking protuberance 92c is formed at a front-end portion 92b that is located at an end portion on the opposite side of the base end 92a at which the hinge portion 91a of the lid 92 is provided, and this locking protuberance is detachably fitted into and engaged with a locking recess portion (not shown in the figure) that is formed at the base 91.

In a state where the upper surface 91b of the base 91 is covered with the lid (closed state), as a result of engaging the locking protuberance 92c with the locking recess portion (not shown in the figure) of the base 91, the base 91 can grasp and fix the inserted optical fiber 103 by pushing it against the base.

As shown in FIG. 88, as the optical connector 22, a connector may be used including a structure that is provided with, for example, a connector body 22a and a fastening mechanism 22b that fastens the optical fiber cable 24 to the connector body 22a.

The connector body 22a is provided with a housing 22d that accommodates an optical ferrule 22c (hereinbelow, may be simply referred to as a ferrule) and a finger grip 22e that is attached to the outside of the housing 22d.

A splicing mechanism (not shown in the figure) is provided inside the housing 22d, and the splicing mechanism causes, for example, a built-in optical fiber of the ferrule 22c to splice the optical fiber that is drawn from the optical fiber cable 24 by butt-jointing connection or the like.

The fastening mechanism 22f is provided with a body unit (not shown in the figure), a cable grasping portion (not shown in the figure) that grasps the terminal 24b of the optical fiber cable 24, and a fastening cover 22g that fastens the cable grasping portion.

As a structure of the connector body 22a, for example, SC-type optical connector (refer to JIS C 5973), LC-type optical connector (registered trademark, Lucent Technologies, Inc.), MU-type optical connector (refer to JIS C 5983), SC2-type optical connector (structure in which a finger grip is removed from SC-type optical connector), or the like may be adopted.

Next, an operation of splicing (optical splice) the extended optical fiber 102 to the inserted optical fiber 103 (method of splicing optical fiber) by use of the optical fiber splicing device 190 will be described.

As shown in FIGS. 84 and 85, the inserted optical fiber 103 is disposed inside the positioning groove 96 of the base 91, is pressed against the base 91 by the lid 92, and thereby grasped and fixed thereto.

The inserted optical fiber 103 having the protruding length that is ensured in the predetermined anterior direction is fixed to the fiber holder 90.

As shown in FIG. 82, in a state where the bare optical fiber 103a is exposed by removing the coating of the front end of the portion that protrudes forward from the fiber holder 90, the inserted optical fiber 103 is inserted into the splice 195 held by the splice holder portion 60 of the optical fiber splicing unit 291 and is used for a butt-jointing connection with respect to the extended optical fiber 102.

As a result of making the protruding length of the inserted optical fiber 103 from the fiber holder 90 slightly longer than the distance from this to the bare optical fiber 102a of the extended optical fiber 102 in the splice 195, a butting force between the bare optical fibers 103a and 102a which is due to elastic action of flexion formed at the inserted optical fiber 103 is ensured, and it is possible to butt-joint the bare optical fibers 103a and 102a to each other.

The fiber holder 90 is mounted on the slide surface 143 of the second rail portion 142 of the base 170, and the locking protrusion 98 is engaged with the engagement recess 146c of the elastic locking end 146.

Accordingly, the fiber holder 90 is sandwiched between the elastic locking ends 146 in a state of being stably held and positioned on the slide surface 143.

As shown in FIG. 82, the optical fiber splicing unit 291 and the slider 120a accommodating this are mounted on the slide surface 173 of the first rail portion 172 of the base 170.

The slider 120a causes both side edge portions 121a of the substrate unit 121b to come into contact with the guide wall portions 175 of both sides of the first rail portion 172 in the width direction, and the positions thereof in the width direction are determined.

the slider 120a on the first rail portion 172 moves toward the fiber holder 90.

In the movement of the optical fiber splicing unit 291 and the slider 120a, as both side edge portions 121a of the substrate unit 121b are inserted into the groove portions 177a formed on the inner surface of the side wall portions 177, upward movement of the slider 120a is restricted, and precise positioning with respect to the inserted optical fiber 103 is thereby realized.

Due to the forward movement of the optical fiber splicing unit 291, the inserted optical fiber 103 can be inserted into the coated-portion insertion grooves 193d and 323b of the splice 195 through the fiber introduction recess portion 66 that opens at the front end of the splice holder portion 60.

The bare optical fiber 103a, that is exposed at the front end of the inserted optical fiber 103, is inserted into the alignment groove 193b through the coated-portion insertion grooves 193d and 323b and can be brought into contact with the front end of the bare optical fiber 102a of the extended optical fiber 102.

As shown in FIG. 86, when the optical fiber splicing unit 291 and the slider 120a further move forward, the locking protrusion 127 is engaged with the engagement recess 176c of the elastic locking end 176.

Consequently, the fiber holder 90 is sandwiched between the elastic locking ends 146 in a state of being stably held and positioned on the slide surface 143.

The positions of the optical fiber splicing unit 291 and the slider 120a are referred to as the forward-movement limit positions.

When the optical fiber splicing unit 291 reaches the forward-movement limit position, the bare optical fiber 103a that is inserted into the alignment groove 193b of the splice 195 is brought into contact with the front end of the bare optical fiber 102a of the extended optical fiber 102, and the coated portion thereof is inserted into the coated-portion insertion grooves 193d and 323b.

Flexion occurs at the inserted optical fiber 103, due to elastic action thereof, the butting force generated between the bare optical fibers 103a and 102a is ensured, and the bare optical fibers 103a and 102a can be butt-jointed to each other.

Next, as shown in FIG. 79, a lateral pressure P is applied to the interposing member driving unit 82 of the second splicing tool 80 from the right and left sides, and the interposing members 107A and 107B are thereby removed from the splice 195.

When the interposing members 107A and 107B are removed from the splice 195, due to elastic action of the clamp spring 110 (particularly, second clamp spring portion 332), the second clamp portion of the splice 195 grasps and fixes the bare optical fibers 103a and 102a between the base 193 and the middle lid member 322 in a state of being butt-jointed to each other.

Additionally, due to elastic action of the clamp spring 110 (particularly, third clamp spring portion 333), the third clamp portion grasps and fixes the coated portion of the inserted optical fiber 103 between the base 193 and the front lid member 323.

Consequently, the operation of butt-jointing connection (optical splice) between the extended optical fiber 102 and the inserted optical fiber 103 in the splice 195 is completed.

As a result of grasping and fixing the extended optical fiber 102 and the inserted optical fiber 103, in which the splicing operation is completed, to the halved grasping member 34 of the splice 195, a state where the bare optical fibers 103a and 102a are butt-jointed to each other is stably maintained.

As has been described, the second splicing tool 80 deforms the interposing member driving unit 82 by the lateral pressure P applied thereto from the right and left thereof, causes the separation distance between the pressure-receiving wall portion 86 and the locking wall portion 85 of the interposing member driving unit 82 to increase, and can remove the interposing members 107A and 107B from the splice 195.

As shown in FIG. 79, each of the drive-part side wall portions 88 at right and left sides of the interposing member driving unit 82 of the second splicing tool 80 connects the pressure-receiving wall portion 86 to the locking wall portion 85, the drive-part side wall portion is configured by three plate parts 88a, the three plate parts are arranged in the circumferential direction of the interposing member driving unit 82 with thin portions 88b interposed therebetween.

Furthermore, via the thin portions 88b, the drive-part side wall portions 88 and the pressure-receiving wall portion 86 are connected and the drive-part side wall portions 88 and the locking wall portion 85 are connected.

Particularly, each of the plate parts 88a including the locking wall portion 85, the pressure-receiving wall portion 86, and the drive-part side wall portion 88, is formed in an elongated plate shape that extends in the axis direction of the sleeve-shaped interposing member driving unit 82.

The lateral pressure P causing the interposing member driving unit 82 to be deformed affects at the portion at which the distance of overhanging at the right and left sides is maximum in both drive-part side wall portions 88 at the right and left sides where the central axis line Q of the interposing member driving unit 82 is interposed between the sides, i.e., at the center plate part 88a between the plate parts 88a at both sides of the three plate parts 88a in the circumferential direction of the interposing member driving unit 82 where the three plate parts constitute each drive-part side wall portion 88.

Hereinafter, the central plate part 88a is also referred to as a pressing plate portion.

Additionally, the pressing plate portion is labeled by reference numeral 88c in the drawings.

The interposing member driving unit 82 applies the lateral pressure P from the right and left sides thereof to the right and left pressing plate portions 88c, reduces the separation distance between of the right and left pressing plate portions 88c, as a result, causes the thin portion 88b to be deformed and to serve as a hinge portion; therefore, the separation distance between the pressure-receiving wall portion 86 and the locking wall portion 85 increases.

Figure 81:
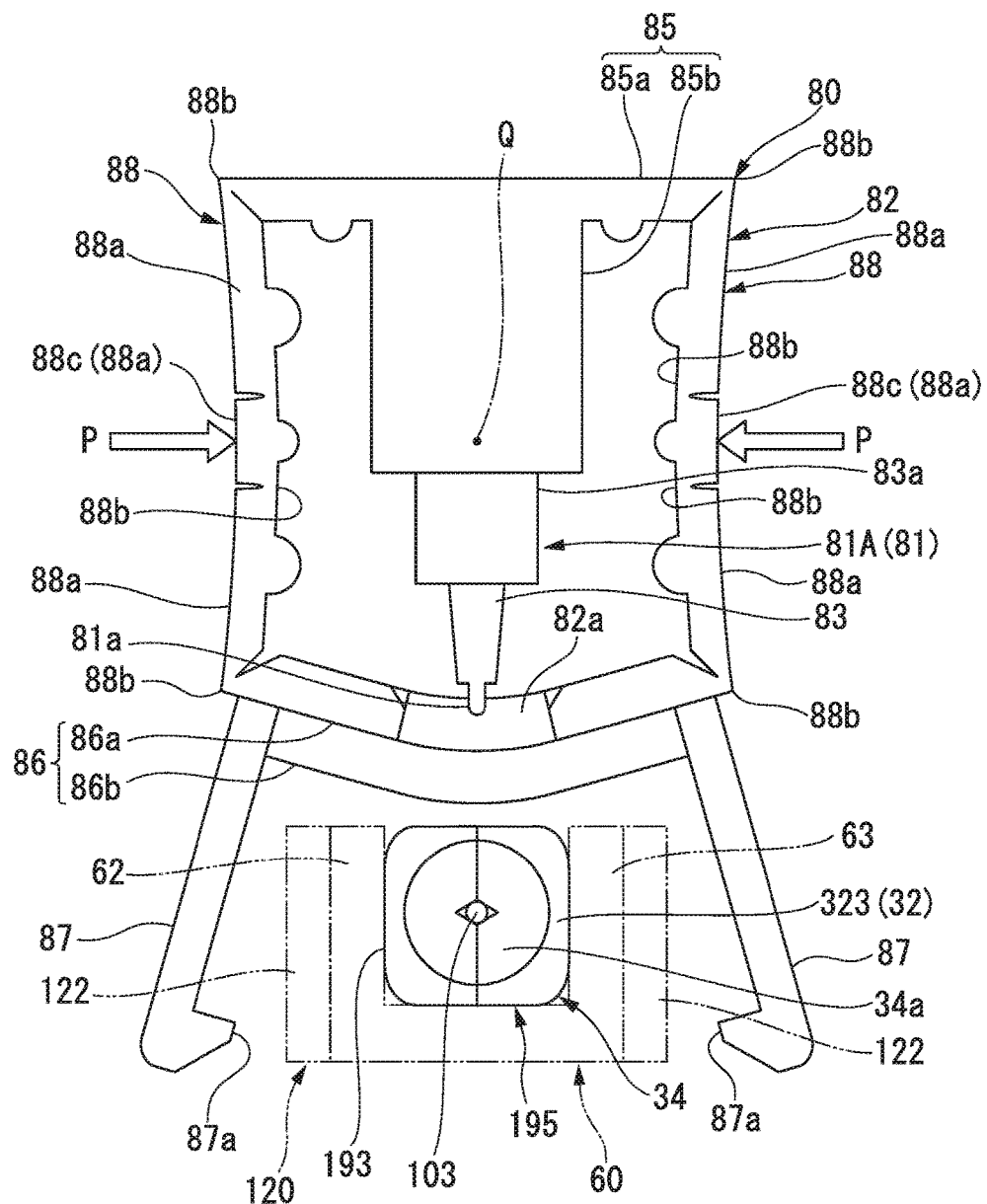
FIG. 81 is a cross-sectional view showing a state where the second interposing member is removed from the halved elements of the mechanical splice.

Additionally, as shown in FIG. 81, even after the separation distance between the pressure-receiving wall portion 86 and the locking wall portion 85 becomes maximum as a result of affecting the lateral pressure P applied from the right and left sides, the interposing member driving unit 82 proceeds the deformation of the interposing member driving unit 82 which is due to the lateral pressure P; therefore, the right and left drive-part side wall portions 88 is deformed in a substantially bow shape that is the position coming closest to the central axis line Q of the pressing plate portion 88c.

Consequently, the interposing member driving unit 82 is deformed in a circular arc plate shape such that the center portion of the pressure-receiving wall portion 86 is located at the outside of the interposing member driving unit 82 and outer than both ends in the circumferential direction of the interposing member driving unit 82.

As a result, in the second splicing tool 80, the relative directions of the paired engagement wall portions 87 varied so that the distance between the ends thereof (protuberance edges) increases in accordance with the deformation of the pressure-receiving wall portion 86, engagement with respect to the side wall portions 122 of the pair of engagement wall portions 87 is released.

When the engagement with respect to the side wall portions 122 of the pair of engagement wall portions 87 is released, the second splicing tool 80 can be easily removed.

As shown in FIG. 80, in the second splicing tool 80 shown as an example in the drawing, when the contact walls 83a of the interposing members 107A and 107B come into contact with the locking wall portion 85 (particularly, the protuberance edges of the protruding wall portions 85b), the separation distances c1 and c2 between the engagement claw 84a of the engagement end 84 of the interposing member 107 and the locking wall portion 85 of the interposing member driving unit 82 (particularly, a step-difference face 85e) are not the same as each other but are different from each other.

In the second splicing tool 80 shown as an example in the drawing, the separation distance c1 of the first interposing member 107A that is inserted into the second clamp portion of the splice 195 is shorter than the separation distance c2 of the second interposing member 107B that is inserted into the third clamp portion.

Consequently, when the second splicing tool 80 is deformed by the lateral pressure P applied from the right and left of the interposing member driving unit 82, after the first interposing member 107A is removed from the second clamp portion of the splice 195, removal of the second interposing member 107B from the third clamp portion is completed.

The second splicing tool 80 realizes time-difference removal such that removal of the first interposing member 107A from the second clamp portion is carried out before removal of the second interposing member 107B from the third clamp portion.

After the splicing operation of the extended optical fiber 102 and the inserted optical fiber 103 is completed, the entire optical fiber splicing unit in which the optical fibers are connected can be used in a state of being removed from the device base 292.

Specifically, after the optical fiber splicing unit and the slider 120a is removed from the base 170, the optical fiber splicing unit can be used in a state of being removed from the slider 120a.

The extended optical fiber 102 can be connected to the other optical fiber through the connector by use of the optical connector 22.

Because of this, the inserted optical fiber 103 and another connector-attached optical fiber can be optically spliced to each other through the extended optical fiber 102.

Figure 89:
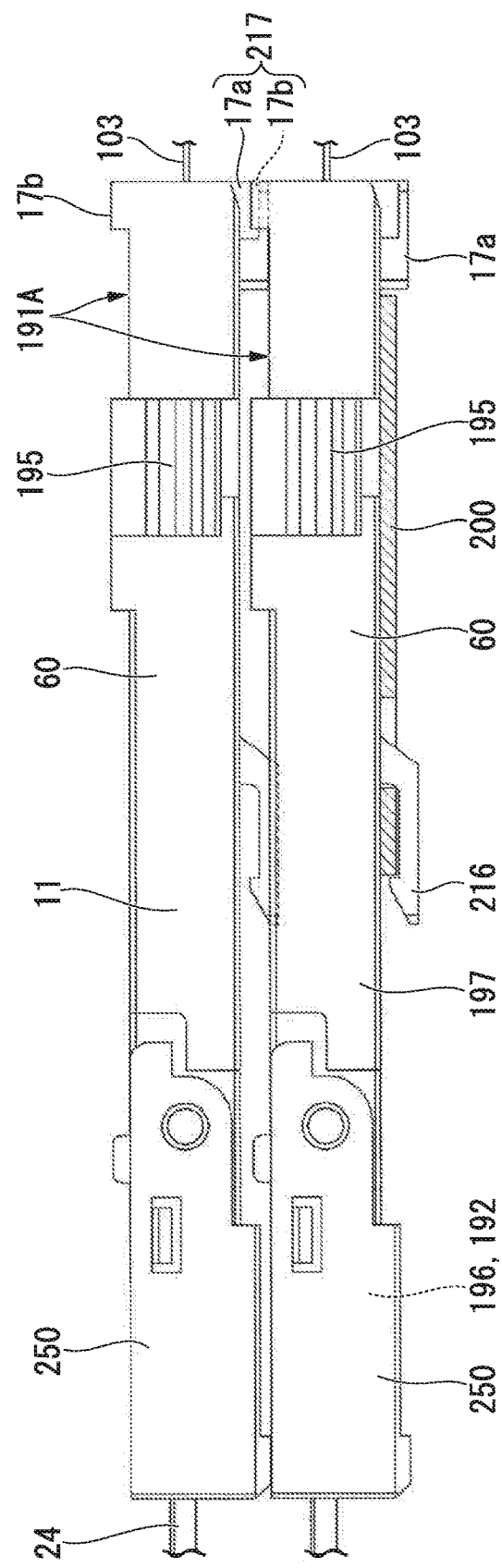
FIG. 89 is a side view showing an example of an optical fiber splicing unit installed state after the extended optical fiber is connected to an inserted optical fiber.

FIG. 89 shows an installation example of the optical fiber splicing units in which a splicing operation of the inserted optical fiber 103 thereto was carried out.

The optical fiber splicing units (represented as reference numeral 191A in FIG. 89) that were subjected to the splicing operation have a constitution in which the splicing tools 240 and 80 or the slider 120a are removed and the lever member 250 covers the cable grasping member 192 at the regulated position shown in FIG. 70.

Engaging engagement claws 216 are provided to protrude from the lower portion of the unit base 197, the engaging engagement claws are engaged with an plate portion 200 that is a part of an optical splice box, and therefore the installation of the optical fiber splicing units 191A is easy.

Additionally, as shown in FIG. 60, the unit base 197 has an engagement projected portion 17a under a forward-end portion thereof and an engagement recess 17b above the forward-end portion thereof.

As shown in FIG. 89, as a connection portion 217 is configured by engaging the engagement projected portion 17a of the upper-side unit 191A with the engagement recess 17b of the lower-side unit 191A, a plurality of units 191A can be integrated in a state of stacked in the vertical direction thereof in any plural number of stages, and it is advantageous to promotion of streamlining installation operation and to space-saving.

As shown in FIGS. 60, 65, or the like, in the optical fiber splicing units 191 and 291 that are before completion of the splicing operation, the engagement projected portion 17a formed under the unit base 197 can be accommodated in an accommodating recess 123a formed at a bottom wall portion 123 of the slider 120a.

An example of use of the optical fiber splicing unit 191A will be described.

The inserted optical fiber 103 that is drawn from the optical fiber cable is spliced to the extended optical fiber 102 by use of the above-described splicing method.

The optical fiber cable is, for example, an optical fiber cable or the like trunk that is installed in a vertical hole (for example, a hoistway used for an elevator) provided at each floor of a construction including a plurality of floors.

The optical fiber splicing unit 191A to which the inserted optical fiber 103 is spliced is stored in an optical fiber splicing box (for example, referred to as an optical termination box or the like), if required, the optical connector 22 is spliced to the other optical fiber (not shown in the figure) through the connector, and therefore, it is possible to optically splice the inserted optical fiber 103 to another connector-attached optical fiber (not shown in the figure).

The other optical fiber (not shown in the figure) of the optical fiber splicing unit 191A which is to be spliced is not particularly limited, and may be indoor optical fibers, optical fibers that are provided in an optical composite electronic device, or the like.

In the optical fiber splicing unit 191, since the splice holder portion 60 and the cable grasping member 192 are integrated, the position of the terminal 24a of the optical fiber cable 24 relative to the splice 195 is always constant.

Consequently, during an operation of accommodating optical fibers to the optical fiber splicing box or the like, excessive force is not applied to the optical fiber 102 between the terminal 24a and the splice 195, and it is possible to prevent damage thereto.

Therefore, excellent operatability is realized.

Moreover, the optical fiber splicing unit 191 has a simple structure and can be reduced in size, therefore, is accommodated in an optical joint box (optical termination box or the like) and can be used without modification.

In the optical fiber splicing unit 191, since both the splice holder portion 60 and the cable grasping member 192 are provided on the upper surface side of the unit base 197, the structure is simple and can be reduced in size.

In addition, since the splice holder portion 60, the cable grasping member 192, and the optical fiber 102 are less easily affected by external force that is applied from the lower face side of the unit base 197, it is possible to increase the durability thereof.

The optical fiber splicing unit 191 can efficiently and simply realize splicing of the optical fibers to each other (the inserted optical fiber 103 is spliced to the extended optical fiber 102) by use of the mechanical splice.

Furthermore, the optical fiber splicing unit 191 realizes a structure simpler than that of the optical fiber splicing tool disclosed in Japanese Unexamined Patent Application, First Publication No. 2010-145951 as has been described and can easily be realized at a low cost.

Moreover, since the optical fiber splicing unit 191 can be easily reduced in size, it is advantageous to insertion into a little space, and it can be widely applied to a work operation of splicing the extended optical fiber 102 to the optical fiber (inserted optical fiber 103) or a work operation (optical fiber relay-splicing method) of splicing optical fibers through the extended optical fiber 102.

Additionally, in a constitution in which the interposing member 107 of the second splicing tool 80 as has been described is adopted as the interposing member of the interposing-member-attached splice, the sleeve-shaped interposing member driving unit 82 of the second splicing tool 80 is deformed due to the lateral pressure P applied from both sides thereof, and removal of the interposing member 107 from the splice 195 can be realized; therefore, an operation of removing the interposing member from the splice 195 can be realized by only ensuring a slight space on the second splicing tool 80.

Particularly, a slight space is ensured on the second splicing tool 80 in the case of adopting the second splicing tool 80 as compared with, for example, the case of adopting a constitution as an interposing member which is removed from the splice 195 by directly pulling the interposing member by an operator with fingers in the direction in which this is separated from the splice 195.

This means that it is advantageous to use of the optical fiber splicing unit 191 which is inserted into a little space and is used for splicing the extended optical fiber 102 to the inserted optical fiber 103.

In other cases, as the interposing member of the interposing-member-attached splice, a constitution may be adopted which is removed from the splice 195 by directly pulling the interposing member by an operator with fingers in the direction in which this is separated from the splice 195.

As the interposing member including this configuration, an interposing member may be adopted in which a removal grasping portion is provided on the portion protruding from the splice 195 at, for example, the base end side on the opposite side of the front-end side interposing-end portion interposed between the base member 193 of the splice 195 and the press lid 194; and the removal grasping portion is used for operation of pulling the interposing member in the direction in which this is separated from the splice 195 while an operator grasps this with fingers.

As the removal grasping portion, for example, a protuberance or the like may be adopted which protrudes in a direction perpendicular to the extending direction of the interposing-member main body and is provided at the base end of the interposing-member main body extending toward the base end side that protrudes from the front-end side interposing-end portion to the outside of the splice 195.

In the aforementioned splicing method, after the inserted optical fiber 103 is positioned with respect to the base 170, splicing of the optical fiber 102 and the inserted optical fiber 103 is carried out by causing the optical fiber splicing unit 191 to come close to the inserted optical fiber 103. In the invention, conversely, after the optical fiber 102 is positioned with respect to the base 170, splicing of the optical fiber 102 and the inserted optical fiber 103 can also be carried out by causing the fiber holder 90 to slide in the direction in which this approaches the optical fiber 102 on the second rail portion 142.

Particularly, a method may be adopted in which, after the optical fiber splicing unit 191 and the slider 120a move forward to the forward-movement limit position, the fiber holder 90 slides on the second rail portion 142 in the direction in which the fiber holder approaches the optical fiber splicing unit 191.

Sixth Embodiment

Hereinbelow, a sixth embodiment of the invention of the invention will be described with reference to drawings.

Figure 90:
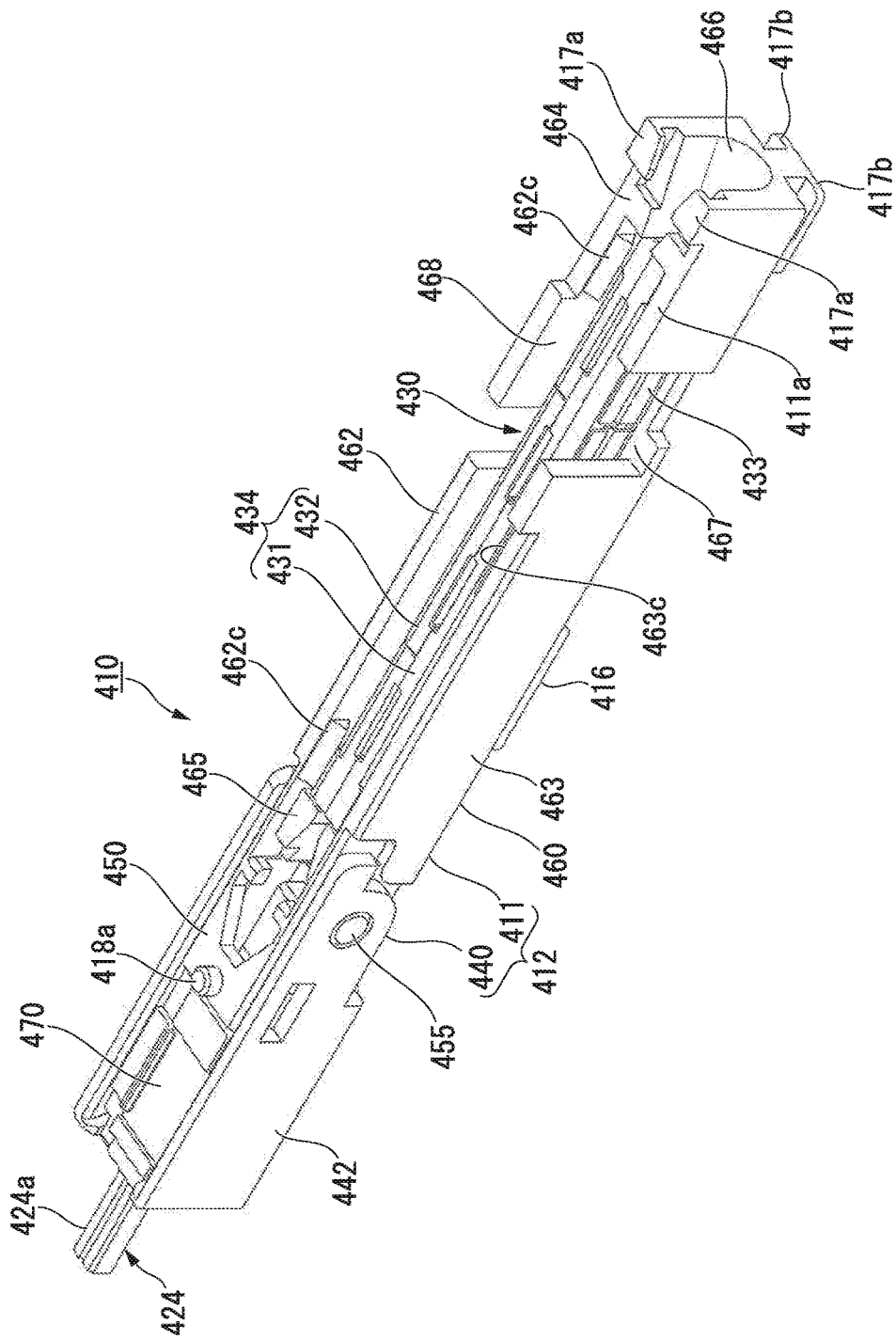
FIG. 90 is a perspective view showing an optical fiber splicing unit of an embodiment of the invention.
Figure 91:
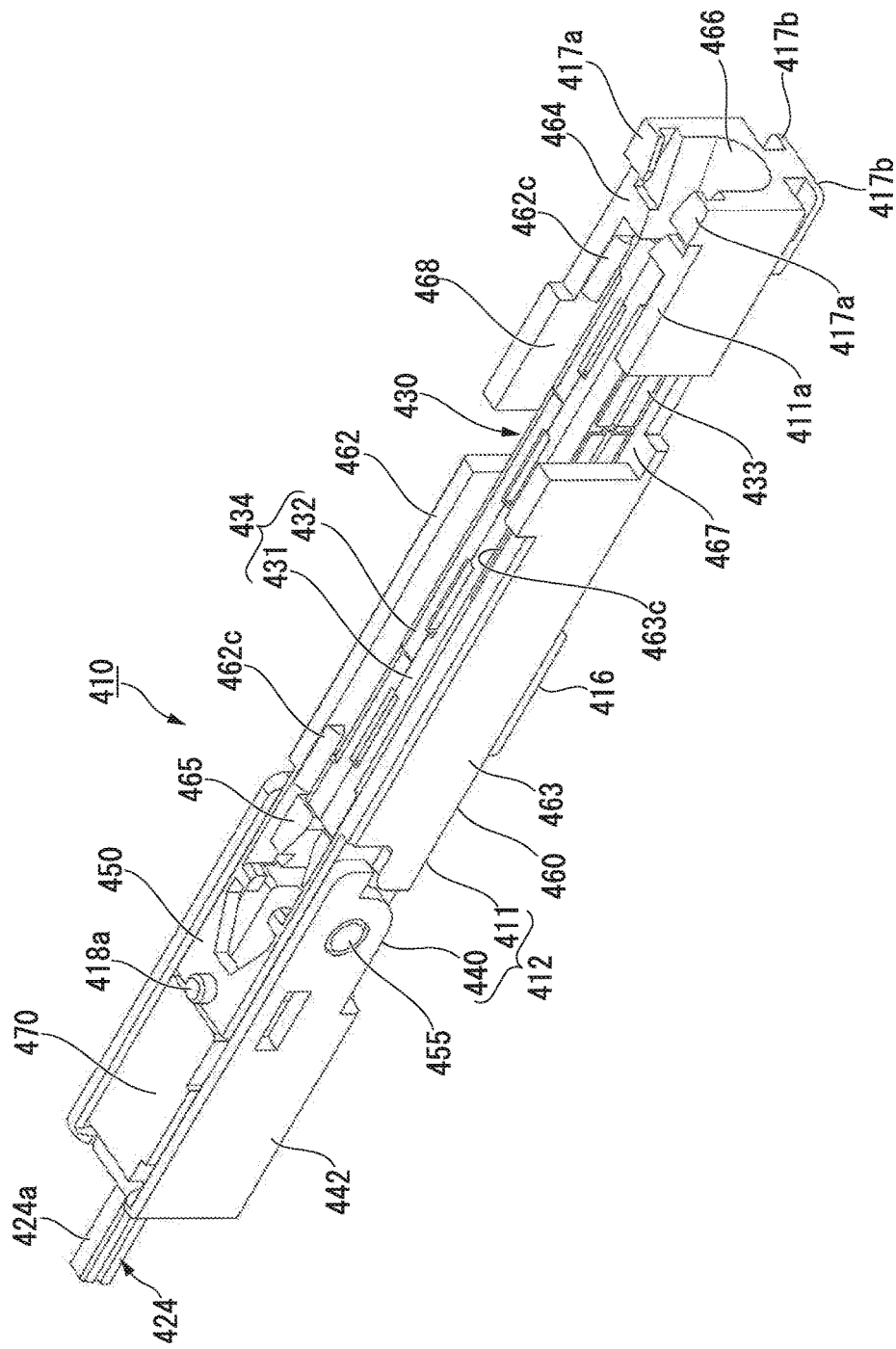
FIG. 91 is a perspective view showing an optical fiber splicing unit of an embodiment of the invention.
Figure 92:
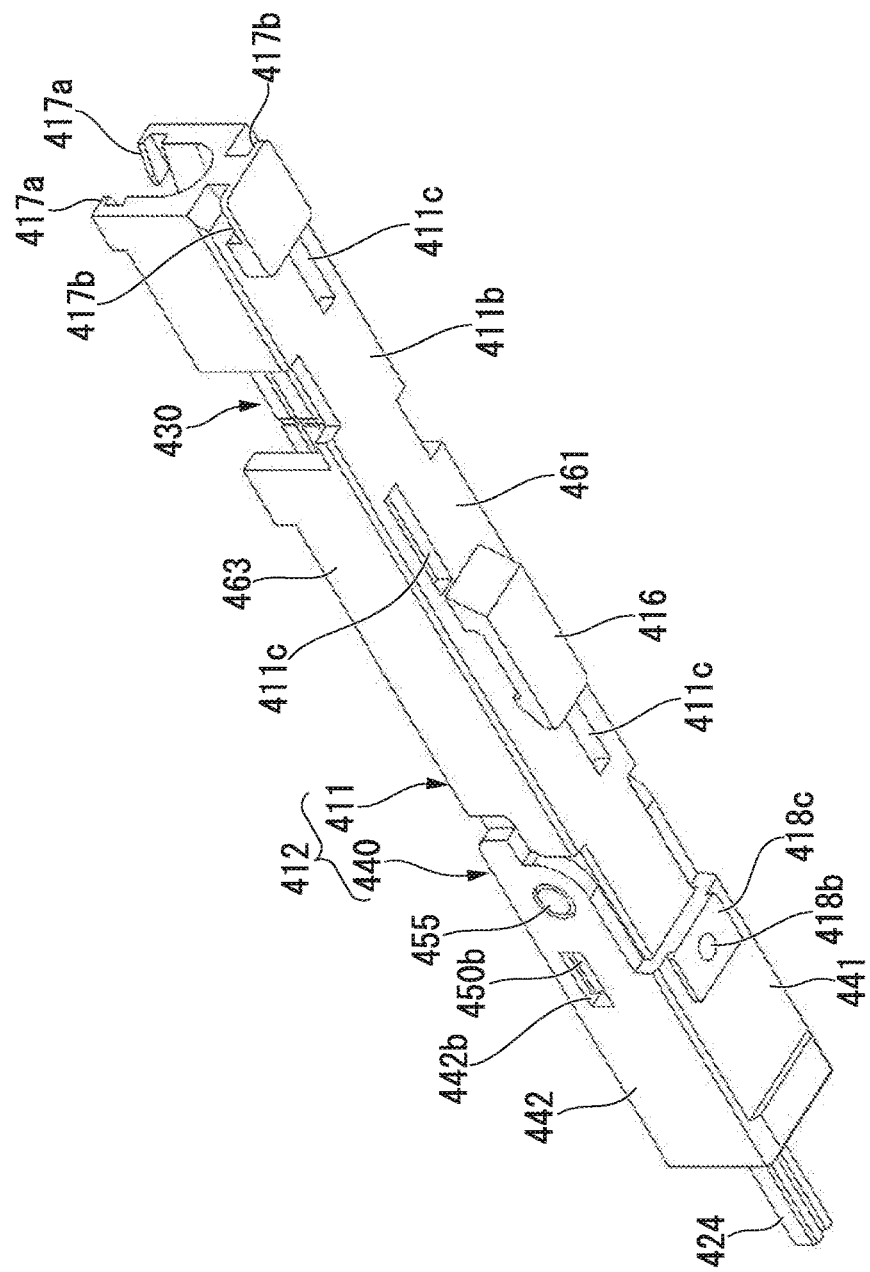
FIG. 92 is a perspective view showing an optical fiber splicing unit of an embodiment of the invention.

As shown in FIGS. 90 to 92, an optical fiber splicing unit 410 includes: a mechanical splice 430 that is capable of causing the optical fibers to be butt-jointed to each other and to be grasped and fixed between halved elements; and a case 412 that includes a splice holder portion 460 holding the mechanical splice 430.

In the embodiment, one of the optical fiber that is to be grasped and fixed to the mechanical splice 430 is an extended optical fiber 421 that is to be drawn from the terminal of the optical fiber cable 424.

The extended optical fiber 421 is butt-jointed to an inserted optical fiber 401 that is the other optical fiber (refer to FIG. 101) and is sandwiched between halved elements 431 and 432 so as to be grasped and fixed therebetween.

The case 412 is provided with: a splice holder portion 460 that holds the mechanical splice 430; a cable grasping member 470 that grasps the optical fiber cable 424; a grasping member holding portion 450 that holds the cable grasping member 470; a unit base 411 that integrates the grasping member holding portion 450 and the splice holder portion 460; and a lever member 440 that holds the back-end portion of the cable grasping member so as to restrict backward movement thereof from the grasping member holding portion 450.

Particularly, the optical fiber splicing unit 410 will be described, particularly, an upper side thereof is referred to as "above", and a lower side thereof is referred to as "below" in FIGS. 90 and 92.

Figure 99:
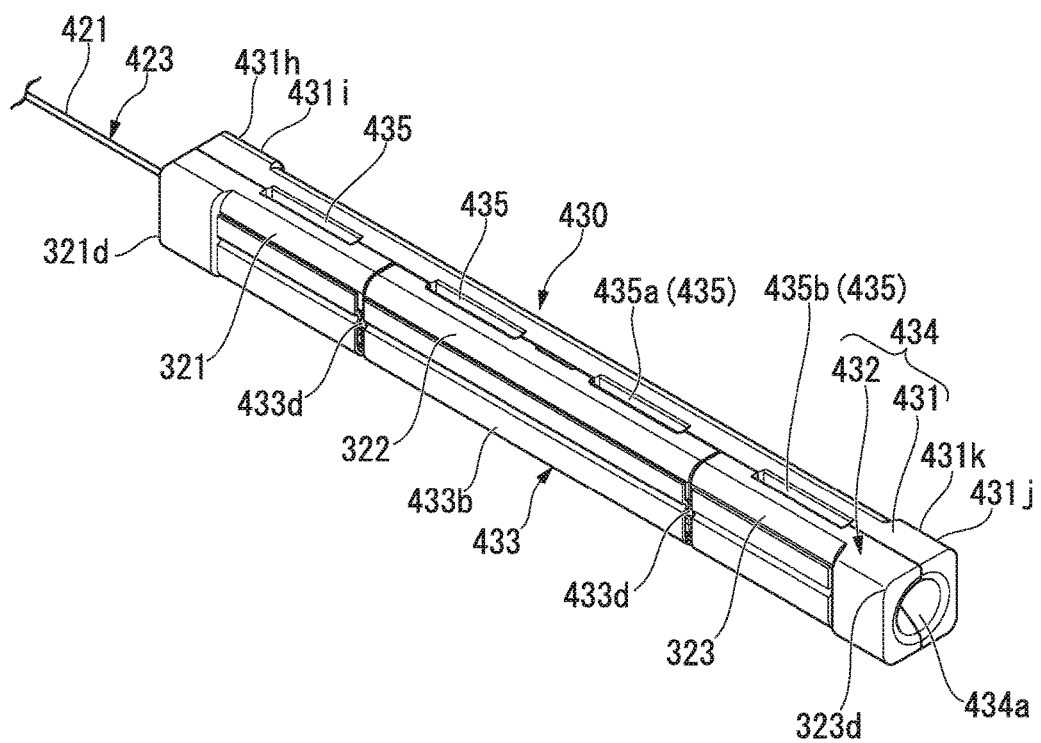
FIG. 99 is a perspective view showing an example of a mechanical splice.
Figure 100:
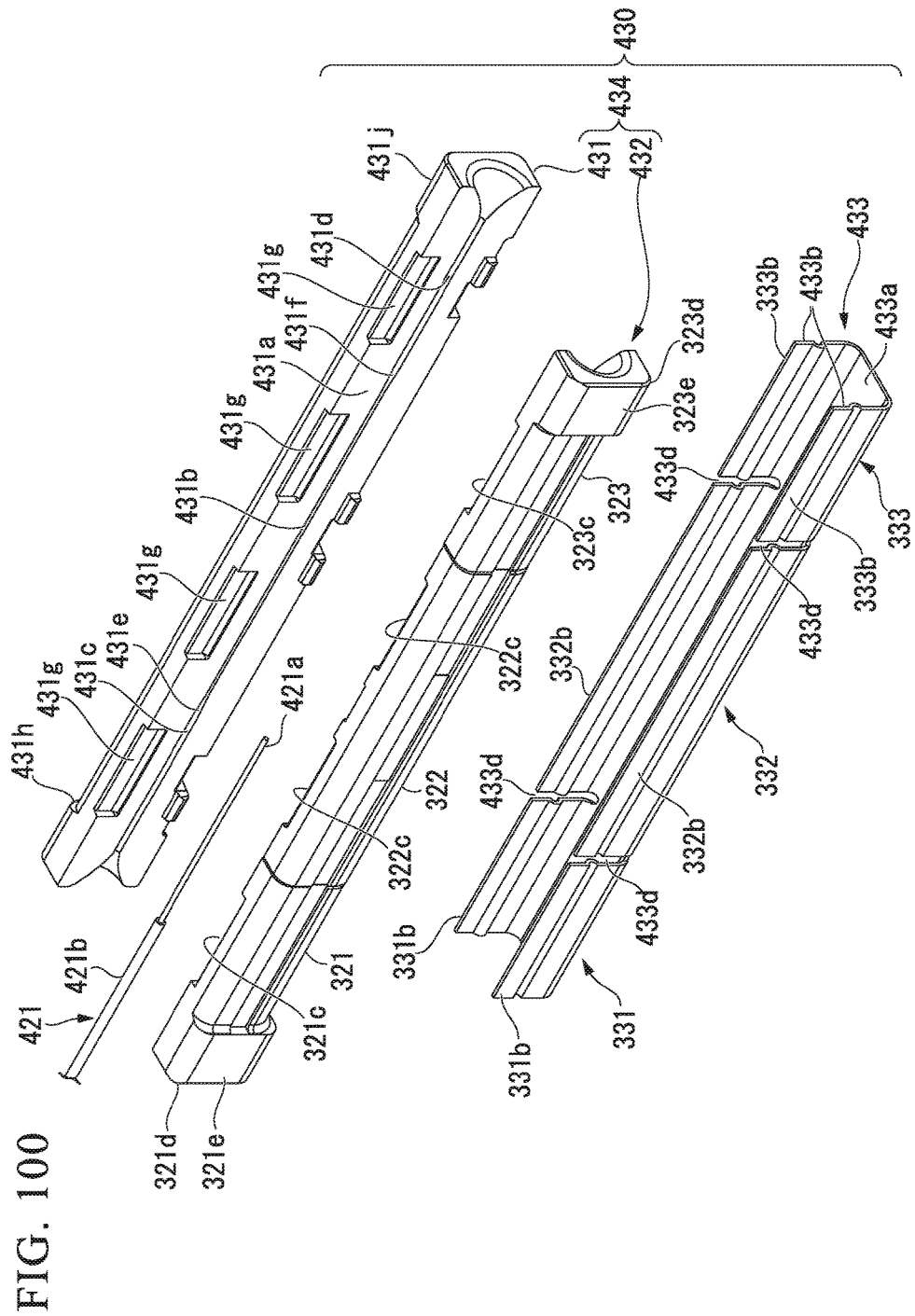
FIG. 100 is an exploded perspective view illustrating a structure of the mechanical splice shown in FIG. 99.
Figure 101:
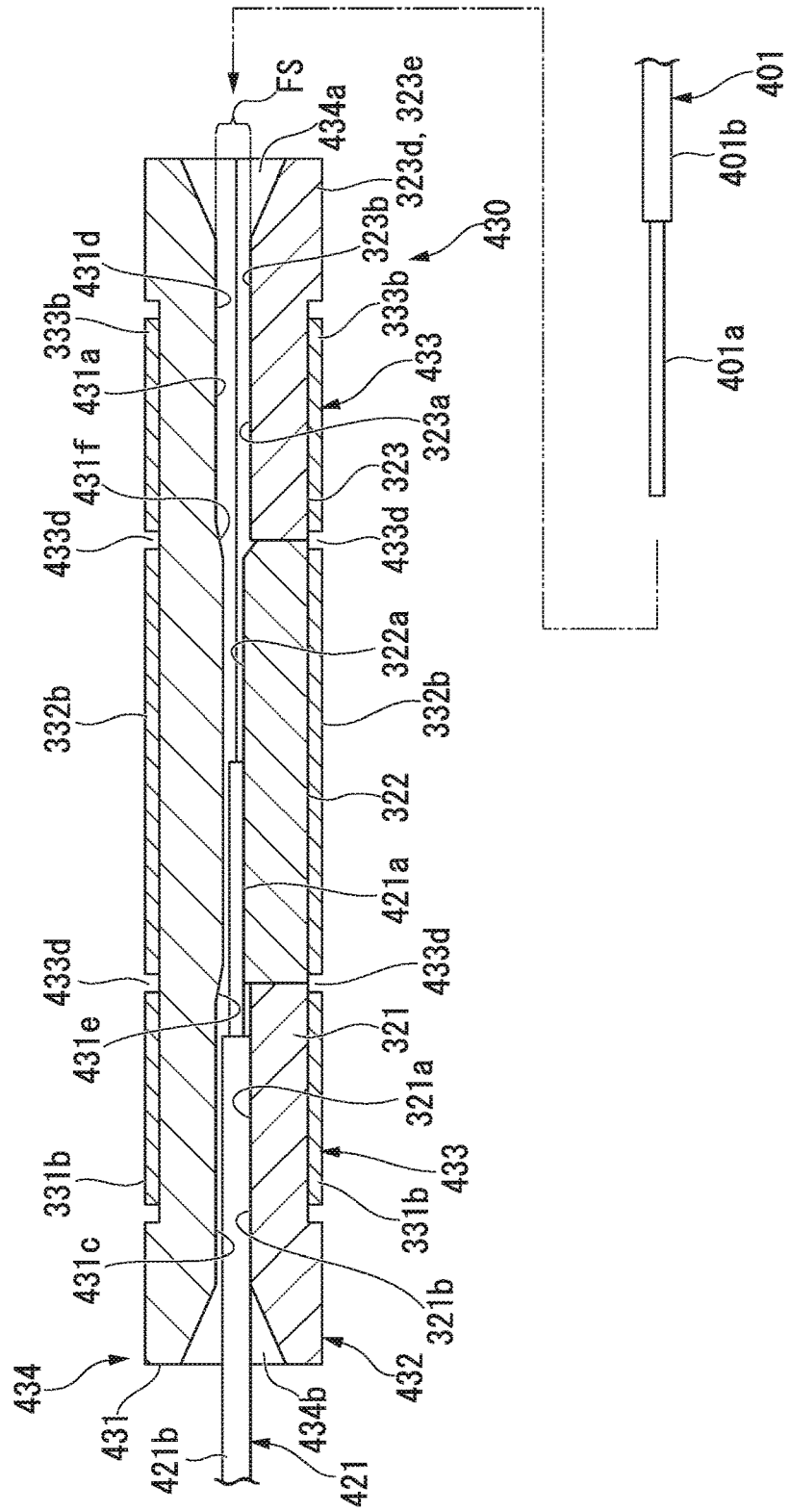
FIG. 101 is a cross-sectional view illustrating insert and grasping states of an optical fiber in the mechanical splice shown in FIG. 99.

As shown in FIGS. 99 to 101, the mechanical splice 430 is configured to include: an elongated-plate-shaped base member 431; a press lid 432 that is constituted of three lid members 321, 322, and 323 which are arrayed and placed along the longitudinal direction of the base member 431; and an extended clamp spring 433 that has an elongated configuration, is formed in a U-shape or a C-shaped in the cross-sectional face thereof (as an example in the drawing, U-shape), and integrally holds the base member and press lid which are positioned inside the clamp spring.

The mechanical splice 430 has a halved grasping member 434 that is configured to include: the base member 431 (base-side element) and the lid members 321, 322, and 323 (lid side element).

Due to an elastic action of the clamp spring 433, the base member 431 and the lid members 321, 322, and 323 elastically press each other in a direction in which they connect to each other and are closed.

Hereinafter, the mechanical splice is also referred to as a splice.

As shown in FIG. 101, an end of the extended optical fiber 421 is inserted through one end of the elongated halved grasping member 434 of the splice 430 in the longitudinal direction to the center portion thereof in the longitudinal direction.

Hereinbelow, in the extended optical fiber 421, the portion that is inserted between the base member 431 and the press lid 432 which constitute the halved grasping member 434 is referred to as an insertion end.

In the description, the splice 430 will be described, particularly, the side thereof (left side in FIG. 101) from which the extended optical fiber 421 extends is defined as "back", and the opposite side thereof (right side in FIG. 101) is defined as "front" in the longitudinal direction.

The extended optical fiber 421 extends from the back end of the halved grasping member 434 of the splice 430.

Hereinbelow, of three lid members (lid side element) 321, 322, and 323 configuring the press lid 432 of the splice 430, a lid member that is located at the backmost position and represented as reference numeral 321 may be referred to as a rear lid member, and a lid member that is located at the foremost position and represented as reference numeral 323 may be referred to as a front lid member.

Additionally, a lid member that is located between the rear lid member 321 and the front lid member 323 and represented as reference numeral 322 may be referred to as a middle lid member, hereinbelow.

As shown in FIGS. 99 to 101, the clamp spring 433 having U-shape in the cross-sectional face is formed of a single metal plate by shaping and is configured so that side plate parts 433b are provided at the entire longitudinal area of the elongated plate-shaped back plate part 433a in the longitudinal direction so as to perpendicularly protrude from both sides of the back plate part 433a.

In the splice 430, counterface surfaces 431a, 321a, 322a, and 323a, at which the base member 431 faces the three lid members 321, 322, and 323, are sandwiched between a pair of the side plate parts 433b in the direction substantially perpendicular to the direction in which a pair of the side plate parts 433b of the clamp spring 433 makes a space.

One of the side plate parts 433b comes into contact with the base member 431, and the other of the side plate parts 433b comes into contact with the press lid 432.

Regarding the insertion end of the extended optical fiber 421, the front-end thereof, that is, the part of the bare optical fiber 421a is located between the base member 431 of the splice 430 and the middle lid member 322, and the portion having the coating 421b is disposed between the base member 431 of the splice 430 and the rear lid member 321.

As a result of inserting the other optical fiber 401 between the base member 431 and the middle lid member 322 through the front side of the splice 430, the front end of the optical fiber 401 (hereinbelow, may be referred to as an inserted optical fiber) can be butt-jointed to the front end of the extended optical fiber 421 (the front end of the insertion end).

Additionally, due to elastic action of the clamp spring 433, it is possible to grasp and fix the extended optical fiber 421 and the inserted optical fiber 401 that was brought into contact with the optical fiber 421 between halved elements of the splice 430, that is, between the base member 431 (base-side element) and the press lid 432 (lid side element).

Figure 102:
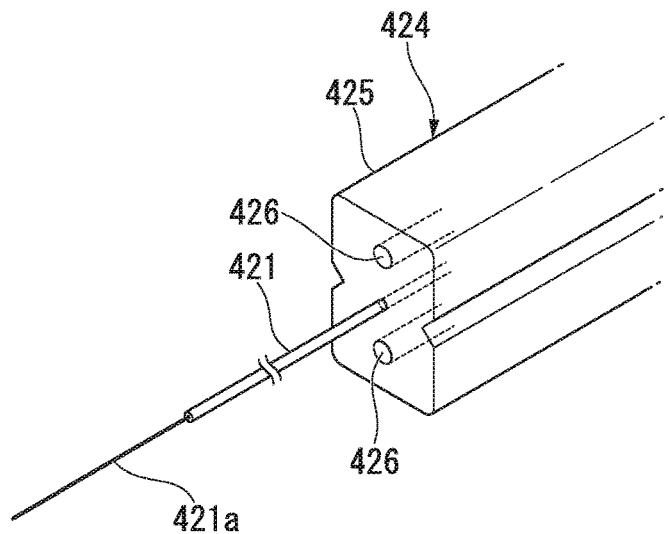
FIG. 102 is a perspective view showing an example of a structure of an optical fiber cable.

As shown in FIG. 102, the optical fiber cable 424 is used as an optical drop cable, a light indoor cable, or the like, and is an optical fiber cable that has a substantially rectangular cross section and has a structure in which, for example, the optical fiber 421 is integrally implanted in a resin-coating member 425 (hereinbelow, may be referred to as an outer coating) with a pair of linear tensile strength bodies 426 that extends parallel to the optical fiber 421 in the longitudinal direction thereof.

The optical fiber 421 is disposed at the center portion in the cross-sectional face of the optical fiber cable 424, and the pair of tensile strength bodies 426 is located at the positions that are separated from the optical fiber 421 toward both sides of the optical fiber cable 424 in the longitudinal direction of the cross-sectional face.

The optical fiber 421 is a coated optical fiber such as an optical core fiber, a bare optical fiber, or the like.

The extended optical fiber 421 and the inserted optical fiber 401 are a coating-attached optical fiber such as an optical core fiber, a bare optical fiber, or the like.

In an example of the drawing, as the extended optical fiber 421 and the inserted optical fiber 401, a single core optical fiber is adopted.

A bare optical fiber 421a is exposed at the front end of the insertion end of the extended optical fiber 421 (fore end).

As a result of butt-jointing a bare optical fiber 401a exposed at the front end of the inserted optical fiber 401 to the bare optical fiber 421a located at the front end of the insertion end of the extended optical fiber 421, butt-jointing connection between the extended optical fiber 421 and the inserted optical fiber 401 in the splice 430 is realized.

Figure 103:
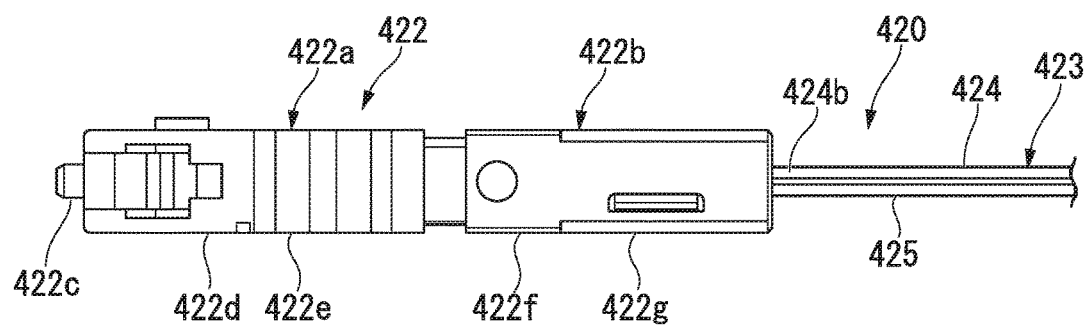
FIG. 103 is a side view showing an example of an optical connector which is attached to the optical fiber cable.

As shown in FIG. 103, a portion of the optical fiber 421 that is extended from one end of the splice 430 in the longitudinal direction thereof, the optical fiber cable 424, and the optical connector 422 may be referred to as a connector-attached pigtail 423.

That is, in the case where the optical fiber splicing unit 410 is attached to one terminal 424a of the optical fiber cable 424 and the optical connector 422 is attached to the other terminal 424b of the optical fiber cable 424, a splice-attached pigtail 420, in which the extended optical fiber 421 is grasped and fixed to one end side of the splice 430, has a constitution in which the connector-attached pigtail 423 extends from the splice 430.

As the optical connector 422, a connector may be used including a structure that is provided with, for example, a connector body 422a and a fastening mechanism 422b that fastens the optical fiber cable 424 to the connector body 422a.

The connector body 422a is provided with a housing 422d that accommodates an optical ferrule 422c (hereinbelow, may be simply referred to as a ferrule) and a finger grip 422e that is attached to the outside of the housing 422d.

A splicing mechanism (not shown in the figure) is provided inside the housing 422d, and the splicing mechanism causes, for example, a built-in optical fiber of the ferrule 422c to splice the optical fiber that is drawn from the optical fiber cable 424 by butt-jointing connection or the like.

The fastening mechanism 422f is provided with a body unit (not shown in the figure), a cable grasping portion (not shown in the figure) that grasps the terminal 424b of the optical fiber cable 424, and a fastening cover 422g that fastens the cable grasping portion.

As a structure of the connector body 422a, for example, SC-type optical connector (refer to JIS C 5973), LC-type optical connector (registered trademark, Lucent Technologies, Inc.), MU-type optical connector (refer to JIS C 5983), SC2-type optical connector (structure in which a finger grip is removed from SC-type optical connector), or the like may be adopted.

As shown in FIGS. 100 and 101, the counterface surface 431a facing the lid members 321, 322, and 323 is formed on the entire base member 431 of the splice 430 so as to extend in the longitudinal direction thereof.

An alignment groove 431b is formed at the center portion in the longitudinal direction (extending direction) of the counterface surface 431a of the base member 431; and the alignment groove allows the bare optical fiber 421a exposed at the front end of the extended optical fiber 421 and the bare optical fiber 401a exposed at the front end of the inserted optical fiber 401 to be butt-jointed to each other (optical splice) and to align the positions thereof with a high level of precision.

The alignment groove 431b is a V-groove formed along the longitudinal direction of the base member 431.

However, the alignment groove 431b is not limited to the V-groove; for example, a groove having a semicircular cross-sectional face, U-groove, or the like may be adopted thereto.

The alignment groove 431b is formed at the portion that faces the middle lid member 322 of the counterface surface 431a of the base member 431.

Coated-portion insertion grooves 431c and 431d, each of which has a groove width wider than the alignment groove 431b, are formed at the portion that faces the rear lid member 321 of the counterface surface 431a of the base member 431 and at the portion that faces the front lid member 323.

The coated-portion insertion grooves 431c and 431d are formed at both sides of the alignment groove 431b in the longitudinal direction of the base member 431 so as to extend along the longitudinal direction of the base member 431.

Tapered grooves 431e and 431f, which have a tapered shape and have a groove width that gradually becomes small in the direction from the coated-portion insertion grooves 431c and 431d to the alignment groove side 431b, are formed between the coated-portion insertion groove 431c and the alignment groove 431b and between the coated-portion insertion groove 431d and the alignment groove.

The coated-portion insertion grooves 431c and 431d are communicated with the alignment groove 431b through the tapered grooves 431e and 431f, respectively.

In the splice 430 shown as an example in the drawing, the coated-portion insertion grooves 431c and 431d are a V-groove.

However, the coated-portion insertion grooves 431c and 431d are not limited to the V-groove; for example, a groove having a semicircular cross-sectional face, U-groove, or the like may be adopted thereto.

A coated portion, at which the outer-periphery of the bare optical fiber 421a is covered with a coating 421b, is inserted into the coated-portion insertion grooves 431c and 321b where the coated-portion insertion grooves are formed on the counterface surfaces 431a and 321a and where the rear lid member 321 and the base member 431 face each other at the counterface surfaces; the bare optical fiber 421a that protrudes from the terminal of the coated portion is inserted into the alignment groove 431b; and the insertion end of the extended optical fiber 421 is thereby provided between the base member 431 and the press lid 432.

Subsequently, at the insertion end of the extended optical fiber 421, the coated portion is grasped and fixed between the rear lid member 321 and the base member 431, due to elastic action of the clamp spring 433.

The coated-portion insertion groove 431c of the rear lid member 321 is formed at the position corresponding to the coated-portion insertion groove 431c of the base member 431 at the counterface surface 321a of the rear lid member 321.

Additionally, the depth of the coated-portion insertion groove 321b of the rear lid member 321 and the depth of the coated-portion insertion groove 431c of the base member 431 are adjusted so that the coated portion of the extended optical fiber 421 can be firmly grasped and fixed between the rear lid member 321 and the base member 431 in view of the external diameter of the coated portion of the extended optical fiber 421.

Particularly, the depth of the coated-portion insertion groove 321b of the rear lid member 321 and the depth of the coated-portion insertion groove 431c of the base member 431 are adjusted so that the total of the depth is lower than the outer diameter of the coated portion of the extended optical fiber 421.

As shown in FIGS. 100 and 101, a coated portion, which is the portion at which the outer-periphery of the bare optical fiber 401a of the inserted optical fiber 401 is covered with a coating 401b, is inserted into the coated-portion insertion groove 431d that is formed at the front side of the alignment groove 431b.

Moreover, in the splice 430 shown as an example in the drawing, the coated-portion insertion groove 323b, into which the coated portion of the inserted optical fiber 401 is inserted, is also formed at the position corresponding to the coated-portion insertion groove 431d of the base member 431 and at the counterface surface 323a of the front lid member 323.

The inserted optical fiber 401 is inserted into the coated-portion insertion grooves 431d and 323b through the front side of the splice 430 in a state where the bare optical fiber 401a is preliminarily exposed at the front end of the inserted optical fiber.

Figure 98:
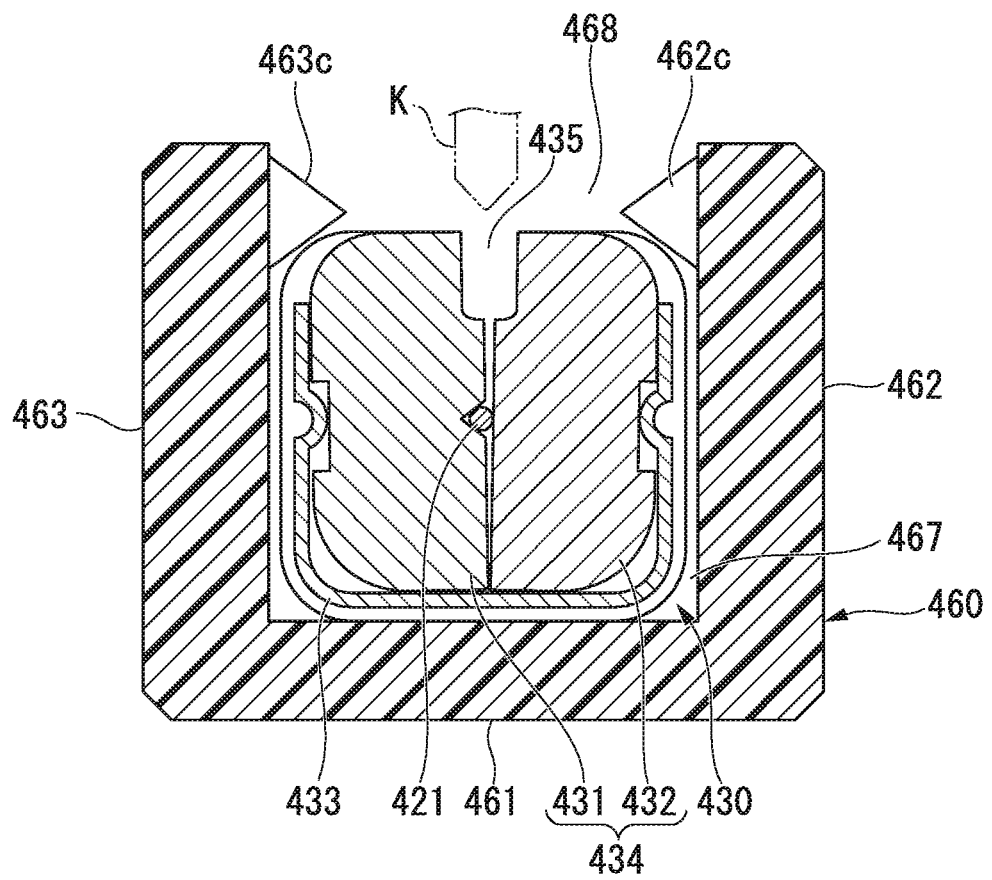
FIG. 98 is a cross-sectional view showing a splice holder portion in which a mechanical splice is accommodated.

As shown in FIG. 98, the splice 430 can interposes an interposing member K between the halved elements 431 and 432.

As the interposing member K, a first interposing member that interposes between the halved elements 431 and 432 at one end side of the splice 430 in the longitudinal direction thereof (left side in FIG. 101) so that the extended optical fiber 421 can be inserted there and a second interposing member that is interposed between the halved elements 431 and 432 at the other end side of the splice 430 in the longitudinal direction thereof (right side in FIG. 101) so that the inserted optical fiber 401 can be inserted therebetween are used.

The first interposing member is used for opening between the back-end portion of the middle lid member 322 of the splice 430 and the base member 431 and between the rear lid member 321 and base member 431 against an elastic action of the clamp spring 433.

The second interposing member is used for opening between the forward-end portion of the middle lid member 322 of the splice 430 and the base member 431 and between the front lid member 323 and the base member 431 against an elastic action of the clamp spring 433.

As shown in FIG. 101, when the second interposing member interposes between the halved elements 431 and 432, the inserted optical fiber 401 is inserted therebetween and can be butt-jointed to the extended optical fiber 421.

As shown in FIG. 101, the front lid member 323 is separated (opened) from the base member 431 to such an extent that the coated portion of the inserted optical fiber 401 can be easily inserted into the coated-portion insertion grooves 431d and 323b through the front side of the splice 430.

The forward-end portion of the middle lid member 322 is separated (opened) from the base member 431 to such that the bare optical fiber 401a that is exposed at the front end of the inserted optical fiber 401 can be easily inserted into the alignment groove 431b.

In FIG. 101, a container space of the optical fiber 401, that is constituted of the coated-portion insertion grooves 431d and 323b, is labeled by reference letter FS.

The depths of the coated-portion insertion groove 323b of the front lid member 323 and the coated-portion insertion groove 431d of the base member 431 are adjusted in view of the outer diameter of the coated portion of the inserted optical fiber 401 so that the coated portion of the inserted optical fiber 401 can be grasped and fixed between the front lid member 323 and the base member 431 when the second interposing member is removed from between the front lid member 323 and the base member 431.

Particularly, the depths of the coated-portion insertion groove 323b of the front lid member 323 and the coated-portion insertion groove 431d of the base member 431 are adjusted so that the total of the depths is less than the outer diameter of the coated portion of the inserted optical fiber 401.

In the splice 430 shown as an example in the drawing, the coated-portion insertion grooves 321b and 323b of the rear lid member 321 and the front lid member 323 is a V-groove.

However, the coated-portion insertion grooves 321b and 323b are not limited to the V-groove; for example, a groove having a semicircular cross-sectional face, U-groove, or the like may be adopted thereto.

Additionally, it is not necessary to form the coated-portion insertion groove at both portions of the rear lid member 321 and the base member 431 which face each other.

As a splice, a constitution may be adopted in which the coated-portion insertion groove is formed at one of the portions at which the rear lid member 321 and the base member 431 face each other.

This is similarly adopted to the portions at which the front lid member 323 and the base member 431 face each other; as a splice, a constitution may be adopted in which the coated-portion insertion groove is formed at one of the portions at which the front lid member 323 and the base member 431 face each other.

As shown in FIG. 99, in the halved grasping member 434 of the splice 430, interposing member insertion holes 435, into which the interposing member to be inserted, open at the side face (hereinbelow, may be referred to as an exposed side) which is exposed to a side opposite to the back plate part 433a of the clamp spring 433.

As shown in FIG. 100, the interposing member insertion holes 435 are ensured between the base member 431 and the lid members 321, 322, and 323 with interposing member insertion grooves 431g, 321c, 322c, and 323c. The interposing member insertion grooves 431g, 321c, 322c, and 323c are formed at the positions corresponding to the counterface surfaces 431a and 321a, 322a, and 323a of the base member and the three lid members.

Particularly, the interposing member insertion holes 435 are formed so as to have depths that do not reach the alignment groove 431b and the coated-portion insertion grooves 431c, 431d, 321b, and 323b at the exposed side of the halved grasping member 434.

Furthermore, as the interposing member insertion holes 435, a structure may be adopted which is ensured by interposing member insertion grooves only formed at one side of the base member 431 and the lid members 321, 322, and 323.

As shown in FIG. 99, in the splice 430 shown as an example in the drawing, the interposing member insertion holes 435 are formed at four positions; two positions thereof are places corresponding to the back-end portion and the forward-end portion of the middle lid member 322, and the other portions thereof are places corresponding to the center portions of the rear lid member 321 and the front lid member 323 in the front-back direction along the longitudinal direction of the base member 431.

Of four portions of the interposing member insertion holes 435, the second interposing member is inserted into the interposing member insertion hole 435 (represented as reference numeral 435a in FIG. 99) which is formed at the position corresponding to the forward-end portion of the middle lid member 322 and into the interposing member insertion hole 435 (represented as reference numeral 435b in FIG. 99) which is formed at the position corresponding to the center portion of the front lid member 323 in the front-back direction thereof, respectively.

As shown in FIG. 101, a flat counterface surface 322a is formed on the portion of the middle lid member 322 facing the alignment groove 431b of the base member 431.

When the interposing member that is interposed between the middle lid member 322 and the base member 431 is removed, due to elastic action of the clamp spring 433, at the counterface surface 322a, the middle lid member 322 presses the bare optical fiber 421a of the front end of the extended optical fiber 421 onto the bare optical fiber 401a of the inserted optical fiber 401 that is brought into contact with the front end of the bare optical fiber 421a, and can push them against the alignment groove 431b.

As shown in FIGS. 100 and 101, the paired side plate parts 433b of the clamp spring 433 are separated into three parts corresponding to the three lid members 321, 322, and 323 of the press lid 432 of the splice 430.

A side plate part 433b (the side plate part 433b is located at an upper side in FIGS. 100 and 101) that is to be in contact with the press lid 432 is separated into three parts corresponding to the three lid members 321, 322, and 323 by slit-shaped cut portions 433d where the cut portions are formed at portions corresponding to a boundary between the rear lid member 321 and the middle lid member 322 and a boundary between the middle lid member 322 and the front lid member 323.

The side plate part 433b that is to be in contact with the base member 431 is separated into three parts corresponding to the three lid members 321, 322, and 323 by the cut portions 433d where the cut portions are formed at positions corresponding to the cut portions 433d of the side plate part 433b that is to be in contact with the lid members 321, 322, and 323.

The clamp spring 433 is configured to include: a first clamp spring portion 331 holding the rear lid member 321 and the base member 431; a second clamp spring portion 332 holding the middle lid member 322 and the base member 431; and a third clamp spring portion 333 holding the front lid member 323 and the base member 431.

Each of the first to third clamp spring portions 331 to 333 functions as an independent clamp spring.

In particular, in FIGS. 100, 101, or the like, a pair of side plate parts of the first clamp spring portion 331 is represented as reference numeral 331b, a pair of side plate parts of the second clamp spring portion 332 is represented as reference numeral 332b, and a pair of side plate parts of the third clamp spring portion 333 is represented as reference numeral 333b.

The splice 430 includes three clamp portions corresponding to the three clamp spring portions.

That is, the splice 430 has a first clamp portion that holds the rear lid member 321 and the base member 431 inside the first clamp spring portion 331; a second clamp portion that holds the middle lid member 322 and the base member 431 inside the second clamp spring portion 332; and a third clamp portion that holds the front lid member 323 and the base member 431 which are lateral to the third clamp spring portion 333.

Due to each elastic action of the clamp spring portion corresponding to the clamp portion, the three clamp portions can grasp and fix an optical fiber between the halved elements (between the base member 431 (base-side element) and the lid member (lid side element)).

The first clamp portion of the splice 430 can grasp and fix the coated portion of the extended optical fiber 421 between the rear lid member 321 and the base member 431 due to elastic action of the first clamp spring portion 331.

In the splice 430, for example, even where the middle lid member 322 opens or closes (i.e., opening and closing of the second clamp portion) as a result of inserting the interposing member between the middle lid member 322 and the base member 431 or of removing the interposing member therebetween, a state where the extended optical fiber 421 is grasped and fixed by the first clamp portion is stably maintained.

Furthermore, opening or closing of the third clamp portion, which is due to inserting or removing of the interposing member, does not affect a state where the extended optical fiber 421 of the first clamp portion is grasped and fixed at all.

As shown in FIGS. 90 to 93, the unit base 411 of the optical fiber splicing unit 410 is provided with a splice holder portion 460 detachably holding the splice 430, and the grasping member holding portion 450 holding the cable grasping member 470 removably grasping an outer coating 425 of the terminal 424a of the optical fiber cable 424.

The unit base 411 may be, for example, substantially rectangular as seen in a plan view.

As shown in FIGS. 90 to 93 and 98, the splice holder portion 460 includes: a base portion 461 constituting a part of the unit base 411; a one-side-protruding wall portion 462 that is placed upright at one side edge of the base portion 461; an another-side-protruding wall portion 463 that is placed upright at another side edge of the base portion 461; a pair of front-side-protruding wall portions 464 that is provided at both sides of the forward-end portion; and a pair of rear-side-protruding wall portions 465 that is provided at both sides of the back-end portion.

The protruding wall portions 462 to 465 are formed to protrude from the upper surface side of the base portion 461.

The splice holder portion 460 accommodates the splice 430 in a splice storage space 467, that is ensured between the one-side-protruding wall portion 462 and the another-side-protruding wall portion 463, and thereby holds the splice 430.

At the inner face of the one-side-protruding wall portion 462, locking claws 462c protruding toward the inner face side therefrom are formed.

Similarly, at the inner face of the another-side-protruding wall portion 463, locking claws 463c protruding toward the inner face side therefrom are formed.

By such locking claws 462c and 463c, it is possible to restrict upward movement of the splice 430.

The splice 430 is pushed into the splice storage space 467, thereby moves downward to the lower sides of the locking claws 462c and 463c, and the upward movement is restricted.

The separation distance between the front-side-protruding wall portion 464 and the rear-side-protruding wall portion 465 is set depending on the length of the splice 430 in the longitudinal direction, and the displacement of the splice 430 with respect to the base portion 461 in the front-back direction is restricted by the front-side-protruding wall portion 464 and the rear-side-protruding wall portion 465.

When the interposing member is detached from the splice 430, since the separation distance between the paired side plate parts 433b of the clamp spring 433 is reduced, the splice 430 is easily removed from the splice holder portion 460.

Accordingly, the splice holder portion 460 can removably hold the splice 430.

Moreover, the locking or the releasing of the splice 430 by the locking claws 462c and 463c of the one-side-protruding wall portion 462 and the another-side-protruding wall portion 463 can also be carried out as a result of elastically deforming the one-side-protruding wall portion 462 and the another-side-protruding wall portion 463 in a direction away from each other by, for example, an operator with its fingers.

As shown in FIGS. 99 to 101, in the splice 430, hereinbelow, the direction perpendicular to the counterface surface 431a of the base member 431 is referred to as the width direction.

Both engagement faces 431k and 323e of a front-end engagement protuberance portion (front-end projected portions 431j and 323d) of the halved grasping member 434 of the splice 430 are located at both sides of the front-end engagement protuberance portion in the width direction, and both engagement faces 431i and 321e of a back-end engagement protuberance portion (back-end projected portions 431h and 321d) are located at both sides of a rear-side engagement protuberance portion in the width direction.

Additionally, both side plate parts 433b of the clamp spring 433 are located both sides of the halved grasping member 434 interposed therebetween in the width direction.

In the splice 430, the protruding lengths of a back-end projected portion 431h and a front-end projected portion 431j from the back face of the base member 431 with which the side plate part 433b of the clamp spring 433 comes into contact are made slightly larger than the plate thickness of the side plate part 433b of the clamp spring 433.

Furthermore, the protruding length of the back-end projected portion 321d from the back face of the rear lid member 321 with which the side plate part 433b of the clamp spring 433 comes into contact and the protruding length of the front-end projected portion 323d from the back face of the front lid member 323 with which the side plate part 433b of the clamp spring 433 comes into contact are made slightly larger than the plate thickness of the side plate part 433b of the clamp spring 433.

The thickness of the plate-shaped middle lid member 322, that is, the distance between the counterface surface 322a of the middle lid member 322 and the back face with which the side plate part 433b of the clamp spring 433 comes into contact, the thickness of the plate-shaped portion other than the back-end projected portion 321d of the rear lid member 321, and the thickness of the plate-shaped portion other than the front-end projected portion 323d of the front lid member 323 are made the same as each other.

As shown in FIGS. 100 and 101, a tapered-opening portion 434a, which is provided at each of the front lid member 323 and the base member 431 and which is formed of a recess having a tapered shape gradually becomes fine in the direction from the front-edge face thereof to the rear side, opens at the front end of the halved grasping member 434 of the splice 430.

The rear end (back end) of the tapered-opening portion 434a is communicated with the coated-portion insertion grooves 323b and 431d.

Moreover, a fiber introduction recess portion 466 is ensured between the front-side-protruding wall portions 464; and the fiber introduction recess portion smoothly guides the inserted optical fiber 401 that is to be inserted into the coated-portion insertion grooves 323b and 431d of the splice 430 held by the splice holder portion 460 through the front side of the splice holder portion 460, into the tapered-opening portion 434a that opens at the front end of the splice 430.

The fiber introduction recess portion 466 is a tapered groove having the groove width that gradually decreases in the direction from the front side thereof to the rear side.

The inserted optical fiber 401 that is to be inserted from the front side into the splice 430 can be guided into the splice 430 held by the splice holder portion 460 through the fiber introduction recess portion 466.

As shown in FIGS. 100 and 101, a tapered-opening portion 434b, which is provided at each of the rear lid member 321 and the base member 431 and which is formed of a recess having a tapered shape gradually becomes fine in the direction from the rear-edge face thereof to the front side, opens at the back end of the halved grasping member 434 of the splice 430.

The front end (back end) of the tapered-opening portion 434b is communicated with the coated-portion insertion grooves 321b and 431c.

Figure 93:
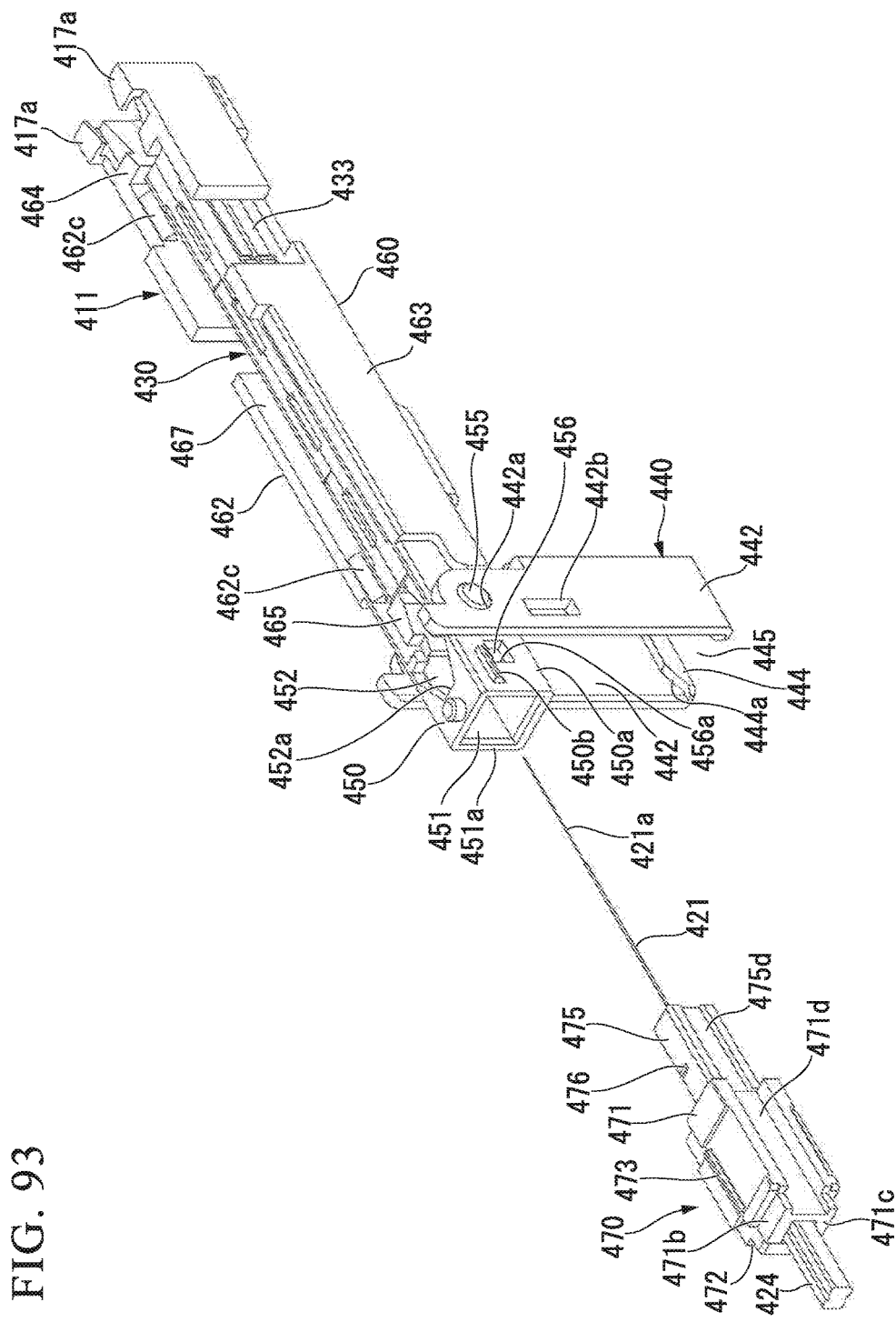
FIG. 93 is an exploded perspective view showing the optical fiber splicing unit of FIG. 90.

As shown in FIG. 93, a hole edge portion, which is provided around the tapered-opening portion 434b at the back end of the base member 431, comes into contact with the front side of the rear-side-protruding wall portion 465.

Figure 94:
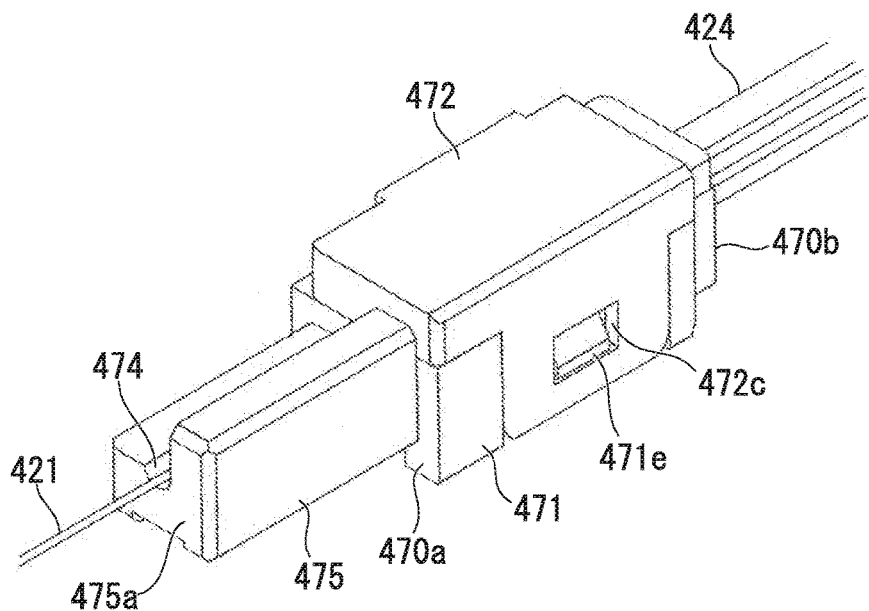
FIG. 94 is a perspective view showing an example of a cable grasping member.
Figure 95:
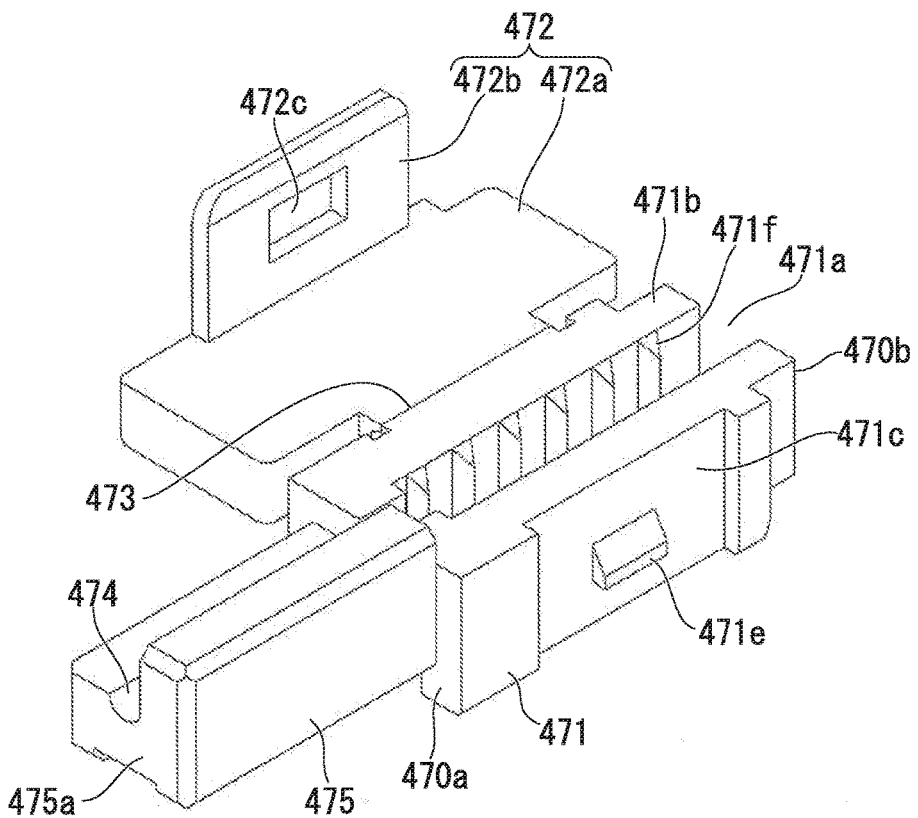
FIG. 95 is a perspective view showing a state where a lid of the cable grasping member shown in FIG. 92 is opened.

As shown in FIGS. 94 to 95, the cable grasping member 470 includes: a grasping base 471 that is formed in a U-shape in the cross-sectional face and has a cable-fitting groove 471a into which the optical fiber cable 424 is fitted; and a press lid 472 that is pivotally provided to one of side wall portions 471b and 471c of the cable-fitting groove 471a in the groove-width direction of the grasping base 471.

Figure 107:
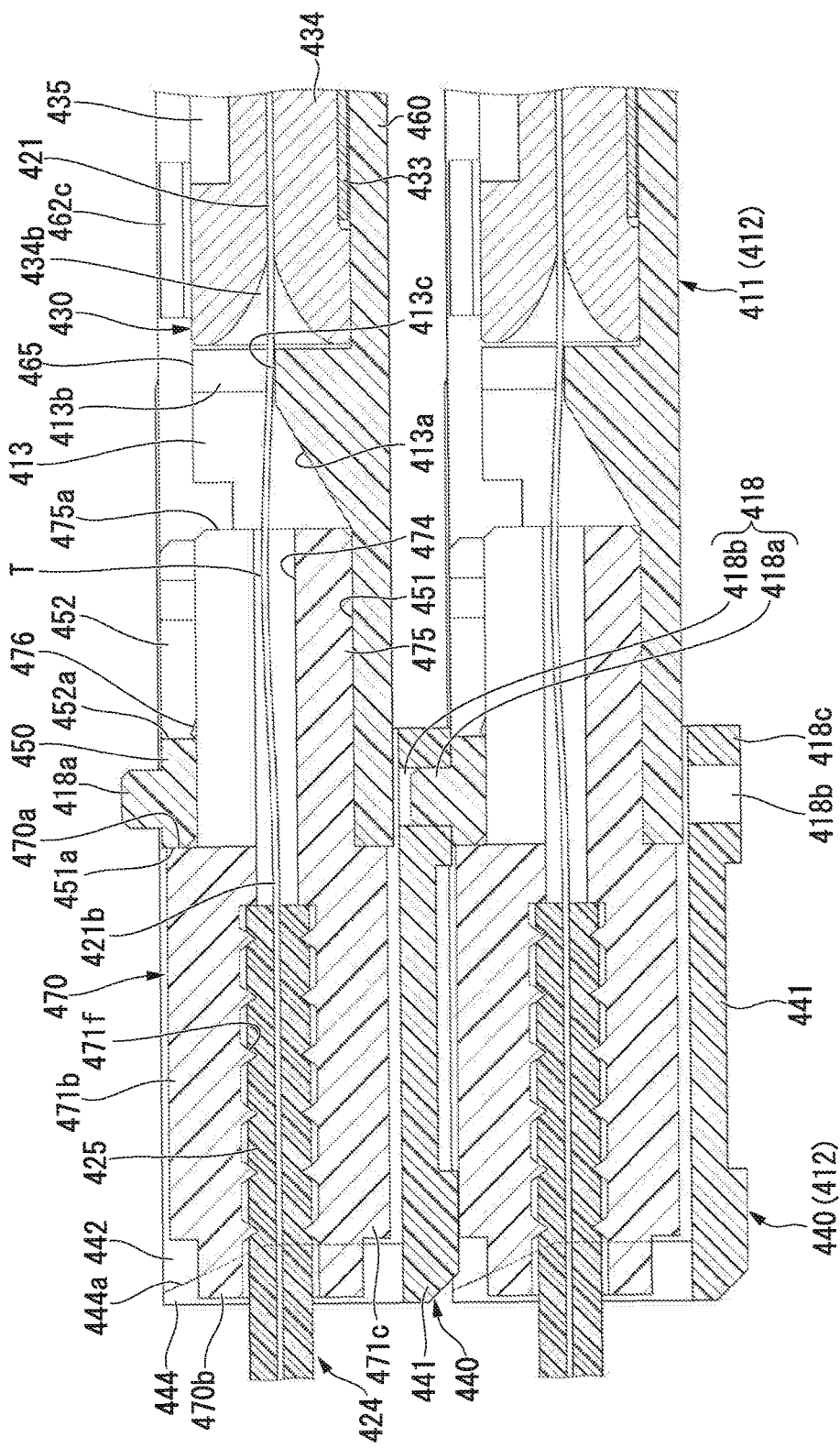
FIG. 107 is a cross-sectional view showing a connection state by use of a connection unit.

As shown in FIG. 107, in the cable grasping member 470, a plurality of grasping protrusions 471f, that is provided to protrude from the faces at which the paired side wall portions 471b and 471c of the grasping base 471 face each other, bites into the outer coating 425 of the optical fiber cable 424 which is fitted into the cable-fitting groove 471a, and it is thereby possible to grasp and fix the optical fiber cable 424 between the paired side wall portions 471b and 471c.

The grasping base 471 is a member which has a U-shaped cross-sectional face and in which the cable-fitting groove 471a is ensured between the paired side wall portions 471b and 471c provided at one-face side of a bottom wall portion 471d so as to protrude therefrom (refer to FIG. 93).

The groove width direction of the cable-fitting groove 471a is a direction in which both side wall portions 471b and 471c facing each other with the cable-fitting groove 471a interposed therebetween make a space.

The grasping protrusions 471f of the cable grasping member 470 shown as an example in the drawing are protuberances which have a triangular shape in the cross-sectional face and extend in the depth direction of the cable-fitting groove 471a.

After the grasping base 471 is externally fitted onto and fixed to the terminal of optical fiber cable 424 in an opened state where the press lid 472 is separated from the side wall portion 471c, the press lid 472 rotates to be positioned at the closed position so as to close an opening portion of the cable-fitting groove 471a where the opening portion is located between upper ends of the side wall portions 471b and 471c of the grasping base 471, the press lid 472 is locked to the side wall portion 471c, and the cable grasping member 470 is attached to the terminal of the optical fiber cable 424.

The cable grasping member 470 shown as an example in the drawing is an integral molding product made of plastic.

The press lid 472 is linked to one of protuberance edges (first side wall portion 471b) of the paired side wall portions 471b and 471c with a thin portion 473 serving as a hinge portion interposed therebetween.

The press lid 472 is pivotally provided so as to be able to rotate with respect to the first side wall portion 471b of the grasping base 471 via the thin portion 473 along the axis line extending along the extending direction of the cable-fitting groove 471a.

In particular, the other of the side wall portions 471b and 471c of the grasping base 471 is also referred to as a second side wall portion 471c.

The press lid 472 of the cable grasping member 470 shown as an example in the drawing is formed in an L-shaped plate.

The press lid 472 includes: a top panel portion 472a that is pivotally provided to the first side wall portion 471b of the grasping base 471 via the thin portion 473; and a lock plate portion 472b that is formed at the top panel portion 472a vertically from the end portion of the top panel portion 472a on the opposite side of the thin portion 473.

In the press lid 472, when the top panel portion 472a comes into contact with the protuberance edges of the pair of side wall portions 471b and 471c of the grasping base 471 and is positioned at the closed position at which the opening portion of the cable-fitting groove 471a is closed, the lock plate portion 472b can overlap the outer face of the cable-fitting groove 471a on the opposite side of the second side wall portion 471c of the grasping base 471.

Subsequently, the press lid 472 causes a locking claw 471e, that is provided to protrude from the outer face of the second side wall portion 471c of the grasping base 471, to be inserted into a locking window 472c formed at the lock plate portion 472b, the press lid is engaged with the grasping base 471, and it is thereby possible to stably maintain a closed state with respect to the grasping base 471.

When the terminal 424a of the optical fiber cable 424 is fitted into the cable-fitting groove 471a, the plurality of grasping protrusions 471f, that protrudes from the faces (inner surface) of the pair of side wall portions 471b and 471c of the grasping base 471 which are exposed to the cable-fitting groove 471a, come into contact with the side face of the outer coating 425 of the optical fiber cable 424, and the terminal 424a of the optical fiber cable 424 is grasped and fixed between the paired side wall portions 471b and 471c.

Additionally, as described above, as a result of maintaining a closed state where the L-shaped plate lid 472 is locked by the locking claw 471e of the outer face of the second side wall portion 471c, it is possible to reliably prevent the optical fiber cable 424 from being removed from the cable-fitting groove 471a, and it is possible to stably maintain a fixed state where the cable grasping member 470 is fixed to the terminal 424a of the optical fiber cable 424.

The optical fiber cable 424 can be removed from the cable grasping member 470 by opening the lid 472 and by extracting the optical fiber cable 424 from the cable-fitting groove 471a.

That is, the cable grasping member 470 is attachable to and detachable from the optical fiber cable 424.

The cable grasping member 470 is preferably an integral molding product made of plastic.

The cable grasping member 470 shown as an example in the drawing includes a front-side protrusion portion 475 that protrudes from one end of the cable-fitting groove 471a of the grasping base 471 in the front-back direction along the extending direction thereof.

The extended optical fiber 421 can be mounted on an optical-fiber holding groove 474 that is formed at the front-side protrusion portion 475.

Additionally, as shown in FIG. 93, the grasping member holding portion 450 that holds the cable grasping member 470 is provided at one end of the unit base 411.

As shown in FIG. 93, the grasping member holding portion 450 has an insert hole 451 into which the front-side protrusion portion 475 of the cable grasping member 470 can be fitted.

As the front-side protrusion portion 475 is inserted into the insert hole 451, the front-side protrusion portion 475 of the cable grasping member 470 is fitted thereinto and can be held by the grasping member holding portion 450.

As shown in FIG. 107, an optical fiber guiding portion 413 is provided between the grasping member holding portion 450 and the splice holder portion 460, and the optical fiber guiding portion guides the front end of the extended optical fiber 421, that protrudes from the front-side protrusion portion 475 of the cable grasping member 470, to the tapered-opening portion 434b of the splice 430.

Accordingly, even where it is difficult to visually check the front end of the extended optical fiber 421 inside the grasping member holding portion 450 when the cable grasping member 470 is inserted into the grasping member holding portion 450, it is possible to reliably guide the cable grasping member into the tapered-opening portion 434b of the splice 430.

The optical fiber guiding portion 413 includes an inclined face 413a that is inclined toward the center of the tapered-opening portion 434b and a U-shaped groove 413b that is upwardly opened; and the upper edge of the inclined face 413a coincides with the lower edge 413c of the U-shaped groove 413b in height.

The height of the lower edge 413c of the U-shaped groove 413b substantially coincides with the height of the groove into which the optical fiber in the halved grasping member 434 of the splice 430.

Particularly, the optical fiber guiding portion 413 in an example of the drawing is formed integrally with the rear-side-protruding wall portions 465 of the splice holder portion 460, and the U-shaped groove 413*b* is disposed so as to come close to the tapered-opening portion 434*b* of the splice 430.

Figure 96C:
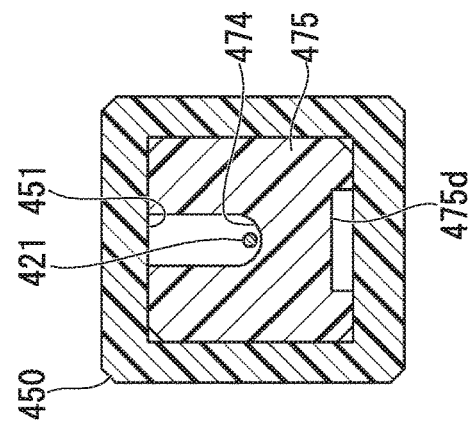
FIG. 96C is a horizontal cross-sectional view showing the grasping member holding portion into which the cable grasping member is inserted.
Figure 96B:
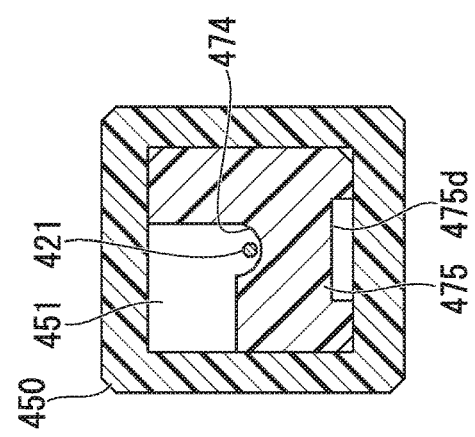
FIG. 96B is a horizontal cross-sectional view showing the grasping member holding portion into which the cable grasping member is inserted.
Figure 96A:
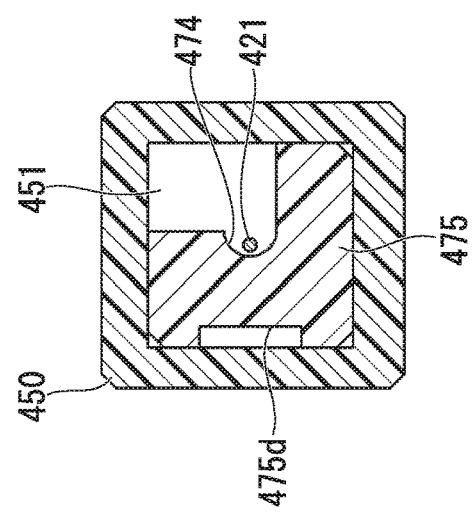
FIG. 96A is a horizontal cross-sectional view showing the grasping member holding portion into which the cable grasping member is inserted.

As shown in FIGS. 96A to 96C, the cross-sectional face of the front-side protrusion portion 475 of the cable grasping member 470 is substantially square; and the insert hole 451 of the grasping member holding portion 450 has a substantially square cross-section so as to be fitted thereinto.

Consequently, as shown in FIGS. 96A to 96C, the cable grasping member 470 can be fitted into the grasping member holding portion 450 in various directions that are different from each other by 90° around the center corresponding to the axis direction of the optical fiber (particularly, the extended optical fiber 421).

Since the external surfaces of the front-side protrusion portion 475 includes the portions that come into contact with four inner faces of the insert hole 451 at at least four places, backlash in a vertical direction or a horizontal direction or vibration in a little angle range (for example, less than several angles in degrees) is prevented, and it is possible to realize stable fitting thereof in various directions that are different from each other by 90°.

Furthermore, as a result of transferring straight the cable grasping member 470 toward the grasping member holding portion 450, it is possible to fit the front-side protrusion portion 475 into the insert hole 451 even in direction.

The cross-sectional shape of the front-side protrusion portion 475 serving as fitting part with respect to the insert hole 451 may have one or more cuttings or chamfer at the side portions and/or the corner portions thereof as long as the shape comes into internal contact with a square.

For example, FIGS. 96A and 96B show that the cable grasping member 470 that is the same as the above is inserted into the grasping member holding portion 450, FIG. 96A shows that the bottom portion 475*d* of the front-side protrusion portion 475 is directed to left side, and FIG. 96B shows that the bottom portion 475*d* of the front-side protrusion portion 475 is directed to the lower side.

Even where the cable grasping member 470 is in arrangement shown in FIGS. 96A and 96B, the cross-sectional face of the front-side protrusion portion 475 is an L-shape such that the optical-fiber holding groove 474 is upwardly opened.

The reason is that, the grasping member holding portion 450 shown as an example in the drawing includes an observation window 452 (refer to FIG. 93) at the upper side thereof, which is used for visual observation of the inside condition thereof.

Although disadvantageous effect for a function of the optical fiber splicing unit 410 does not occur even where the bottom portion 475*d* of the front-side protrusion portion 475 is directed to the observation window side 452, it is possible to prevent the optical-fiber holding groove 474 from being opened in a downward direction as a result of carrying out a work operation in a state where the extended optical fiber 421 is mounted on the optical-fiber holding groove 474 of the front-side protrusion portion 475.

In particular, FIGS. 96A and 96B show a constitution in which the optical-fiber holding groove 474 can be disposed to be opened in two upward directions, but, as shown in FIG. 96C, the optical-fiber holding groove 474 may be disposed to be opened in only one upward direction.

Since the cable grasping member 470 shown as an example in the drawing is applied to the optical fiber cable 424 that has the outer coating 425 having a flat shape in a cross-sectional view as shown in FIG. 102, it is preferable that the cable grasping member can be attached to the optical fiber splicing unit 410 in two directions such that the rotation angles thereof with respect to the longitudinal direction of the optical fiber that is a central axis line are different from each other by 90° as shown in FIGS. 96A and 96B.

Particularly, in the case of the flat-shaped optical fiber cable 424, the outer coating 425 is bended in the short-side direction thereof (horizontal direction in FIG. 102) easier than that in the long-side direction (vertical direction in FIG. 102).

In the case of the drawing shown as an example, that is, in the attachment of the cable grasping member 470 as shown in FIG. 90 corresponding to FIG. 96A, the optical fiber cable 424 is easily bended in the vertical direction with respect to the longitudinal direction of the optical fiber splicing unit 410 in this configuration.

Moreover, in the attachment of the cable grasping member 470 as shown in FIG. 91 corresponding to FIG. 96B, the optical fiber cable 424 is easily bended in the horizontal direction with respect to the longitudinal direction of the optical fiber splicing unit 410 in this configuration.

When the optical fiber splicing unit 410 is accommodated in a narrow space such as a termination box or the like, since it is possible to bend the optical fiber cable 424 in the selected direction from the vertical direction or the horizontal direction, accommodation (storage) of the optical fiber cable 424 is easy.

In the grasping member holding portion 450 shown as an example in the drawing, since the cable grasping member 470 (particularly, the front-side protrusion portion 475 thereof) is inserted and fitted into the insert hole 451 having the same cross-sectional shape throughout in the longitudinal direction, it is possible to movably hold the cable grasping member 470 along the longitudinal direction of the splice 430.

In other cases, as modified examples, the grasping member holding portion 450 may has a plate-shaped guide member (not shown in the figure) on which the cable grasping member 470 is slidably mounted.

This kind of guide member protrudes from the edge face 451*a* of the insert hole 451 of the grasping member holding portion 450 and thereby receives the cable grasping member 470; and the guide member moves forward along with the cable grasping member 470 and thereby can be accommodated inside the grasping member holding portion 450.

In this case, even where the cable grasping member 470 does not have the portion that is to be fitted into the insert hole 451, as the guide member is fitted into and accommodated in a groove-like guide member accommodating portion (not shown in the figure) formed in the grasping member holding portion 450, slide movement can be realized without vibration.

Figure 97:
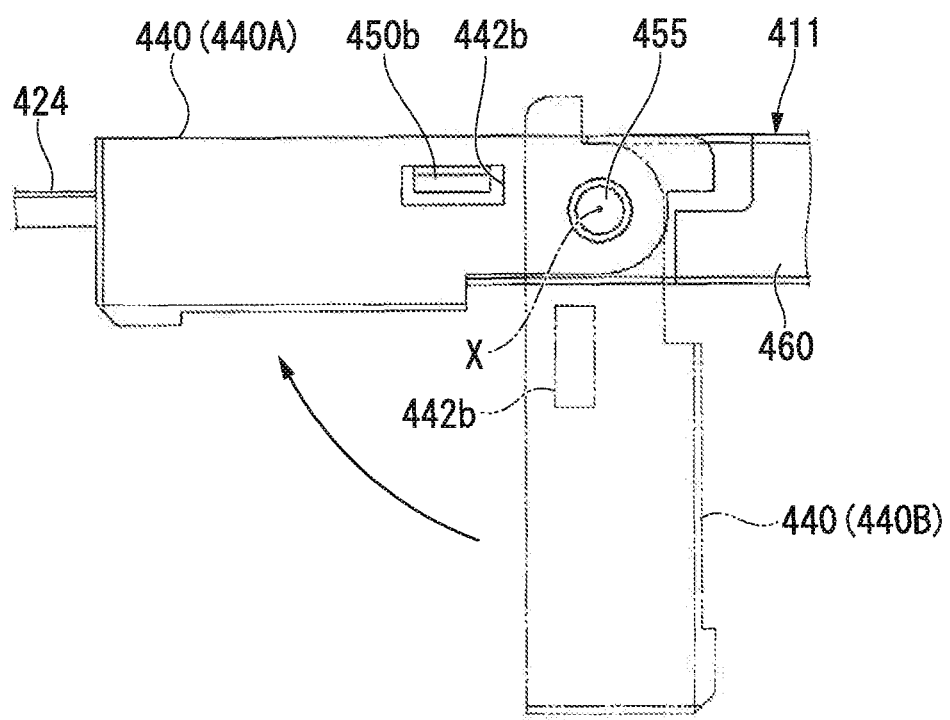
FIG. 97 is a side view showing a state where a lever member rotates from a standby position to a regulated position.

As shown in FIG. 97 or the like, the optical fiber splicing unit 410 shown as an example in the drawing is provided with a lever member 440 that rotates on the axis line X perpendicular to the longitudinal direction of the splice 430 (horizontal direction in FIG. 97) and thereby can rotate between a regulated position 440A (position indicated by a solid line in FIG. 97), at which the back-end portion 470*b* of the cable grasping member 470 is maintained and the backward movement thereof is thereby restricted, and a standby position 440B (position indicated by a chain line in FIG. 97), at which the backward movement of the cable grasping member 470 is not restricted.

The lever member 440 is configured to include: a cover plate 441 that covers the cable grasping member 470 held by the grasping member holding portion 450; and linear-shaped rotation arms 442 that are provided in parallel to each other at both sides thereof.

The paired arms 442 have bearing holes 442a into which a rotation shaft 455 protruding from both side portions of the grasping member holding portion 450 is inserted.

By inserting the rotation shaft 455 into the bearing holes 442a, the lever member 440 is pivotally provided so as to rotate with respect to the grasping member holding portion 450 on the rotation axis line X in the horizontal direction thereof.

Here, the bearing holes 442a are through holes that penetrate through the rotation arm 442 in the thickness direction thereof, but may be bottomed holes.

Additionally, a structure of the pivot point is not particularly limited, and a constitution may be adopted in which a bearing hole is formed at the grasping member holding portion 450, a rotation shaft protuberance is formed at the rotation arm 442, or the like.

As shown in FIG. 97, the cable grasping member 470 held by the grasping member holding portion 450 can be covered with the cover plate 441 by rotating the lever member 440 on the rotation shaft 455 (refer to FIG. 107).

Here, the position of the lever member 440 (a solid-line portion in FIG. 97) with respect to the grasping member holding portion 450 is also referred to as a covered position.

As shown in FIG. 93, before the cable grasping member 470 is inserted into the grasping member holding portion 450, the lever member 440 is opened so that the cable grasping member 470 is easily inserted into the grasping member holding portion 450.

The position of the lever member 440 (a chain-line portion in FIG. 97) with respect to the grasping member holding portion 450 in this situation is also referred to as an opened position.

In an example of the drawing, even after the cable grasping member 470 is inserted into the grasping member holding portion 450, the lever member 440 is maintained at the opened position so as to be able to operate the cable grasping member 470 until butt-jointing connection between the extended optical fiber 421 and the inserted optical fiber 401 is completed.

As shown in FIG. 107, or the like, when the lever member 440 is located at the covered position, backward-movement restriction ends 444 that are provided to protrude from the back-end side can be located at the back side of the cable grasping member 470.

It is possible to restrict backward movement of the cable grasping member 470 relative to the unit base 411 by disposing the backward-movement restriction ends 444 at the back side of the cable grasping member 470.

Since the optical fiber cable 424 protruding from the back side of the cable grasping member 470 is located at cut-off portions 445 (refer to FIG. 93) between the backward-movement restriction ends 444, the backward-movement restriction ends 444 are provided at both right and left sides of the optical fiber cable 424, and it is possible to cover a wide region of the back-end portion of the cable grasping member 470.

As shown in FIGS. 93 and 97, the rotation arms 442 of the lever member 440 have engagement holes 442b that are to be engaged with engagement protrusions 450b protruding from external faces 450a of the grasping member holding portion 450.

The lever member 440 can be maintained to be positioned at the covered position with respect to the grasping member holding portion 450 by causing the engagement protrusions 450b to engage with the engagement holes 442b.

A fastening operation of restricting backward movement of the cable grasping member 470 relative to the unit base 411 can be carried out by disposing the lever member 440 on the covered position.

Consequently, a state where the cable grasping member 470 and the unit base 411 are integrated is maintained.

The unit base 411 is preferably formed integrally with the grasping member holding portion 450 and the splice holder portion 460.

For example, the unit base 411 may be an integral molding product made of plastic.

In other cases, the outer coating grasping portion is not limited to constitution shown as an example in the drawing.

As an outer coating grasping portion, a press lid may be adopted which has a structure in which, for example, the lock plate portion 472b is omitted and an engagement portion to be engaged with the protuberance edge of the second side wall portion 471c of the grasping base 471 is provided on the top panel portion 472a.

Moreover, as the outer coating grasping portion, a structure that is formed of only the grasping base may be adopted.

Furthermore, the outer coating grasping portion is not limited to an integral molding product made of plastic, and a structure which is constituted of a plurality of members may be adopted.

The outer coating grasping portion may be a member that is fixed to, for example, the periphery of the terminal of the optical fiber cable 424 by adhesive fixation using adhesive, thermal welding, or the like.

An outer coating grasping portion of a modified example does not include a lid and is constituted of a grasping base in which both side wall portions 471b and 471c are provided on a bottom wall portion 471d in parallel with each other so as to protrude therefrom so that the cable-fitting groove 471a is interposed therebetween.

Removal prevention protrusions that project to the inside, restrict upward movement of the optical fiber cable 424, and thereby prevent the optical fiber cable 424 from being removed are formed at the protuberance edges of the side wall portions 471b and 471c.

In the outer coating grasping portion having this configuration, since a lid is not provided, the constitution thereof is simple, an operation of inserting the optical fiber cable 424 into the cable-fitting groove 471a is easy.

In addition, since the structure is simple, the manufacturing thereof is easy, and it is also possible to reduce the cost therefor.

Next, as shown in FIGS. 90 and 91, an optical fiber splicing unit 410 in which the extended optical fiber 421 is grasped and fixed to one end side of the splice 430 and a method of assembling thereof will be described.

The interposing member K is interposed between the halved elements 431 and 432 of the splice 430 in advance.

Additionally, as shown in FIG. 93, the lever member 440 is located at the safety position (opened position).

The cable grasping member 470 grasping the optical fiber cable 424 is inserted into the grasping member holding portion 450, and the extended optical fiber 421 is inserted into the one end side of the splice 430.

By allowing the cable grasping member 470 to press the front-end face 475a of a front-side protrusion portion 475 into the insert hole 451 of the grasping member holding portion 450, the front-side protrusion portion 475 is accommodated in the insert hole 451.

As shown in FIG. 93, a removal prevention protuberance 476 is provided on the side face of the front-side protrusion portion 475 so as to protrude therefrom.

After the front-side protrusion portion 475 is inserted into the insert hole 451, as the removal prevention protuberance 476 comes into contact with the inner surface 452a of the observation window 452 (particularly, the inner surface close to the edge face 451a of the insert hole 451) as shown in FIG. 107, it is possible to prevent the front-side protrusion portion 475 from being removed from the insert hole 451.

Particularly, as shown in FIG. 96B, in the case where the bottom portion 475d of the front-side protrusion portion 475 is directed downward by changing the direction of the cable grasping member 470, the removal prevention protuberance 476 can be in contact with the inner face 456a of the hole 456 that opens at the side face of the grasping member holding portion 450; therefore, it is possible to prevent the front-side protrusion portion 475 from being removed from the insert hole 451.

When the first interposing member (not shown in the figure), that is interposed between the back-end portion of the middle lid member 322 of the splice 430 and the base member 431 and between the rear lid member 321 and the base member 431, is removed from the splice 430, it is possible to grasp and fix the extended optical fiber 421 to the one end side of the splice 430 due to elastic action of the clamp spring 433.

When the first interposing member is removed from between the halved elements 431 and 432 of the splice 430 and the front-end portion of the extended optical fiber 421 is sandwiched between the halved elements 431 and 432 and thereby grasped and fixed therebetween, as a result of causing the cable grasping member 470 to further come close to one end side of the splice 430 in the longitudinal direction thereof, flexural deformation T can be formed at the portion having the coating 421b of the extended optical fiber 421 between the cable grasping member 470 and one end side of the splice 430 in the longitudinal direction thereof as shown in FIG. 107.

Finally, as shown in FIG. 107, as the stopper portion 470a of the cable grasping member 470 comes into contact with the edge face 451a provided around the insert hole 451 of the grasping member holding portion 450, the forward movement of the cable grasping member 470 is stopped.

When the lever member 440 moves rotationally to the regulated position, the cable grasping member 470 is held by the grasping member holding portion 450 at the position at which the front-end portion of the extended optical fiber 421 inserted between the halved elements 431 and 432 through one end side of the splice 430 in the longitudinal direction thereof.

In the drawing shown as an example, even if an operator forgets to operate the cable grasping member 470 to move forward, when the lever member 440 moves rotationally from the safety position to the regulated position, inclined faces 444a of the backward-movement restriction ends 444 (refer to FIGS. 93 and 107) come into contact with the back-end portion 470b of the cable grasping member 470, it is possible to apply the pressing force to the cable grasping member 470 to move forward.

For this reason, it is possible to reliably form flexural deformation T at the portion having the coating 421b of the extended optical fiber 421 between the cable grasping member 470 and the splice 430.

Particularly, in an example of the drawing, since the flexural deformation T is formed after the extended optical fiber 421 is grasped and fixed by the splice 430, the elastic force which is due to the flexural deformation T does not affect the bare optical fiber 421a of the front end of the extended optical fiber 421.

However, the butting force of the optical fibers 401 and 421 can be ensured by forming the flexural deformation at the inserted optical fiber 401 during butt-jointing both optical fibers 401 and 421.

The insertion end of the extended optical fiber 421 in the halved grasping member 434 is grasped and fixed to the splice 430, the cable grasping member 470 grasping the outer coating 425 is held by the lever member 440, and as a result, the flexural deformation T is thereby protected.

Even where a force is generated in the direction in which the extended optical fiber 421 drawn into the inside of the outer coating 425 depending on difference in linear coefficient of expansion between the outer coating 425 and the extended optical fiber 421 and variation in ambient temperature, since the foregoing flexural deformation T is formed, the applying of excessive tension to the extended optical fiber 421 is prevented, and damage to the optical fiber is prevented.

Moreover, the position of the front end of the extended optical fiber 421 that is inserted into the splice 430 in advance is important to form suitable flexural deformation on the inserted optical fiber 401 during butt-jointing both optical fibers 401 and 421.

The lengths of both optical fibers 401 and 421 are set so that the butt-jointing of the front ends of both optical fibers 401 and 421 to each other is realized at the center of the splice 430 in the longitudinal direction thereof.

If the position of the front end of the first-insertion extended optical fiber 421 does not reach the center of the splice 430 in the longitudinal direction thereof, there is a concern that the butt-jointing of the inserted optical fiber 401 thereto may be incomplete.

Conversely, if the position of the front end of the first-insertion extended optical fiber 421 exceeds the center of the splice 430 in the longitudinal direction thereof, there is a concern that flexural deformation to be formed on the inserted optical fiber 401 excessively becomes larger when the inserted optical fiber 401 is butt-jointed thereto.

After the extended optical fiber 421 is grasped and fixed to one end side of the splice 430, the inserted optical fiber 401 is inserted into the other end side of the splice 430 from the fiber introduction recess portion 466, and optical splice between the extended optical fiber 421 and the inserted optical fiber 401 is realized by grasping and fixing the inserted optical fiber 401 to the other end side of the splice 430.

The inserted optical fiber 401 can be inserted into the coated-portion insertion grooves 431d and 323b of the splice 430 through the fiber introduction recess portion 466, that opens at the front end of the splice holder portion 460, in a state of being held by, for example, a fiber holder (not shown in the figure).

The bare optical fiber 401a, that is exposed at the front end of the inserted optical fiber 401, is inserted into the alignment groove 431b through the coated-portion insertion grooves 431d and 323b and can be brought into contact with the front end of the bare optical fiber 421a of the extended optical fiber 421.

When the second interposing member (not shown in the figure), that is interposed between the forward-end portion of the middle lid member 322 of the splice 430 and the base member 431 and between the front lid member 323 and the base member 431, is removed from the splice 430, it is possible to grasp and fix the inserted optical fiber 401 to the other end side of the splice 430 due to elastic action of the clamp spring 433.

As a result of grasping and fixing the extended optical fiber 421 and the inserted optical fiber 401, in which the splicing operation is completed, to the halved grasping member 434 of the splice 430, a state where the bare optical fibers 401a and 421a are butt-jointed to each other is stably maintained.

Additionally, since the optical fiber splicing unit 410, in which the operation of splicing the extended optical fiber 421 to the inserted optical fiber 401 is completed, accommodates the splice 430 grasping and fixing both optical fibers 401 and 421 in the splice holder portion 460, it is possible to provide the mechanical splice with excellent operatability.

The extended optical fiber 421 can be connected to the other optical fiber through the connector by use of the optical connector 422.

Because of this, the inserted optical fiber 401 and another connector-attached optical fiber can be optically spliced to each other through the extended optical fiber 421.

An example of use of the optical fiber splicing unit 410A in which both optical fibers 401 and 421 are spliced to each other will be described.

The inserted optical fiber 401 that is drawn from the optical fiber cable is spliced to the extended optical fiber 421 by use of the above-described splicing method.

The optical fiber cable is, for example, an optical fiber cable or the like trunk that is installed in a vertical hole (for example, a hoistway used for an elevator) provided at each floor of a construction including a plurality of floors.

The optical fiber splicing unit 410A to which the inserted optical fiber 401 is spliced is stored in an optical fiber splicing box (for example, referred to as an optical termination box or the like), if required, the optical connector 422 is spliced to the other optical fiber (not shown in the figure) through the connector, and therefore, it is possible to optically splice the inserted optical fiber 401 to another connector-attached optical fiber (not shown in the figure).

The other optical fiber (not shown in the figure) of the optical fiber splicing unit 410A which is to be spliced is not particularly limited, but may be indoor optical fibers, optical fibers that are provided in an optical composite electronic device, or the like.

In the optical fiber splicing unit 410, since the splice holder portion 460 and the cable grasping member 470 are integrated, the position of the terminal 424a of the optical fiber cable 424 relative to the splice 430 is always constant.

Consequently, during an operation of accommodating optical fibers to the optical fiber splicing box or the like, excessive force is not applied to the optical fiber 421 between the terminal 424a and the splice 430, and it is possible to prevent damage thereto.

Therefore, excellent operatability is realized.

Moreover, the optical fiber splicing unit 410 has a simple structure and can be reduced in size, therefore, is accommodated in the optical joint box (optical termination box or the like) and can be used without modification.

In the optical fiber splicing unit 410, since both the splice holder portion 460 and the cable grasping member 470 are provided on the upper surface side of the unit base 411, the structure is simple and can be reduced in size.

In addition, since the splice holder portion 460, the cable grasping member 470, and the optical fiber 421 are less easily affected by external force that is applied from the lower face side of the unit base 411, it is possible to increase the durability thereof.

The optical fiber splicing unit 410 can efficiently and simply realize splicing of the optical fibers to each other (the inserted optical fiber 401 is spliced to the extended optical fiber 421) by use of the mechanical splice.

Furthermore, the optical fiber splicing unit 410 realizes a structure simpler than that of the optical fiber splicing tool disclosed in Japanese Unexamined Patent Application, First Publication No. 2002-71999 as has been described and can easily be realized at a low cost.

Moreover, since the optical fiber splicing unit 410 can be easily reduced in size, it is advantageous to insertion into a little space, and it can be widely applied to a work operation of splicing the extended optical fiber 421 to the optical fiber (inserted optical fiber 401) or a work operation (optical fiber relay-splicing method) of splicing optical fibers through the extended optical fiber 421.

Figure 104:
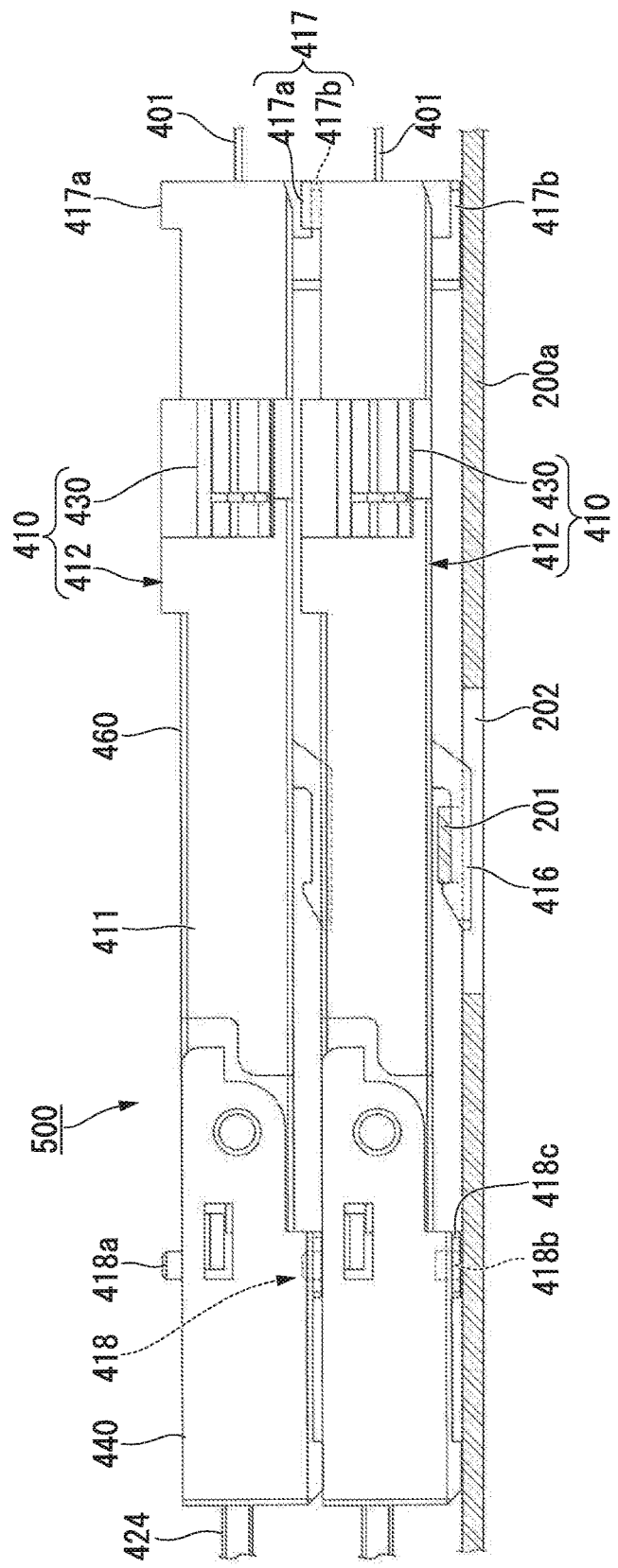
FIG. 104 is a side view showing an example state where optical fiber splicing units are stacked.

FIG. 104 shows an installation example of the optical fiber splicing units in which a splicing operation of the inserted optical fiber 401 thereto was carried out.

The optical fiber splicing unit 410 includes engagement claw 416 that are provided under the unit base 411 so as to protrude therefrom.

By causing the engagement claw 416 to engage with a plate-shaped portion 200a that is a bottom portion of a storage container or the like such as an optical joint box or a tray, it is possible to easily place the optical fiber splicing unit 410 in the storage container or the like.

A locking portion 201 with which the engagement claw 416 is engaged is formed at the plate-shaped portion 200a, and an opening portion 202 capable of accommodating the engagement claw 416 that engages with the locking portion 201 is provided around the locking portion 201.

Hereinafter, the optical fiber splicing unit may be referred to as a unit.

In an example of the drawing, the locking portion 201 is provided at a position higher than that of the plate-shaped portion 200a.

For this reason, even where the thickness of the plate-shaped portion 200a is small, the engagement claw 416 is prevented from protruding toward the lower side of the plate-shaped portion 200a, it is possible to prevent a structure, that is provided under the plate-shaped portion 200a, from being limited.

As shown in FIG. 104, the case 412 includes: the splice holder portion 460 accommodating the splice 430 in the unit 410, an engagement unit 417 that allows units 410 to be able to engage with each other as a result of movement in a direction different from the vertical direction thereof; and a connection unit 418 that allows the units 410 to be coupled to each other as a result of movement in a vertical direction, that is, the direction in which the units 410 are stacked.

By integrating a plurality of units 410 so as to be stacked up and down in any plural number of stages as described above, it is advantageous to efficiency in installation operation and space-saving.

Furthermore, when engagement of the engagement unit 417 is carried out, since the movement direction of the unit 410 is different from the vertical direction that is the movement direction during connection of a connection projected portion 418a to a connection recessed portion 418b, it is possible to prevent the connection unit 418 from being unintentionally removed or the units 410 from being separated from each other.

As shown in FIGS. 90 to 92 and 107, the connection unit 418 includes: the connection projected portion 418a that protrudes upwardly from the upper surface of the case 412; and the connection recessed portion 418b that opens downwardly at the bottom face of the case 412.

In the case shown as an example in the drawing, the connection recessed portion 418b is a through hole that penetrates through the cover plate 441 in the thickness direction thereof, but the connection projected portion 418a may also be a through hole or a bottomed hole as long as it can be fitted into the connection recessed portion 418b.

The connection projected portion 418a and the connection recessed portion 418b are removably fitted to each other by movement in the vertical direction, it is possible to reliably connect the above and below units 410 to each other using a simple operation.

In an example of the drawing, a connection portion of the case upper surface is formed on the upper surface 411a of the unit base 411 of the grasping member holding portion 450, and a connection portion of the case bottom surface is formed on the outer surface of the cover plate 441 of the lever member 440 which is located at the regulated position; in other cases, the position of the connection portion is not particularly limited thereto and may be provided on the upper portion and the bottom portion of, for example, the unit base 411, such as a bottom face of a base part 461 of the splice holder portion 460, or an upper surface or the like of the protruding wall portions 462 to 465.

Furthermore, in an example of the drawing, as connection portions of the upper portion and the lower portion of the case, a projected portion is provided on a case upper portion and a recessed portion is provided on a case lower portion.

Conversely, as connection portions of the upper portion and the lower portion of the case, a recessed portion may be provided on the case upper portion and a projected portion may be provided on the case lower portion.

Moreover, a first connection unit that is configured by combining the projected portion of the case upper portion with the recessed portion of the case lower portion and a second connection unit that is configured by combining the recessed portion of the case upper portion with the projected portion of the case lower portion may be concomitantly-used.

A boss section 418c that protrudes downwardly from the bottom face of the case 412 is provided around the connection recessed portion 418b so as to increase the thickness thereof.

Because of this, even where the thickness of the entire bottom portion of the case 412 does not increase, it is possible to sufficiently ensure the depth of the connection recessed portion 418b into which the connection projected portion 418a is inserted and can be fitted.

The shapes of the connection projected portion 418a and the connection recessed portion 418b are not particularly limited and may be a suitable shape such as a circle, an ellipse, and a polygon.

If the section size (for example, internal diameter) of the connection recessed portion 418b is smaller than the section size (for example, outer diameter) of the connection projected portion 418a, they are fitted together with a large force, they are less easily detached from each other, and therefore preferable.

Figure 105:
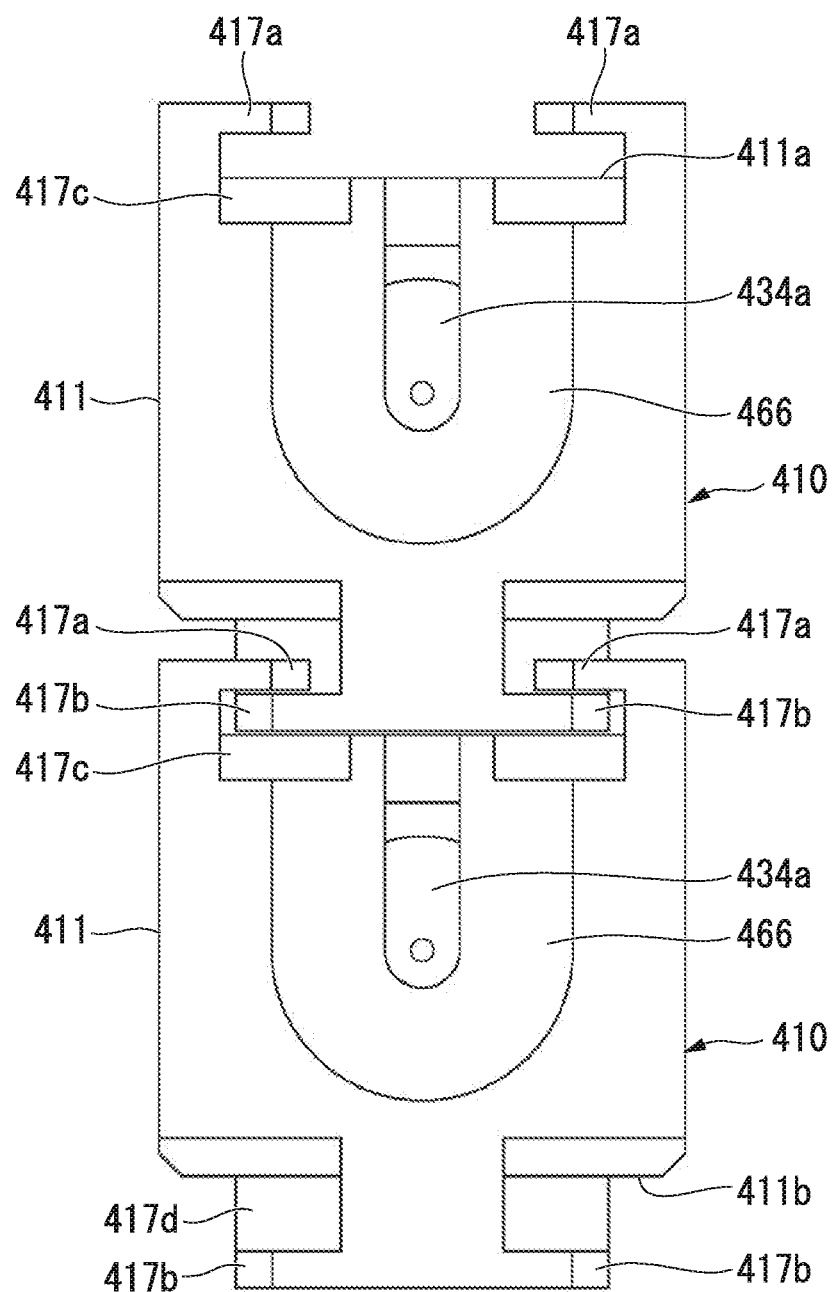
FIG. 105 is a side view showing a state where engagement units are engaged with each other which is viewed from a case end side.

As shown in FIG. 105, the engagement unit 417 is constituted of an upper-side engagement portion 417a that is provided on the upper portion of the case 412 and a lower-side engagement portion 417b that is provided on the lower portion of the case 412.

Figure 106B:
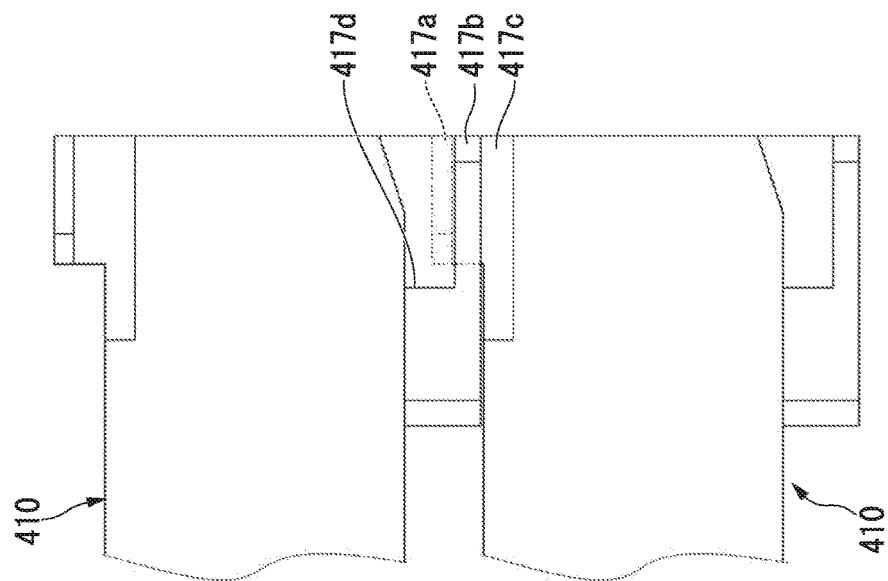
FIG. 106B is a side view thereof showing a post-state of engaging the engagement units.
Figure 106A:
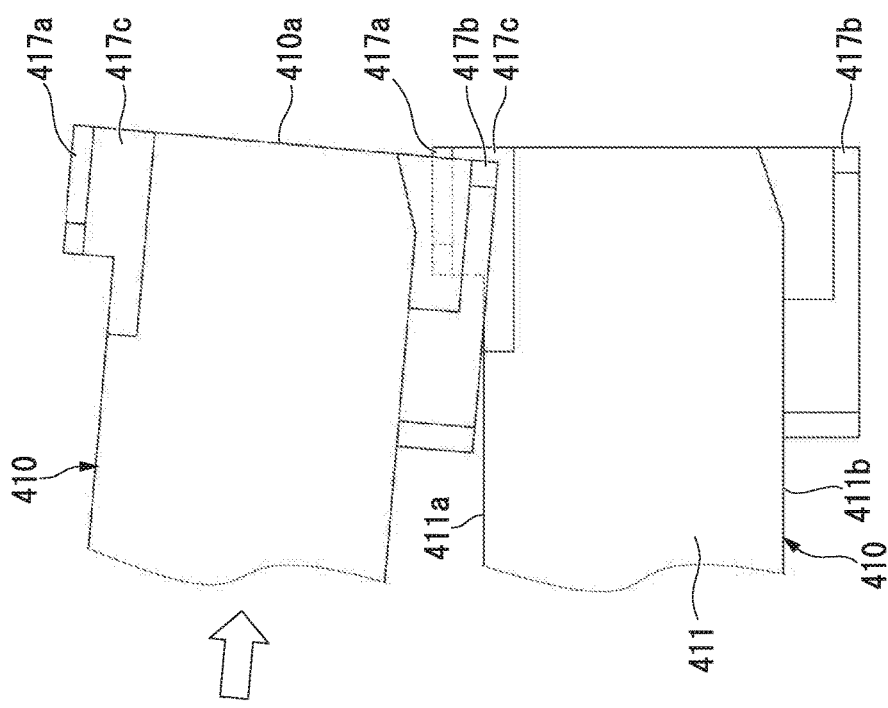
FIG. 106A is a side view showing a state of engaging the engagement units.

When the upper-side unit 410 is stacked on the lower-side unit 410, the lower-side engagement portion 417b of the upper-side unit 410 is inserted between the upper surface 411a of the lower-side unit 410 and the upper-side engagement portion 417a by transferring the upper-side unit 410 along the longitudinal direction of the unit base 411 (splice longitudinal direction) as shown in FIGS. 106A and 106B, and the engagement portions 417a and 417b can be engaged with each other.

The upper-side engagement portion 417a shown as an example in the drawing protrudes upwardly from the upper surface 411a of the unit base 411 and has a shape that bends inward in the width direction of the splice 430 (horizontal direction in FIG. 105).

Additionally, the lower-side engagement portion 417b protrudes downwardly from the bottom face 411b of the unit base 411 and has a shape that bends outward in the width direction of the splice 430 (horizontal direction in FIG. 105).

In other cases, the constitution of the engagement unit 417 is not limited to the drawing shown as an example and may has a configuration in which, for example, the upper-side engagement portion 417a bends outward in the width direction and the lower-side engagement portion 417b bends inward in the width direction.

Furthermore, instead of provision of the upper-side engagement portion 417a to both sides in the width direction, provision thereof to one side in the width direction may be adopted.

Also, instead of provision of the lower-side engagement portion 417b to both sides in the width direction, provision thereof to one side in the width direction may be adopted.

A recessed portion 417c that is depressed lower than the upper surface 411a is formed inside the upper-side engagement portion 417a.

Consequently, as shown in FIG. 106A, when the engagement portions 417a and 417b are engaged with each other, the upper-side unit 410 of the end portion 410a can be lowered as an attitude thereof, a wide acceptable direction range of the end portion 410a of the upper-side unit 410 can be ensured.

A stopper 417d that prevents the upper-side engagement portion 417a from passing therethrough is provided behind the lower-side engagement portion 417b (left side in FIGS. 106A and 106B).

As shown in FIGS. 93 and 98, the splice holder portion 460 shown as an example in the drawing includes a slot 468, through which the splice 430 can be extracted, above the splice 430.

For this reason, in a state where a plurality of units 410 are stacked up and down as shown in FIG. 104, as necessary, the splice 430 can be removed while grasping and fixing the optical fibers 401 and 421.

As shown in FIG. 92, elongate holes 411c are provided at the bottom portion of the unit base 411 (particularly, a base part 461 of the splice holder portion 460) so as to be located at the positions corresponding to the lower sides of the locking claws 462c and 463c.

For this reason, when putting in and out of the splice 430 with respect to the splice storage space 467 of the splice holder portion 460 through the slot 468 is carried out, the one-side-protruding wall portion 462 and the another-side-protruding wall portion 463 easily and elastically deform in the thickness direction at the positions of the locking claws 462c and 463c, and the distance between the locking claws 462c and 463c is easily wider than or equal to the width of the splice 430 by pushing them.

A plurality of unit-connected bodies 500 that are coupled by stacking a plurality of units 410 up and down as shown in FIG. 104 can be formed on the plate-shaped portion 200a of the storage container or the like.

Partitions may be provided around the unit-connected bodies 500 or between the unit-connected bodies 500.

Furthermore, a space into which the optical fiber 401 or the optical fiber cable 424 is inserted may be provided at the partitions.

According to the units 410 of the embodiment, even in the case where it is necessary to replace the optical fiber that is grasped and fixed to the splice 430 in a specified unit 410 with another one, since the units 410 is easily detachable from each other, the units 410 are simply separated from each other, and it is possible to carry out an operation of replacement of the optical fiber or re-splicing thereof.

Conventionally, in the case where splicing points of optical fibers such as splice are accommodated in the storage container or the like such as a tray or an optical joint box, when an operation regarding an optional line is carried out, it is necessary to carry out the operation after splicing points of peripheral lines temporarily transfer.

At this time, an operator may carry out a work operation regarding a line or may temporarily fixes a line to near work area by use of a jig used for temporal fixation such as an adhesive tape, a ligature, or a fastener in a state of ensuring the temporarily-transferred splicing points with their hand or the like.

In the case of carrying out a work operation regarding the upper-side unit 410 in one unit-connected body 500, it is possible to remove only the upper-side unit 410 without affecting the lower-side unit 410.

In the case of carrying out a work operation regarding the lower-side unit 410, it is preferable that the upper-side unit 410 that is located upper than that be temporarily held at a different place.

According to the units 410 of the embodiment, since the connection projected portion 418a can be removably engaged with the connection recessed portion 418b of the other unit 410, it is possible to temporarily fix the upper-side unit 410, that is necessary to be held at a different place, by further stacking this unit on the uppermost unit 410 of the other unit-connected body 500.

Therefore, it is necessary for an operator to ensure the unit 410, that is not necessary to be subjected to a work operation, with their hand or the like where, a work operation related to a necessary unit 410 can be safely carried out, and it is possible to prevent the influence on a line.

Even in the case where extra lengths of the optical fiber 401 or the optical fiber cable 424 are short, since temporary fixation can be carried out by utilizing a suitable-near unit 410, it is possible to prevent the influence on the optical fiber 401 or the optical fiber cable 424.

In the above-description, the best mode of the invention is described; however, the invention is not limited to the above-described best mode, and various modifications may be made without departing from the scope of the invention.

For example, specific constitutions of a mechanical splice, an extended-optical-fiber-attached splice, an interposing member, an optical connector, and a fiber holder are not limited as long as they are applied to a technical concept of the invention.

What is claimed is:

1. A method of splicing an optical fiber, splicing a first optical fiber cable and an optical fiber in a splicing box, the first optical fiber cable being a drop cable or an indoor cable, the first optical fiber cable having one terminal to which an optical connector is attached, the first optical fiber cable having an other terminal, a second optical fiber cable being an optical fiber cable trunk line, the optical fiber being drawn from the second optical fiber cable, the method splicing the other terminal of the first optical fiber cable and the optical fiber, the method using an optical fiber splicing device comprising:

an extended-optical-fiber-attached splice configured to grasp and fix an extended optical fiber at one end side in a longitudinal direction of a mechanical splice and between halved elements and configured to interpose an interposing member between the halved elements at an other end side in the longitudinal direction of the mechanical splice, the extended optical fiber being drawn from the other terminal of the first optical fiber cable;

a unit base configured to hold the extended-optical-fiber-attached splice; and a device base that comprises a grasper that grasps, in the extended-optical-fiber-attached splice, an inserted optical fiber that is drawn from the second optical fiber cable and is to be butt-jointed to the extended optical fiber, wherein the unit base comprises: a base body; a splice holder that is formed integrally with the base body and configured to hold the mechanical splice; and an outer coating grasper that is formed integrally with the base body and configured to grasp an outer coating of the other terminal of the first optical fiber cable, the splice holder and the outer coating grasper are formed separately to each other, part of the extended optical fiber which is located between the splice holder and the outer coating grasper has flexibility, the device base comprises a rail configured to allow the unit base to slide in a direction in which the unit base approaches the grasper, and the method comprises:

sliding the unit base holding the extended-optical-fiber-attached splice along the rail in the direction in which the unit base approaches the grasper;

thereby inserting the inserted optical fiber grasped by the grasper between the halved elements of the mechanical splice; and splicing the inserted optical fiber and the extended optical fiber by butt-jointing an end of the inserted optical fiber to the extended optical fiber.

2. The method according to claim 1, wherein the optical fiber splicing device further comprises a unit maintaining member that is configured to hold the unit base and has a guided portion to be guided by the rail, as the guided portion of the unit maintaining member is guided by the rail, the unit base slides along the rail.

3. An optical fiber splicing device configured to splice a first optical fiber cable and an optical fiber in a splicing box, the first optical fiber cable being a drop cable or an indoor cable, the first optical fiber cable having one terminal to which an optical connector is attached, the first optical fiber cable having an other terminal, a second optical fiber cable being an optical fiber cable trunk line, the optical fiber being drawn from the second optical fiber cable, the optical fiber splicing device comprising:

an extended-optical-fiber-attached splice configured to grasp and fix an extended optical fiber at one end side in a longitudinal direction of a mechanical splice and between halved elements and configured to interpose an interposing member between the halved elements at an other end side in the longitudinal direction of the mechanical splice, the extended optical fiber being drawn from the other terminal of the first optical fiber cable;

a unit base configured to hold the extended-optical-fiber-attached splice; and a device base that comprises a grasper that grasps, in the extended-optical-fiber-attached splice, an inserted optical fiber that is drawn from the second optical fiber cable and is to be butt-jointed to the extended optical fiber, wherein the unit base comprises: a base body; a splice holder that is formed integrally with the base body and configured to hold the mechanical splice; and an outer coating grasper that is formed integrally with the base body and configured to grasp an outer coating of the other terminal of the first optical fiber cable, the splice holder and the outer coating grasper are formed separately to each other, part of the extended optical fiber which is located between the splice holder and the outer coating grasper has flexibility, the device base comprises a rail configured to allow the unit base to slide in a direction in which the unit base approaches the grasper, the inserted optical fiber grasped by the grasper is inserted between the halved elements of the mechanical splice by sliding the unit base holding the extended-optical-fiber-attached splice along the rail in the direction in which the unit base approaches the grasper, and the inserted optical fiber is spliced to the extended optical fiber by butt-jointing an end of the inserted optical fiber to the extended optical fiber.

4. The optical fiber splicing device according to claim 3, further comprising a unit maintaining member that is configured to hold the unit base and has a guided portion to be guided by the rail, wherein as the guided portion of the unit maintaining member is guided by the rail, the unit base slides along the rail.

5. The optical fiber splicing device according to claim 4, wherein the splice holder comprises:

a plurality of protruding wall portions that are configured to hold the mechanical splice; and engagement claws that are provided to protrude from the protruding wall portions and configured to engage with the mechanical splice accommodated between the protruding wall portions and restrict upward movement thereof.

* * * * *